(12) United States Patent
Malone et al.

(10) Patent No.: US 12,521,227 B2
(45) Date of Patent: Jan. 13, 2026

(54) METHODS AND DEVICES FOR TISSUE GRAFT FIXATION

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Miles Malone, New Durham, NH (US); Christopher D. MacCready, Medfield, MA (US); Ali Hosseini, Quincy, MA (US); Mark Edwin Housman, North Attleboro, MA (US); Chun Liu, Brookline, MA (US); James Hunt, Hanover, MA (US); Jacob Peabody, Londonderry, NH (US); Paul McGovern, Hanson, MA (US); Han Teik Yeoh, Albany, MA (US); Paul Alexander Torrie, Marblehead, MA (US); Mason James Bettenga, Memphis, TN (US); Anil S. Ranawat, Tenafly, NJ (US); Lawrence Ferraiuolo, Randolph, NJ (US); Geoffrey Ian Karasic, Raynham, MA (US)

(73) Assignees: Smith & Nephew, Inc., Memphis, TN (US); Smith & Nephew Orthopaedics AG, Zug (CH); Smith & Nephew Asia Pacific Pte. Limited, Singapore (SG)

( * ) Notice: Subject to any disclaimer, the term of this patent is extended or adjusted under 35 U.S.C. 154(b) by 1059 days.

(21) Appl. No.: 17/617,212

(22) PCT Filed: Jun. 18, 2020

(86) PCT No.: PCT/US2020/038401
§ 371 (c)(1),
(2) Date: Dec. 7, 2021

(87) PCT Pub. No.: WO2020/257432
PCT Pub. Date: Dec. 24, 2020

(65) Prior Publication Data
US 2022/0233302 A1    Jul. 28, 2022

Related U.S. Application Data

(60) Provisional application No. 63/036,570, filed on Jun. 9, 2020, provisional application No. 62/978,401, filed
(Continued)

(51) Int. Cl.
*A61F 2/08*    (2006.01)

(52) U.S. Cl.
CPC ..... *A61F 2/0811* (2013.01); *A61F 2002/0823* (2013.01); *A61F 2002/0852* (2013.01); *A61F 2250/0012* (2013.01)

(58) Field of Classification Search
CPC ............ A61F 2/0811; A61F 2002/0852; A61F 2250/0012; A61F 2002/0882;
(Continued)

(56) References Cited

U.S. PATENT DOCUMENTS

| | | | |
|---|---|---|---|
| 4,291,698 | A | 9/1981 | Fuchs et al. |
| 4,823,794 | A | 4/1989 | Pierce |

(Continued)

FOREIGN PATENT DOCUMENTS

| | | |
|---|---|---|
| CN | 107028683 | 8/2017 |
| CN | 107753150 | 3/2018 |

(Continued)

OTHER PUBLICATIONS

Japanese Notice or Reasons for Rejection—Application No. 2021-573971 dated Dec. 12, 23.
(Continued)

*Primary Examiner* — Julian W Woo
(74) *Attorney, Agent, or Firm* — Kate Ryland Tetzlaff; Norman F. Hainer, Jr.

(57) ABSTRACT

Methods and devices for tissue graft fixation include fixation devices attached to an adjustable fixation loop of suture without compromising the graft or requiring additional material to complete the repair. Other fixation devices are attachable to an independent adjustable suture system. Adjustable fixation loops minimize slip/creep of the suture within the loop.

19 Claims, 88 Drawing Sheets

Related U.S. Application Data on Feb. 19, 2020, provisional application No. 62/978,425, filed on Feb. 19, 2020, provisional application No. 62/933,695, filed on Nov. 11, 2019, provisional application No. 62/901,463, filed on Sep. 17, 2019, provisional application No. 62/869,593, filed on Jul. 2, 2019, provisional application No. 62/862,807, filed on Jun. 18, 2019.

(58) Field of Classification Search
CPC ..... A61F 2002/0817; A61F 2002/0847; A61B 17/0401; A61B 2017/0404; A61B 2017/0414; A61B 2017/0459
See application file for complete search history.

(56) References Cited

U.S. PATENT DOCUMENTS

| | | | |
|---|---|---|---|
| 6,193,754 | B1 | 2/2001 | Seedhom |
| 6,833,005 | B1 | 12/2004 | Mantas |
| 8,123,806 | B1 | 2/2012 | Hoof |
| 9,642,610 | B2 * | 5/2017 | Albertorio ......... A61B 17/0401 |
| 10,076,322 | B1 | 9/2018 | Dreyfuss |
| 2001/0041938 | A1 | 11/2001 | Hein |
| 2002/0077631 | A1 | 6/2002 | Lubbers et al. |
| 2002/0173788 | A1 | 11/2002 | Bojarski et al. |
| 2003/0176919 | A1 | 9/2003 | Schmieding |
| 2004/0254593 | A1 | 12/2004 | Fallin et al. |
| 2005/0288711 | A1 | 12/2005 | Fallin et al. |
| 2007/0162125 | A1 | 7/2007 | LeBeau et al. |
| 2008/0046009 | A1 | 2/2008 | Albertorio et al. |
| 2008/0275553 | A1 | 11/2008 | Wolf et al. |
| 2008/0287991 | A1 | 11/2008 | Fromm |
| 2009/0043318 | A1 | 2/2009 | Michel et al. |
| 2010/0100182 | A1 | 4/2010 | Barnes et al. |
| 2010/0256677 | A1 | 10/2010 | Albertorio et al. |
| 2010/0298872 | A1 | 11/2010 | Berndt et al. |
| 2010/0324676 | A1 | 12/2010 | Albertorio et al. |
| 2011/0087280 | A1 | 4/2011 | Albertorio |
| 2011/0118762 | A1 | 5/2011 | Dooney, Jr. et al. |
| 2012/0059416 | A1 * | 3/2012 | Justin ................ A61B 17/0401 606/232 |
| 2012/0059418 | A1 | 3/2012 | Denham et al. |
| 2012/0071719 | A1 | 3/2012 | Shanley et al. |
| 2012/0109194 | A1 | 5/2012 | Miller et al. |
| 2012/0123541 | A1 | 5/2012 | Albertorio et al. |
| 2012/0123641 | A1 | 5/2012 | Albertorio et al. |
| 2013/0023929 | A1 | 1/2013 | Sullivan et al. |
| 2013/0035720 | A1 | 2/2013 | Berube, Jr. et al. |
| 2013/0204366 | A1 | 8/2013 | Spenciner et al. |
| 2013/0345726 | A1 | 12/2013 | Berube, Jr. et al. |
| 2014/0222148 | A1 | 8/2014 | Shinde |
| 2014/0243976 | A1 | 8/2014 | Schmieding et al. |
| 2014/0257346 | A1 | 9/2014 | Sengun et al. |
| 2014/0276990 | A1 | 9/2014 | Perez, III |
| 2015/0057750 | A1 | 2/2015 | Timmerman |
| 2015/0094761 | A1 | 4/2015 | Spenciner |
| 2015/0196385 | A1 | 7/2015 | Kam et al. |
| 2016/0345963 | A1 | 12/2016 | Langley et al. |
| 2017/0014122 | A1 | 1/2017 | Lear |
| 2017/0231752 | A1 | 8/2017 | Rodriguez et al. |
| 2018/0049755 | A1 | 2/2018 | Laviano et al. |
| 2018/0085110 | A1 | 3/2018 | Earhart et al. |
| 2018/0098839 | A1 | 4/2018 | Hoover et al. |
| 2018/0103947 | A1 | 4/2018 | Nobles et al. |
| 2018/0185135 | A1 | 7/2018 | Meister et al. |
| 2018/0221014 | A1 | 8/2018 | Darabian |
| 2018/0249998 | A1 | 9/2018 | Chavan et al. |
| 2019/0125340 | A1 | 5/2019 | Bettenga |
| 2019/0321024 | A1 | 10/2019 | Rodriguez et al. |
| 2019/0365366 | A1 | 12/2019 | Petry et al. |
| 2020/0100781 | A1 | 4/2020 | Brunsvold et al. |

FOREIGN PATENT DOCUMENTS

| | | |
|---|---|---|
| CN | 208447852 | 2/2019 |
| EP | 1108401 | 6/2001 |
| EP | 2677941 | 1/2014 |
| WO | 2013032435 | 3/2013 |
| WO | WO2016205351 | 12/2016 |
| WO | 17207027 A1 | 12/2017 |
| WO | 18204553 | 11/2018 |
| WO | 2019051050 | 3/2019 |
| WO | WO19051050 A | 3/2019 |

OTHER PUBLICATIONS

Search Report and WO for PCT/US2020/038401 dated Dec. 4, 2020, 21 pages.
Japanese Application No. 2021-573971, Notice of Reasons for Rejection.
European Application No. 20737705.2-1122 Examination Report dated Jan. 21, 2022.

* cited by examiner

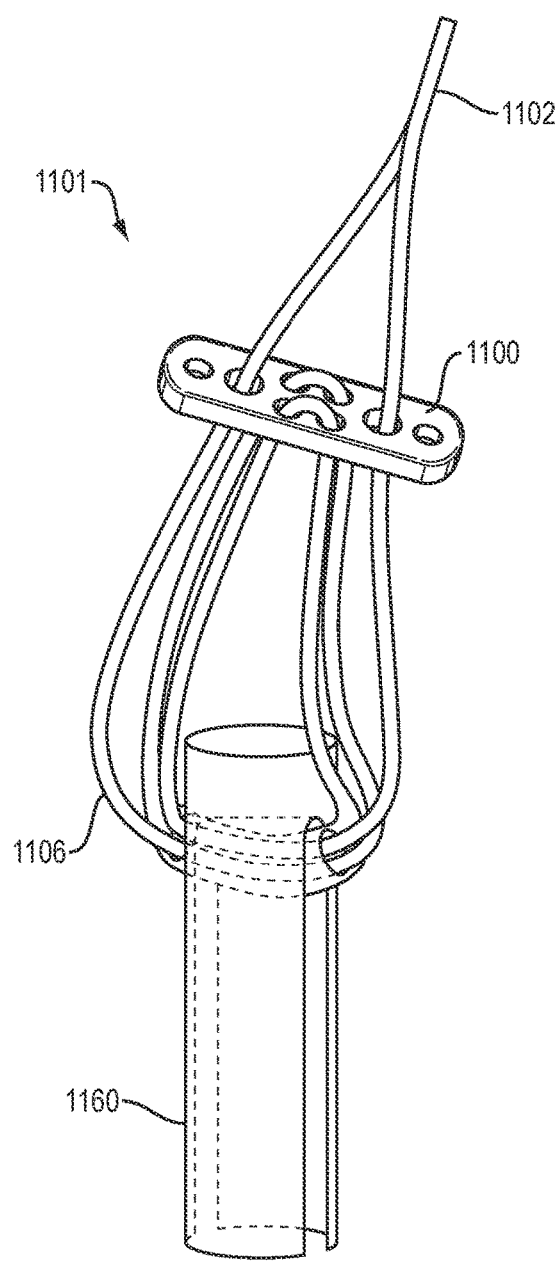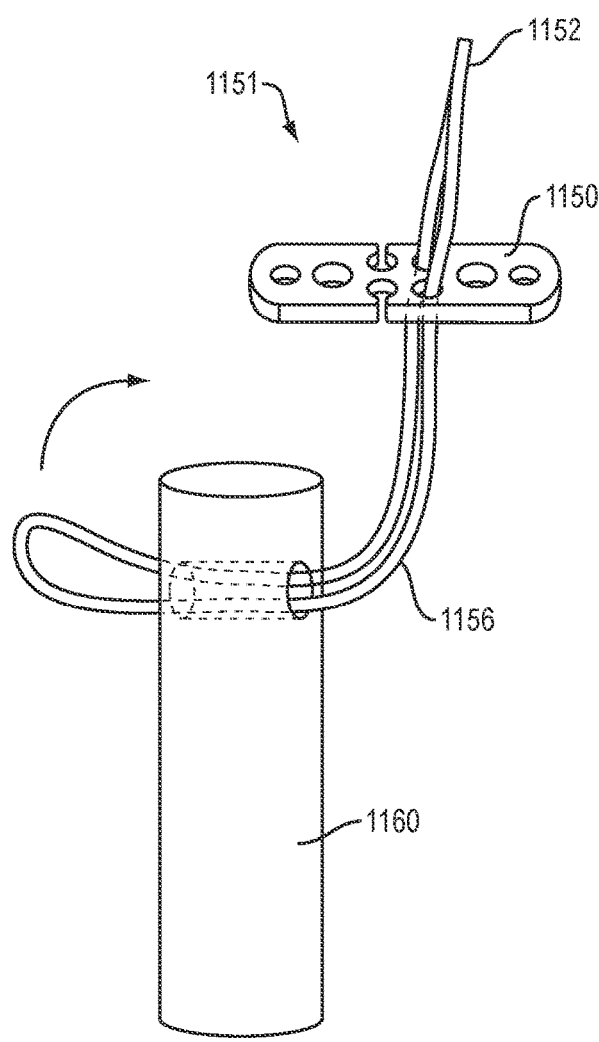
FIG. 11A
FIG. 11B

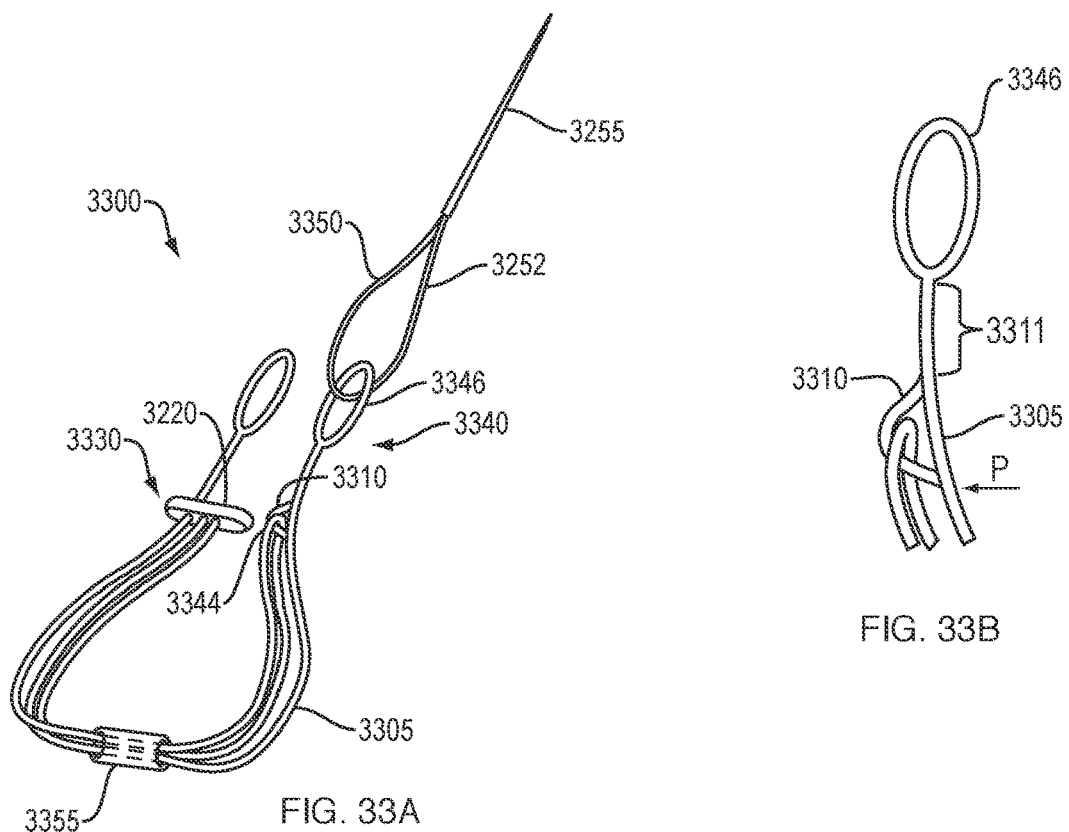
FIG. 33A
FIG. 33B
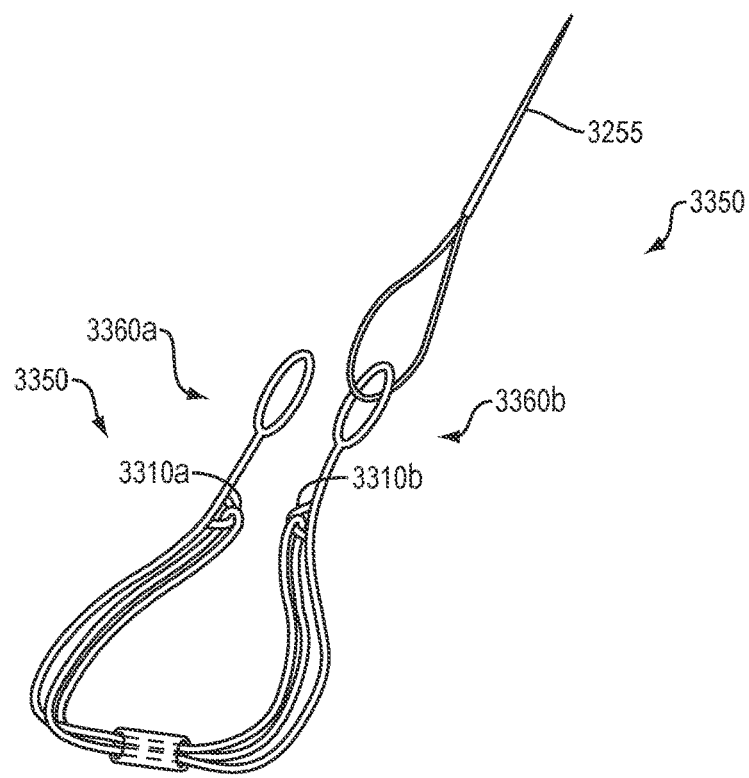
FIG. 33C

METHODS AND DEVICES FOR TISSUE GRAFT FIXATION

CROSS-REFERENCE TO RELATED APPLICATIONS

This application is a U.S. National Phase Entry of PCT Application Serial No. PCT/US2020/038401 filed Jun. 18, 2020 and titled "METHODS AND DEVICES FOR TISSUE GRAFT FIXATION", which claims the benefit of U.S. Provisional App. No. 62/862, 807 filed Jun. 18, 2019 and U.S. Provisional App. No. 62/901,463 filed Sep. 17, 2019 and U.S. Provisional App. No. 62/933,695 filed Nov. 11, 2019 and U.S. Provisional App. No. 62/978,401 filed Feb. 19, 2020 and U.S. Provisional App. No. 62/978,425, also filed Feb. 19, 2020 and 63/036,570 filed Jun. 9, 2020; all of which are titled "METHODS AND DEVICES FOR TISSUE GRAFT FIXATION" and herein incorporated by reference in its entirety.

This application also claims priority to U.S. Provisional App. No. 62/869,593 filed Jul. 2, 2019 titled "ADJUSTABLE ACL FIXATION DEVICE"; herein incorporated by reference in its entirety.

This application also incorporates by reference commonly owned U.S. Pat. No. 10,383,617; herein incorporated by reference in its entirety.

FIELD

The present disclosure relates to methods and devices for tissue graft fixation in a surgical repair.

BACKGROUND

Soft tissue (such as ligaments and tendons) that has ruptured and non-repairable is generally replaced arthroscopically by a tissue graft. Currently, for a soft tissue repair where the surgeon wishes to use adjustable suspensory fixation, one of two methods have to be utilized. In instances where the tendon graft is not long enough to drape over the closed loop of the adjustable fixation device, the end of the graft must be secured to the closed loop, generally by whipstitching, which may compromise the graft and may be difficult to form on such a small piece of tissue. In the other methods, suture tape or a comparable material is used to couple the loop of the adjustable fixation device through a hole drilled in the bone block, requiring additional materials to complete the repair. Another issue encountered with adjustable fixation loops is that slip or creep of the suture within the loop is more common than in non-adjustable loops. Additionally, graft fixation devices are primarily designed to cradle or attach to a soft tissue graft that is attached to bone blocks. Instead, grafts with bone blocks are typically fixed into bone tunnels with an interference screw.

Adjustable fixation devices have become more popular as they minimize fixation length calculations and allow the graft to bottom in the tunnel. Additionally, over the last decade the femoral and tibia tunnels used in ACL reconstruction have become shorter. These shorter tunnels are a by-product of the preferred more horizontal orientation of the tunnels through the femur and tibia that improves the functionality of the graft post-procedure. Shorter tunnels translate to less tunnel length available for suture loops and therefore an adjustable suture loop that requires a minimal length is preferable. Adjustable suture loops require oftentimes pulling with high forces on the loops to reduce them, which can sometimes injure the surgeon or damage the surgeon's gloves. Some attempted solutions have included wrapping sutures multiple times around an instrument such as a forceps or using reinforced gloves, but this has not sufficiently addressed the needs of the industry. Therefore, there is a need for a means of achieving the required forces to reduce an adjustable suture construct in a safe and reliable manner.

SUMMARY

Described herein, are various improvements in methods and devices for tissue graft fixation using an adjustable fixation loop. Such improvements include examples of fixation devices that are attached to an adjustable fixation loop of suture without compromising the graft or requiring additional material to complete the repair. Other improvements include suture loop/fixation device constructs, which are designed to minimize slip/creep of the suture within the loop. Further improvements include a helical needle for stitching a tissue graft, which is designed to minimize suture ingrowth blockage. Still other improvements include fixation devices that can be used with grafts attached to bone blocks, for example, patella tendon or quad tendon grafts. Yet further improvements include fixation devices that could be attachable to an independent adjustable suture system.

For example, a first embodiment may disclose a fixation device that may be a cortical button and may include two bodies; a first body having a first recess defined in a sidewall between first and second ends and a second body having a second recess defined in a sidewall between first and second ends, wherein the first and second bodies are detachably coupleable in a same plane whereby the first end of the second body is insertable into the first recess, and the second end of the first body is insertable into the second recess. The first body and second body may be mirror images of each other. The first and second body are both configured to assemble with a portion of an adjustable suture construct. At least one of the bodies is configured to thread a portion of the adjustable suture construct through tissue before coupling to the other body. A suture cradle of the adjustable suture construct may be disposed between the first and second body. The first and second bodies each define a longitudinal axis extending between their respective first and second ends and wherein when coupled the two bodies partially axially overlap and partially axially extend away from each other and thereby do not axially overlap. The first body may assemble with a first loop of the adjustable suture construct and the second body may assemble with a second loop of the adjustable suture construct and when coupled, the first loop may be disposed within the second body recess and the second loop may be disposed within the first body recess.

In a further example embodiment, a fixation device may be disclosed including a first body with a first and second end. The first body may define the maximum fixation device footprint. The first body may include a slot formed through an upper surface of the body and transverse to a body longitudinal axis, closer to a first end. The slot may define a hole through a lower surface of the body. The device may also include a second body having a plurality of holes and configured to be extend through the hole in a first orientation and then nest within the slot in a second orientation. The first body may be operatively coupled to a first loop of an adjustable suture construct. The first body may include a pair of holes adjacent the slot to operatively couple to the first loop. The second body may be operatively coupled to a second loop of an adjustable suture construct. The second body may having a length that extends across a width of the first body from a first lateral side of the first body to a second lateral side. When operatively coupled the upper surface of the first body and an upper surface of the second body may be flush. The second body is configured to thread the second loop of the adjustable suture construct through tissue before coupling to the other body. A suture cradle of the adjustable suture construct may be disposed between the first and second body.

In a further example embodiment, a fixation device may be disclosed including a body having parallel first and second slots formed through the body and extending along the longitudinal axis of the body. The body also includes a plurality of openings defining a path between the sidewalls of the body, the openings in communication with the first and second slots. The plurality of openings, may all define a path, oriented transverse to the longitudinal axis of the body. The fixation device may also include a pin for insertion through the plurality of openings. Pin may bifurcate the first and second slots. Pin may be configured to selectively operatively couple to a loop of an adjustable suture construct. Pin may be configured to selectively operatively couple to a first loop of an adjustable suture construct within the first slot, and a second loop of the adjustable suture construct within the second slot. A method of repairing a tissue may including coupling a first loop of an adjustable suture construct to a fixation device by partially inserting a pin of the fixation device across a first slot, and inserting a second loop of the adjustable suture construct though the tissue. The second loop may then be inserted through the second slot and the pin advanced across the second slot and through the second loop to assemble the second loop with the fixation device.

A further example embodiment disclosed herein may include a fixation device comprising a first body having a first end defining a triangular shape cavity formed in an upper surface of the first body. The cavity also includes a hole extending from the bottom of the cavity and extending through to a bottom surface of the first body. The first body also includes a plurality of holes through the entire thickness of the first body for engaging a first end of a suture. The device also includes a second body, defining a plurality of slots and configured to nest within the triangular shaped cavity of the first body. The plurality of slots may be surrounded when disposed within the cavity. The plurality of slots may engage peripheral surfaces of the cavity when nested. The plurality of slots may couple to a second end of the suture after the suture has extended through the hole that extends from the cavity. The first and second body cooperate to engage the second end of the suture and prevent the second end from disengaging from the second body.

A further exemplary embodiment disclosed here includes a fixation device with a pivoting member comprising a body having a first sidewall and a second sidewall defining a longitudinal slot. The body also includes a plurality of slots perpendicular to the longitudinal slot configured to engage a first end of a suture. The body also includes a plurality of holes for engaging a second end of the suture and a closing member configured to pivot relative to the second sidewall within the longitudinal slot between an open position and a closed position to engage the suture.

A further exemplary embodiment disclosed here includes a fixation device having first and second slotted holes formed through the first side of the body and third and fourth slotted holes formed through the second opposing side of the body. The body is configured to receive a first side of an adjustable suture loop construct through the first and third slotted holes; and wherein the first and third slotted holes comprise tortuous paths to retain the first side of the suture loop construct. The body is configured to receive a second side of the adjustable suture loop construct through the second and fourth slotted holes. The body may include at least one pair of holes through the body, medially disposed relative to the slotted holes. The pair of holes may operatively couple with the adjustable suture construct. A method of tissue repair using this fixation device may include extending a first or second side of an adjustable suture loop through the tissue to place a suture cradle of the adjustable suture loop within the tissue. The first side may then be coupled to the first and third slotted holes. In some example methods, the first side may be coupled before extending a second side of the adjustable suture loop through the tissue. The slotted holes are configured to form a tortuous paths for the adjustable suture construct when assembled to the fixation device.

An embodiment of a fixation device embodiment is disclosed herein including a cannulated, cylindrical body and a hollow suture extending through an inner passage of the body. The fixation device also includes a plug configured to be inserted within the hollow suture and pushed through the hollow suture, and be secured within the inner passage of the body, such that the suture is prevented from sliding relative to the body.

A further exemplary embodiment disclosed here includes a fixation device operatively coupled to an adjustable suture construct having at least one constriction portion or longitudinal passage. This construction portion may be disposed adjacent a bottom surface of the fixation device. The constriction member configured to apply 360 degrees of compression to at least one loop of suture extending through the constriction member.

A further exemplary embodiment disclosed here includes a fixation device comprising an anchor body comprising a plurality of apertures and a suture being threaded through the plurality of apertures such that first and second loops extend from the bottom surface of the anchor body while the first and second free ends extend from the top surface of the anchor body. Each of the first and second loops extend through a cradle region and exit a same side of the cradle region, and a connection member joins a portion of the first and second loops extending from the same side of the cradle region.

An example method of attaching a graft to a fastener is disclosed and may comprise inserting a helical needle coupled to a suture into a graft, passing the needle and the suture through the graft along a first suture path, passing the needle and the suture through an adjustable suture loop of a fixation device, reinserting the needle into the graft, and passing the needle and the suture through the graft along a second suture path.

A further exemplary embodiment disclosed here includes a fixation member and an adjustable suture loop attached to the fixation member. The adjustable suture loop includes a cradle portion and an implant coupled to the cradle region configured to engage an outer surface of a bone block, the bone block being pre-attached to soft tissue.

An exemplary method for attaching a fixation device/suture loop construct to a graft is disclosed and may include inserting a needle into a proximal end of the graft and out through a top surface of the graft; looping the cradle over an end of the graft such that the needle and the cradle are disposed below a bottom surface of the graft; inserting the needle from the bottom surface to the top surface of the graft at a second exit point distal to the first exit point to draw the cradle above the top surface of the graft; and attaching a reinforcing material to the graft at least between the first and second exit points of the needle such that the needle passes through the reinforcing material.

A further example embodiment is disclosed herein and includes a fixation system for suspending a bone-tendon graft within a bone tunnel, the bone-tendon graft including a bone block. The fixation system includes a fixation device, a continuous suture loop and an adjustable suture loop. The adjustable suture loop is operatively coupled to the fixation device providing the link between the fixation device and continuous loop. The adjustable loop is operatively coupled to the continuous loop at a loop intersection. The continuous loop has a length configured to extend through a passage in the bone block and along an outer surface of the bone block such that the loop intersection is disposed at a target location that is along the outer surface and axially spaced away from a first proximal end of the bone block, the first end proximal adjacent the fixation device. In some embodiments, the continuous loop may comprise a means to maintain the loop intersection at the target location. In some embodiments, the means may include a luggage tag loop with the adjustable loop. In some embodiments, the means may include a knot at a first end of the continuous loop. In some embodiments, the means may include a button operatively coupled to a continuous loop first end. In some embodiments, the adjustable loop may comprise at least two adjustable loops and the continuous loop loops over at least one adjustable loop of the adjustable loop, to form a luggage tag loop and maintain the loop intersection at the target location. In some embodiments, the adjustable portion may include a cradle, the cradle operatively coupled to the continuous loop via a luggage tag loop An example embodiment of a fixation system is disclosed for suspending a bone-tendon graft within a bone tunnel, the bone-tendon graft including a bone block. The fixation system includes a fixation device, a continuous loop and an adjustable loop; the adjustable loop operatively coupled to the fixation device and links the fixation device to the continuous loop. The adjustable loop is operatively coupled to the continuous loop at a loop intersection; wherein the continuous loop has a length configured to extend through a passage in the bone block and along an outer surface of the bone block such that the loop intersection is disposed at a target location that is axially spaced away from a first end of the bone block, the first end adjacent the fixation device.

An example method of securing soft tissue to bone is disclosed including preparing a tunnel along a longitudinal axis of a bone block of a graft. A fixation construct may then be coupled to the bone block, the fixation construct including a fixation button, an adjustable suture loop and a continuous suture loop. Both suture loops are formed as separate sutures. Coupling comprises first extending a first end of the continuous suture loop through the entire tunnel and then passing the fixation button through the first end to form a luggage tag loop through and around the bone block, the continuous loop and the adjustable suture loop both forming a portion of the luggage tag loop.

A further example fixation system is disclosed herein for use in surgical implantation, including a first flexible member having a first free end, a second free end, and a first body extending between the first free end and the second free end of the first flexible member. The first body defines a first longitudinal passage portion in the first flexible member, the first flexible member forming an adjustable loop by passing a first free end through the first longitudinal passage portion. The embodiment also includes a second flexible member, defining a continuous loop and coupled to the first flexible member; wherein the first and the second flexible member are formed as separate members. A fixation button anchor is directly coupled to the first flexible member, the apparatus formed such that the first flexible member adjustable loop defines a link between the anchor and the second flexible member. The first flexible member defines a first loop end and a second loop end at an opposite end of the first loop end, the second flexible member coupled to a first loop end. The anchor is coupled to the second loop end. The fixation system also includes a retaining button slidingly coupled to at least one of the first or second flexible members to limit migration of the continuous loop into a prepared bone block tunnel. In some example embodiments, the second flexible member has a length configured to form a portion of a loop around and through a bone block, the first flexible member completing the loop. In some example embodiments, the second flexible member has a length that is limited to form an incomplete loop around a bone block such that the first flexible member completes the loop and an intersection between the first and secondly flexible member places the longitudinal passage portion on an external surface of the bone block spaced between a distal-most and proximal-most end of the bone block.

An example method of securing soft tissue to bone is also disclosed herein including preparing a tunnel through a bone block of a graft, the bone block having a longitudinal axis and a transverse axis and the tunnel oriented at an angle between the longitudinal and transverse axis. The tunnel defines a first opening through a cortical external surface of the bone block and a second opening though a lower cancellous external surface between the distal-most and proximal-most end of the bone block. The method also includes extending an adjustable loop of suture operatively coupled to a bone fixation device through the angled bone tunnel and then over the tendon/bone interface opposite the first opening; and thereby attaching the suture loop to the bone block. The adjustable loop of suture may include a suture cradle and wherein after extending the loop of suture over the tendon/bone interface, the adjustable loop may shortened so as to draw the bone fixation device to the bone block. The method may also include forming bilateral grooves around the lateral surface of the bone block and extending the loop of suture over the tendon/bone interface to place the loop into the bilateral grooves.

A further example embodiment disclosed herein includes a graft suspension device comprising an elongated body. The elongate body may include a first end, a second end, and a longitudinal axis extending therebetween, a first sidewall extending between the first and second ends along the longitudinal axis, and a second sidewall opposite the first sidewall extending between the first and second ends along the longitudinal axis. The elongate body also includes at least a first and a second aperture defined through the body adjacent a midpoint of the body defined by the first and second ends and a first slot formed through one of the first or second sidewalls such that the first slot is adjacent the first aperture and a second slot formed through one of the first side or second sidewalls such that the second slot is adjacent the second aperture. At least the first and second apertures are preassembled to a first loop of an adjustable suture loop. The first and second slots are configured to receive a second loop of the adjustable suture loop. In some embodiments, the adjustable suture loop includes a cradle disposed between the first and second loops. The second loop may define a free end as provided. In some example embodiments, the free end is configured to draw the cradle into or through graft tissue rather than cradle it and then wrap around the first and second slots to couple to the elongate body. In some example embodiments, the cradle comprises a longitudinal passage portion through which ends of a first and second suture limb extend, and wherein the elongate body further comprises a third and fourth hole, disposed adjacent the first and second end respectively, the third and fourth holes configured to receive the first and second limbs therethrough.

An example method for attaching an adjustable suture loop construct to a graft may include placing a reinforcement means around a graft proximal end, including around a bottom surface, an end surface and a top surface of the graft proximal end. A needle is coupled to a cradle of the adjustable suture loop construct and is inserted through the reinforcement means and into a proximal end of the graft and out through a top surface of the graft and through the reinforcement means, defining a first exit point. The cradle is then looped over an end of the graft such that the needle and the cradle are disposed below a bottom surface of the graft. In some embodiments, the needle is inserted from the bottom surface to the top surface of the graft at a second exit point distal to the first exit point to draw the cradle above the top surface of the graft. In some example methods, the needle is coupled to the cradle via a flexible member; the flexible member having a tapered member coaxially disposed therealong. The tapered member defines a smaller opening end adjacent the needle and a larger opening end that houses a portion of the cradle therein. Inserting the needle through the reinforcement means and graft thereby draws the tapered member through the reinforcement means and graft. In some example embodiments, the reinforcement means is selected from a group consisting of a flat braided suture, a woven cap or a rigid implant. In some example embodiments, the reinforcement means comprises preformed apertures for receiving the needle therethrough.

Some exemplary embodiments disclosed herein may include an adjustable fixation system for suspending a graft within a bone tunnel. This system may include a suspension device including a fixation device and an adjustable suture construct, the adjustable suture construct operatively coupled to the fixation device. The adjustable suture construct has a first limb, a second limb and a bifurcated portion therebetween. In some embodiments, the adjustable suture construct may include at least two adjustable loops. In some embodiments, the bifurcated portion may link or cradle the graft. In some embodiments, the bifurcated portion defines two longitudinal passages of the adjustable suture construct. In some embodiments, the bifurcated portion is continuous with the first and second limb and is formed during braiding of the suture construct. In some embodiments, the first and second limbs both include a braided core, thereby defining a length of the bifurcated portion therebetween, the length of the bifurcated portion defining two parallel longitudinal passages. In some embodiments, a first longitudinal passage of the bifurcated portion is configured to receive one of either the first or second limb there through and form a first adjustable suture loop and wherein a second longitudinal passage of the bifurcated portion is configured to receive the other of either the first or second limb therethrough and form a second adjustable suture loop. In some embodiments, the first and second limbs both comprise an outer wall comprising a first plurality of braided strands, and a core section comprising a second plurality of braided strands. Each longitudinal passage may comprises at least one strand of the first plurality of braided strands, and at least one strand of the second plurality of braided strands. In some embodiments, the first plurality of strands and the second plurality of strands are split equally between the longitudinal passages.

In another embodiment of an adjustable tissue fixation system disclosed herein, the system includes a tissue anchor and a flexible member coupled to the tissue anchor. The flexible member has a first free end, a second free end, and a body extending between the first free end and the second free end of the flexible member, the body defining a first and a second longitudinal passage portion in the flexible member. The first and the second longitudinal passage portions are parallel to each other. The flexible member forms a first adjustable loop by passing the first free end through the first longitudinal passage portion. The flexible member forms a second adjustable loop by passing the second free end through the second longitudinal passage portion. In some embodiments, tension on the first free end is configured to either reduce the first adjustable loop length or reduce a diameter of the first longitudinal passage portion to selectively limit further adjustment of the first adjustable loop length. In some embodiments, tension on the second free end is configured to either reduce the second adjustable loop length or reduce a diameter of the second longitudinal passage portion to selectively limit further adjustment of the second adjustable loop length. In some embodiments, the first end passes through the first longitudinal passage portion in a first direction and the second free end pass through the second longitudinal passage portion in an opposite direction to the first direction. In some embodiments, the first and second longitudinal passages are formed from a single suture construct that is continuously braided to form a length including the first and second longitudinal passages. In some embodiments, the first and second longitudinal passages are configured to cradle a tissue to be fixed within a bone tunnel.

An example method of securing soft tissue to bone is also disclosed including coupling the soft tissue to a cradle of an adjustable suture loop construct. The cradle has two parallel longitudinal passages of a bifurcated length of the adjustable suture loop construct. The method also includes extending the adjustable loop suture construct that is operatively coupled to a bone fixation device through a bone tunnel. A first end of the adjustable suture loop construct is drawn to slide the first end through a first of the two parallel longitudinal passages and draw the soft tissue into the bone tunnel. A first end of the adjustable suture loop construct may also be drawn to cinch the first of the two parallel longitudinal passages around the first free end. The method may also include drawing on a second end of the adjustable suture loop construct to slide the second end through a second of the two parallel cores and draw the soft tissue into the bone tunnel. Drawing on the second end of the adjustable suture loop construct may also cinch the second of the two parallel cores around the second free end. The method may also include operatively coupling a button anchor of the adjustable suture loop construct to the bone.

Another example embodiment is disclosed herein including a suture-tensioning device that defines a bar shaped handle with a longitudinal axis and two lateral ends. A groove extends along a portion of the handle between the lateral ends defining an elongate opening along a first outer surface of the handle. The groove has a bottom surface extending along the handle defining a medial-most surface of the groove. At least one notch extends radially from the groove, the at least one notch having a first end at the first outer surface and an opposing medial end radially offset from the bottom surface of the groove. The groove may be configured to receive a length of suture and the at least one notch may be configured to retain a linking means associated with the length suture therein, and limit the suture from sliding laterally along the groove. The at least one notch comprises a plurality of notches axially spaced along the intermediate portion of the groove. The groove may terminate with a first end and a second end, each of the groove ends continuous with a ramped slot and spaced away from the two lateral ends. The ramped slots may extend from the grooves through the handle to a second outer surface, opposite the first outer surface. The at least one notch may have a larger cross sectional dimension than a corresponding cross sectional dimension of the groove. The groove may be sized to prevent a linking means associated with the suture from engaging the groove bottom surface. The at least one notch may be sized to receive a linking means associated with the suture and retain the linking means within the at least one notch during use. The at least one notch may be sized to receive a linking means associated with the suture and the groove may be sized to receive the length of suture extending from the linking means, such that the length of suture is disposed medially from the linking means. The suture-tensioning device may be configured to receive a suture loop formed by two suture tails coupled by a linking means, the groove configured to receive the two suture tails and the at least one notch configured to engage the linking means.

In a further embodiment, a suture-loop reducing device is disclosed including a handle with bilateral slots extending from a first outer surface of the handle to a second outer surface of the handle. The first and second outer surfaces are on opposing sides of the handle. The device also includes a groove extending between and continuous with the bilateral slots, wherein a suture loop is receivable through the bilateral slots and into the groove. The handle also includes at least one notch for receiving a knot or splice of the suture loop, the at least one notch extending from an inner surface of the groove up to the second outer surface. In some embodiments, the groove has a bottom surface extending along the handle defining a medial-most surface of the groove. In some embodiments, the at least one notch has an axis that is disposed transverse a longitudinal axis of the handle. In some embodiments, the at least one notch medial most end is offset from the bottom surface of the groove. In some embodiments, the at least one notch is a plurality of notches axially spaced along an intermediate portion of the groove. In some embodiments, the at least one notch is larger in cross section than a groove cross section such that the groove cross section obstructs the knot or splice from entry. In some embodiments, the suture loop is a portion of an adjustable fixation construct and wherein applying tension to the suture loops is configured to reduce a suture loop of the adjustable fixation construct.

A method of reducing a perimeter of an adjustable suture construct is also disclosed herein, the method including placing a first and second suture tail of the adjustable suture construct within an elongate groove of a tensioning handle and placing a linking means of the first and second tail within a notch extending from the groove, and thereby limiting sliding of the suture tails along the groove. The method also includes rocking the tensioning handle back and forth to apply an alternating tension between a first tail and a second tail and thereby reduce a perimeter of the adjustable suture construct. In some example methods, the suture splice is retained within the notch, while rocking the tensioning handle.

Another method of reducing a perimeter of an adjustable suture construct is also disclosed herein, the method including placing a first side of the adjustable suture construct within a first slot through a tensioning handle and placing a second side of the adjustable suture construct within a second slot through a tensioning handle; the first and second openings disposed adjacent ends of the tensioning handle, The tensioning handle is then rocked back and forth so as to apply an alternating tension between the first side and the second side and thereby reduce a perimeter of the adjustable suture construct. In some example methods, there may be a linking means of the adjustable suture construct that may be placed within a notch of the tensioning handle to limiting sliding of the adjustable suture construct along the tension bar while rocking. In some example methods, the adjustable suture construct is operatively coupled to a fixation device, and is also configured to couple to a graft and wherein rocking the tensioning handle draws the graft towards the fixation device. The first and second side may define first and second loops and placing the first side within the first slot comprises wrapping the first loop around the tensioning handle and through the first slot and placing the second side within the second slot comprises wrapping the second loop around the tensioning handle and through the second slot.

Disclosed herein is a tissue repair system including an open looped adjustable fixation construct having a first end assembled with a cortical button and a second end defining a free end. The system also includes a needle system including a needle operatively coupled to a first and second loop, the first and second loop extending different lengths from the needle. Both the first and second loop may be directly coupled to the needle. The first loop may be longer than the second loop. The first and second loop may be separately formed and include means that readily distinguish them from each other, the means different surface markings, trace braids, shapes, sizes or colors. A first loop of the construct second end may be coupled to the first loop of the needle system. A second loop of the construct second end may be coupled to the second loop of the needle system.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The disclosure will be more fully understood by reference to the detailed description, in conjunction with the following figures, wherein:

FIGS. 33A-33C illustrate an alternative open looped construct with bypass loops in accordance with at least some embodiments;

DETAILED DESCRIPTION

Figure 1A:
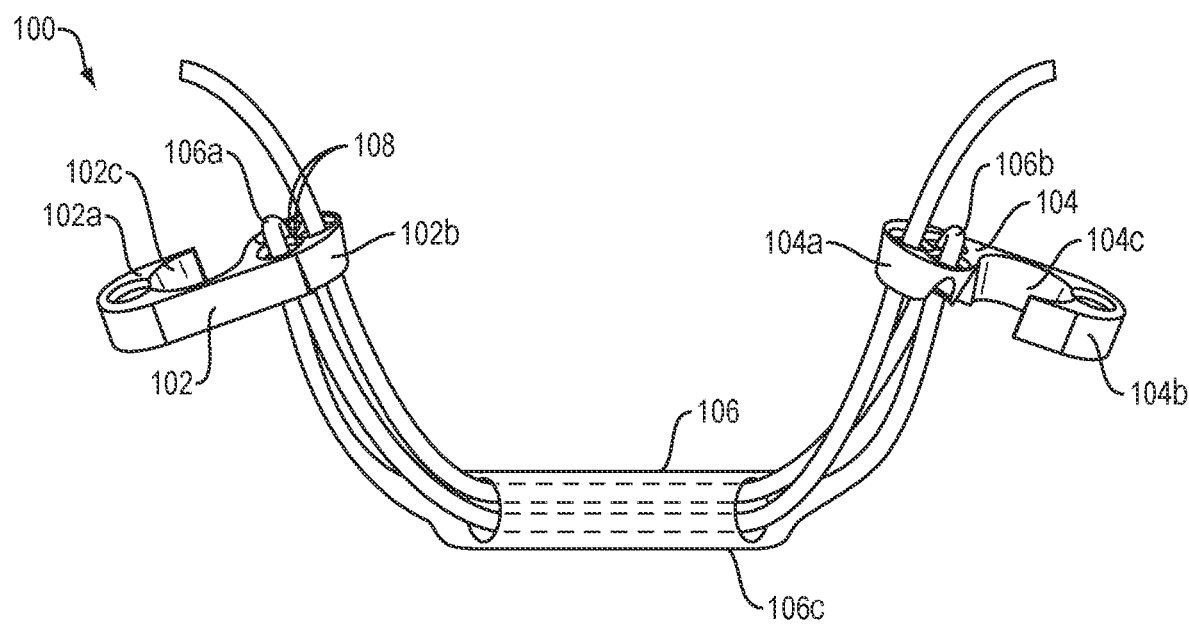
FIGS. 1A and 1B illustrate a first example of a fixation device of this disclosure for use with an adjustable fixation suture construct, in accordance with this disclosure.

In the description that follows, like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the invention, the terms "about" and "substantially" are used to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts. Use of the terms "upper," "lower," "upwards," and the like is intended only to help in the clear description of the present disclosure and are not intended to limit the structure, positioning and/or operation of the disclosure in any manner.

Referring now to FIG. 1A, a first example of a detachable two-part suspensory fixation device 100 for soft tissue repair is shown in a disassembled view. The device 100 comprises a first elongated, substantially flat body 102 and a second elongated, substantially flat body 104. The first body 102 and the second body 104 may be made of a biocompatible material, such as titanium or polyether ether ketone (PEEK). The first body 102 has a first end 102*a* and a second end 102*b*. A recess 102*c* is formed in a sidewall of the body 102 between the first end 102*a* and the second end 102*b*. Similarly, the second body 104 has a first end 104*a* and a second end 104*b*. A recess 104*c* is formed in a sidewall of the body 104 between the first end 104*a* and the second end 104*b*. The first body 102 is preassembled to a first side 106*a* of an adjustable fixation loop 106 through a first plurality of holes 108 defined in the second end 102*b*. The second body 104 is preassembled to a second side 106*b* of the adjustable fixation loop 106 through a second plurality of holes 110 defined in the first end 104*a*, creating an open loop configuration. Disclosed in more detail later, a cradle portion 106*c* is disposed between the two sides 106*a* and 106*b* and spaced away from both the first and second body.

Figure 1B:
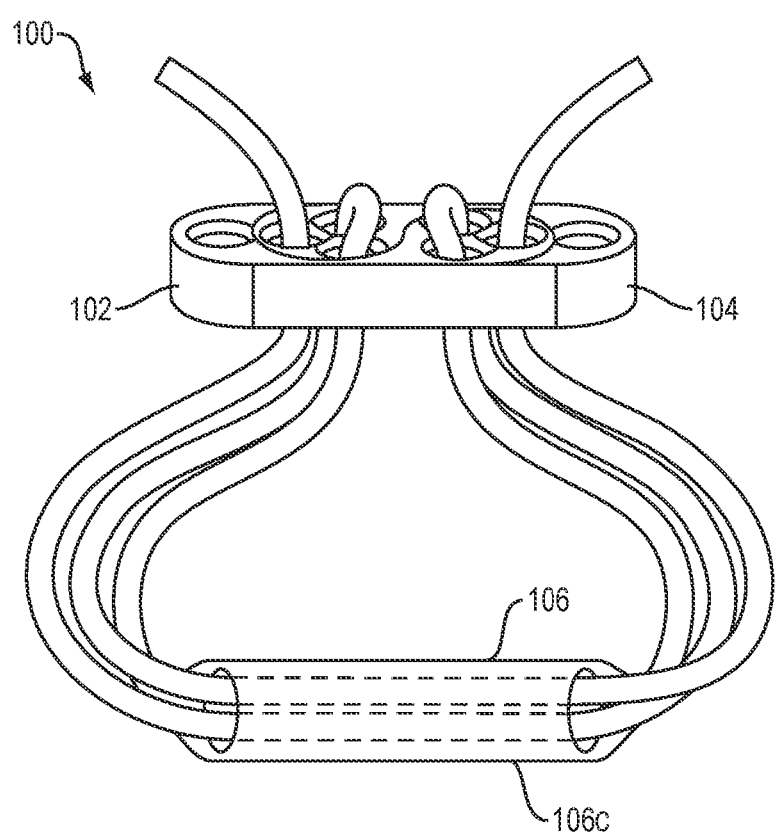
Figure 16A:
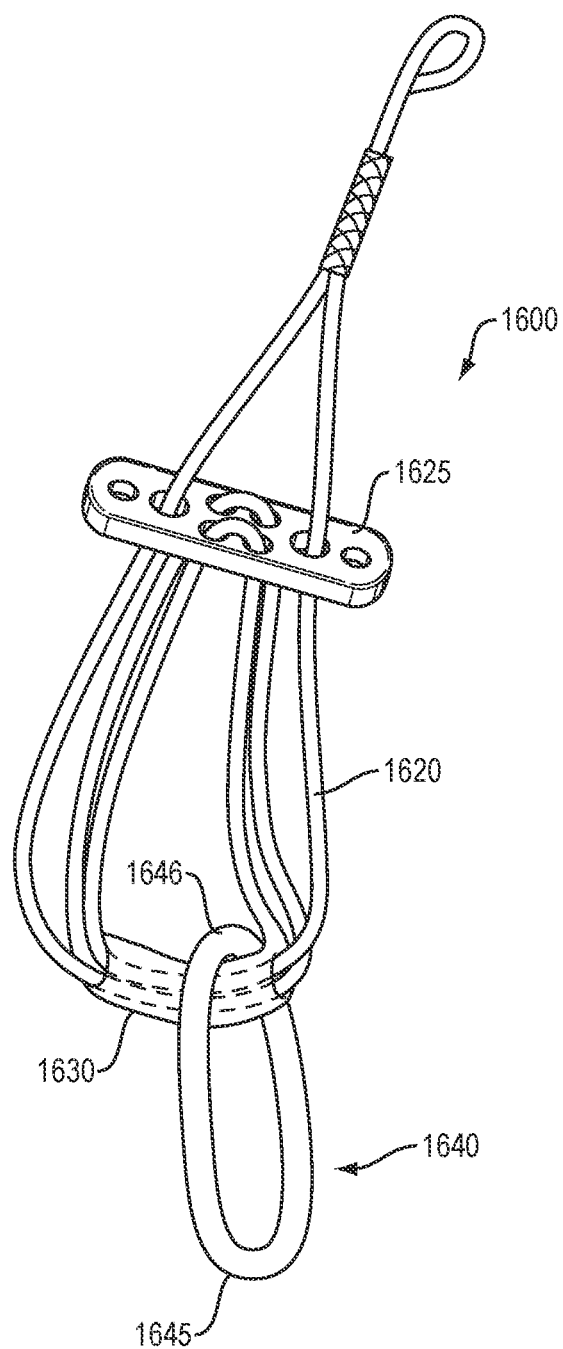
FIGS. 16A, 16B and 16C schematically show isometric views of adjustable constructs for fixing a graft with a bone block within a bone tunnel in accordance with at least some embodiments.
Figure 16B:
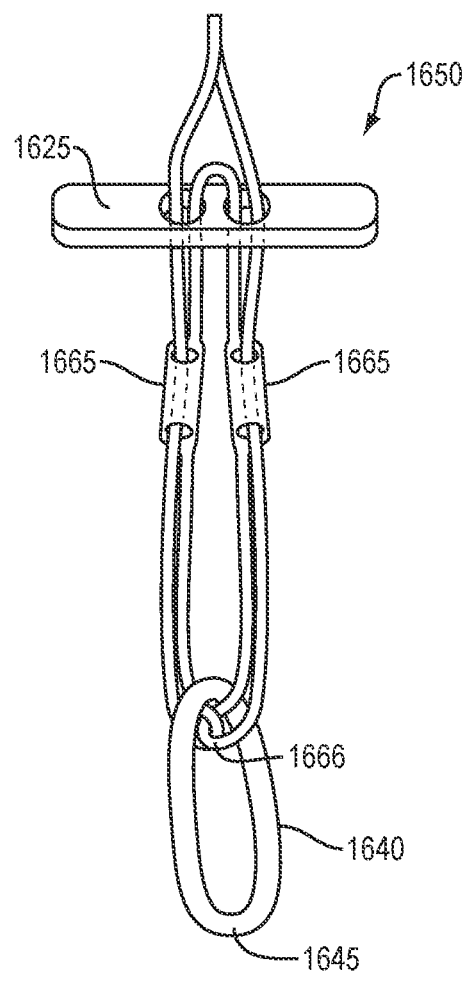
Figure 16C:
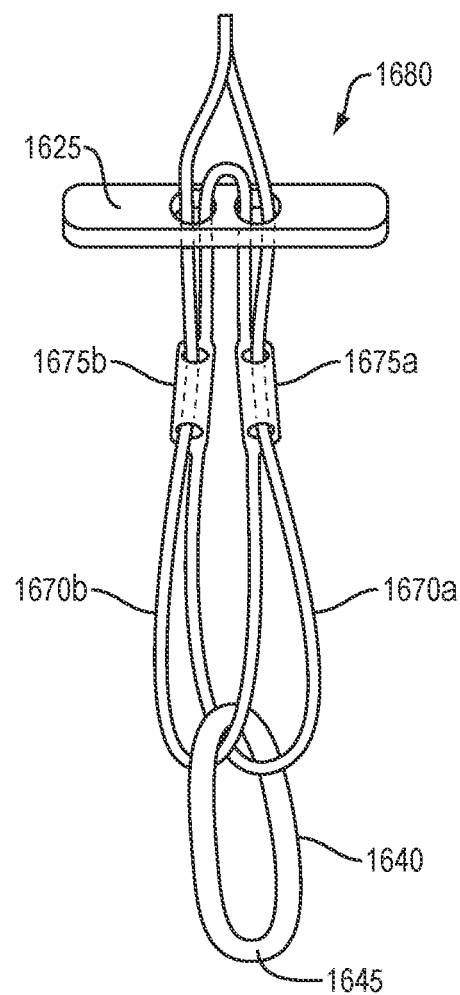

During the repair, the graft (not shown) may be attached to or suspended over the adjustable fixation loop 106 to be pulled into a bone tunnel. More specifically the graft may loop over the cradle 106*c*. The first body 102 and the second body 104 are detachably coupleable in a same plane whereby the first end 104*a* of the second body 104 is insertable into the recess 102*c* of the first body 102, and the second end 102*b* of the first body 102 is insertable into the second recess 104*c* of the second body 104, creating a closed loop configuration (FIG. 1B). In this way, the first body 102 can be fed through a hole created in the bone block or soft tissue to place the cradle 106*c* within the bone block or soft tissue. First body 102 may then be coupled to the second body 104 before completing the repair in a normal fashion for suspensory fixation. The adjustable fixation loop 106 can be formed in the manner shown in at least 8D. Other adjustable loops however may be formed wherein the loops include a means of adjusting the loops that may include sleeve portions therealong that define hollow lengths of the adjustable loop that may receive lengths of the adjustable loop therethrough. Example adjustable loops are also shown in FIG. 16A-16C, for example. The open loop configuration of the adjustable fixation loop 106 advantageously allows the second side 106*b* of the fixation loop 106 to be shuttled through the tissue graft or bone block before being assembled to the device 100. As shown each body 102 and 104 are approximately mirror images of each other and form a left and right side of the fixation body.

Figure 2A:
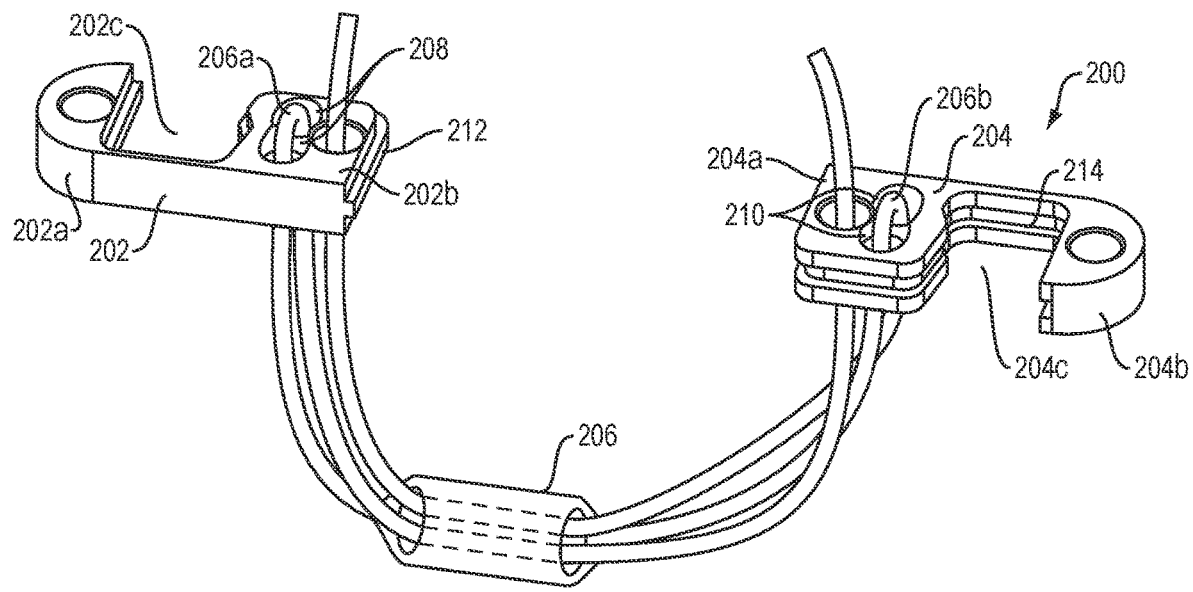
FIGS. 2A-2C illustrate a second example of a fixation device of this disclosure.
Figure 2B:
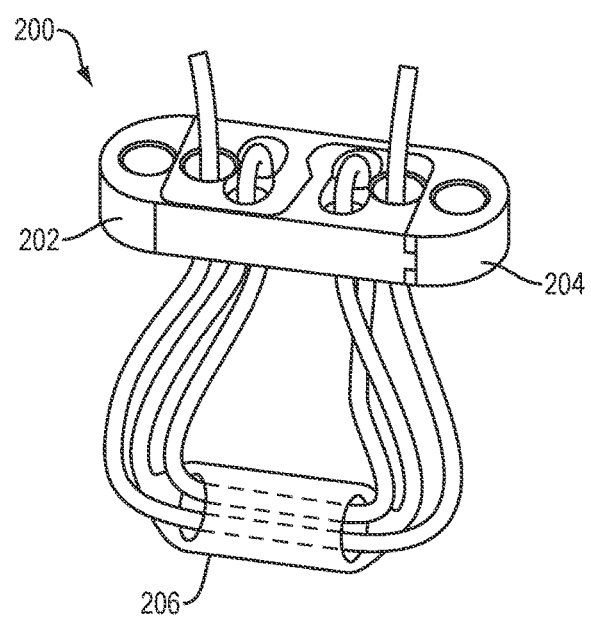

Turning now to FIG. 2A, a second example of a detachable two-part suspensory fixation device 200 for soft tissue repair is shown in a disassembled view. The device 200 comprises a first elongated, substantially flat body 202 and a second elongated, substantially flat body 204. The first body 202 has a first end 202*a* and a second end 202*b*. A recess 202*c* is formed in a sidewall of the body 202 between the first end 202*a* and the second end 202*b*. A rib 212 extends along an interior surface of the recess 202*c* and along an exterior surface of the second end 202*b*. The second body 204 has a first end 204*a* and a second end 204*b*. A recess 204*c* is formed in a sidewall of the body 204 between the first end 204*a* and the second end 204*b*. A groove 214 extends along an interior surface of the recess 204*c* and along an exterior surface of the first end 204*a*. The first body 202 is preassembled to a first side 206*a* of an adjustable fixation loop 206 through a first plurality of holes 208 defined in the second end 202*b*. The second body 204 is preassembled to a second side 206*b* of the adjustable fixation loop 206 through a second plurality of holes 210 defined in the first end 204*a*, creating an open loop configuration. The first body 202 and the second body 204 are detachably coupleable in a same plane whereby the first end 204*a* of the second body 204 is insertable into the recess 202*c* of the first body 202, and the second end 202*b* of the first body 202 is insertable into the second recess 204*c* of the second body 204, creating a closed loop configuration (FIG. 2B). In this way, the first body 202 can be fed through a hole created in the bone block or soft tissue and coupled back to the second body 204 before completing the repair in a normal fashion for suspensory fixation. The adjustable fixation loop 206 may be formed in the manner shown in FIG. 8D. The open loop configuration of the adjustable fixation loop 206 advantageously allows the second side 206*b* of the fixation loop 206 to be shuttled through the tissue graft or bone block before being assembled to the device 200.

Figure 2C:
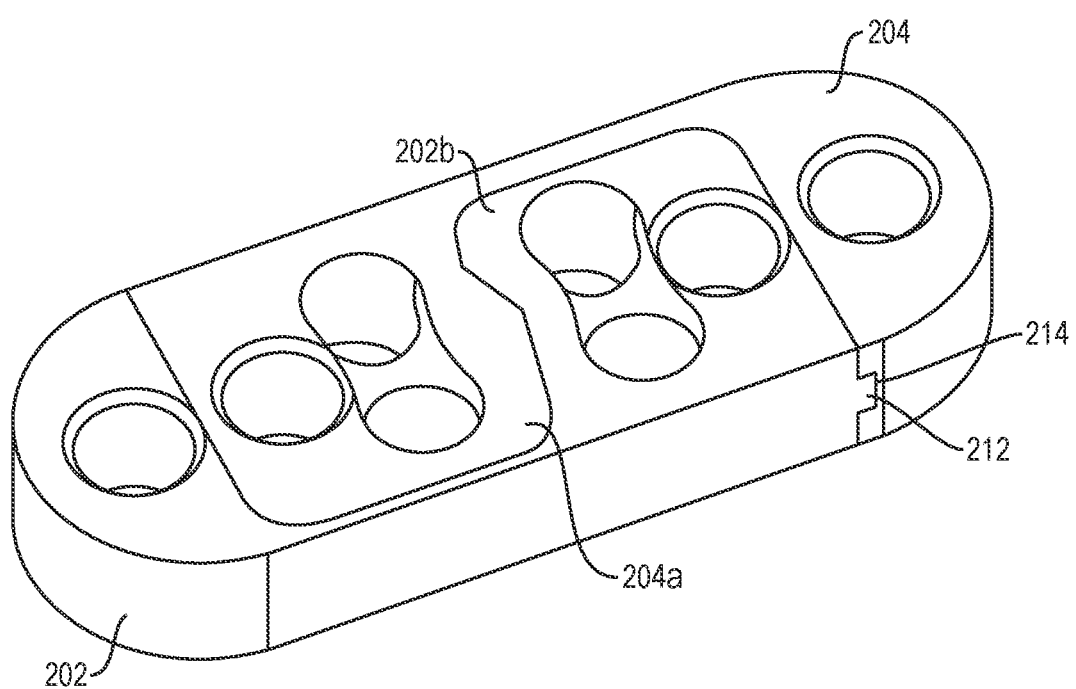

Two locking mechanisms of the device 200 are shown in more detail in FIG. 2C. A first locking mechanism can include the rib 212 of the first body 202 being insertable into the groove 214 of the second body such that the first body 202 and the second body 204 can be locked together for easier passage during the repair to reduce the possibility separation. An additional locking mechanism can include a first mating shape between the first end 204*a* of the second body 204 and the recess 202*c* of the first body 202, and a second mating shape between the second end 202*b* of the first body 202 and the second recess 204*c* of the second body 204. The first and second mating shapes resist separation of the anchor bodies 202, 204. Additionally, for final fixation, each body 202, 204 can span the cortical tunnel for added strength.

Figure 3A:
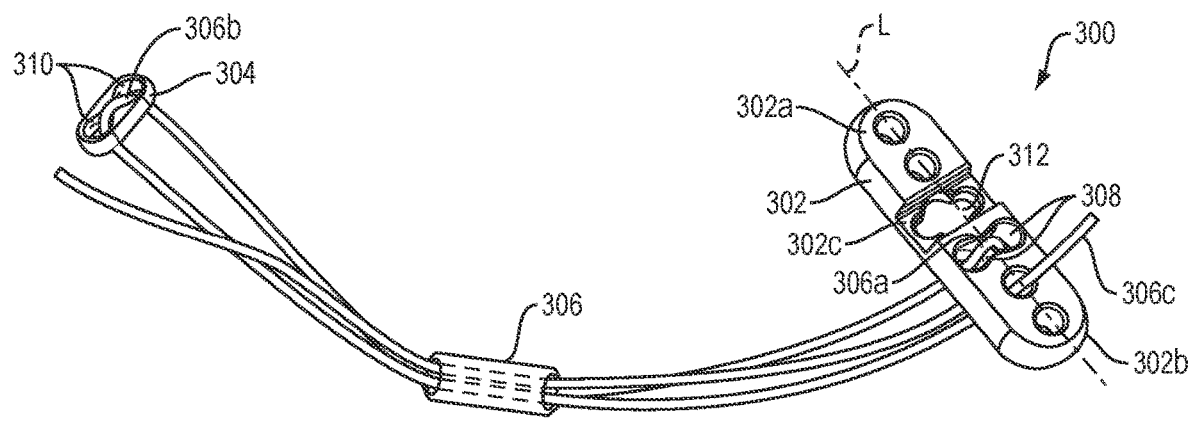
FIGS. 3A and 3B illustrate a third example of a fixation device of this disclosure.

Turning now to FIG. 3A, another example of a detachable two-part suspensory fixation device 300 for soft tissue repair is shown in a disassembled view. The device 300 comprises a first elongated, substantially flat body 302 and a second, smaller body 304.

The first body 302 has a first end 302a and a second end 302b. A slot 302c is formed through an upper surface the body 302 transverse to a longitudinal axis L of the body 302 and closer to the first end 302a. The slot 302c includes an opening 312 in a lower surface of the body 302. The first body 302 is preassembled to a first side 306a of the adjustable fixation loop 306 through a first plurality of holes 308 disposed either side of the longitudinal axis and towards the second end 302b of relative to slot 302c. The second body 304 is preassembled to a second side 306b of the adjustable fixation loop 306 through a second plurality of holes 310 defined in the body 304, creating an open loop configuration. The open loop configuration of the adjustable fixation loop 306 advantageously allows the second side 306b and the free end 306c of the fixation loop 306 to be shuttled through the tissue graft or bone block before being assembled to the device 300. The hole in the bone block or soft tissue could advantageously be smaller than the hole in the bone block or soft tissue required for the passage of the anchor bodies described above with regard to FIG. 1A and 2A.

Figure 3B:
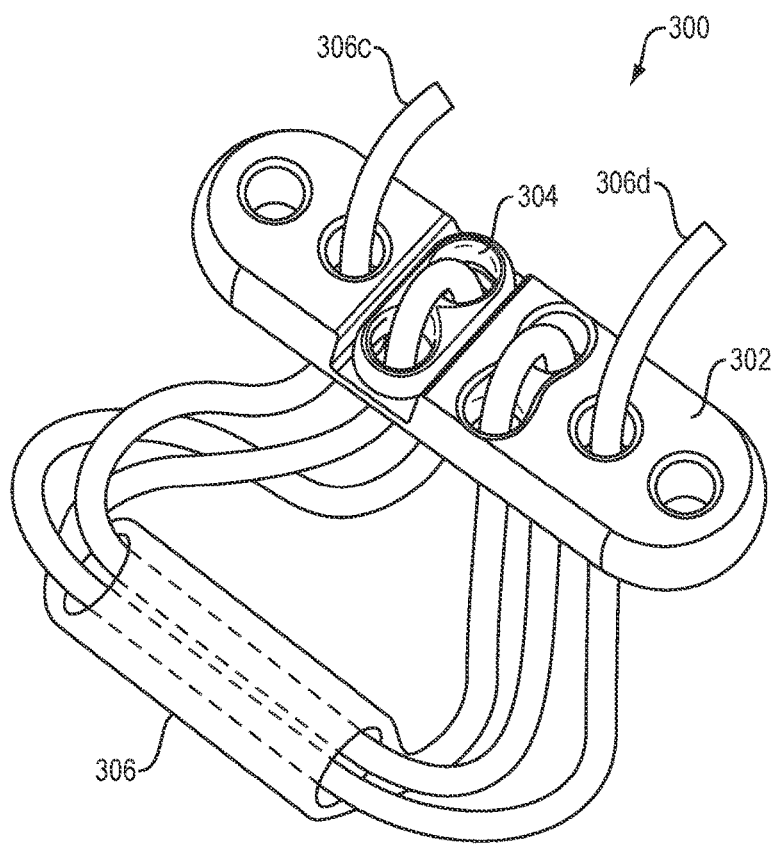

As shown in FIG. 3B, the first body 302 and the second body 304 are detachably coupleable whereby the second body 304 is insertable upwards through the opening 312 and securable into the slot 302c of the first body 302 to create a closed loop configuration. The second body 304 is held in place by the adjustable fixation loop 306, which, after implantation, will always be in tension, keeping the second body 304 in place. In this way, the second body 304 can be passed through a small hole or stitched with, and later assembled into the larger first body 302 to create the closed loop configuration. The second body 304 can be fed through a hole created in a bone block or soft tissue and coupled back to the first body 302 before completing the repair in a normal fashion for suspensory fixation. The adjustable fixation loop 306 can be formed in the manner shown in FIG. 8D. Tension on ends 306c and 306d may reduce the adjustable fixation loop and draw the graft tissue towards body 302 and 304.

Figure 4A:
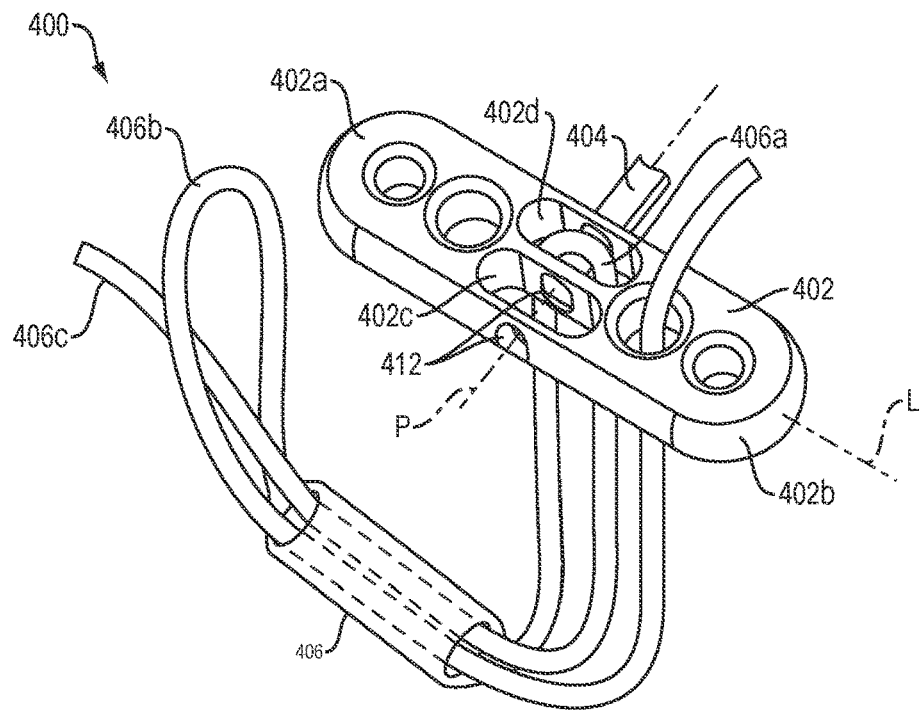
FIGS. 4A and 4B illustrate a fourth example of a fixation device with an open loop adjustable suture construct of this disclosure.
Figure 4B:
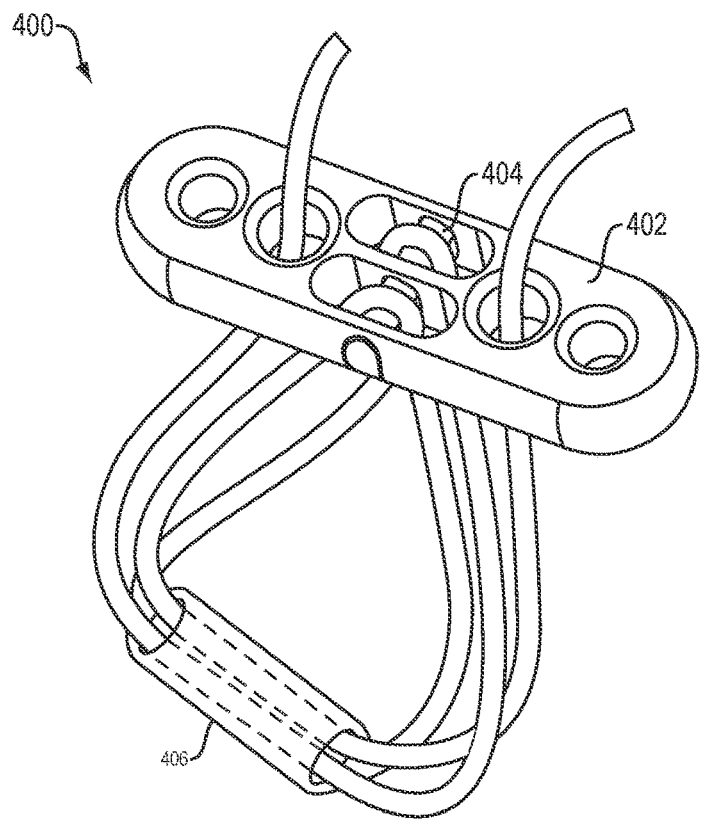

Turning now to FIG. 4A, another example of a detachable two-part suspensory fixation device 400 for soft tissue repair is shown. The device 400 comprises an elongated, substantially flat body 402 and an insertable pin 404. The body 402 has a first end 402a and a second end 402b. Two parallel slots 402c, 402d are formed through the body 402 at a center of the body 402 that extend along a longitudinal axis L of the body 402. The sidewalls of the slots 402c, 402d include openings 412 defining a path P that extends through the body 402 transverse to the longitudinal axis L. The pin 404 is inserted through the openings 412 in the slot 402d and preassembled to a first side 406a of the adjustable fixation loop 406, creating an open loop configuration. The open loop configuration of the adjustable fixation loop 406 advantageously allows the second side 406b and the free end 406c of the fixation loop 406 to be shuttled through the tissue graft or bone block before being assembled to the device 400. The hole in the bone block or soft tissue could advantageously be smaller than the hole in the bone block or soft tissue required for the passage of the anchor bodies described above with regard to FIG. 1A and 2A. The second side 406b of the adjustable fixation loop 406 may be inserted upwards through the slot 402c. As shown in FIG. 4B, the pin 404 is then insertable through the openings 412 in the slot 402c to couple to the second side 406b of the adjustable fixation loop 406, creating a closed loop configuration. In this way, the second side 406b of the adjustable fixation loop 406 can be passed through a small hole or stitched with, and later assembled into the larger body 402 to create the closed loop configuration. The second side 406b can be fed through a hole created in a bone block or soft tissue and coupled back to the body 402 before completing the repair in a normal fashion for suspensory fixation. The adjustable fixation loop 406 can be formed in the manner shown in FIG. 8D.

Figure 5A:
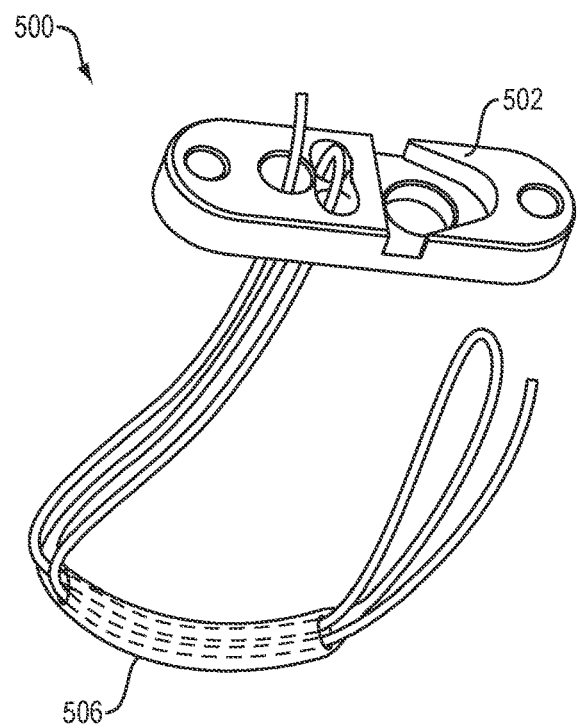
FIGS. 5A-5G illustrate a fifth example and method of use of a fixation device with an open loop adjustable suture construct of this disclosure.
Figure 5B:
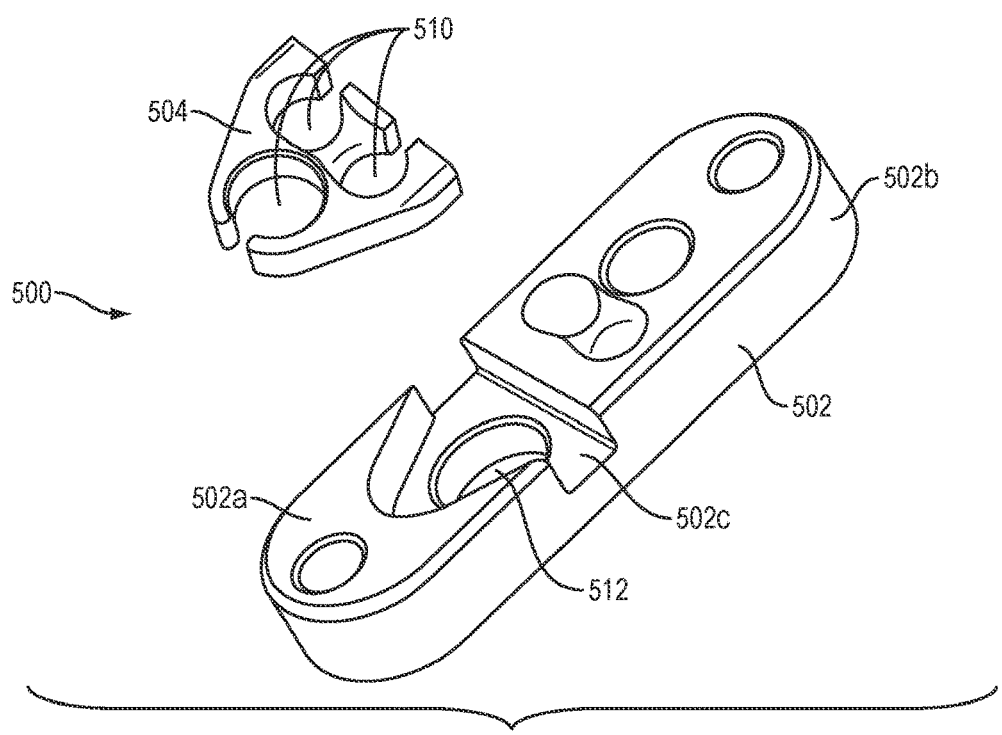
Figure 5C:
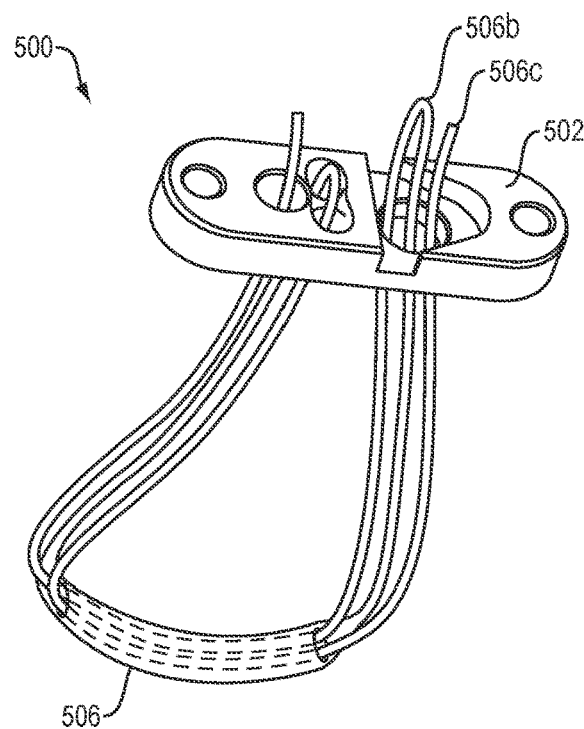
Figure 5D:
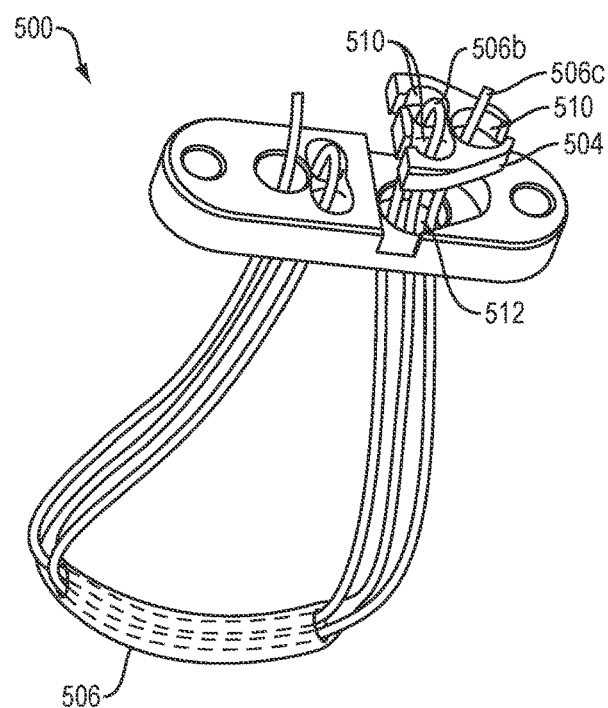

Turning now to FIGS. 5A and 5B, another example of a detachable two-part suspensory fixation device 500 for soft tissue repair is shown in a disassembled view. In FIG. 5A, the device 500 and the adjustable fixation loop 506 create an open loop configuration. As shown in FIG. 5B, the device 500 comprises a first elongated, substantially flat body 502 and a second, triangular-shaped body 504. The first body 502 has a first end 502a and a second end 502b. A triangular-shaped slot 502c is formed through an upper surface the body 502 closer to the first end 502a. The slot 502c includes an opening 512 in a lower surface of the body 502. The second body 504 includes a plurality of slots 510 defined through the body 504. As shown in FIG. 5C, the first body 502 is preassembled to a first side 506a of the adjustable fixation loop 506 through a plurality of closed holes 508 defined in the second end 502b. The second end 506b and the free end 506c can be looped around a soft tissue graft or settled through a bone block of the graft tissue. The second end 506b and the free end 506c of the adjustable fixation loop 506 are then insertable upwards through the opening 512 and coupleable to the second body 504 through the plurality of slots 510 by inserting strands of the loop 506 through the slots 510 (FIG. 5D).

Figure 5E:
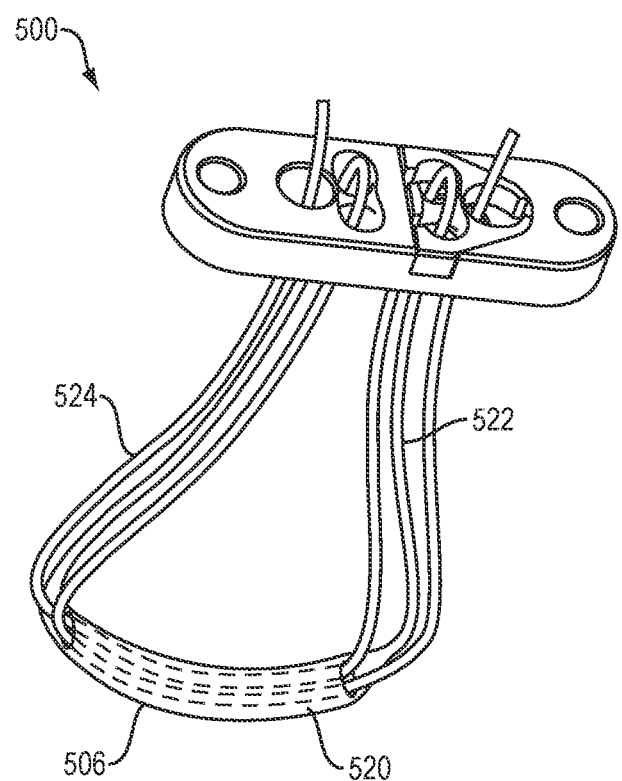
Figure 5F:
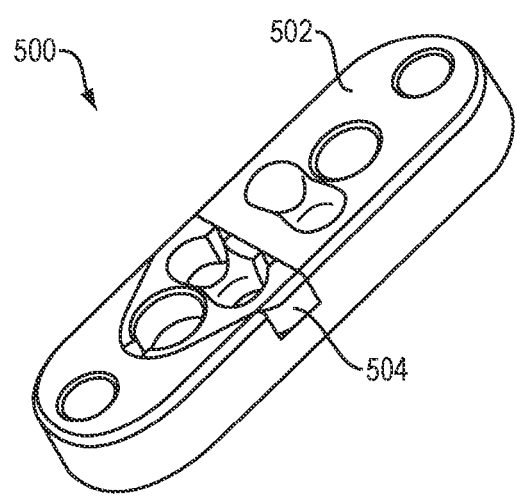
Figure 5G:
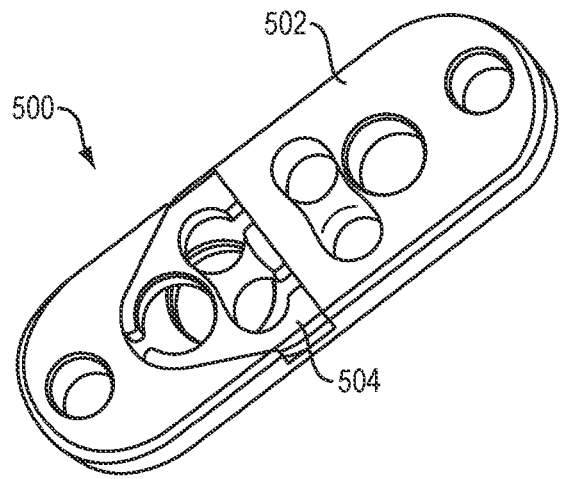

As shown in FIG. 5E, the first body 502 and the second body 504 are detachably coupleable whereby the second body 504 is securable into the slot 502c of the first body 502 to create a closed loop configuration. An assembly jig (not shown) can facilitate the handling of the second body 504—that is, holding the second body 504, passing suture, and placing the second body 504 in the slot 502c of the first body 502. In this way, the second body 504 can be passed through a small hole or stitched with, and later assembled into the larger first body 502 to create the closed loop configuration. The repair can then be completed in a normal fashion for suspensory fixation without adding any significant amount of time to the repair. The hole in the bone block or soft tissue could advantageously be smaller than the hole in the bone block or soft tissue required for the passage of the anchor bodies described above with regard to FIG. 1A and 2A. FIGS. 5F and 5G illustrate perspective and top views, respectively, of the assembled device 500 without the adjustable fixation loop 506.

Open loop adjustable construct such as construct 406, and 506 defines a free end. Unlike the double-looped, adjustable loop construct as disclosed in U.S. Pat. No. 10,383,617; commonly owned and herein incorporated by reference in its entirety, this open loop adjustable construct forms a first loop limited to a first end of a cradle and a second loop limited to a second end. This configuration as shown in FIG. 8D allows for a first loop for example to be coupled to a fixation anchor and the second loop to define a free end as provided, which then is placed through a hole of graft tissue for example to subsequently draw the cradle into the graft tissue hole. Counter to this, since each loop described in U.S.

Figure 6A:
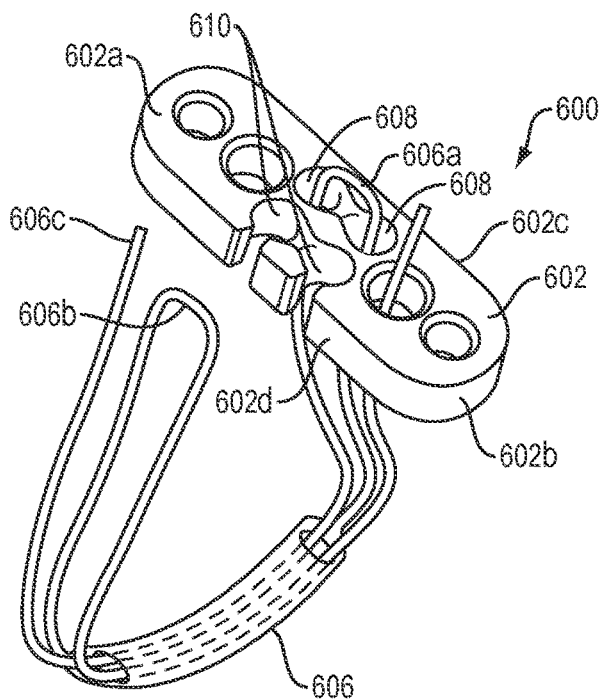
FIGS. 6A-C illustrate a sixth example and method of use of a fixation device with an open loop adjustable suture construct of this disclosure.
Figure 6B:
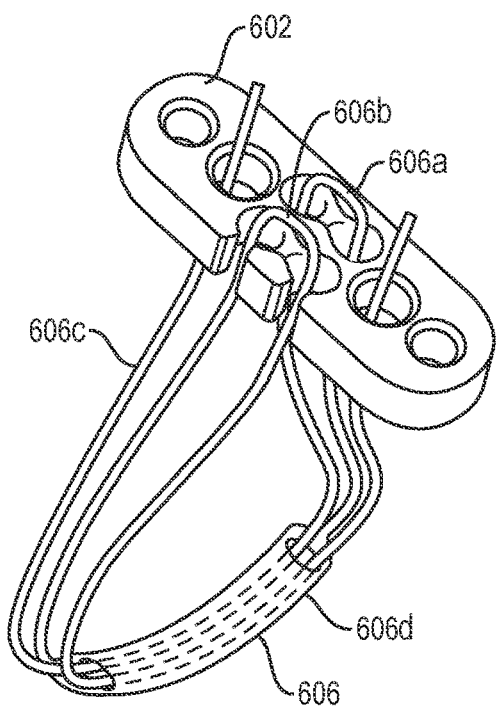
Figure 6C:
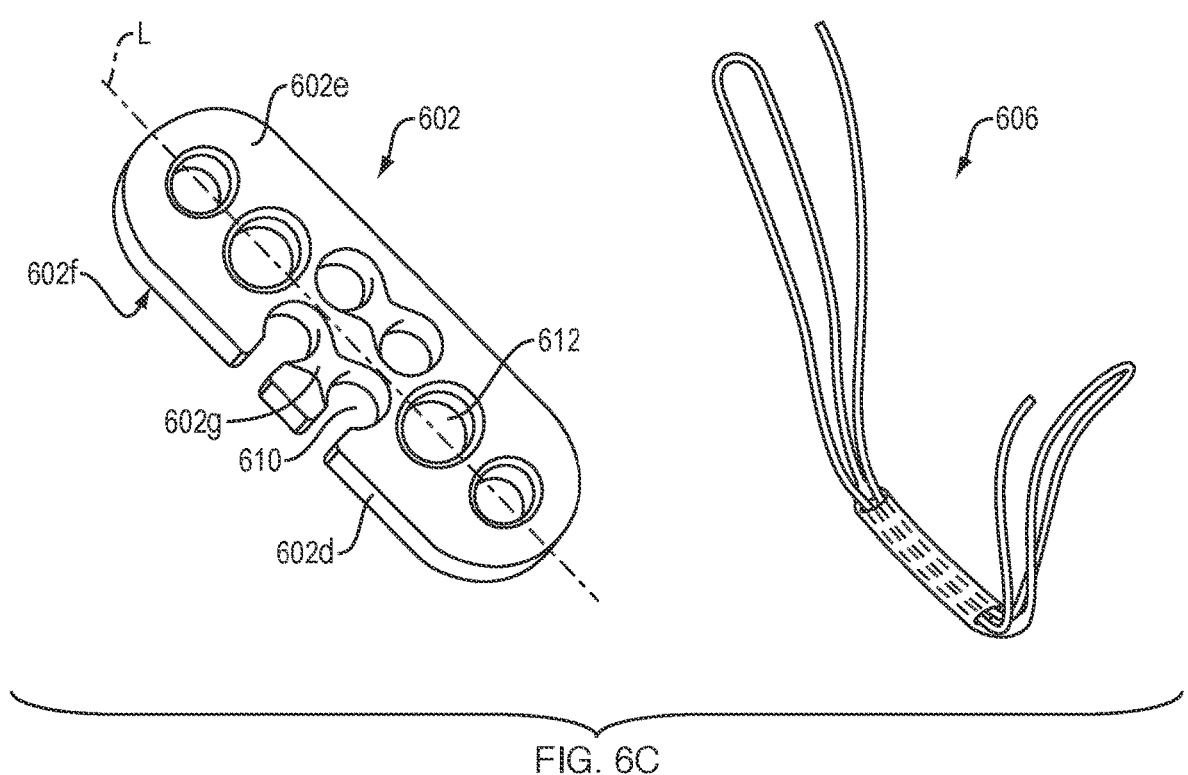

Pat. No. 10,383,617 extends from both ends of the cradle, drawing one of the loops of this construct would appear to draw both ends of the cradle into a tissue hole and at best wedge the cradle ends into a tissue hole. This would not address the need to form an adjustable suture construct coupled through a tissue hole. This adjustable fixation loop 5-6 forms two adjustable loops, one loop remaining on a first side of the single suture cradle, and the other loop on the opposite side of the single suture cradle. Cradle 520 may be a separate sleeve element from the length of suture in some embodiments. However preferably cradle 520 defines a length of a braided suture with a hollow core that is continuously braided with the rest of the suture and thereby adjustable suture loop. Stated otherwise cradle 520 and strands of suture 522 and 524 are a single element. The first strand 522 preferably extends from and is continuously braided with the first end of the cradle 520, the second strand 524 preferably extends from and is continuously braided from the opposite or second end of the cradle 520. Stated otherwise, first strand of suture 522 forms the first side 506a of the adjustable fixation loop 506, and a second strand of suture 524 forms the second side 506b of the adjustable fixation loop 506. The open loop configuration of the adjustable fixation loop 506 advantageously allows the second side 506b of the fixation loop 506 to be provided free of a fixation button and therefore shuttled through the tissue graft or bone block before being assembled to the device 500. First strand 522 extends from a first end of the cradle and may form first loop or bight and then extend through braids of the length of suture at the first end of the cradle then along the hollow core of the cradle 520 and then exit between braids of the length of suture. Second strand 524 extends from a second end of the cradle 520 and may form second loop bight on second side 506b and then extend through braids of the length of suture at the second end of the cradle 520 along the hollow core of the cradle 520 and then exit between braids of the length of suture at the cradle first end. Some of the example fixation devices include slots configured to selectively receive bight ends or loops from free end of the adjustable suture construct therethough Turning now to FIG. 6A, another example of a suspensory fixation device 600 for soft tissue repair is shown. The device 600 comprises an elongated, substantially flat body 602. The body 602 has a first end 602a and a second end 602b. Two closed holes 608 are formed adjacent a first side 602c of the body 602 at a center of the body 602. Two slotted holes 610 are formed adjacent a second side 602d of the body 602 at a center of the body 602. The two slotted holes 610 may be directly opposite the two closed holes 608. The two closed holes and two slotted holes may be disposed adjacent the midpoint between the first end 602a and 602b. A first of the two holes may be adjacent and directly opposite a first of the two slotted holes. A second of the two holes may be adjacent and directly opposite a second of the two slotted holes. The two closed holes 608 may be disposed on a first side of a body longitudinal axis L, while the two slotted holes disposed on the opposite side of the longitudinal axis L. Slotted holes 610 and holes 608 may both define a maximum diameter than are all equivalent to each other. Body also defines a top surface 602e and lower surface 602f. Lower surface defined in that it is configured to engage a cortical layer of bone. The body 602 is preassembled to a first side 606a of an adjustable fixation loop 606 through the closed holes 608, creating an open loop configuration. The first side 606a includes a loop portion that during construction of the adjustable construct 606, is threaded through both closed holes 608, before being threaded through a cradle portion 606d. Construction of this adjustable loop is shown in more detail in at least FIG. 8D. The open loop configuration of the adjustable fixation loop 606 advantageously allows the second side 606b and the free limb 606c of the fixation loop 606 to be shuttled first through the tissue graft or bone block before being assembled to the device 600. The hole in the bone block or soft tissue could advantageously be smaller than the hole in the bone block or soft tissue required for the passage of the anchor bodies described above with regard to FIG. 1A and 2A. As shown in FIG. 6B, the second side 606b of the adjustable fixation loop 606 may be coupled to the slotted holes 610 by placing a bight of loop 606b first directly adjacent the body top surface 606e and inserting strands of the loop 606b through the slots disposed on second side 602d of the slotted holes 610 to create a closed loop configuration. Body top surface 602e may include a contoured recess 602g, recessed below surface 606e and connecting the two slotted holes 610, parallel to the longitudinal axis. Recess 602g is configured to nest bight of loop 606b and reduce the suture loop standing proud of body surface 602e. Slotted holes 610 include narrow entrances at the second surface 606d slots to inhibit loop 606b from inadvertently sliding out of slots 610. Bone hole is also preferably sized such that the width of body 602 (from the first side 602c to 602d) is larger than bone hole formed. Therefore once lower surface 602f engages the bone, slotted holes 610 are partially enclosed such that second side loop 606b is trapped within slotted holes 610. FIG. 6C shows the body 602 disassembled from the adjustable fixation loop 606. The adjustable fixation loop 606 can be formed in the manner shown in FIG. 8D.

Body 602 also include at least two additional holes 612 that may lit on body longitudinal axis L. Holes 612 may each lie either side of holes 608 and may be equal in size. Holes 612 are configures to receive free limbs such as limb 606c therethrough. Holes 612 may be circular and larger in diameter or cross section than the slotted holes 610 or holes 608. In some embodiments, holes 612 may be oval. Holes 612 are generally maximized in opening size to thread suture limbs easily therethough while maintaining structural integrity of the body 602. In an alternative embodiment of anchor 602, shown in FIG. 39B holes 612 may have larger oval shaped holes 612 as discussed previously.

Figure 7A:
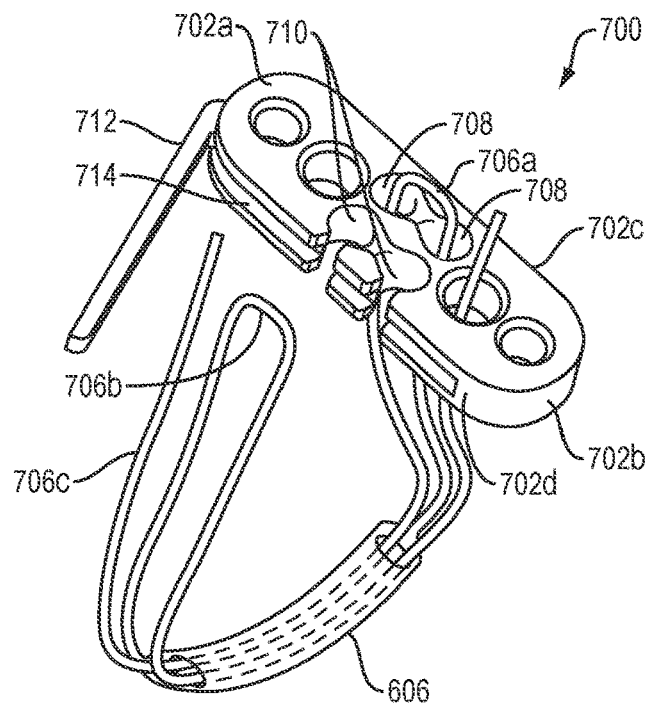
FIGS. 7A-7D illustrate a seventh example and method of use of a fixation device with an open loop adjustable suture construct of this disclosure

Turning now to FIG. 7A, another example of a suspensory fixation device 700 for soft tissue repair is shown. The device 700 comprises an elongated, substantially flat body 702. The body 702 has a first end 702a and a second end 702b. Two closed holes 708 are formed adjacent a first side 702c of the body 702 at a center of the body 702. Two slotted holes 710 are formed adjacent a second side 702d of the body 702 at a center of the body 702. A groove 714 is formed in the second side 702d of the body 702 adjacent the slotted holes 710. A pin 712 is hingedly attached to the first end 702a of the body 702. The body 702 is preassembled to a first side 706a of the adjustable fixation loop 706 through the closed holes 708, creating an open loop configuration. The open loop configuration of the adjustable fixation loop 706 advantageously allows the second side 706b and the free end 706c of the fixation loop 706 to be shuttled through the tissue graft or bone block before being assembled to the device 700. The hole in the bone block or soft tissue could advantageously be smaller than the hole in the bone block or soft tissue required for the passage of the anchor bodies described above with regard to FIG. 1A and 2A.

Figure 7B:
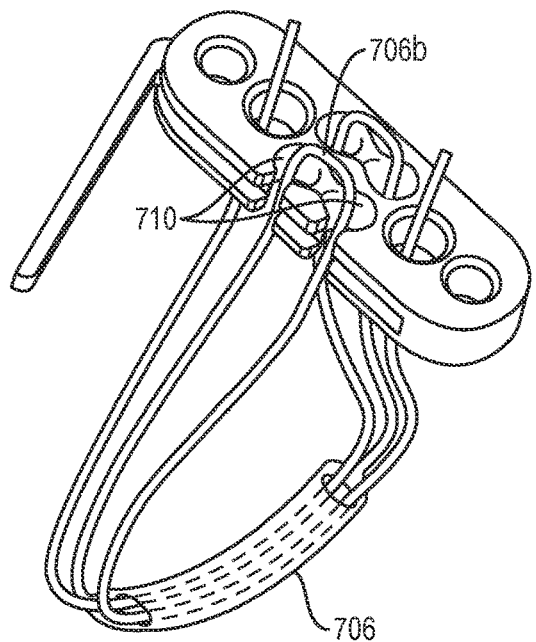
Figure 7C:
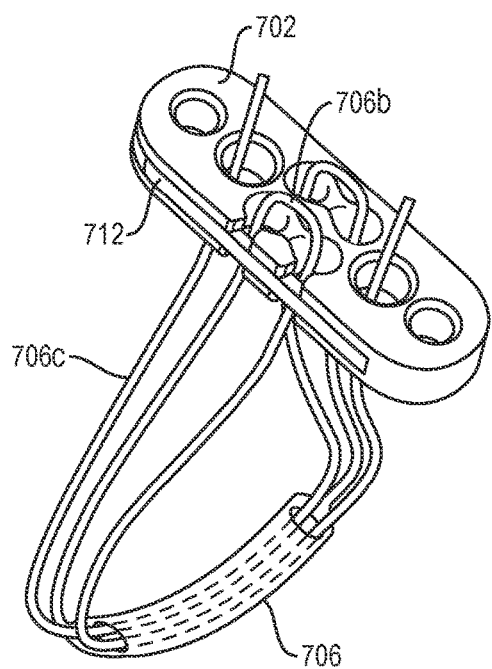
Figure 7D:
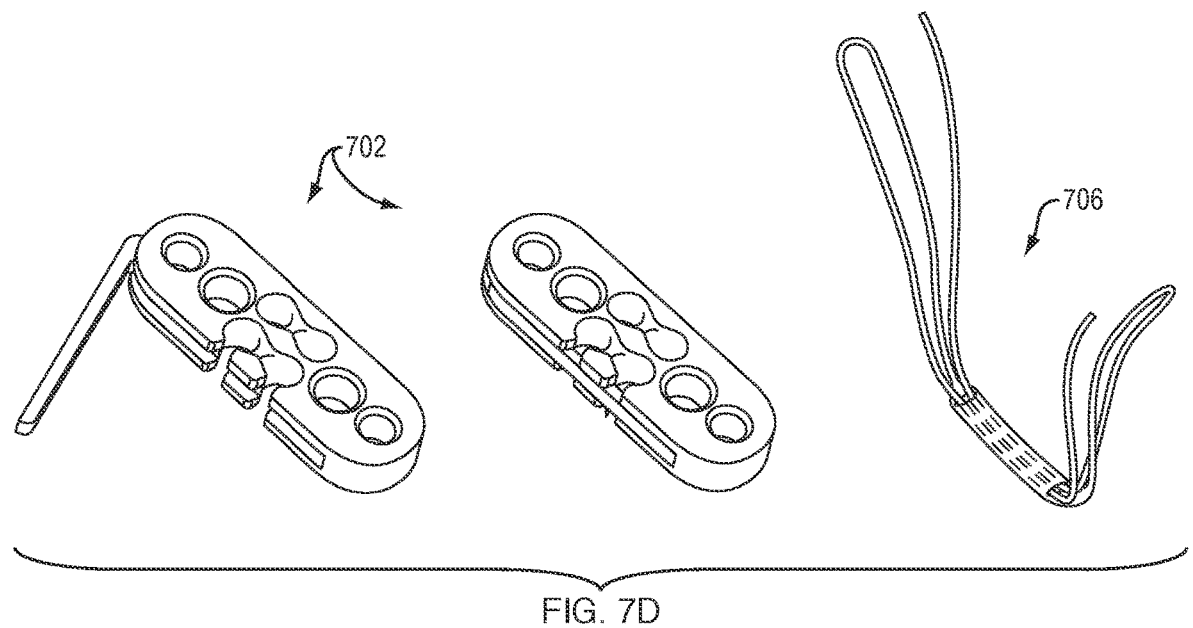

As shown in FIG. 7B, the second side 706b of the adjustable fixation loop 706 may be coupled to the slotted holes 710 by inserting strands of the loop 706 through the slots of the slotted holes 710 to create the closed loop configuration. The pin 712 may be inserted into the groove 714 in a "safety pin" fashion (FIG. 7C) to ensure that the second side 706b of the adjustable fixation loop 706 does not migrate from the device 700 during use. The pin 712 also provides greater structural strength to the grooved side of the body 702. FIG. 7D shows the body 702 disassembled from the adjustable fixation loop 706. The adjustable fixation loop 706 can be formed in the manner shown in FIG. 5H.

Figure 8A:
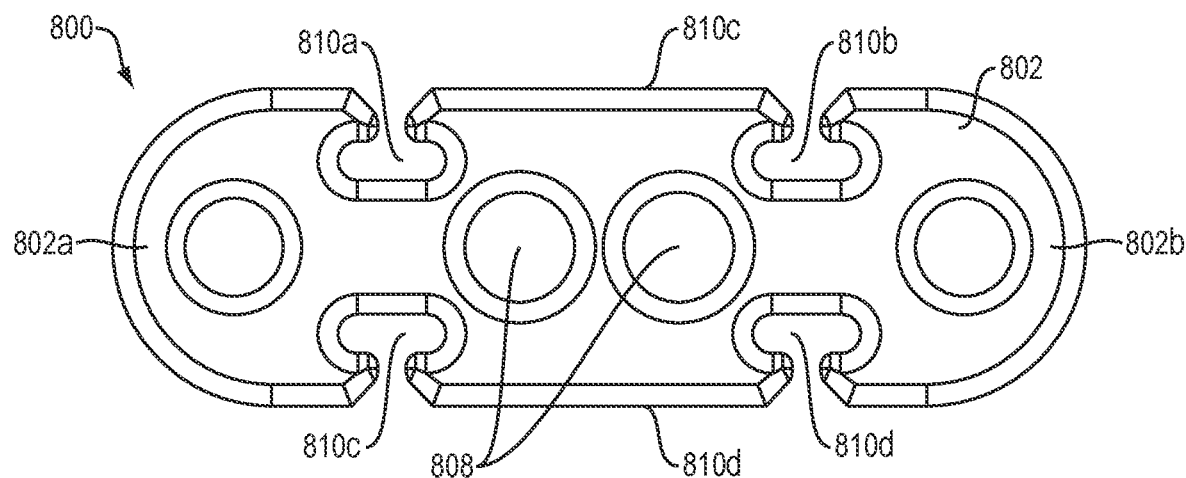
FIGS. 8A-8C illustrate an eighth example of a fixation device with an open loop adjustable suture construct in accordance with this disclosure.
Figure 8B:
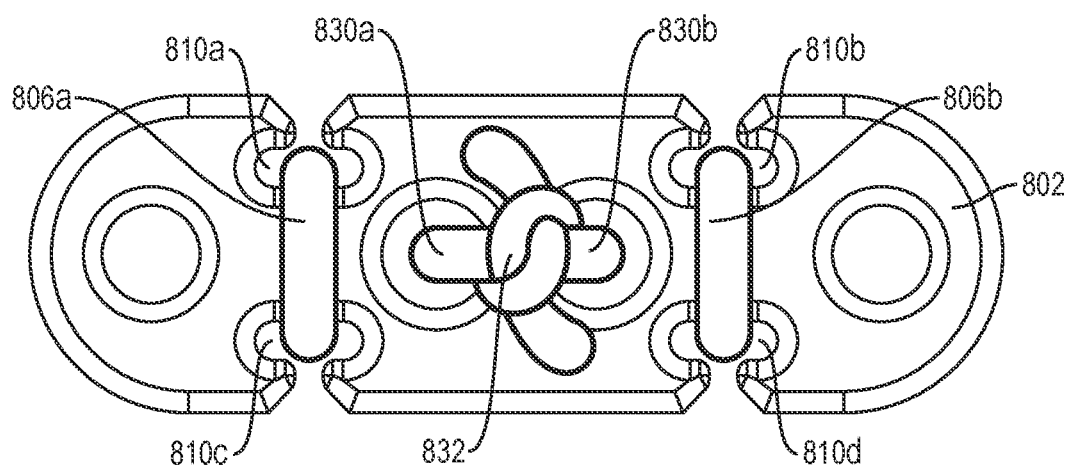
Figure 8C:
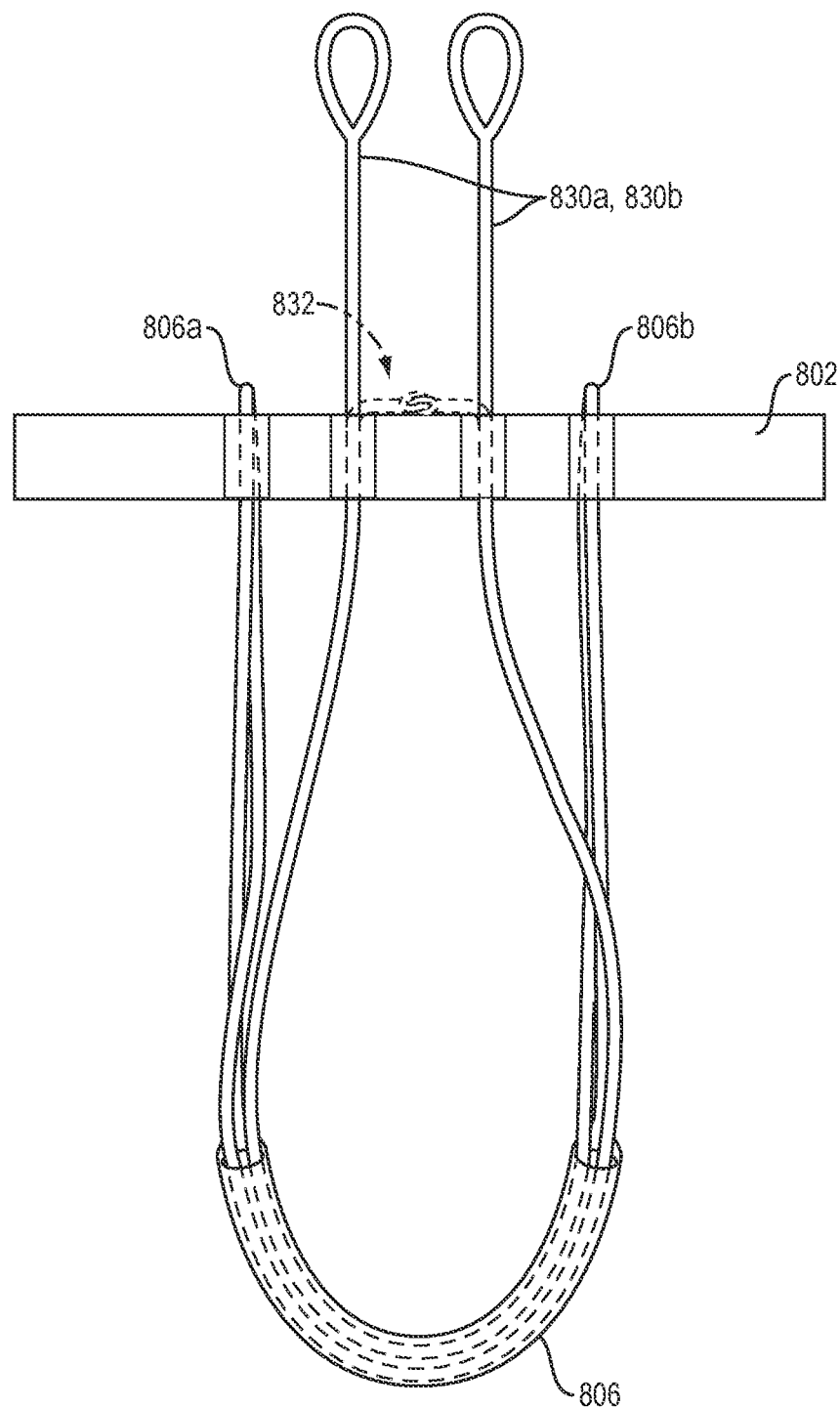
Figure 8D:
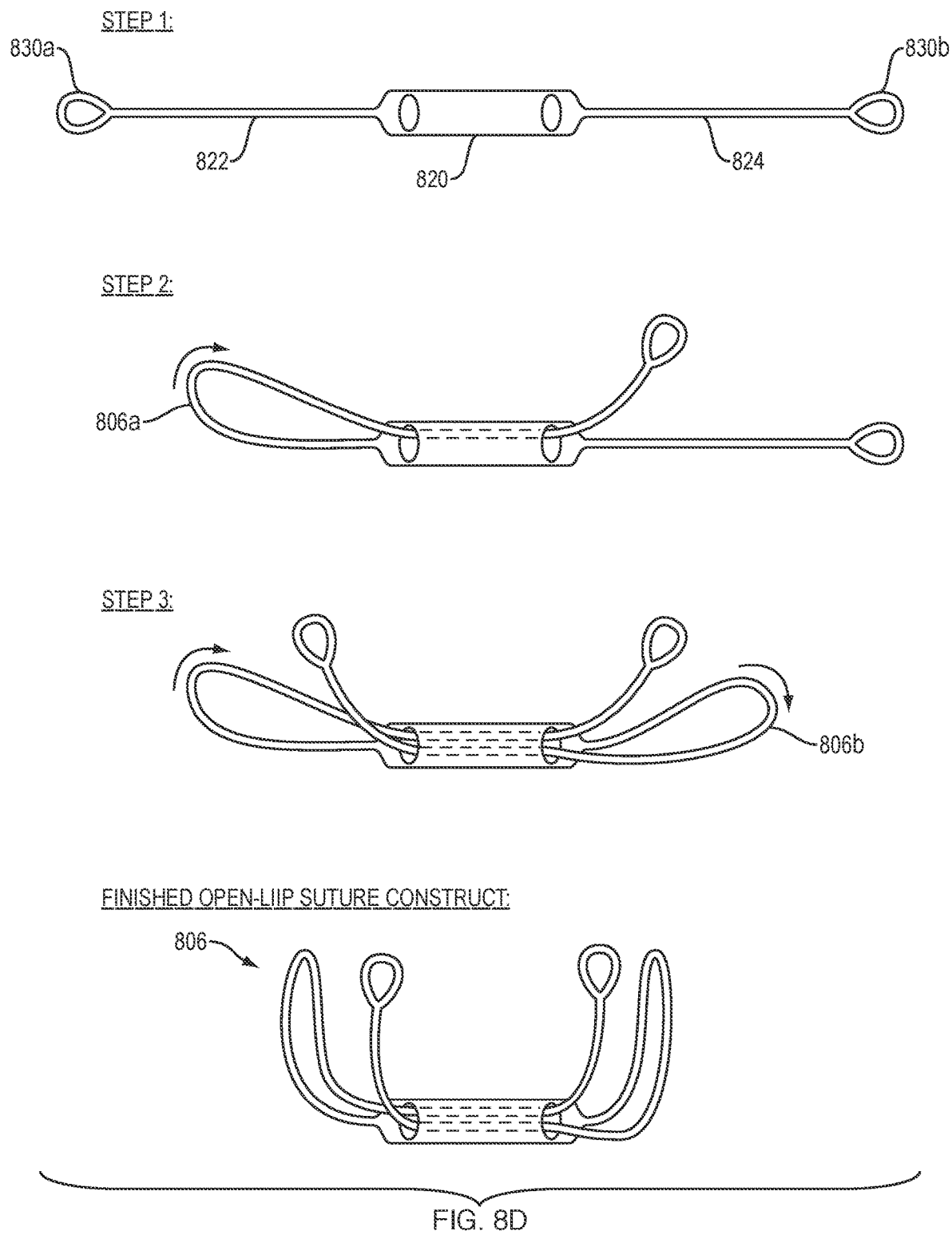
FIG. 8D illustrates a method of forming an suture construct that may be an open loop construct for use with the fixation device of at least FIGS. 1A, 1B, 2A-2C, 3A, 3B, 4A, 4B, 5A-5G, 6A-6C, 7A-7D, 8A-8C and 12A-12D of this disclosure.

Turning now to FIG. 8A, another example of a suspensory fixation device 800 for soft tissue repair is shown. The fixation device 800 can be used with an open loop adjustable suture construct, described in more detail below. The device 800 comprises an elongated, substantially flat body 802. The body 802 has a first end 802a and a second end 802b. Two closed holes 808 are defined through the entire thickness of the flat body 802 and at a center of the body 802. A first slotted hole 810a is formed through a first side 802c of the body 802 between the closed holes 808 and the first end 802a. A second slotted hole 810b is formed through the first side 802c of the body 802 between the closed holes 808 and the second end 802b. A third slotted hole 810c is formed through a second side 802d of the body 802 between the closed holes 808 and the first end 802a. A fourth slotted hole 810d is formed through the second side 802d of the body 802 between the closed holes 808 and the second end 802b. All the slotted holes 810a, b, c and d may define the same shape to each other. All slotted holes may have a more medial opening that defines a first maximum dimension for seating a portion of the adjustable suture construct and an entrance portion for receiving the adjustable suture construct therethrough to allow the adjustable suture construct access to the medial opening that is smaller in size than the medial opening to reduce inadvertent escape of the adjustable suture construct. As shown in FIGS. 8B and 8C, the body 802 may be during the procedure to a first side 806a of the open loop adjustable suture construct 806 through the slotted holes 810a, 810c. This embodiment allows the surgeon for example to assembly the entire adjustable loop construct 806 during the procedure. The slotted holes 810a, b, c, and d feature "tortuous paths" to retain the first side 806a and the second side 806b of the suture construct 806 once mated. Furthermore, the closed holes 808 may receive the finger loops 830a, 830b therethrough and tension on the finger loops 803a and 803b may reduce the adjustable suture loop and draw the graft towards the body 802. Finger loops 803a and 803b may then be joined by tying a knot stack 832 over a top surface of the body 802. The finger loops 830a, 830b allow for tensioning of the suture construct 806.

FIG. 8D illustrates the steps of forming the open loop adjustable suture construct 806 (also shown as at least construct 106, 206, 306, 3206). The suture construct 806 includes a cradle 820, a first strand of suture 822 (that may include finger loop 830a) forming the first side 806a of the suture construct 806, and a second strand of suture 824 (including finger loop 830b) forming the second side 806b of the suture construct 806. Cradle 820 is shown with a larger cross section than strands 822 and 824. As braided, cradle 802 and strands 822 and 824 may all define a similar cross section of hollow core suture. Cradle may be dilated during processing to expand the cross section. Cradle 820 may be expanded simply because of threading strands 822 and 824 therethrough while constructing the adjustable loop construct described herein. The first strand of suture 822, cradle 820 and second strand of suture 824 may be a single continuously braided flexible material. The open loop configuration of the suture construct 806 advantageously allows the second side 806b of the suture construct 806 to be shuttled through the tissue graft or bone block before being assembled to the bodies such as at least body 102, 202, 302, 402, 502, 602 and 802. This may place the length of cradle 820 through the graft tissue or bone block. Drawing on ends 830a and 830b may reduce sides 806a and 806b and thereby forms an adjustable loop construct.

Figure 9A:
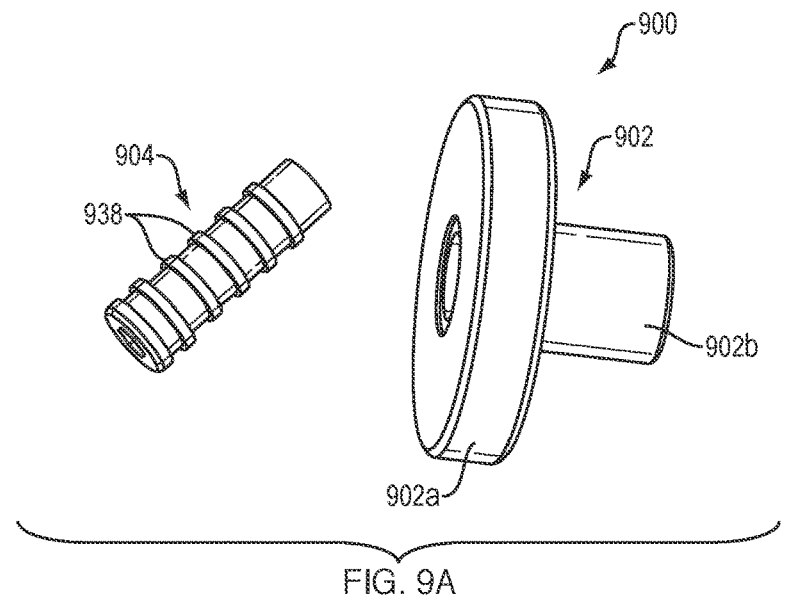
FIGS. 9A-9G illustrate a ninth example of a fixation device of this disclosure.
Figure 9B:
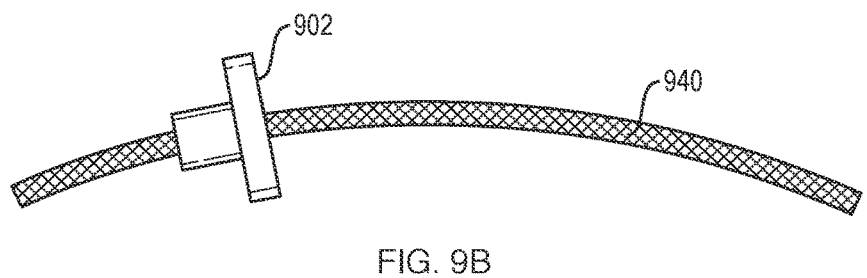
Figure 9C:
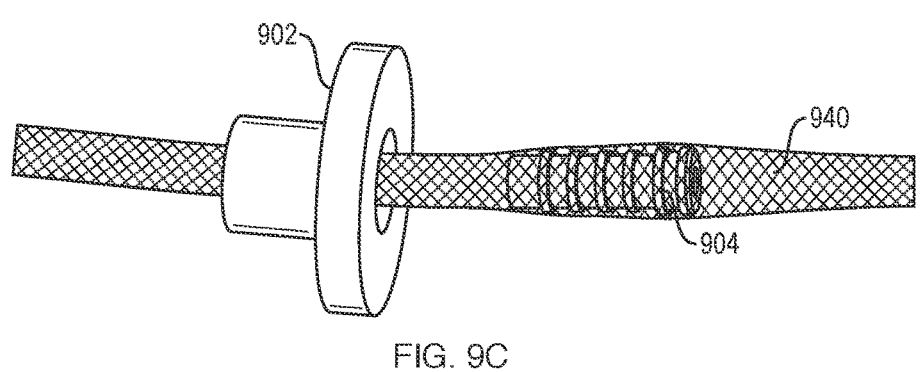
Figure 9D:
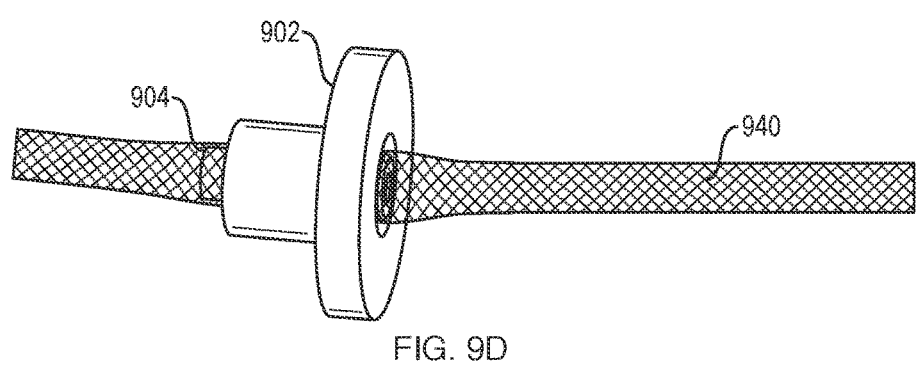
Figure 9E:
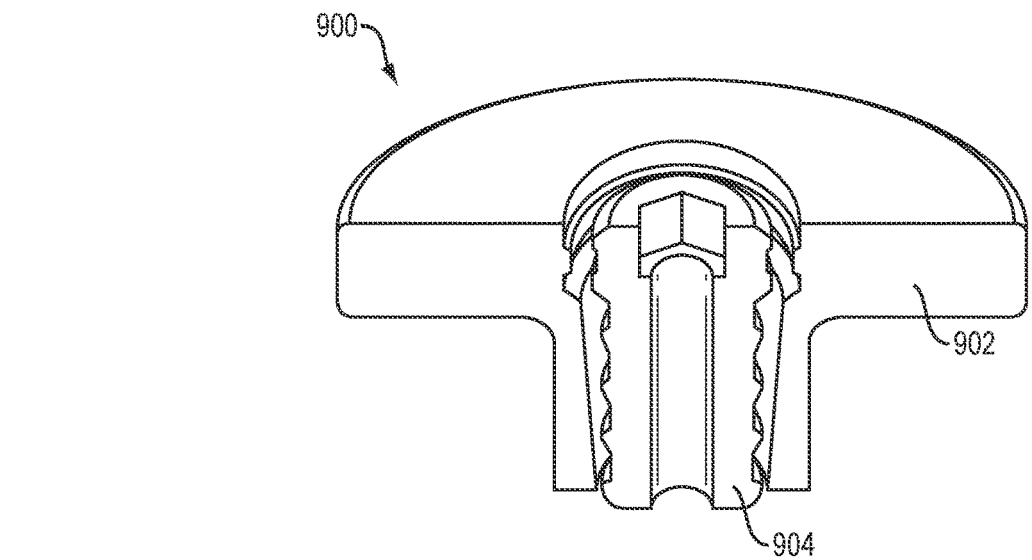
Figure 9F:
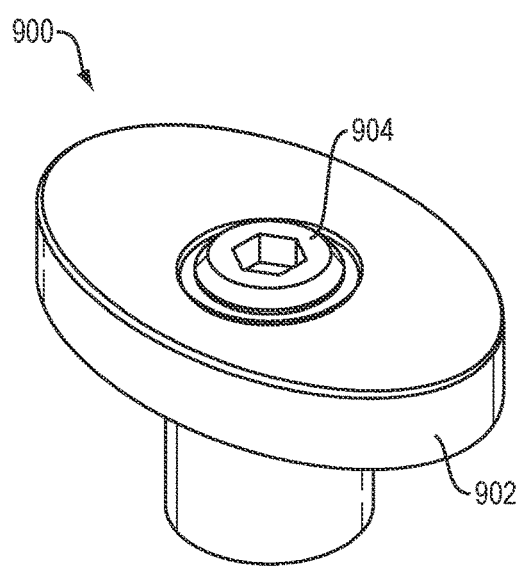
Figure 9G:
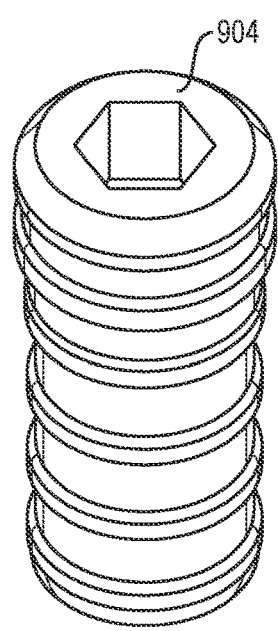

Turning now to FIG. 9A, another example of a two-bodied suspensory fixation device 900 for soft tissue repair is shown. The device 900 comprises a cannulated, cylindrical body 902 and a cannulated, cylindrical plug 904. An outer surface of the plug 904 may include a plurality of retaining features, such as annular ribs 938, as shown. The body 902 has a first portion 902a and a second portion 902b. An outer diameter of the first portion 902a is selected to the larger than an outer diameter of the second portion 902b. An inner diameter of the body 902 is selected to receive a hollow suture 940 therethrough, as shown in FIG. 9B. As shown in FIG. 9C, the plug 904 is insertable within the hollow suture 940 and capable of being pushed through the suture 940 toward the inner diameter of the body 902. As shown in FIG. 9D, the plug 904 can then be locked within the inner diameter of the body 902 to prevent the suture 940 from sliding relative to the body 902. During a repair, the hollow suture 940 can be "luggage tagged" around the bone block/soft tissue and passed through the bone tunnel. The body 902 can then be placed around the hollow suture 940 and pushed down toward the cortical bone surface. The plug 904 is then inserted into the hollow suture 940, thereby locking the suture 940. FIGS. 9E and 9F illustrate cross-sectional and perspective views, respectively, of the assembled device 900 without the hollow suture 940. FIG. 9G is a detailed view of the plug 904.

Figure 10A:
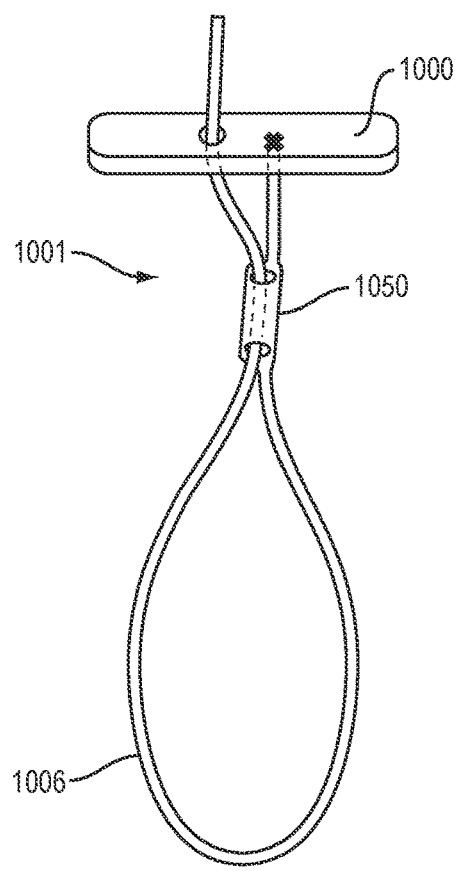
FIGS. 10A-10I illustrate examples of device/suture loop constructs of this disclosure for minimizing suture slip/creep.
Figure 10B:
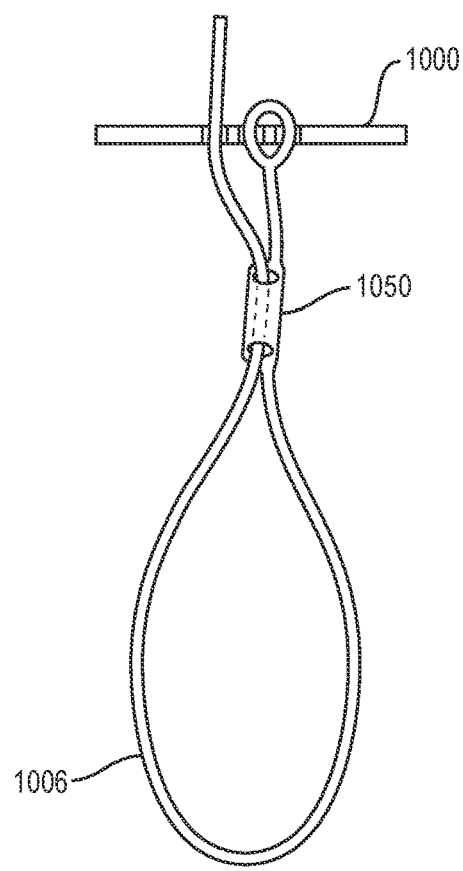
Figure 10C:
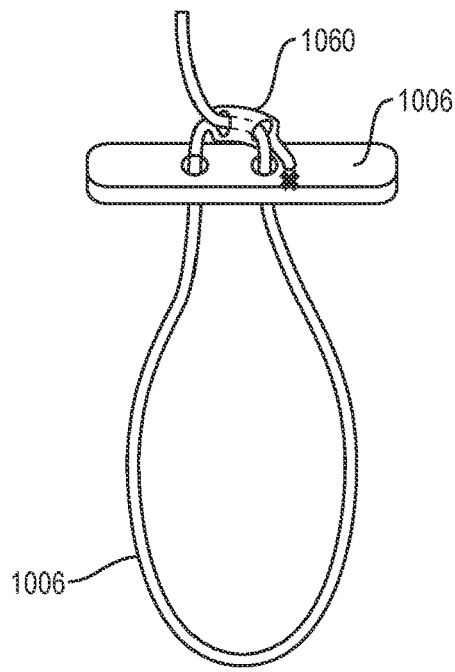

FIGS. 10A-I illustrate suture loop/fixation device constructs 1001 which are designed to minimize slip/creep by including a "Chinese finger trap" concept to provide suture trap compression on 360° of the single suture running within the trap. Compared to a cradle style construct that receives 2 suture therethrough, this concepts are configured to receive only a single suture and thereby reduce slip/creep by having 360° or compression around the single suture upon tendon and elongation of the trap. For example FIG. 10A illustrates a single loop adjustable suture loop 1006 which is dead-ended in the fixation device 1000 and wherein suture loop 1006 extends within the trap 1050 under high trap tension and high adjustable suture tension. FIG. 10B illustrates a single loop adjustable suture loop 1006 which is dead-ended via a loop on the fixation device 1000. FIG. 10C illustrates a single loop adjustable suture loop 1006 in which the trap 1050 is formed above the device 1000 under high trap tension and high adjustable suture tension. For these examples, half the applied tension should result in similar hold on the suture through the trap 1050.

Figure 10D:
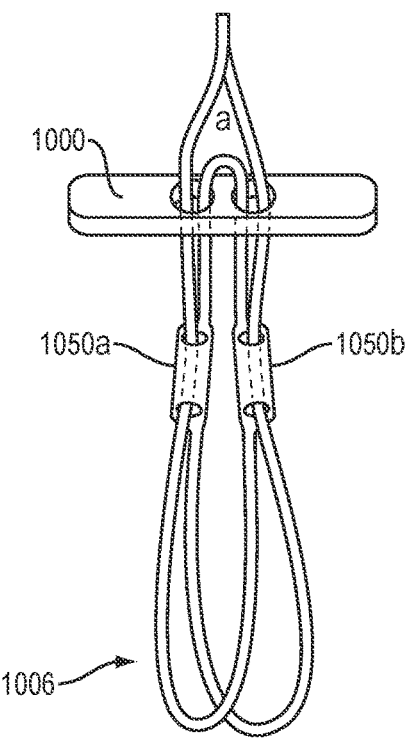
Figure 10E:
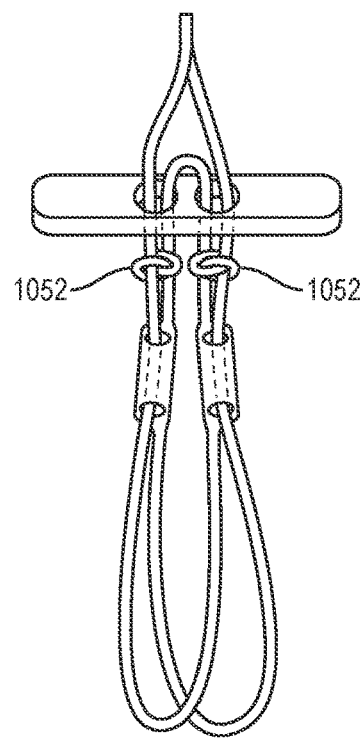
Figure 10F:
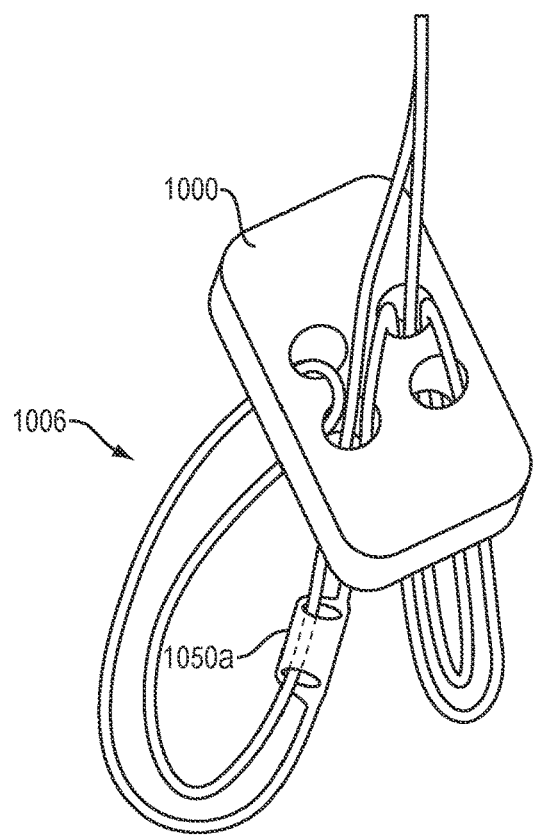
Figure 10G:
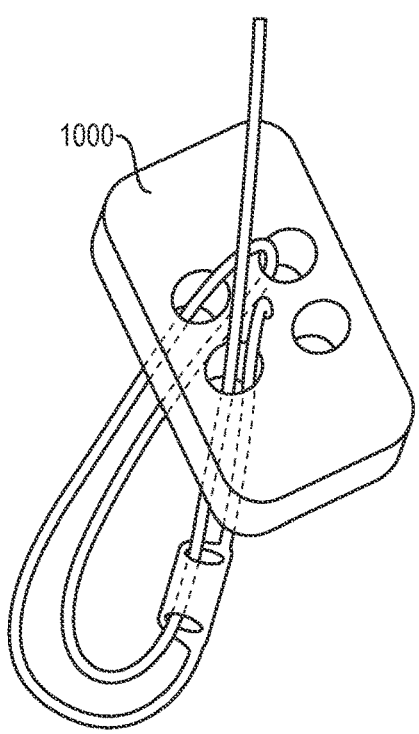
Figure 10H:
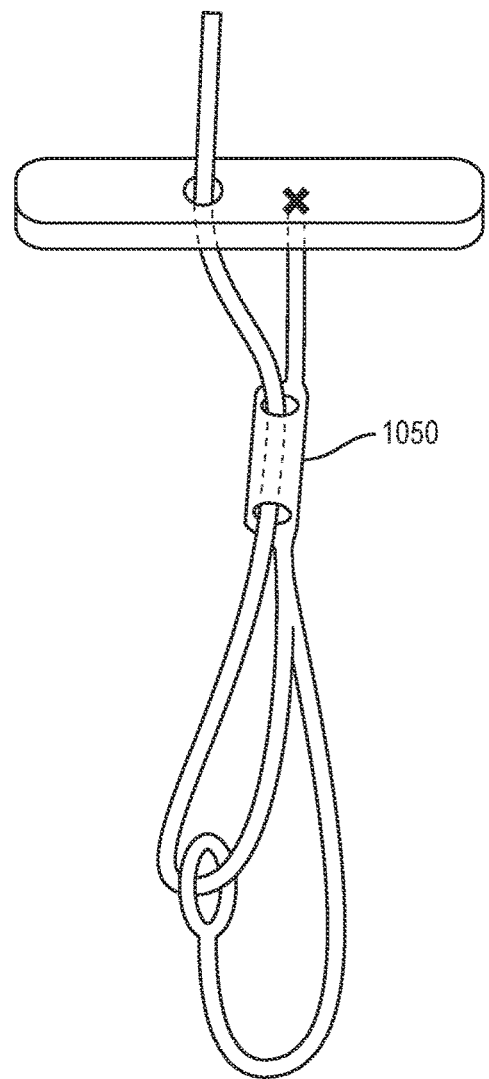
Figure 10I:
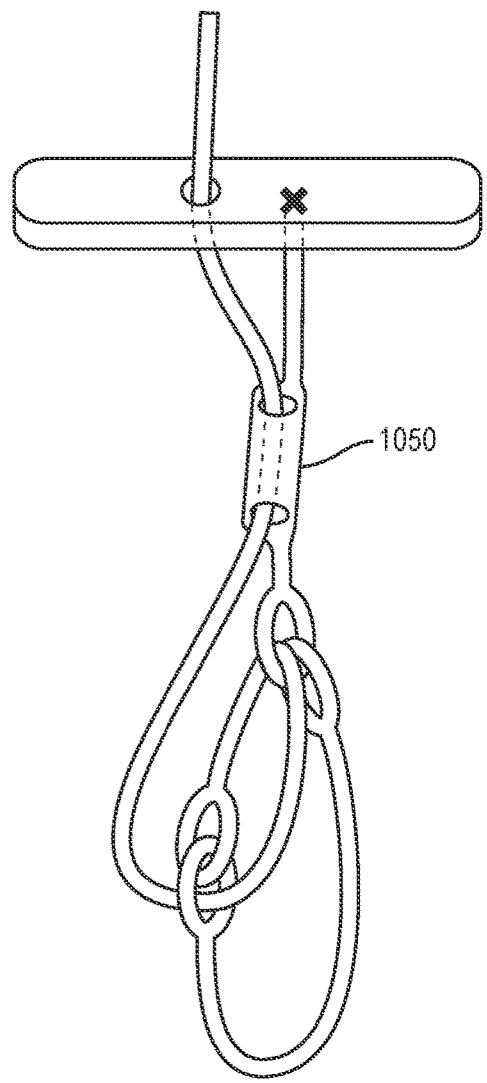

FIG. 10D illustrates a double loop adjustable suture loop 1006 including two traps 1050a,b formed below the device 1000 under trap partial trap tension (T/4) and partial adjustable suture tension (T/4) such that the two suture loops receive full 360° suture compression. Optionally, a stopper 1052 (i.e., a knot/bead or expanded trap section) could be included to eliminate toggle sutures, as shown in FIG. 10E (or in FIG. 10D at position "a"). FIG. 10F illustrates a quadruple loop adjustable suture loop 1006 including two traps 1050a (1050b not shown) formed below the device 1000 under partial trap tension (T/8) and partial adjustable suture tension (T/8) such that the four suture loops receive full 360° suture compression with two limbs adjusted together. FIG. 10G illustrates an alternative threading of two of the four suture loops (the mirror image loops omitted for clarity) through the device 1000. FIGS. 10H and 10I illustrate the use of a trap 1050 under high trap tension (T/2) and low adjustable suture tension (T/3 or T/4) with full 360° suture compression. FIG. 10H shows a spliced suture. It is further contemplated that, by increasing suture-to-suture friction, the traps 1050 will exhibit less suture slip/creep. This could be accomplished by adding the amount of co-braid (i.e., a higher friction material) to the weave of the suture or by manipulating the suture texture.

Figure 11C:
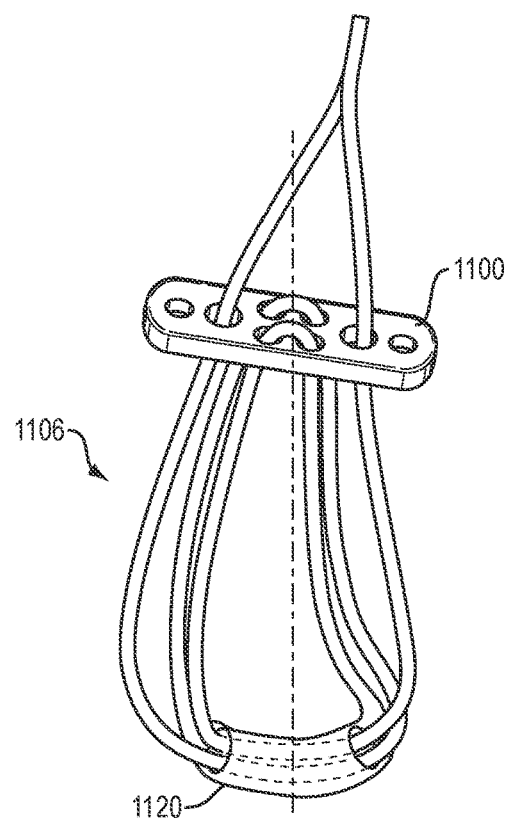
FIGS. 11A and 11C illustrate a fixation device known in the art.
Figure 11D:
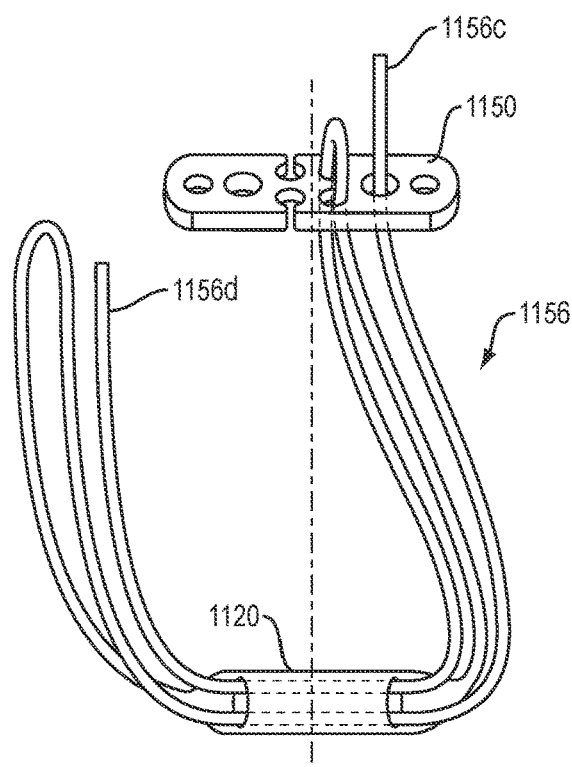
FIGS. 11B and 11D-11G illustrate a tenth example of a fixation device with an open loop adjustable suture construct with two joined tension suture ends in accordance with this disclosure.
Figure 11E:
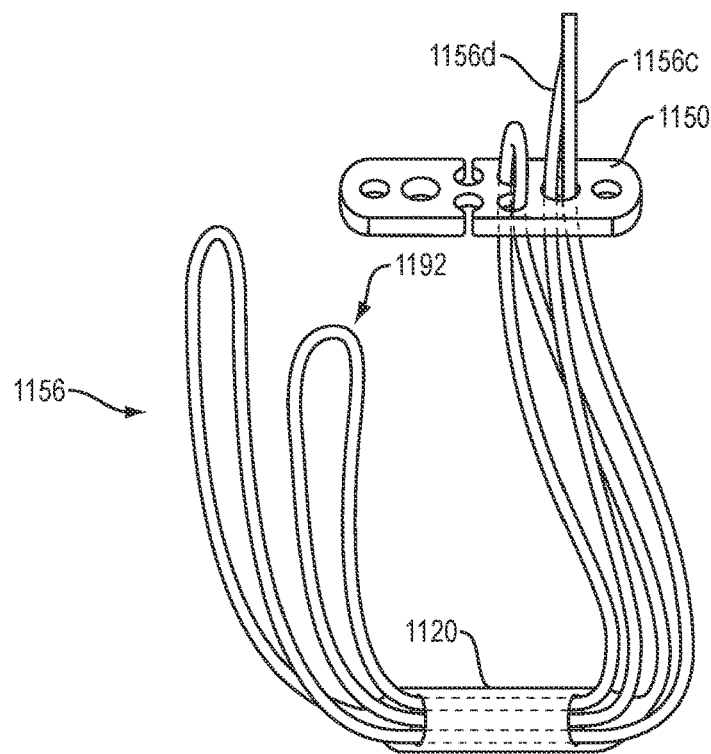
Figure 11F:
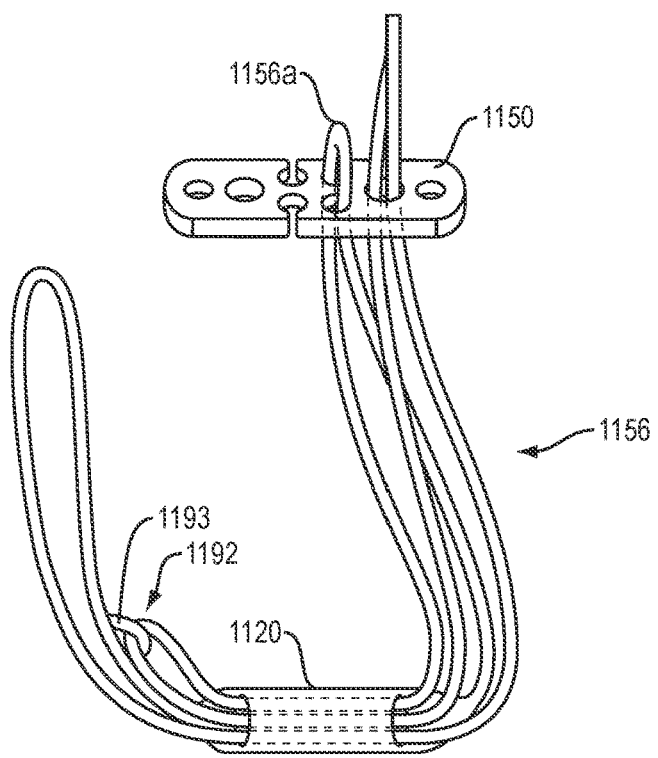
Figure 11G:
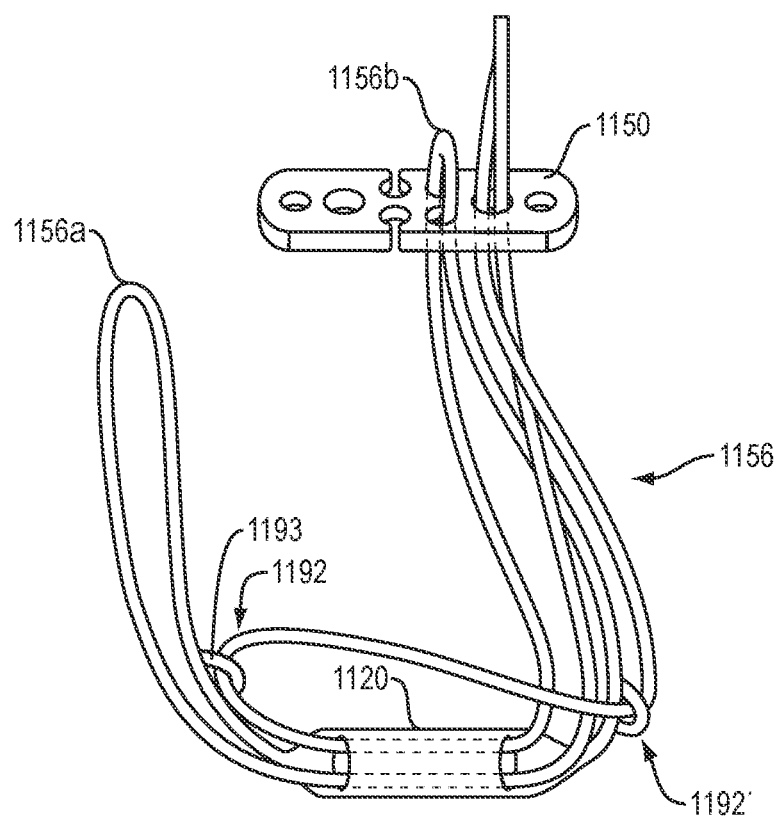

FIGS. 11A illustrates a device/suture loop construct 1101 including a fixation device 1100 and an adjustable suture loop 1106, which includes the use of two joined tension sutures 1102 as opposed to two independent tension sutures. Device in 11A is disclosed in commonly owned U.S. Pat. No. 10,383,617; herein incorporated by reference in its entirety. FIG. 11B shows a device/suture loop construct 1151 including a fixation device 1150 and an adjustable suture loop 1156, which includes the use of two joined tension sutures 1152 as opposed to two independent tension sutures. While the construct shown in FIG. 11A requires splitting a tissue 1160 to couple cradle with tissue, constructs similar to construct 1151 allows for inserting a free end of suture construct through the tissue 1160. Stated otherwise instead of using continuous circular loops with no opening to allow the adjustable suture loop 1106 to be put through tissue 1160 (FIG. 11A), one of the loops of the adjustable suture loop 1106 could be unfolded and passed through the tissue 1160 and then attached to the fixation device 1150 (FIG. 11B). In the example of FIG. 11C (and 11A), the adjustable suture loop 1106 is composed of a series of suture loops each of which pass across the 12 o'clock position (vertical dotted line) then continue around to the cradle 1120. In order to pass the adjustable suture loop 1106 through tissue then back to the device 1150, the sutures could not pass this 12 o'clock position. Instead, the sutures would still make a 180° turn but on the same side from which they came, then continue passing through the cradle 1120 in the opposite direction from the device 1150, as shown in FIG. 11D. Notably, the two free ends 1156c, 1156d of the adjustable suture loop 1156 could not be joined, as the free end 1156c would need to be passed through tissue. In order for the two free ends 1156c,d to be joined, both would need to exit the cradle 1120 on the same side of the device 1150, as shown in FIG. 11E. In examples, this would be accomplished by adding a "redirect" turn 1192 to the adjustable suture loop 1106. Although this would eliminate the need for one of the free ends 1156a,b to be passed through tissue, it may still require two loops to be passed through tissue and then attached to the device 1150. It may require more holes in the device 1150, and thus a larger size of the device 1150, as well as an additional suture to pass through the cradle 1120. A preferred embodiment, shown in FIG. 11F, would require only one loop 1156a to be attached to the device 1150, thus allowing the size of the device 1150 to be smaller, yet still having the joined suture feature. In examples, this could be accomplished by moving the "redirect" turn 1192 from the device 1150 onto the suture adjacent to the cradle 1120. In examples, the redirect turn 1192 would include a bypass loop 1193 tied in the suture, a spliced-in suture, or a rigid pulley. Alternatively, as shown in FIG. 11G, the final redirected path could be external to the cradle 1120. A second redirect turn 1192' could aid in controlling the path.

Figure 11H:
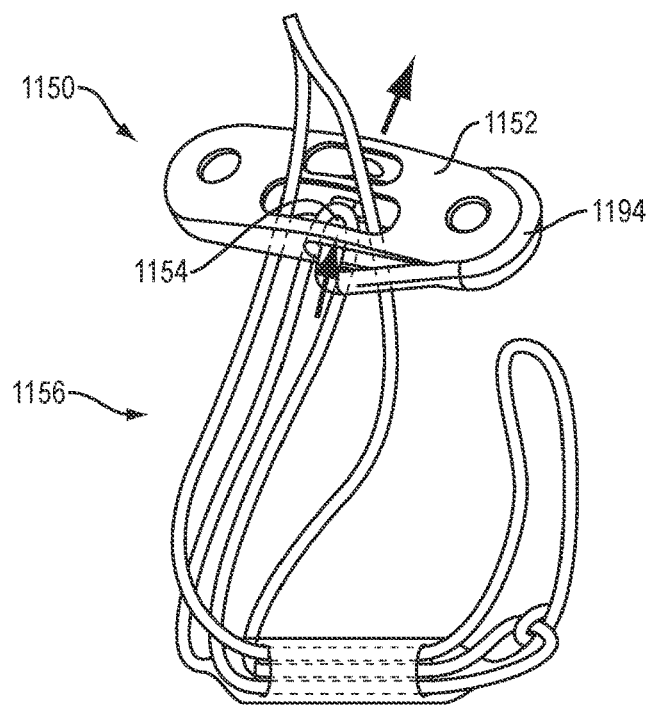
FIGS. 11H-11V illustrate examples of a fixation device for use in the device/suture loop constructs of FIGS. 11A-G.
Figure 11I:
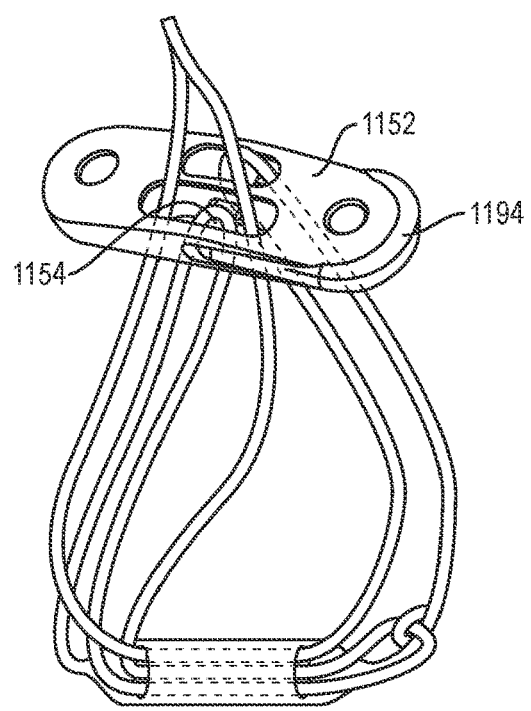
Figure 11J:
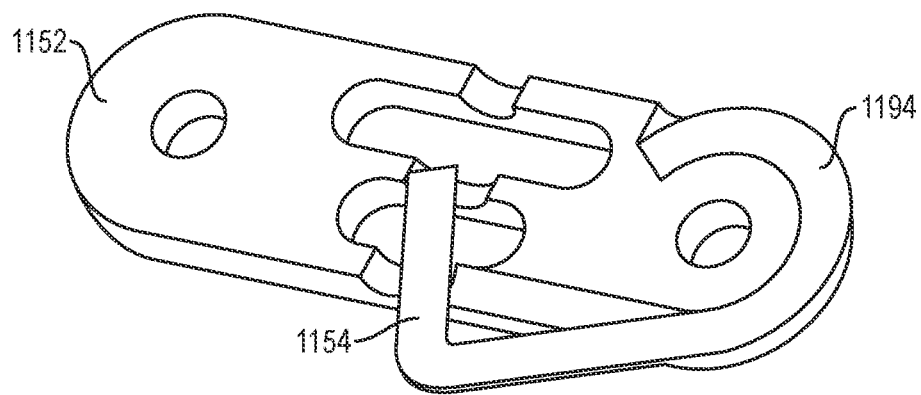
Figure 11K:
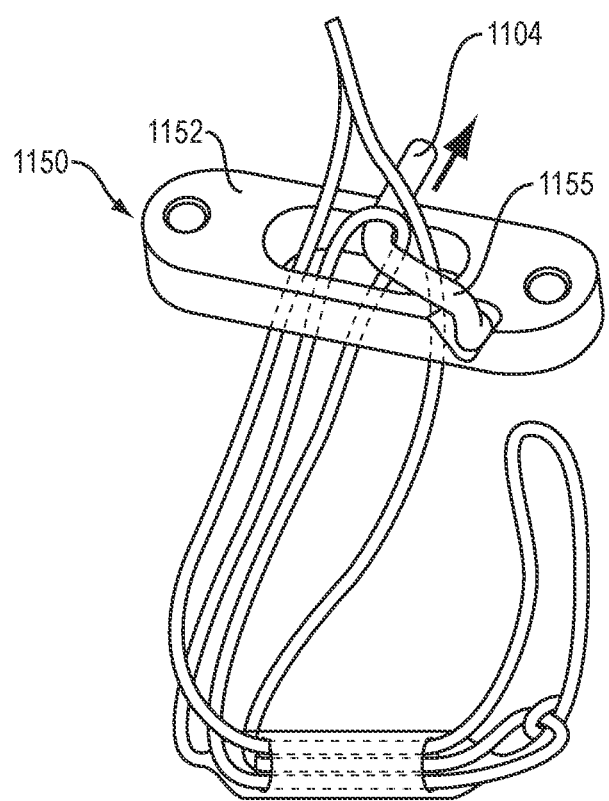
Figure 11L:
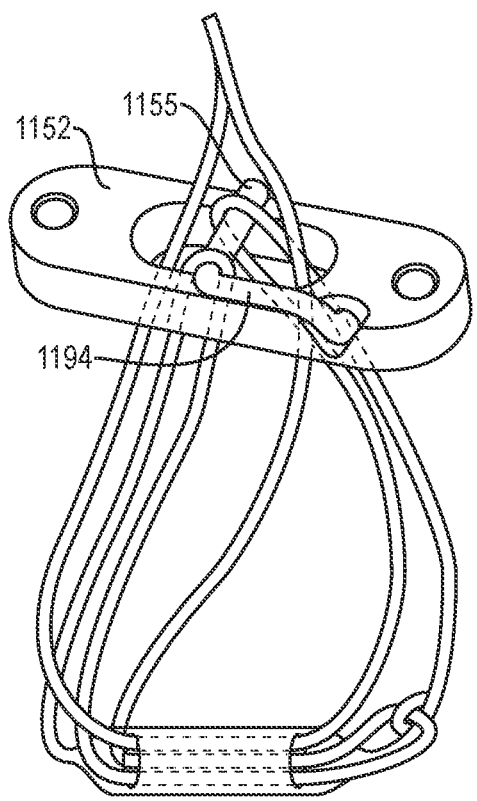
Figure 11M:
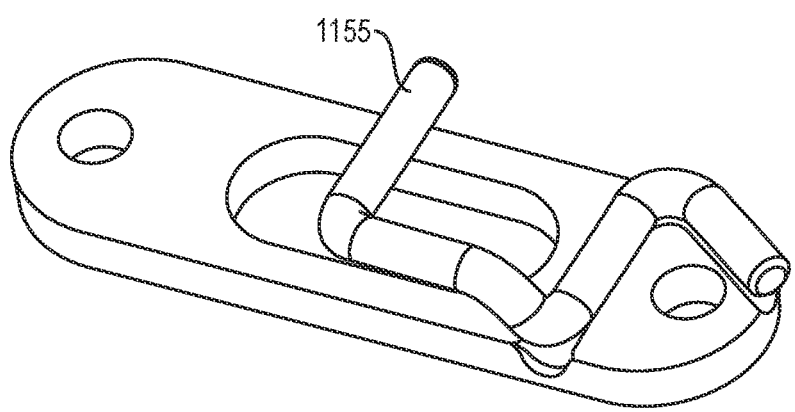
Figure 11N:
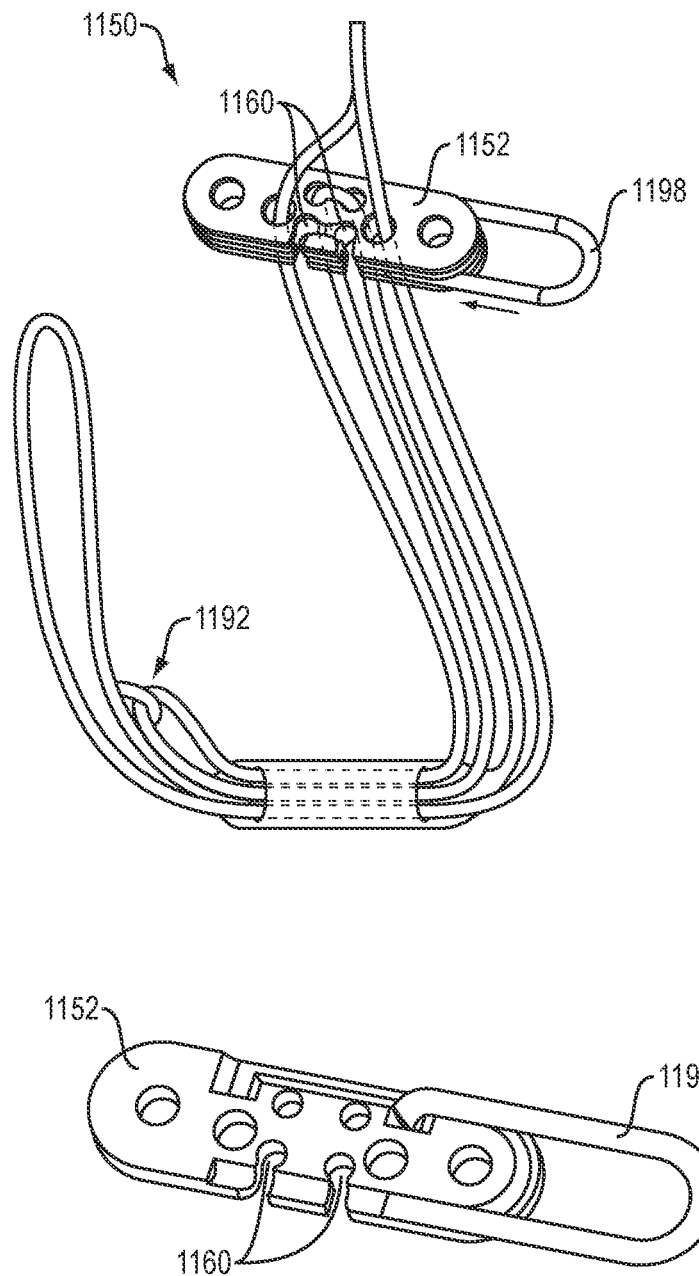
Figure 11O:
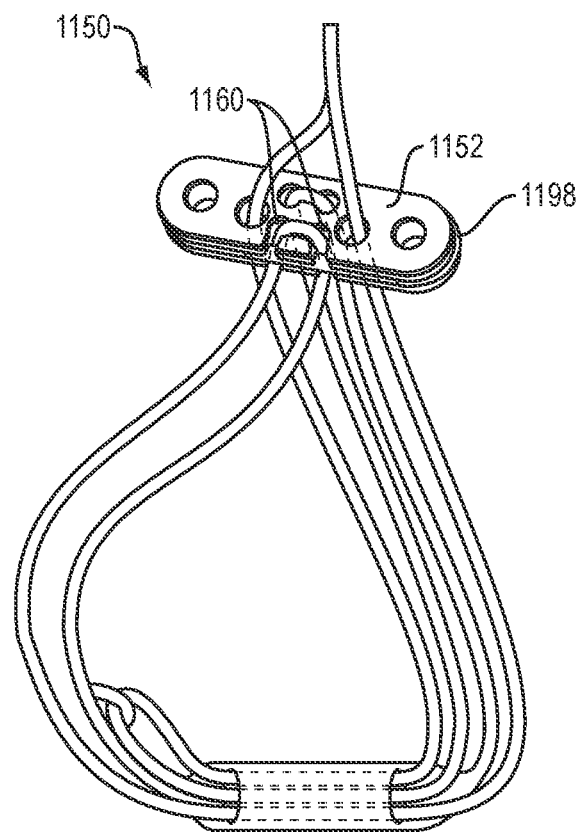
Figure 11O:
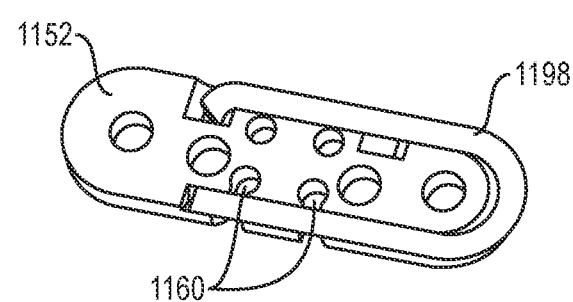
Figure 11P:
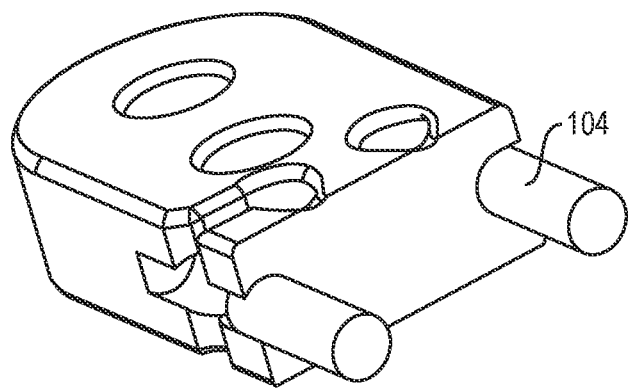
Figure 11Q:
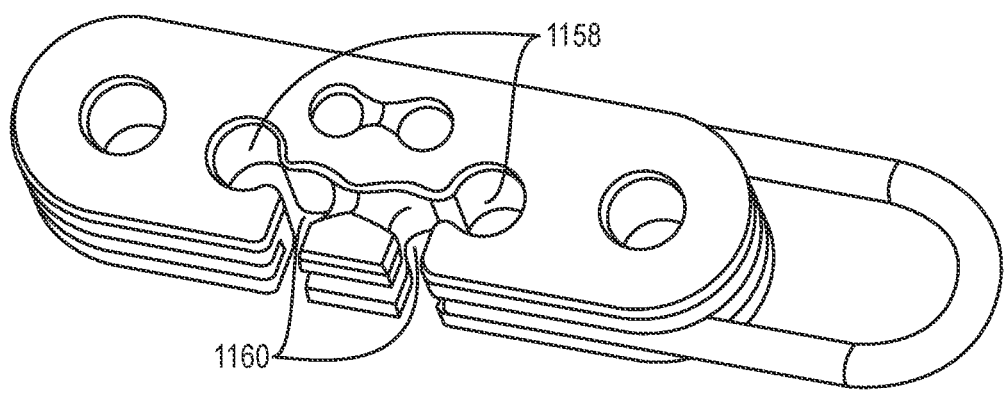
Figure 11R:
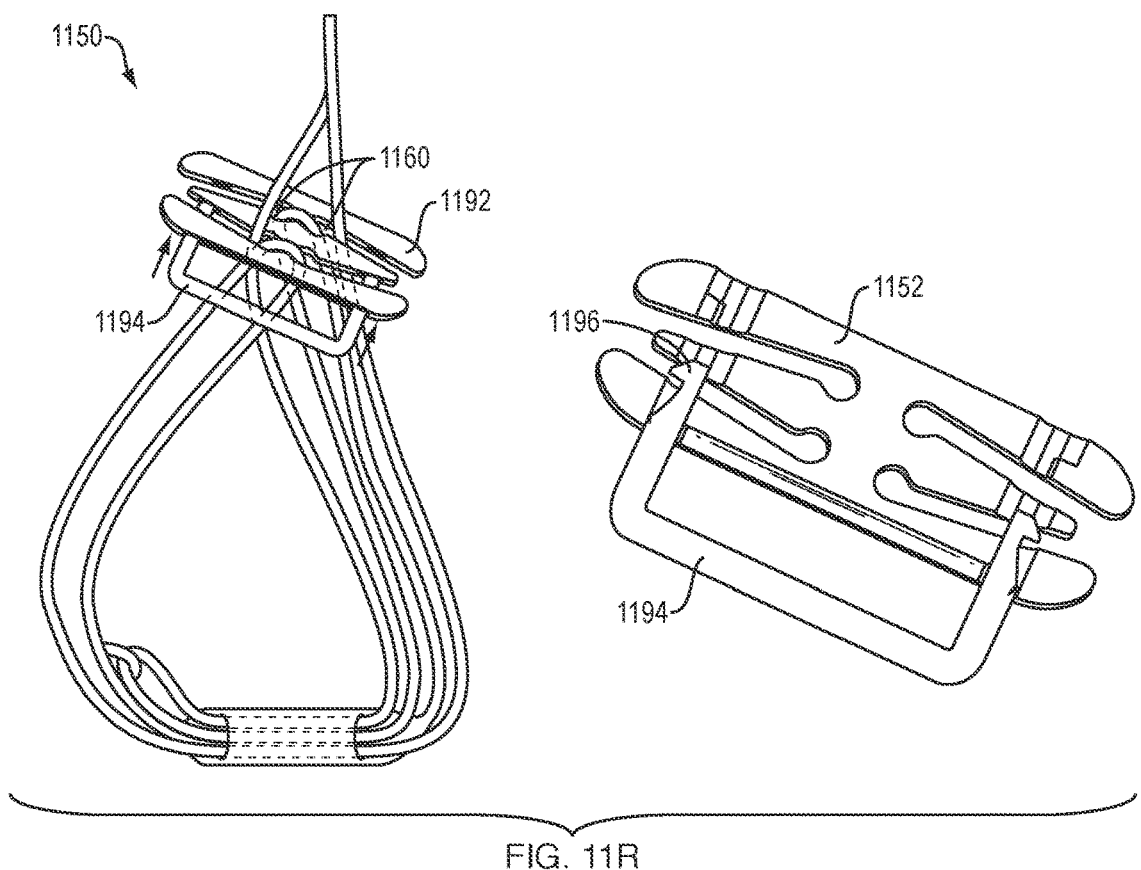
Figure 11S:
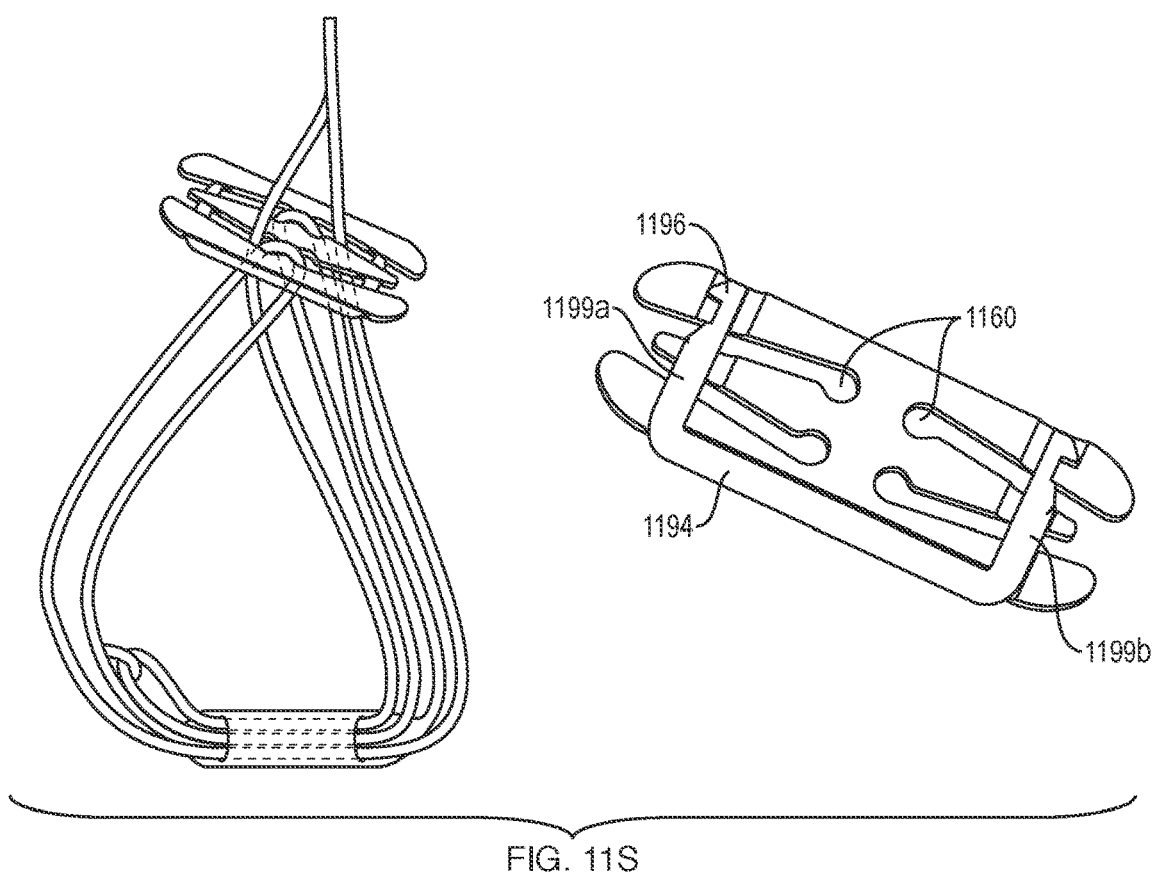
Figure 11T:
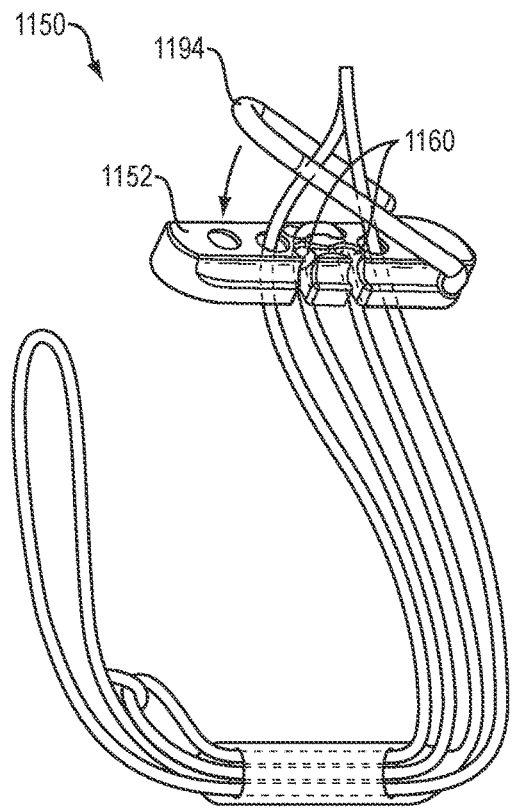
Figure 11U:
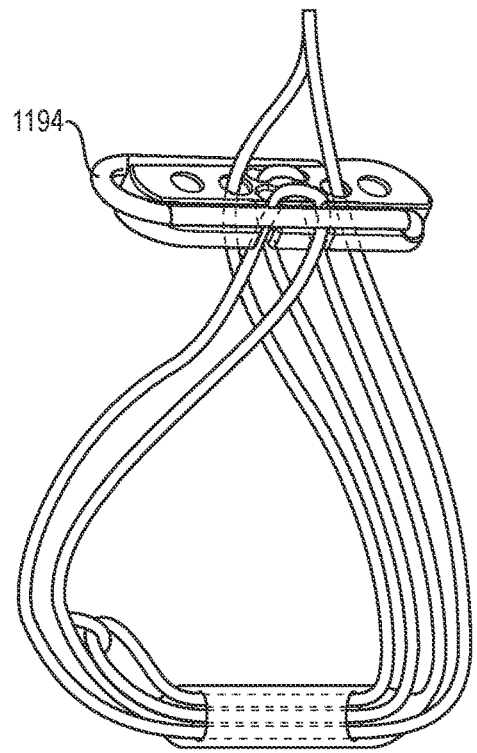
Figure 11V:
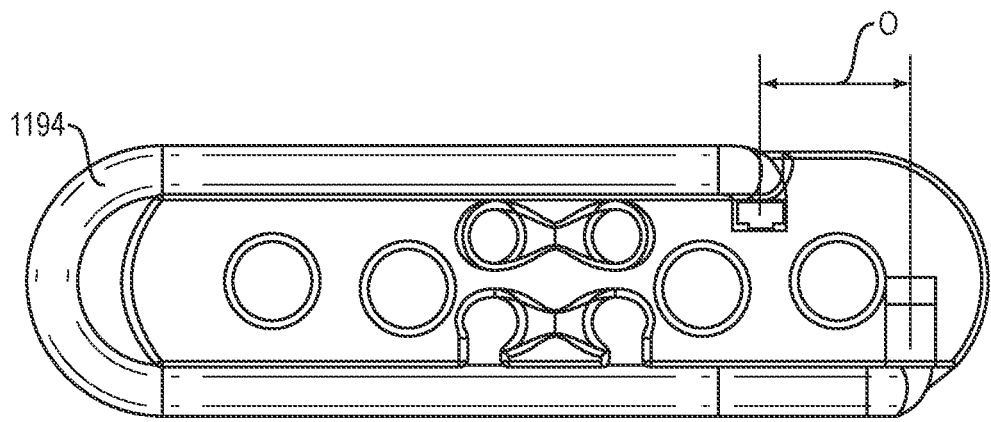

Turning now to FIGS. 11H-V, further examples of the device 1150 for use in the device/suture loop construct 1156 described above are shown. Examples of the device 1150 are substantially similar to the devices 600 and 700, except as described below. In the examples of the device 1150 shown in FIGS. 11 H-J, a cross-pin 1154 could be captively held to the body 1152 of the device 1150 and sprung in a plane perpendicular to the load. A wireform 1194 could be bent over-center, thus preventing the cross-pin 1154 from falling off the device 1150. An end of the wireform 1194 would also bottom within the body 1152, thus providing closure via forced bending. In further examples of the device 1150 show in FIGS. 11 K-M, the cross-pin 1155 could be captively held to the body 1152 of the device 1150 and open in a plane parallel to the load. In further examples of the device 1150 shown in FIGS. 13N-P, a retainer pin 1198 could be held captive in the body 1152 of the device 1150 while allowed to slide longitudinally between "load" and "locked" positions. Detents would ensure the retainer pin 1198 did not reopen prematurely. In the "load" position (FIG. 11N), the retracted retainer pin 1198 would allow suture access from the exterior of the body 1152 to the interior "pulley" holes 1160. When the "locked" position (FIG. 11O), the retainer pin 1194 would add to the rigidity of the body 1152. The retainer pin 1198 would not encounter the relatively high suture loads but, instead, the relatively low forces needed to retain the sutures in the "pulley" holes 1160. FIG. 11P is a cross-sectional view of the device 1150. In an alternative example, shown in FIG. 11Q, the holes 1158 for the adjustable suture loop (not shown) could be in communication with the pulley holes 1110.

In further example embodiments of the device 1150, shown in FIGS. 11R and 11S, a wireform 1194 could be held captive in the body 1152 of the device 1300 while allowed to slide perpendicularly between "load" and "locked" positions. In the "load" position (FIG. 11R), the retracted wireform 1194 would allow suture access from the exterior of the body 1152 to the interior "pulley" holes 1160 before sliding into the "locked position (FIG. 11S). The wireform 1194 would not encounter the relatively high suture loads but, instead, the relatively low forces needed to retain the sutures in their "pulley" holes 1160. The flipping sutures would be looped about the two cross members 1199a, 1199b of the wireform 1194. The wireform 1194 could include a spring latch 1196, thus ensuring non-opening once closed. In examples of the device shown in FIGS. 11T-V, the wireform 1194 could be held captive in the body 1152 of the device 1150 while allowed to bend in the plane parallel to the force between "load" and "locked" positions. In the "load" position (FIG. 11T) the wireform 1194 would allow suture access from the exterior of the body 1152 to the interior "pulley" holes 1160 before being snapped back into the locked position (FIG. 11U). The wireform 1194 would not encounter the relatively high suture loads but, instead, the relatively low forces needed to retain the sutures in their "pulley" holes 1160. Critical to creation of the spring force is the offset 0 between pivoting axes of the wireform 1194, as shown in FIG. 11V.

Figure 12A:
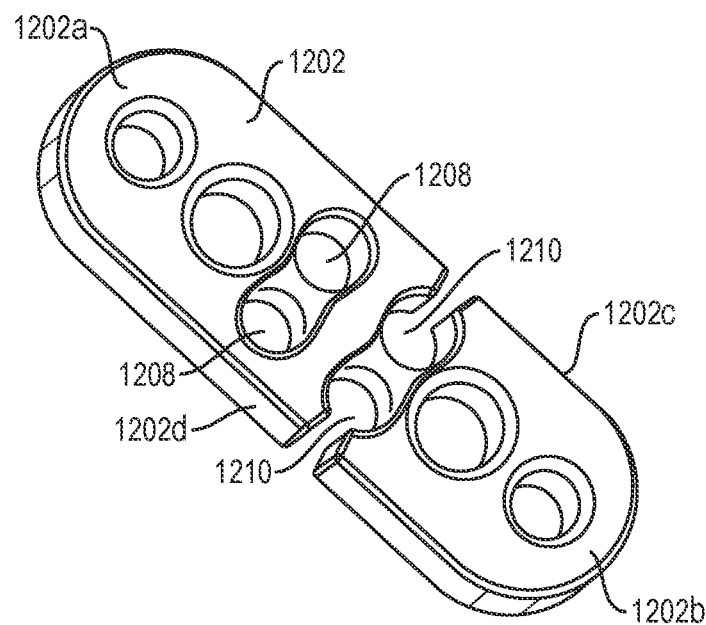
FIGS. 12A-12D illustrate an eleventh example of a fixation device with an open loop adjustable suture construct of this disclosure.

Turning now to FIG. 12A, another example of a suspensory fixation device 1200 for soft tissue repair is shown. The device 1200 comprises an elongated, substantially flat body 1202. The body 1202 has a first end 1202a and a second end 1202b and a longitudinal axis extending therebetween. Two closed holes 1208 are formed adjacent a first side 1202c and a second side 1202d respectively of the body 1202 and closer to the first end 1202a. The two closed holes are formed on opposite sides of the longitudinal axis to each other and directly opposite each other. A first and second of the two slotted holes 1210 are formed adjacent the first side 1202c and the second side 1202d of the body 1202 respectively and closer to the second end 1202b. As shown in FIG.

Figure 12B:
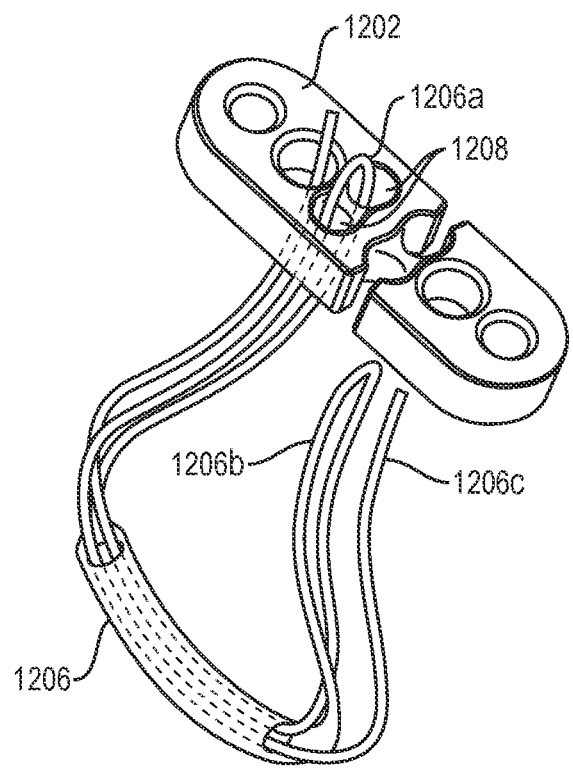
Figure 12C:
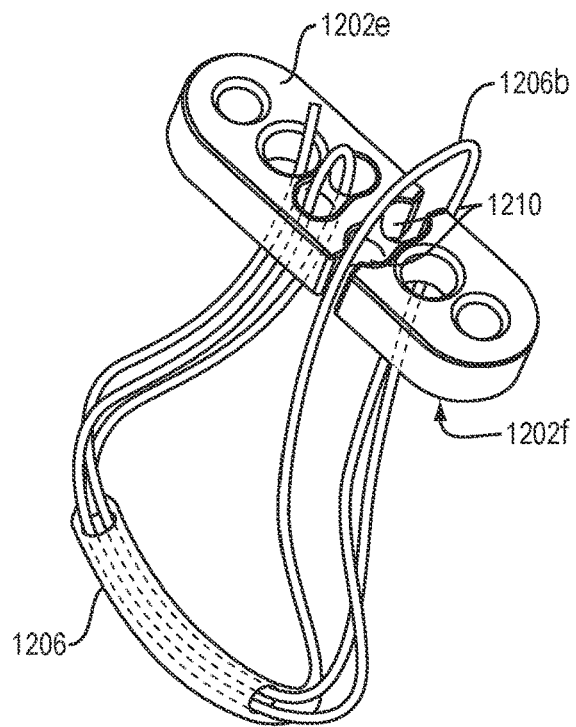
Figure 12D:
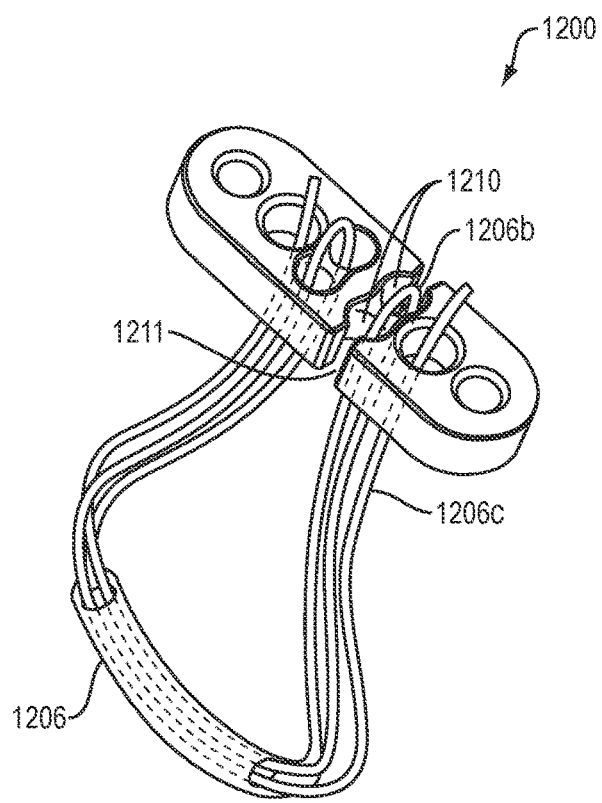

12B, the body 1202 is preassembled to a first side 1206a of an adjustable fixation loop 1206 through the closed holes 1208, creating an open loop configuration. The open loop configuration of the adjustable fixation loop 1206 advantageously allows the second side 1206b and the free end 1206c of the fixation loop 1206 to be shuttled through the tissue graft or bone block before being looped over the body 1200 to place the second side 1206b through both slotted holes 1220. Both sides 1206a and 1206b are oriented when assembled to cross the longitudinal axis of the body 1202. The hole in the bone block or soft tissue could advantageously be smaller than the hole in the bone block or soft tissue required for the passage of the anchor bodies described above with regard to FIG. 1A and 2A. As shown in FIG. 12C, the second side 1206b of the adjustable fixation loop 1206 may then be coupled to the slotted holes 1210 by inserting strands of the loop 1206 through the slots of the slotted holes 1210 to create a closed loop configuration (FIG. 12D). A "V" shape slot opening 1211 at holes 1210 ensures that the second side 1206b of the adjustable fixation loop 1206 does not migrate from the device 1200 during use. Slotted holes 1210 and holes 1208 may both define a maximum diameter than are equivalent to each other. Body 1202 also defines a top surface 1202e and lower surface 1202f. Lower surface defined in that it is configured to engage a cortical layer of bone. As shown in FIG. 12C and FIG. 40C, the second side 1206b of the adjustable fixation loop 1206 may be coupled to the slotted holes 1210 by placing a bight of loop 1206b first around an end of body such as end 1202b and directly adjacent the body top surface 1206e and the drawing strands of the loop 1206b through the slots 1210, one slot disposed through first side 1202c of body 1202 and the other slot through the second side 1202d of the body 1202 to create a closed loop configuration. Similar to embodiment shown in FIG. 6A-6C, body top surface 602e may include a contoured recess, recessed below surface 1206e and connecting the two slotted holes 1210. This recess may perpendicular to the longitudinal axis. The adjustable fixation loop 606 may be formed in the manner shown in FIG. 8D.

Figure 13A:
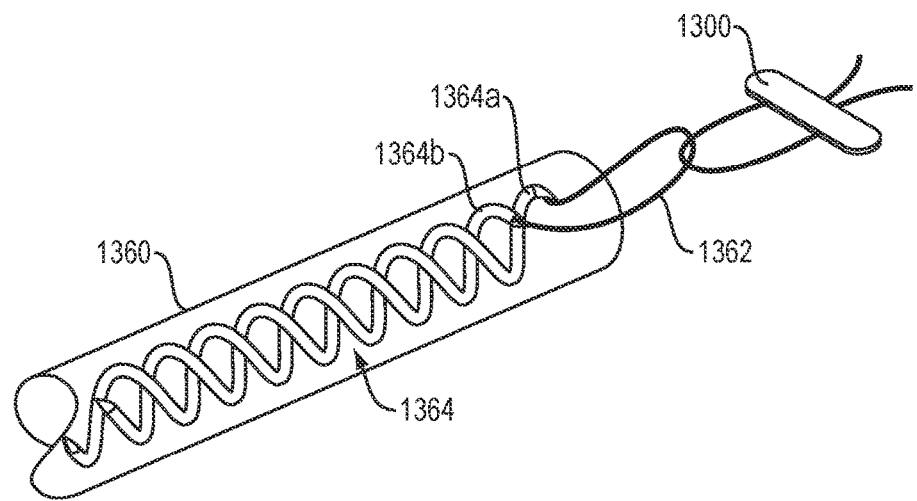
FIGS. 13A-13F illustrate examples of a helical needle of this disclosure for stitching a tissue graft.
Figure 13B:
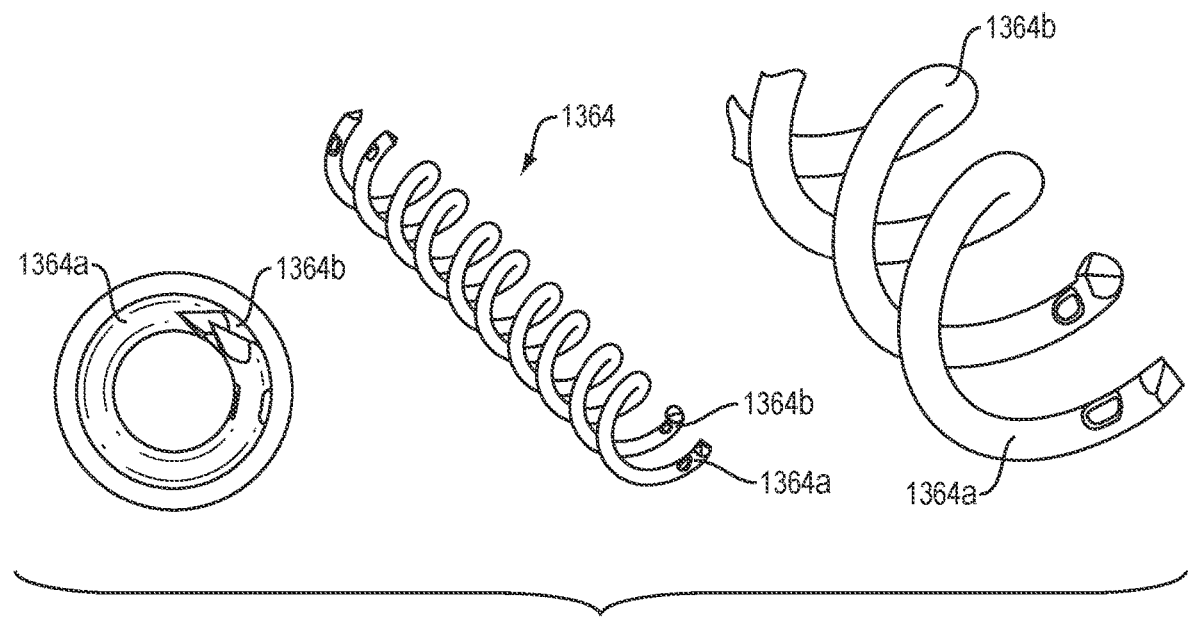
Figure 13C:
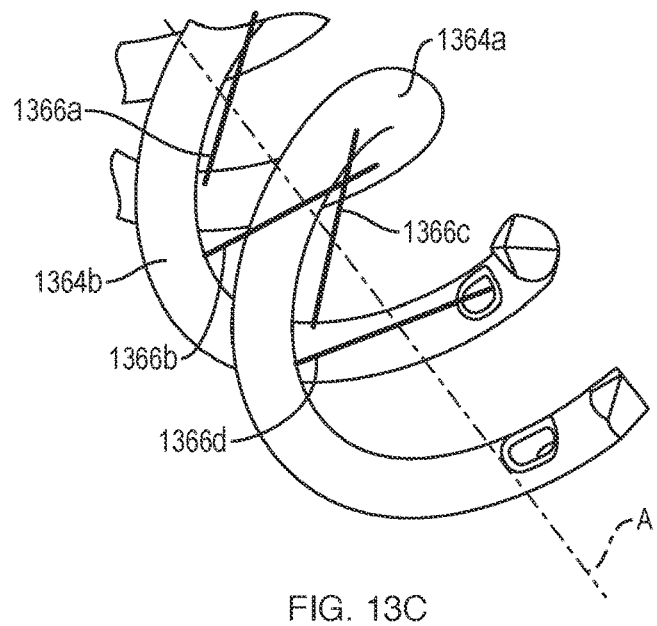
Figure 13D:
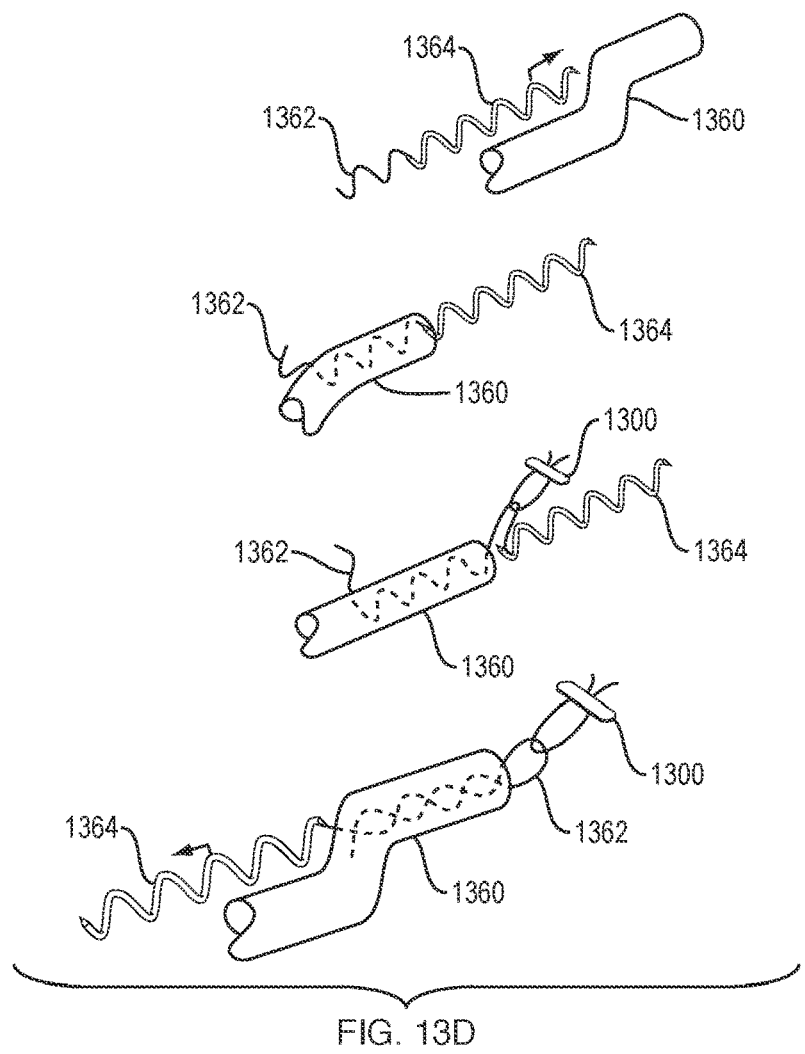
Figure 13E:
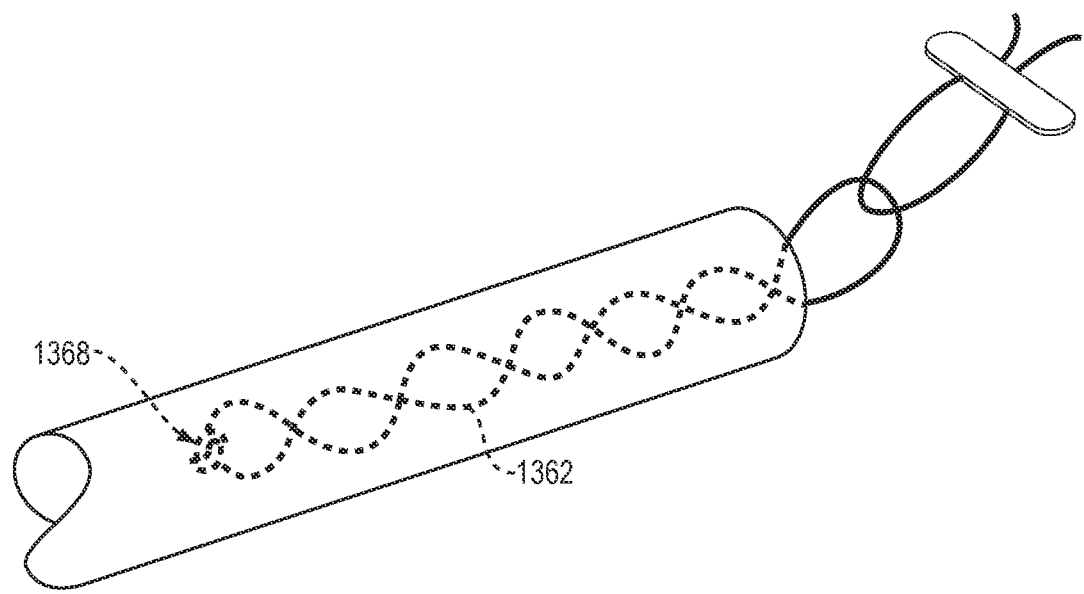
Figure 13F:
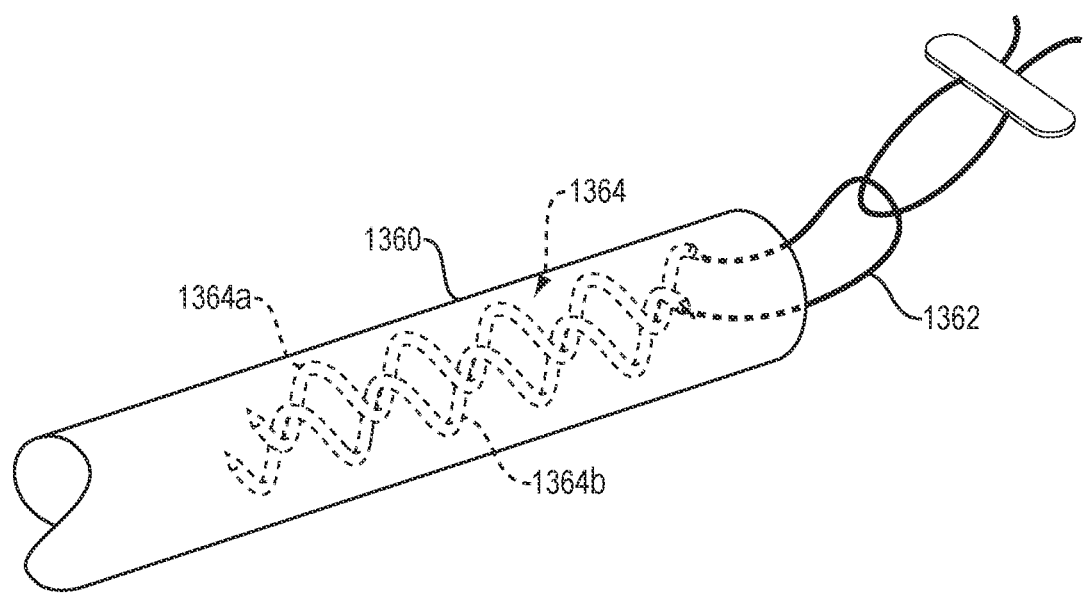
Figure 13G:
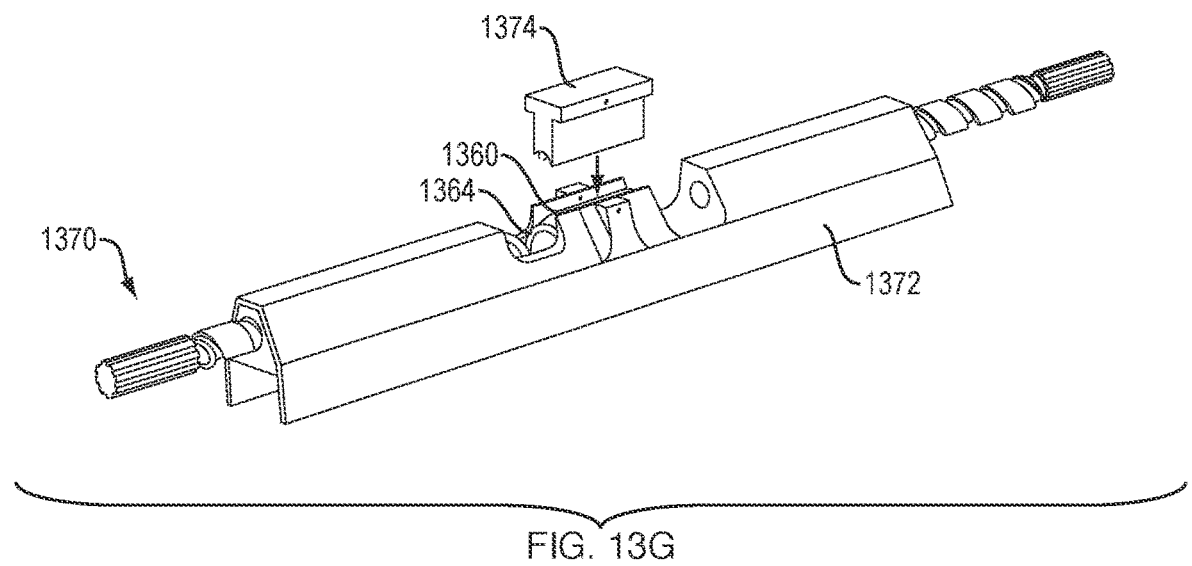
FIGS. 13G-J illustrate examples of a fixture for operating the helical needle of FIGS. 13A-13F.
Figure 13H:
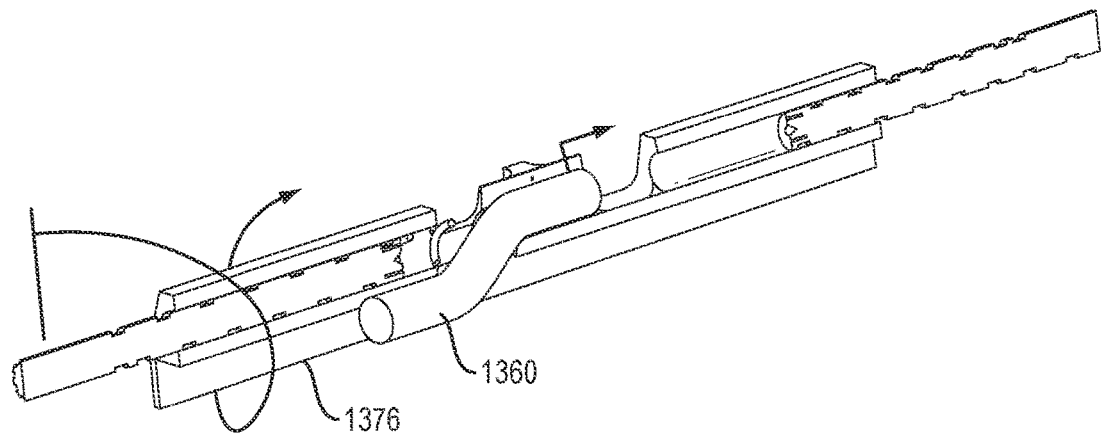
Figure 13I:
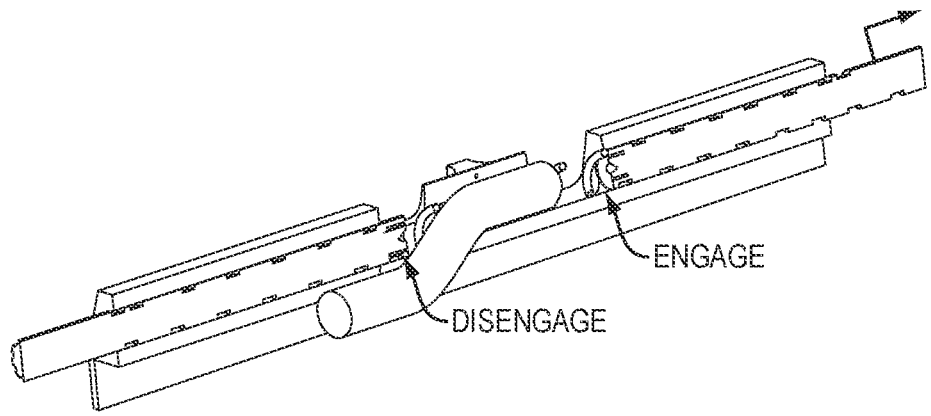
Figure 13J:
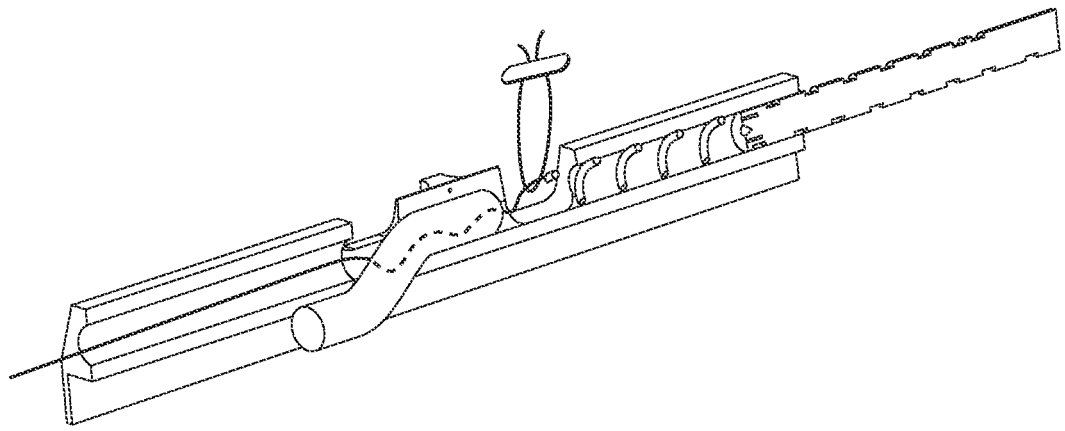

FIGS. 13A-F illustrate a helical needle for whipstitching a tissue graft, which is designed to minimize suture ingrowth blockage. FIG. 13A shows the graft 1360 and a fixation device 1300 with a suture 1362 threaded into the graft 1360. In FIG. 13A, two helices 1364a and 1364b are shown to illustrate the suture paths. However, in practice, only one needle 1364 may be used for two passes and the needle 1364 does not remain in the graft 1360. The two suture paths are shown interwoven, concentric and completely within the graft 1360. Advantageously, the needle 1364 is completely below the surface of the graft 1360, which eliminates graft-to-bone ingrowth blockage by the suture 1362. Additionally, contact between the graft 1360 and the tunnel wall may be maintained even when tension compresses the core of the graft 1360. As shown in FIG. 13B, the helix 1364a represents one pass, and helix 1364b represents the other pass. The same needle 1364 is used for both passes but is offset axially by half of the pitch length of each pass. This prevents the paths from intersecting and thus minimizing the likelihood of the sharp needle 1364 piercing the previously placed suture. In FIG. 13C, the segments 1366a, 1366b, 1366c, and 1366d illustrate some of the infinite number of compression lines between the two helices 1364a and 1364b. All segments 1366a, 1366b, 1366c, and 1366d pass directly through the centerline extending along axis A. As shown in FIG. 13D, in an example using one needle 1364 with both ends sharpened, the needle 1364 with suture 1362 would be passed toward the end of the graft 1360, through the fixation device 1300, and then away from the end of the graft 1360. FIG. 13E illustrates the knot 1368 in the suture 1362 at the lowest tension point. In other examples, not shown, two needles 1364 could be used. FIG. 13F shows an additional example of a needle 1364 in which the axes of the helices 1364a and 1353b are non-collinear. In this example, the paths of the suture 1362 could still be entirely within the graft 1360 or at least partially on an exterior of the graft 1360. Alternatively, helixes of opposite rotational winding directions could be used. As shown in FIGS. 13G-J, the motion of the helical needle 1364 could be accomplished via a fixture 1370 that includes a base 1372, a graft compressor 1374 for compressing the graft 1360 within the base 1372, and needle drivers 1376 keyed to match the helix of the needle 1364. This may advance helix 1634 through the tissue in both directions and through a loop of an adjustable suture construct.

Figure 14A:
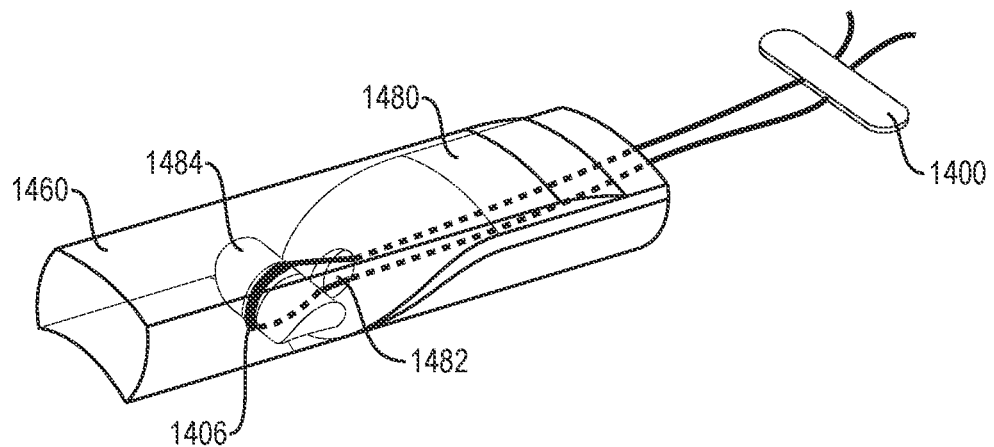
FIGS. 14A-K illustrate examples of a means of coupling a fixation device to a graft including a bone block, in accordance with at least some embodiments.
Figure 14B:
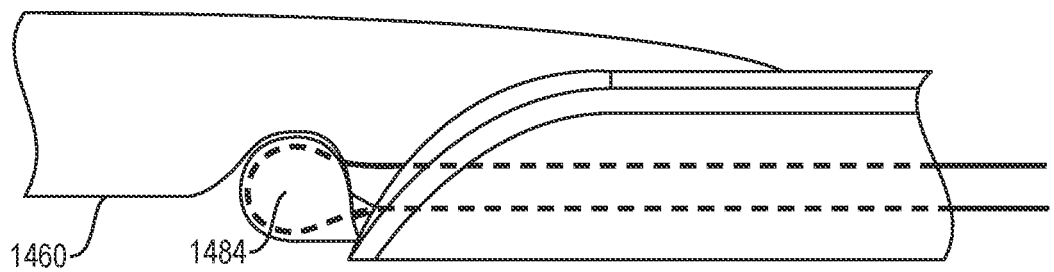
Figure 14C:
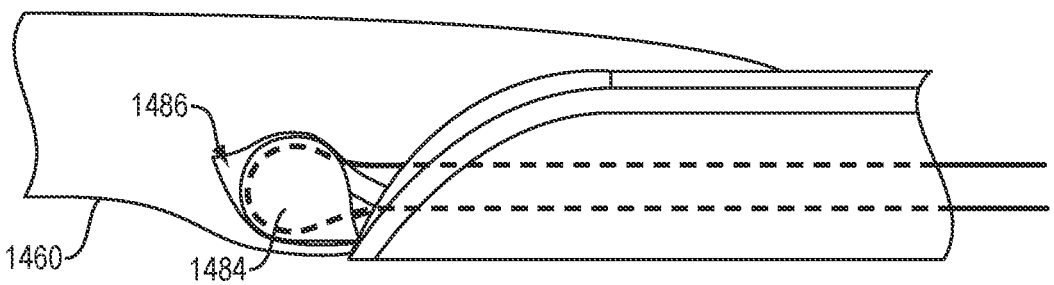

FIGS. 14A-C illustrate a first example of a means of attaching a fixation device 1400 with grafts 1460 attached to bone blocks 1480, for example, patella tendon or quad tendon grafts. Fixation device may be any adjustable suture fixation device, such as for example, constructs disclosed at least in construct 600, construct 1200, construct 1650, and construct 1680 or the construct disclosed in commonly owned U.S. Pat. No. 10,383,617; herein incorporated by reference in its entirety. As shown in FIG. 14A, a small hole 1482 (e.g. 2.4 mm) is initially drilled longitudinally through the bone block 1480. The adjustable fixation loop 1406 is passed through the hole 1482 and a means of coupling the loop 1406 with the bone including a cross pin implant 1484 is passed laterally through the loop 1406, thus acting as a pulley against the cortex of the bone block 1480. In some example suture constructs with a cradle such as embodiments shown in FIG. 8D and FIG. 11A, cradle portion may wrap around the means to couple the loop such as the cross pin implant 1484. Implant 1484 may include a recess or channel circumferentially disposed around implant to receive and retain the loop 1406 therein. The bottom surface of the tissue graft 1460 intersects the bone block 1480 at different heights. Thus, there may be various techniques for placing the implant 1484. For example, as shown in FIG. 14B, the graft 1460 can be deflected upwards and the implant 1484 can be placed under the graft 1460. Alternatively, as shown in FIG. 14C, the implant 1484 can be introduced through a slit 1486 in the graft 1460. Additionally, as shown in FIG. 14I, a keeper 1485 can be utilized to minimize movement of the implant 1484 relative to the bone block 1480. The keeper 1485 may include suture or other materials that may wrap around an external portion of bone block 1480. Alternatively, as shown in FIG. 14J, an intermediate tension member 1487 can be positioned within the longitudinal hole connecting the implant 1484 and the adjustable fixation loop 1406.

Figure 14D:
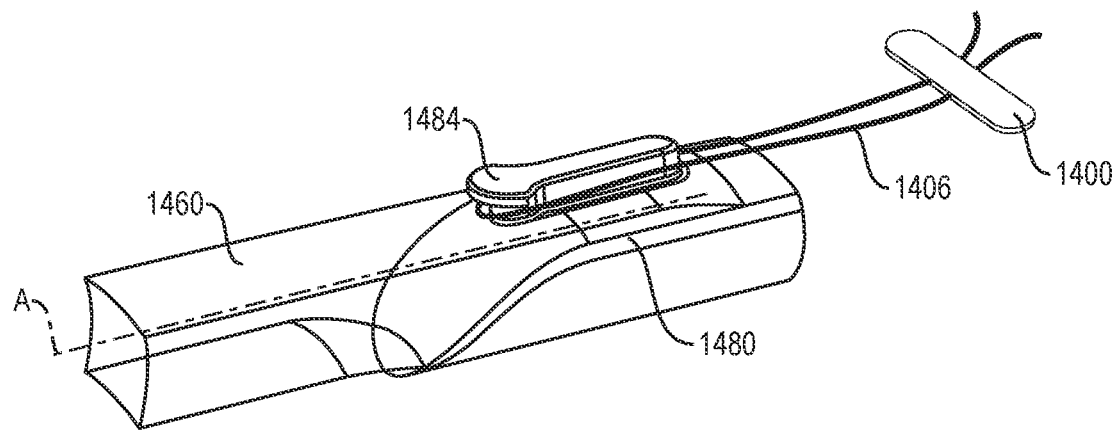
Figure 14E:
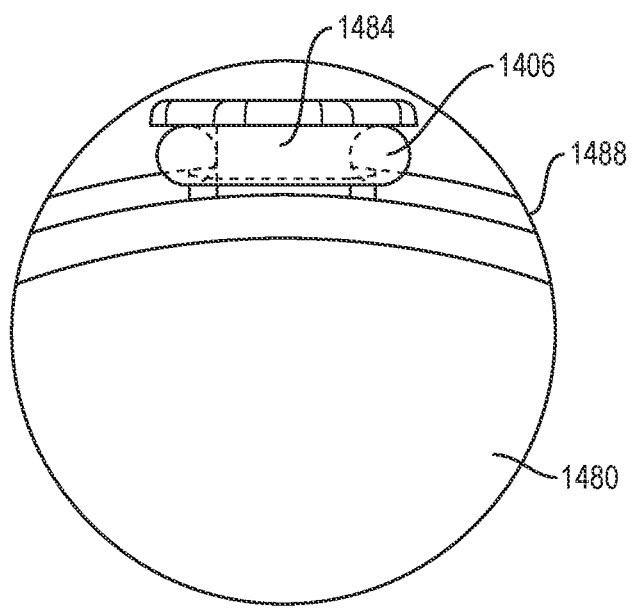

Another example of a means of attaching a fixation device 1400 with grafts 1460 attached to bone blocks 1480 is shown in FIGS. 14D and 14E, the means including an implant 1484 configured to engage a top outer surface of bone block 1480. Again, device 1400 may include any adjustable loop fixation device such as at least construct 600, construct 1200, construct 1650, and construct 1680 or the construct disclosed in commonly owned U.S. Pat. No. 10,383,617. Two small holes (e.g. 2.0 mm) may be drilled through the bone block 1480, which may be perpendicular to a longitudinal axis of the bone block 1480. The two small holes may be axially spaced from each other and lie on an axis that is parallel to the longitudinal axis. A small area of soft tissue may be removed around these holes down to bone 1480. Implant 1484 may include two posts 1492 or split pins configured to be inserted into the two small holes, and fixedly engage the implant 1484 with the bone block 1480. The adjustable fixation loop 1406 may be passed around a portion of the implant 1484, thus acting as a pulley against the cortex of the bone block 1480. A cradle portion of the loop 1406 may extend around an end of implant 1484, farthest from the anchor portion of device 1400. Implant 1484 may include a shelf or top surface that is configured to retain the loop 1406 on the implant and stop the loop 1406 from slipping off. The size of the implant 1484 is selected to fit within the bone tunnel 1488 (FIG. 14E).

Figure 14F:
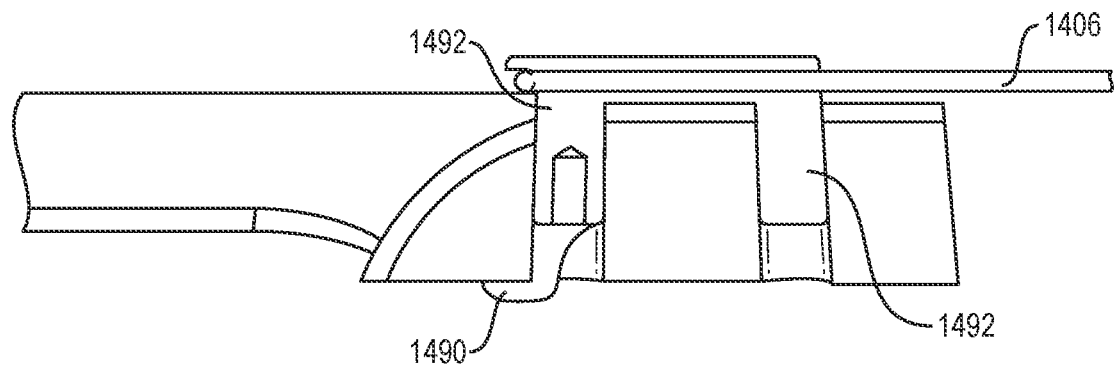
Figure 14G:
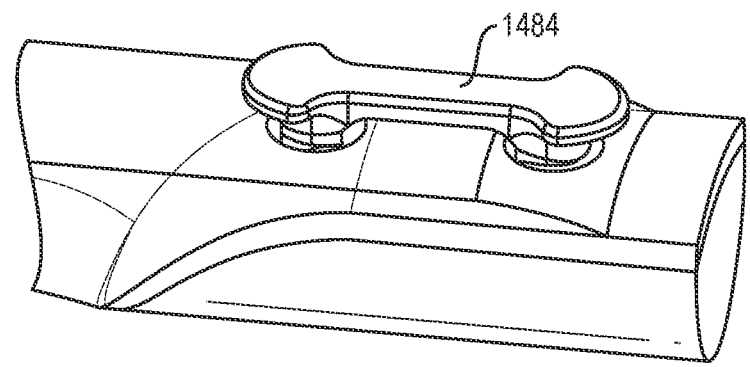
Figure 14G:
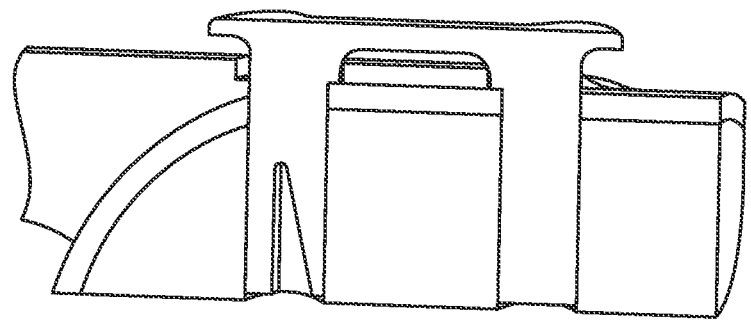
Figure 14H:
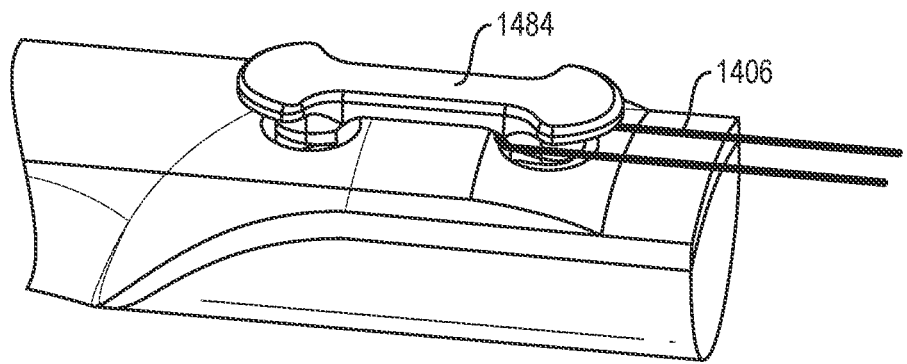
Figure 14I:
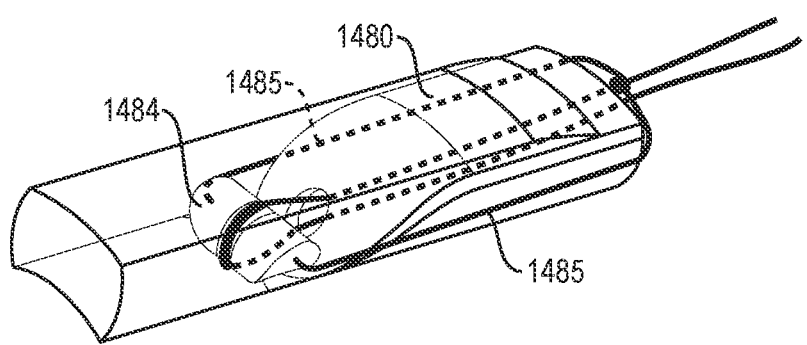
Figure 14J:
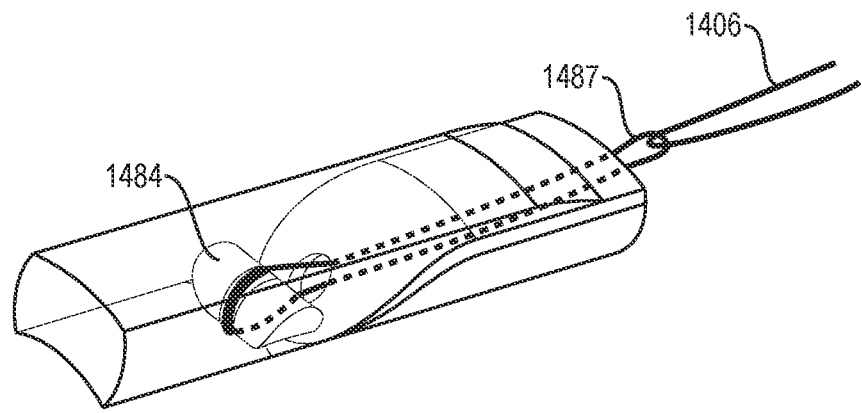
Figure 14K:
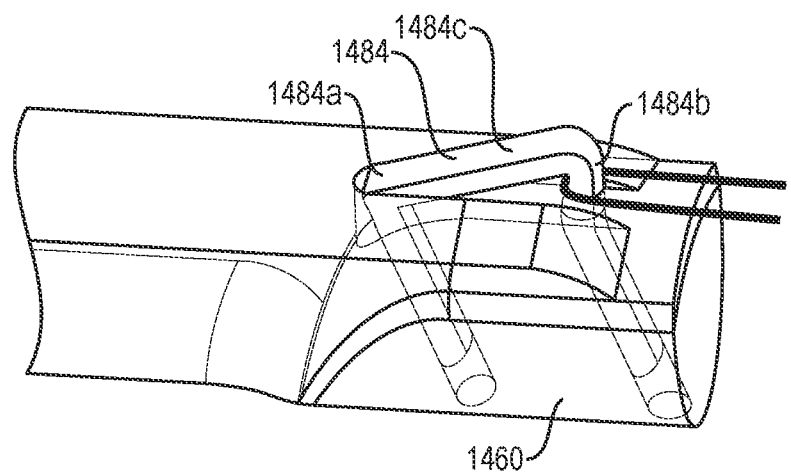

As shown in FIG. 14F, a cross section of implant 1484 includes the two posts 1492 and may include a lift-off feature 1490 (e.g., screw, clip etc.) to prevent liftoff of the implant 1484 before the graft 1460 is placed within a constraining bone tunnel. Lift off clip 1490 may engage a bottom or opposing surface of bone block. In examples, the implant 1484 could be used for traditional trapezoidal cross-section bone blocks 1480. As shown in FIG. 14G, the implant 1484 could further be made symmetrical to minimize misplacement. The adjustable fixation loop 1406 could be held against the implant 1484 via a clip (not shown) to prevent premature slip off prior to tensioning. The implant could be in the form of a bridge with two posts, to minimize soft tissue removal to just two spots around the posts shown in FIG. 14G. In other examples, shown in FIG. 14H, the adjustable fixation loop 1406 could be placed around the opposite post, thus reducing tissue removal and preventing premature slip off the loop 1406. It is preferably to have two points of fixation with the bone block to reduce likelihood of lift off or bending of the implant 1484. Alternatively, as shown in FIG. 14K, holes within bone block 1480 may be non-orthogonal to the bone block longitudinal axis to account for the tensions on posts of implant. To reduce the overall profiled of implant the bridging portion 1484c may be at an angle relative to bone block upper surface; such that a first end 1484a of the implant 1484 may be recessed within the bone block and a second end, 1484b may include space to receive the loop 1406. Legs or posts of 1492 may define rectangular cross-sections of the implant 1484 to improve the fixation between the implant 1484 and round (drilled) holes in the graft 1460.

Figure 15A:
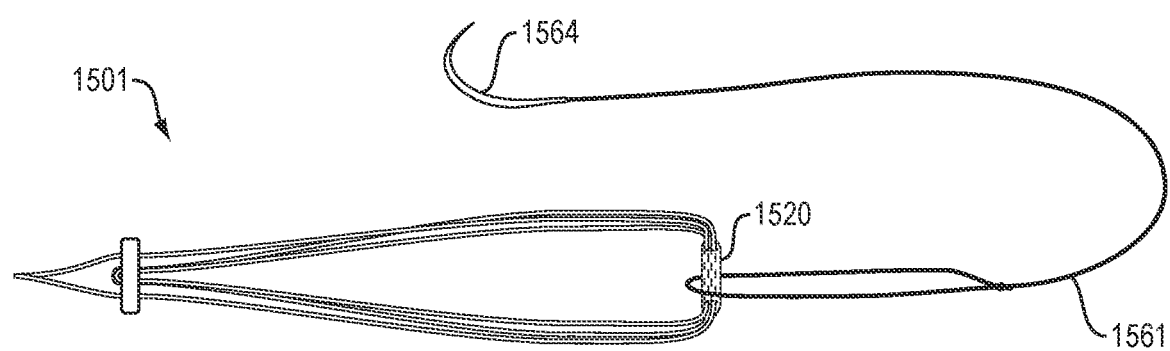
FIGS. 15A-15N and 15P-15R illustrate examples of systems and associated methods of attaching a device/suture loop construct directly to a graft or a bone block, in accordance with at least some embodiments.
Figure 15B:
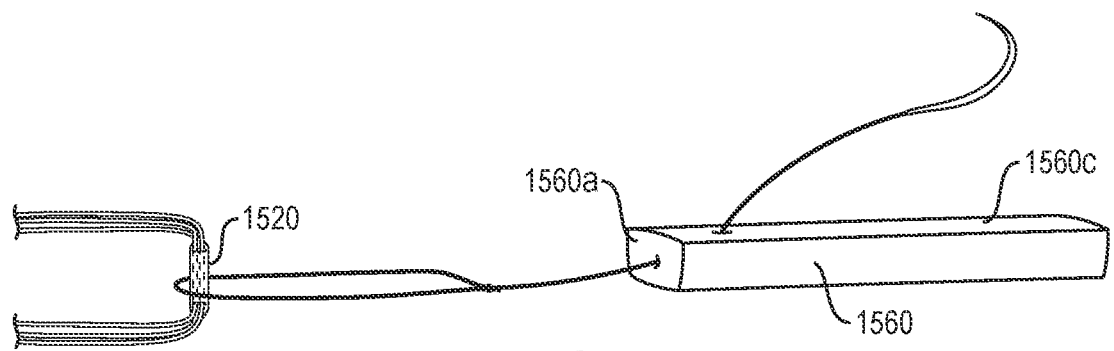
Figure 15C:
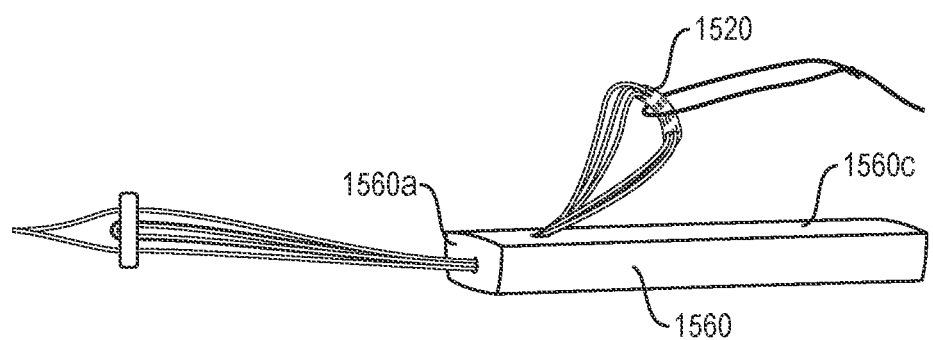
Figure 15D:
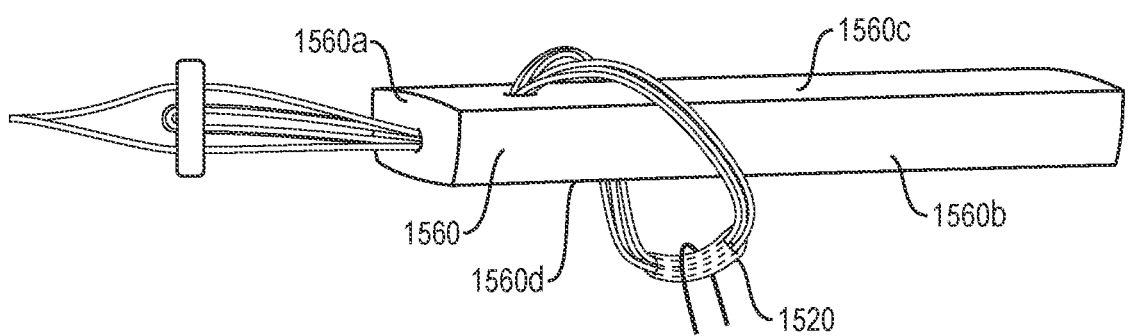
Figure 15E:
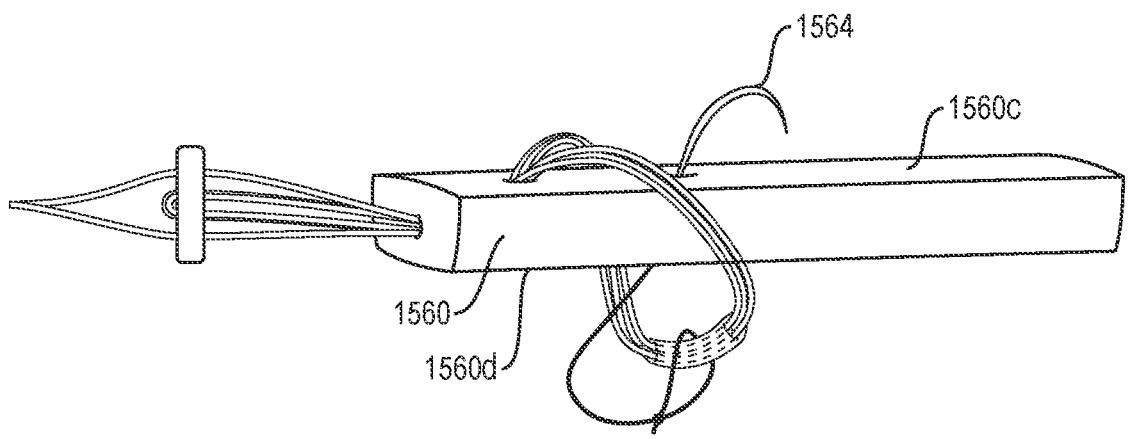
Figure 15F:
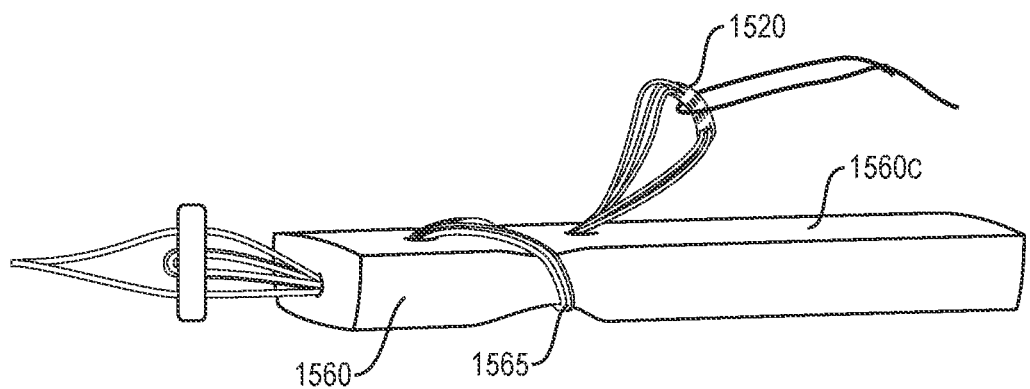
Figure 15G:
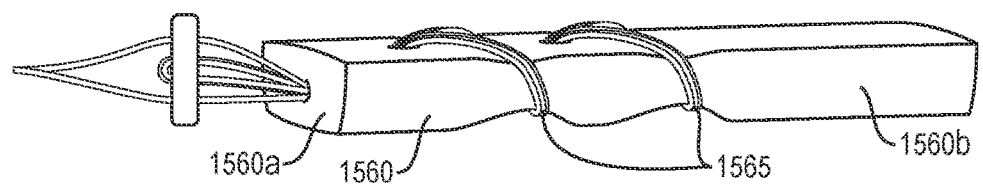
Figure 15H:
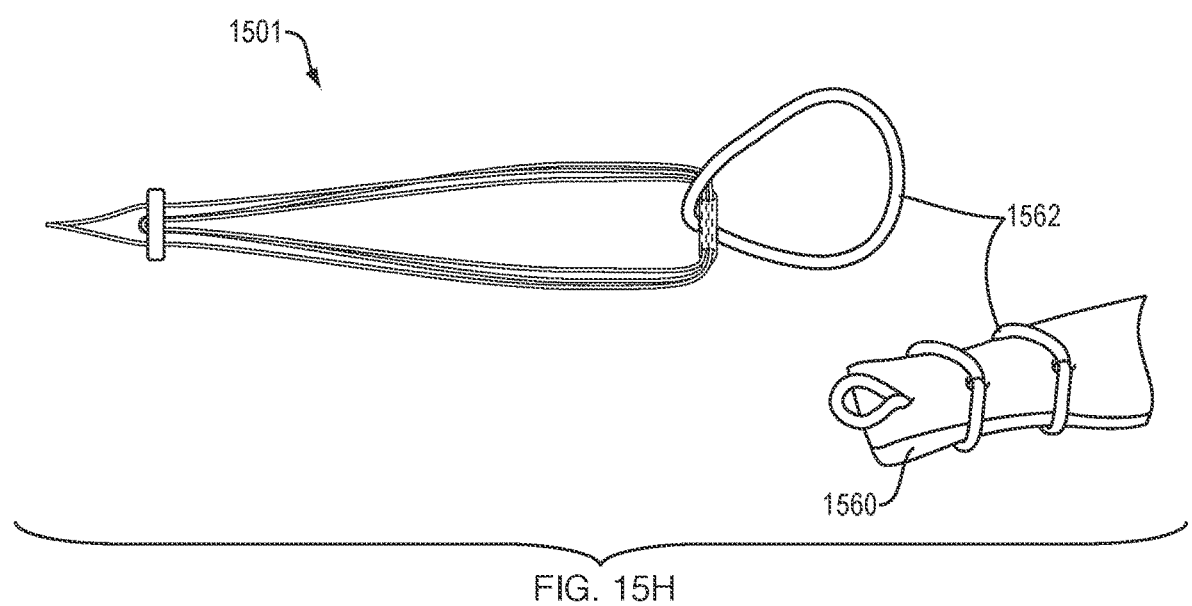
Figure 15I:
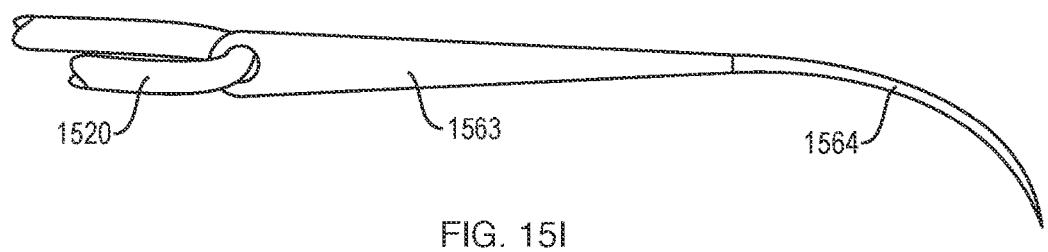
Figure 15J:
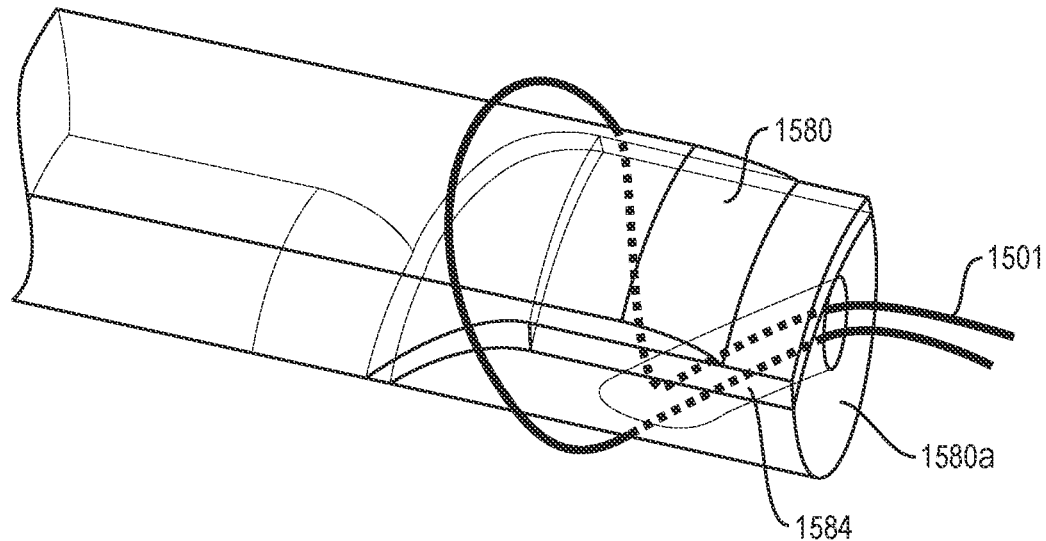
Figure 15K:
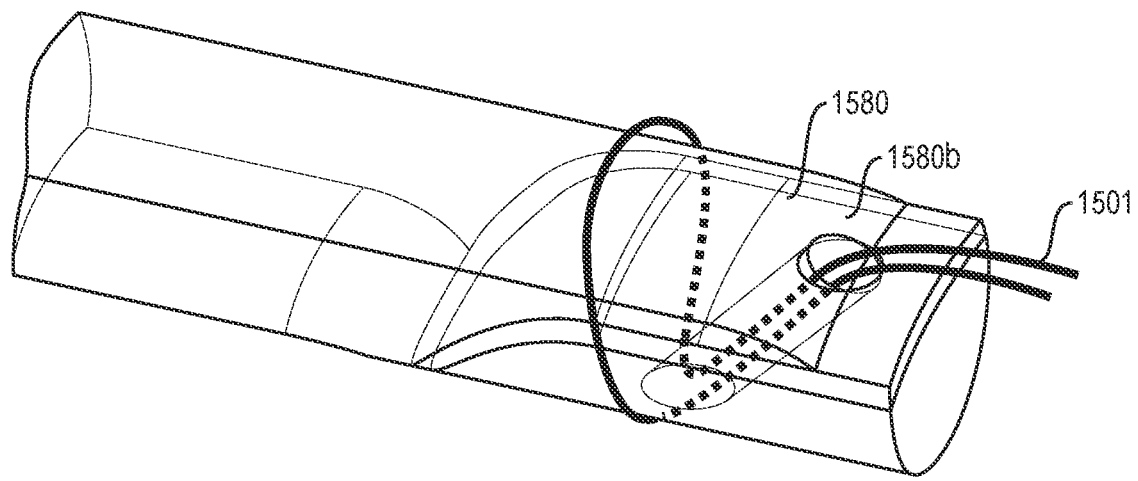
Figure 15L:
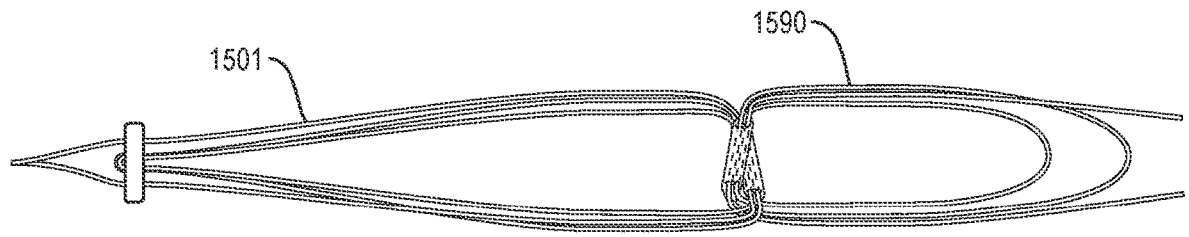
Figure 15M:
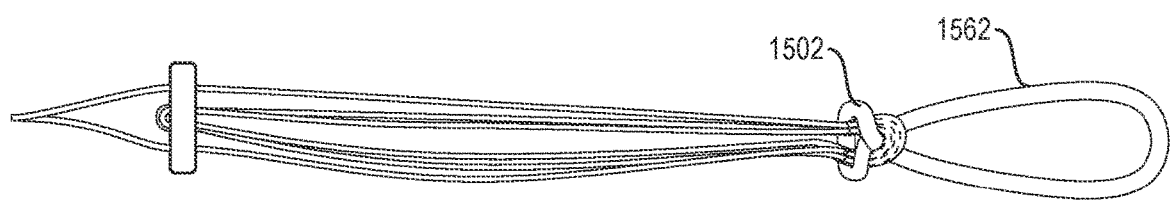
Figure 15N:
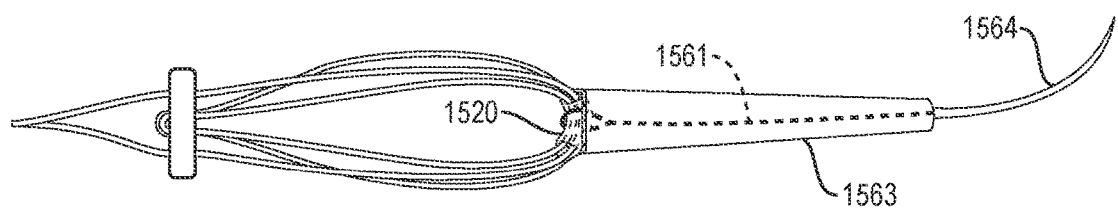
Figure 15P:
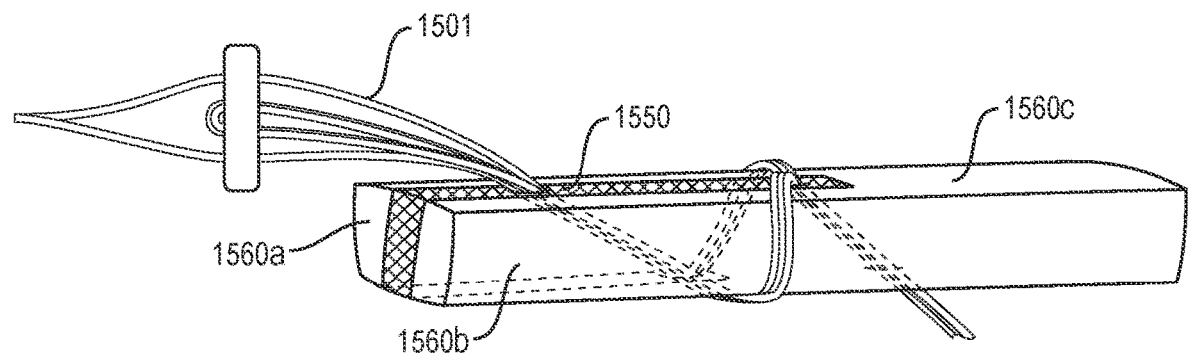
Figure 15Q:
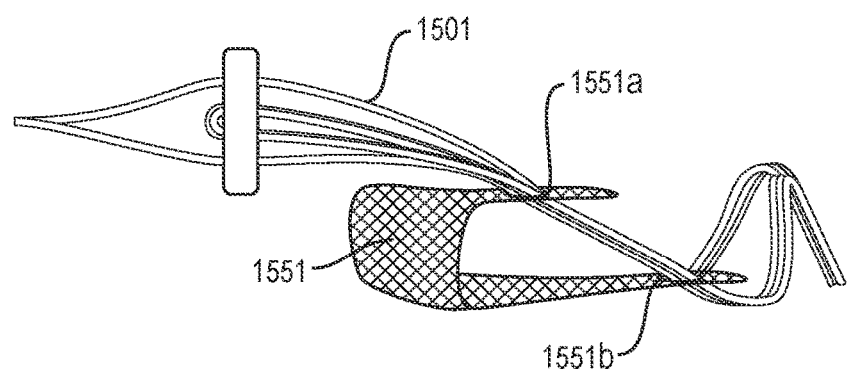
Figure 15R:
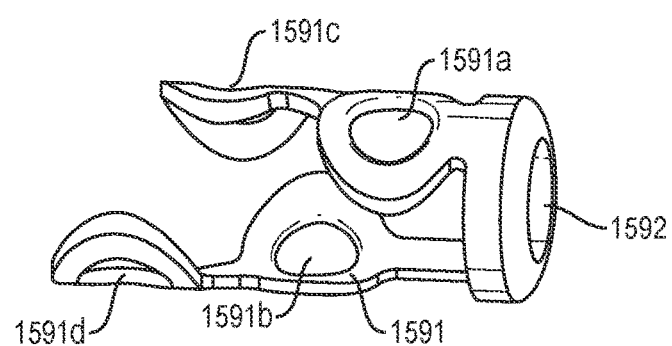

FIGS. 15A-15R illustrates an example of a method for attaching a fixation device/suture loop construct 1501 of this disclosure directly to a graft 1560 (or a bone block, as further described below) without the need for splitting the graft 1560. Splitting the graft is described in at least FIG. 11A. FIGS. 15A-15R also illustrate systems that improve fixation between a fixation construct 1501 and graft, which may include improving the method of fixation illustrated throughout FIGS. 15A-15R. Fixation construct 1501 may be any adjustable suture fixation device, such as for example, constructs disclosed at least in construct 600, construct 1200, construct 1650, and construct 1680 or the construct disclosed in commonly owned U.S. Pat. No. 10,383,617; herein incorporated by reference in its entirety. As shown in FIG. 15A, a passing suture 1561 coupled to a needle 1564 is loosely attached to the cradle 1520 of a device/suture loop construct 1501 that may be an adjustable suture loop construct. The needle 1564 may be inserted into a first end 1560a of the graft 1560 and out through a top surface 1560c of the graft 1560 to draw the cradle 1520 through the graft 1560 such that the cradle 1520 exits the top surface 1560c of the graft 1560 (FIG. 15B, 15C). As shown in FIG. 15D, the cradle 1520 is then looped over the first end 1560a or the second end 1560b of the graft 1560 such that the cradle 1520 is disposed below a bottom surface 1560d of the graft 1560. As shown in FIG. 15E, the needle 1564 is then passed from the bottom surface 1560d to the top surface 1560c of the graft 1560 to draw the cradle 1520 above the top surface 1560c of the graft 1560 (FIG. 15F). This step forms a "herringbone" stitch 1565 in the graft 1560. As shown in FIG. 15G, additional "herringbone" stitches 1565 can be formed in the graft 1560 by again looping the cradle 1520 over the first or second ends 1560a or 1560b of the graft 1560 and repeating the steps as outlined above. Notably, in order not to unravel, the position of the cradle 1520 after the final stitch must be selected to be on the opposite side of the graft 1560 from the position in which the needle 1564 last exited the graft 1560 (for example, as shown in FIG. 15G).

In an alternative example, shown in FIG. 15H, a continuous loop of suture 1562 could be incorporated into the device/suture loop construct 1501 and passed through the graft 1560 or bone block (not shown) in the same manner as described above with regard to FIGS. 15A-15G. In a further alternative example shown in FIG. 15L, a second adjustable loop 1590 could be incorporated into the suture loop construct 1501, the second adjustable loop luggage tagged to the graft 1560 (or bone block) or coupled as described above with regard to FIGS. 15A-G. In a further alternative example shown in FIG. 15M, continuous loop 1562 may be coupled to suture loop construct 1501 by luggage tag 1502. A suture cradle of the suture loop construct 1501 may form part of the link with the continuous loop 1562. In yet further examples, shown in FIG. 15I, to minimize the resistance of pulling the cradle 1520 through the graft 1560, a tapered member 1563 that may be attached to the needle 1564 could be used to gradually increase the graft hole diameter and minimize the chances of the cradle 1520 snagging on the graft 1560. Cradle 1520 may be looped through holes in the tapered member 1563. Preferably, the tapered member 1563 is made of a flexible material. In alternative embodiments shown in FIG.15N, a tapered member 1563 with a smaller opening end adjacent the needle 1564 may extend from the needle 1564 to a larger opening end. The larger opening may be sized to temporarily enclose a portion of the cradle 1520 and ease the cradle's passage through the graft. The cradle 1520 may be temporarily folded over to form a bight to fit within larger opening. Larger opening may be sized to form an interference fit with the cradle 1520 to help keep the cradle within the larger opening during stitching through the graft. Tapered member 1663 may slide along passing suture 1561 and be free of the needle 1564.

In other examples, shown in FIG. 15J, the attachment method described above could also be applied to attaching a fixation device 1501 to a bone block 1580 through an angled hole 1584 in the bone block 1580. Angled hole in FIG. 15J begins at a first end 1580a of bone block, which may include a surface of cancellous bone. Alternatively, as shown in FIG. 15K, the angled hole 1584 can begin at a cortical lateral surface 1580b to pass through the cortex of the bone block 1580.

The system may also include reinforcement means to reduce the flexible members of an adjustable suture construct 1501 as described herein from stripping out of the graft, shown in FIGS. 15P, 15Q and 15R. Reinforcement preferentially reinforces at least two opposing sides of the graft. Shown in FIG. 15P a single length of suture tape or flat braid 1550 may extend along a top side of graft 1560c, around an end surface 1560a and along a bottom surface 1560d of the graft. In FIG. 15Q an alternative reinforcement means may include a woven cap 1551 which may include a shaped braided element with apertures 1551*a* and 1551*b* preformed therethrough. Apertures 1551*a* and 1551*b* are configured to receive an adjustable suture construct such as construct 1501 therethrough. Apertures 1551*a* and 1551*b* may be disposed relative to the woven cap to guide insertion locations of the needle 1564 through the graft 1560. In FIG. 15R an alternative reinforcement means may include implant 1591, formed from a more rigid material for example. This embodiment may include a plurality of apertures, including at least apertures 1591*a*, 1591*b*, 1591*c* and 1591*d*, preformed therethrough. Apertures 1591*a*, 1591*b*, 1591*c* and 1591*d* are configured to receive an adjustable suture construct such as construct 1501 therethrough. More specifically apertures may be configured to receive a needle and cradle 1520 of a suture construct 1501 therethrough. Apertures 1591*a*, 1591*b*, 1591*c* and 1591*d* may be disposed relative to the implant 1591 to guide insertion locations of the needle 1564 through the graft 1560. Implant 1591 may also include an aperture 1592, orthogonally oriented relative to apertures 1591*a*, 1591*b*, 1591*c* and 1591*d*, to receive a needle 1564 therethrough. The method of coupling the adjustable suture construct 1501 to a graft may therefore include placing a reinforcement means such as tape 1550, cap 1551 or implant 1591 around an end portion of a graft 1560 to dispose the reinforcement means along both a top and bottom surface of the graft, and may also place a portion of the reinforcement means along an end surface. The method may then continue by inserting a needle 1564 into a top or end surface (1560*c* or 1560*a*) of the graft including through a reinforcement means and then through a thickness of the graft, followed by out through a bottom surface 1560*c* of the graft 1560 and also the reinforcement means again. This draws the cradle 1520 through the graft 1560 and through at least two portions of the reinforcement means. Alternatively, the needle 1564 could enter the graft from the bottom surface 1560*d* and exit the graft from the top surface 1560*c*. The cradle 1520 may then be passed around the graft and the needle 1564 is then passed through the graft again, which may include passing the needle 1564 through the reinforcement means again, while both entering and exiting the graft 1560. The reinforcement means may include preformed apertures such that passing the needle 1564 through the reinforcement means may include passing the needle through pre-formed apertures of the reinforcement means.

Additional embodiments are directed to an adjustable suspensory fixation construct configured to couple to a bone block and shown in FIGS. 16-23. Some of these embodiments include coupling the adjustable suspensory fixation with a girth hitch or ring hitch alternatively known as a luggage-tag loop. The girth hitch is formed by extending a first end of a continuous loop (sling) both through a passage in the bone block and around an external surface of the bone block, and then extending a fixation device and a portion of the adjustable loop through the first end of the continuous loop, the adjustable loop operatively coupled to the continuous loop. A hitch is now formed around and through the bone block. In this preferred embodiment, the hitch or luggage-tag loop includes both the continuous loop and adjustable loop. This girth hitch means of connecting may provide a strong and adjustable cortical fixation with increased maximum bone-to-bone ingrowth and minimal change in workflow of the procedure. The need to accurately measure the length of graft and bone tunnels is now reduced as the construct is adjustable and the bone block may be drawn right up to the fixation button. Furthermore, as explained in more detail later, by placing the adjustable loop at least partially along the length of the bone block, the adjustable loop may be more readily shortened so that the bone block may be directly adjacent or even abut the button fixation device.

Advantageously this coupling may now place the lengths of suture associated with the continuous and adjustable loops of suture along an external bone-block surface where bone-to-bone ingrowth is not expected. In general, the cortical surface of the bone block is typically shaped so as to be spaced away from the femoral tunnel walls, this space reducing likelihood of bone-to-bone ingrowth. As shown in various figures throughout this application, bone blocks, such as portions of the patella for example, usually include a first external surface of the patella that includes cortical bone and possibly also a thin covering of soft tissue such as tendon tissue. Other external surfaces of the bone block however may include the cancellous patella bone tissue. Bone-to bone growth is more likely from the exposed cancellous bone. Therefore, by keeping the suture loops along the cortical bone surfaces of the bone block, and thereby leaving the cancellous bone surfaces absent any suture loops, it is envisioned that the arrangement of these suture loops may minimally affect bone-to-bone ingrowth.

Alternative adjustable constructs and associated attachment methods are also disclosed herein, including alternative adjustable loops operatively coupled to a button-style fixation device; a continuous loop operatively coupled to the adjustable loop; the continuous loop being sufficiently short such that it places an intersection of the adjustable loop with the continuous loop along the length of the bone block.

A first embodiment of a fixation construct 1600 is shown in FIG. 16A. Construct 1600 includes a fixation button 1625, an adjustable loop 1620 including a cradle 1630 and a continuous loop 1640. Fixation button 1625 and adjustable loop 1620 may be similar to the Ultrabutton, manufactured by Smith and Nephew and disclosed in at least in commonly assigned U.S. Pat. No. 10,383,617 the complete disclosure of which is incorporated herein by reference. Continuous loop 1640 may be looped through the adjustable loop 1620, and may preferably engage the cradle 1630 defining a first continuous loop end 1646. Continuous loop 1640 is preferably not directly coupled to fixation button 1625. In alternative embodiments such as construct shown in FIG. 16B the construct 1650 may include an alternative adjustable loop construct, having a linked end 1666 and with sleeve portions 1665. In further alternative embodiments such as construct shown in FIG. 16C the construct 1680 may include an alternative adjustable loop construct, forming two loops 1670*a* and 1670*b* linked at sleeve portions 1675*a* and 1675*b*. In all embodiments, a second fixed and continuous loop 1640 is operatively coupled to the adjustable loop 1620, 1660 and 1670. Continuous Loop 1640 may be looped though the adjustable construct, may extend through a lumen of the adjustable construct or may be luggage tagged to adjustable loop (1620, 1660 or 1670). Adjustable constructs 1620, 1660 and 1670 and continuous loop 1640 may all be formed separately and thereby be separate flexible members, such as sutures, and may be provided operatively coupled or may be coupled during the surgical procedure. Each of the separate sutures (1620, 1640, 1660 and 1670) may be similar in size and material or unique. For example, the adjustable suture loops may be formed of more lubricious suture material to better slide and adjust in loop length.

Figure 17A:
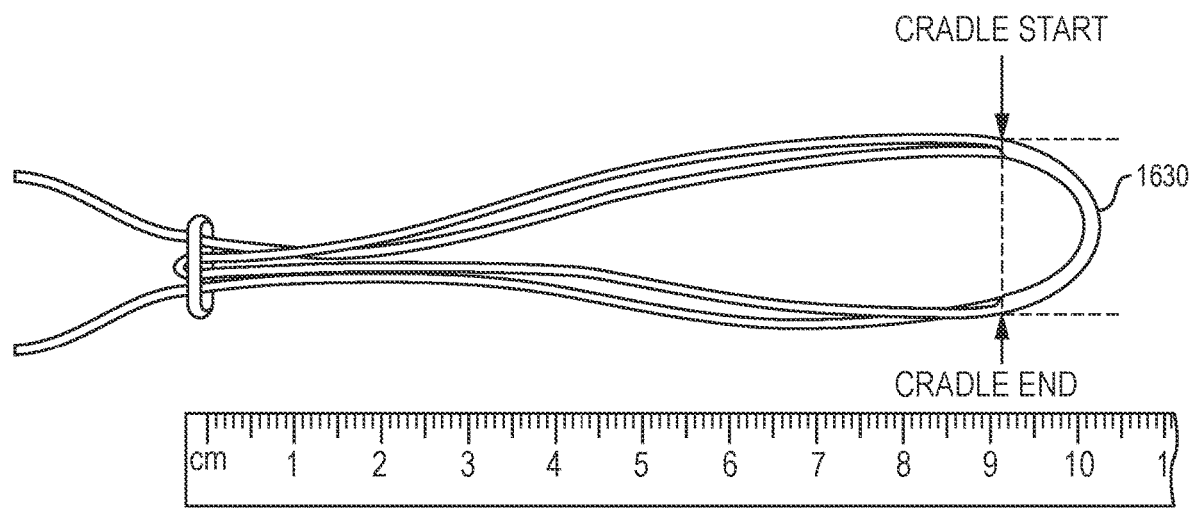
FIGS. 17A and 17B schematically show an adjustable construct adjusted between an extended and shorted loop length respectively.
Figure 17B:
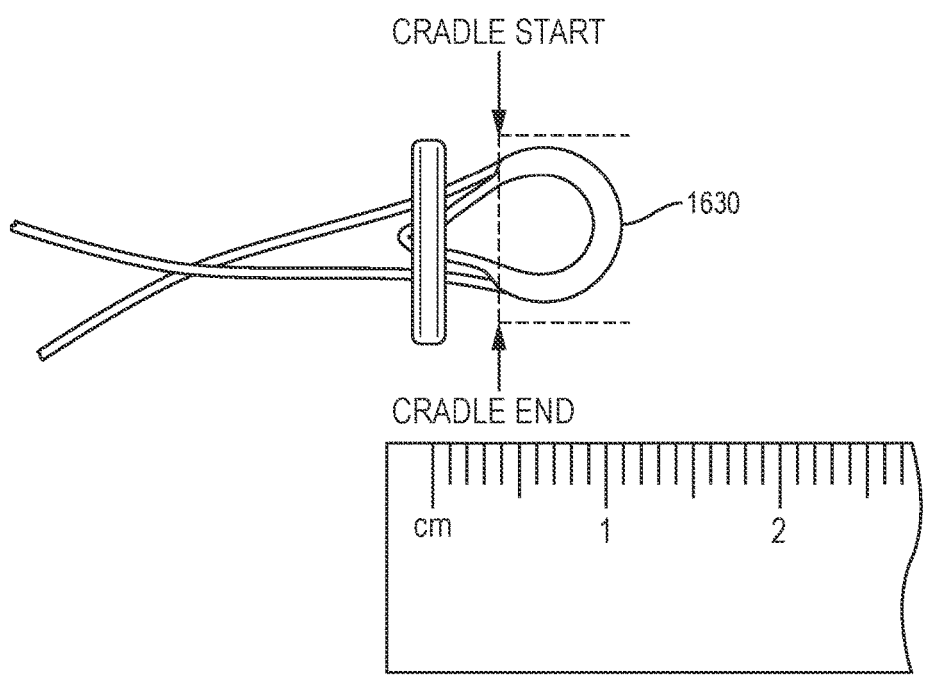
Figure 18A:
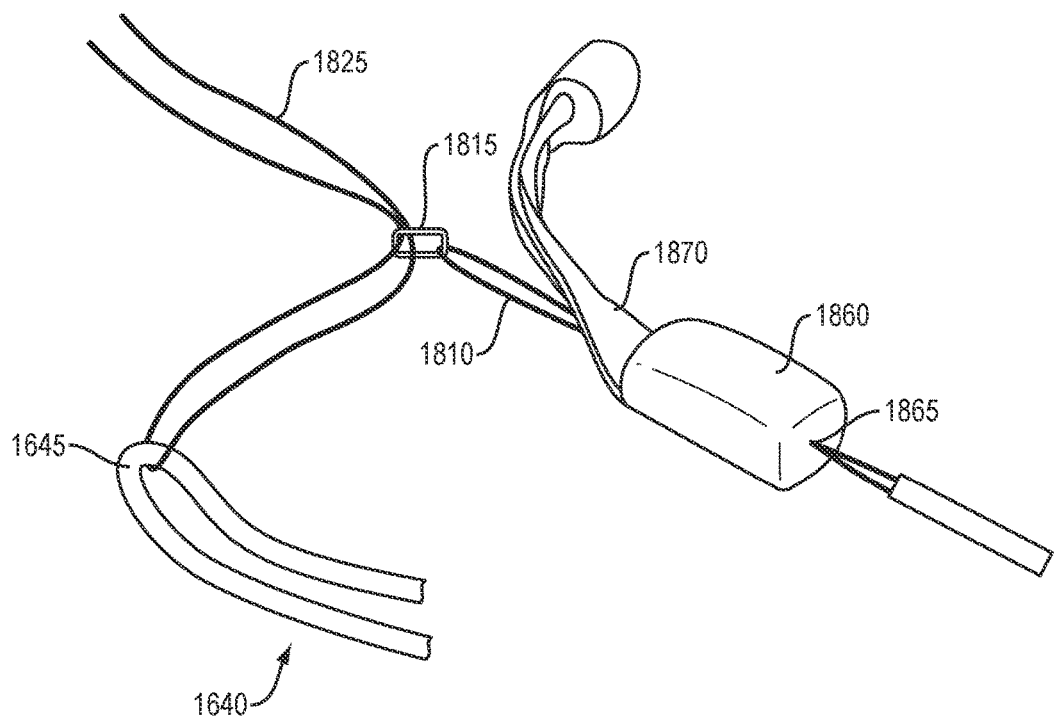
FIGS. 18A-18D schematically shows a method of coupling an adjustable construct through a longitudinal bone block passage in accordance with at least some embodiments.
Figure 18B:
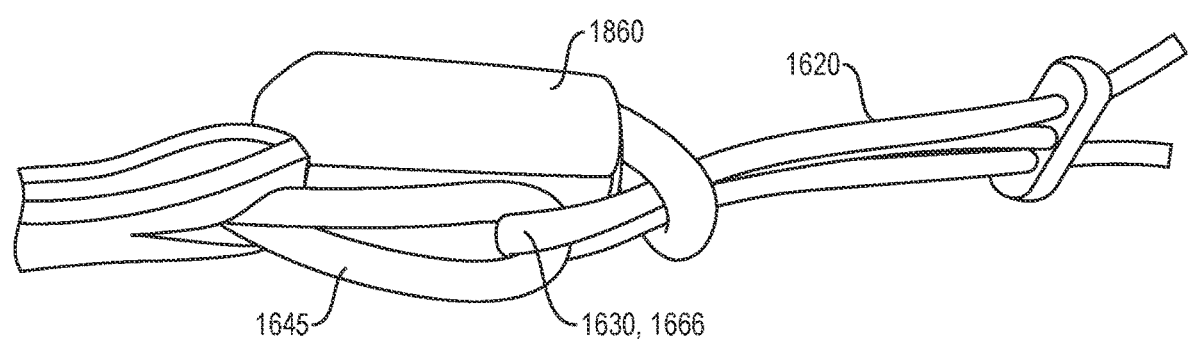
Figure 18C:
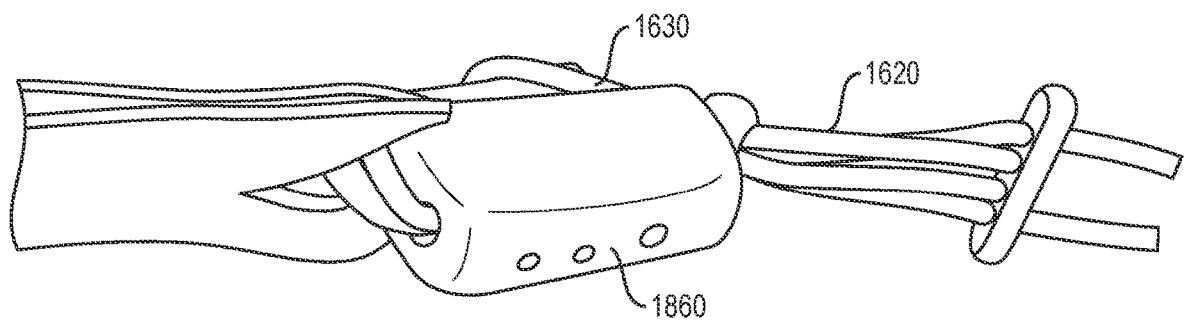
Figure 18D:
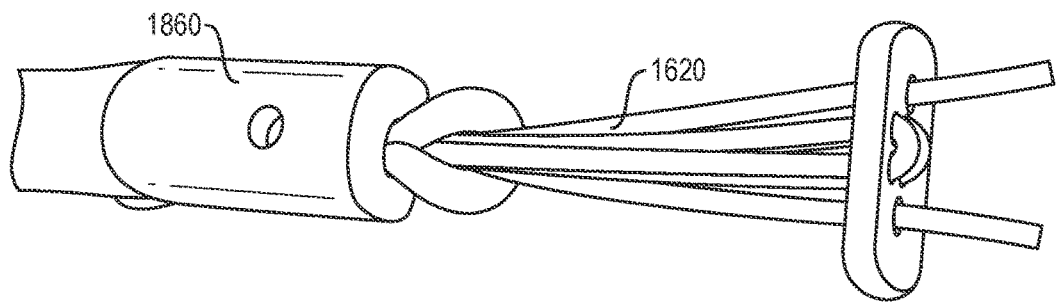

Adjustable loop constructs such as those described in FIGS. 16A, 16B and 16C include suture loop constructs that tend to be limited in how short the final loop may become. For example, as shown in FIG. 17A and 17B, an adjustable loop with a cradle portion 1630 may be shortened to a length of about 10 mm, at which point the diameter of the cradle 1630 and stiffness of three suture lengths may restrict any further significant shortening. As a further example, the embodiments shown in FIG. 16B and 16C also show sleeves or eye splices similar to a cradle with a single suture threaded therethrough (1665, 1675) that may limit the final minimal loop length. As bone tunnel lengths during ACL reconstruction have become shorter, there is less tunnel length available for long suture loops. This disclosure describes methods for attaching adjustable suture loop constructs that reduce the effective length between the fixation button and graft.

One example method of attaching a construct such as construct 1600, 1650 or 1680 to a bone-block is shown in FIGS. 18A-18D. First a suture passer 1810 may be passed through a longitudinal passage 1865 of a bone block 1860, and then through the tendon 1870. Longitudinal passage 1865 may be drilled and may be between 2-3 mm in diameter. The first end 1645 of the continuous loop 1640 may then be threaded through the suture passer end 1815, possibly using a third suture 1825. Suture passer 1810 may then draw first end 1645 through the tendon 1870 and then along and out of the passage 1865. Fixation button 1625 may then be passed through the first end 1645 to form the girth hitch or luggage-tag loop around the bone block 1860, as shown in various views in FIG. 18B, 18C and 18D. Luggage tag loop around the bone block includes both the continuous loop 1640 and adjustable loop 1620.

Figure 19A:
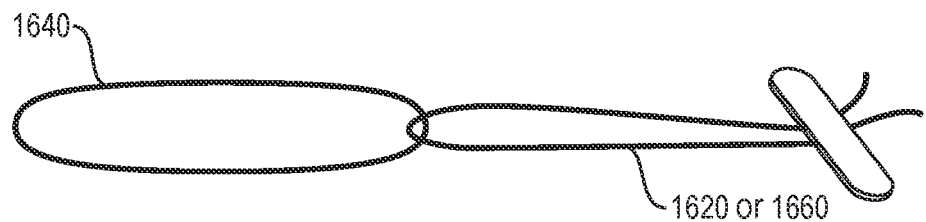
FIG. 19A illustrates an adjustable construct, in accordance with at least some embodiments.
Figure 19B:
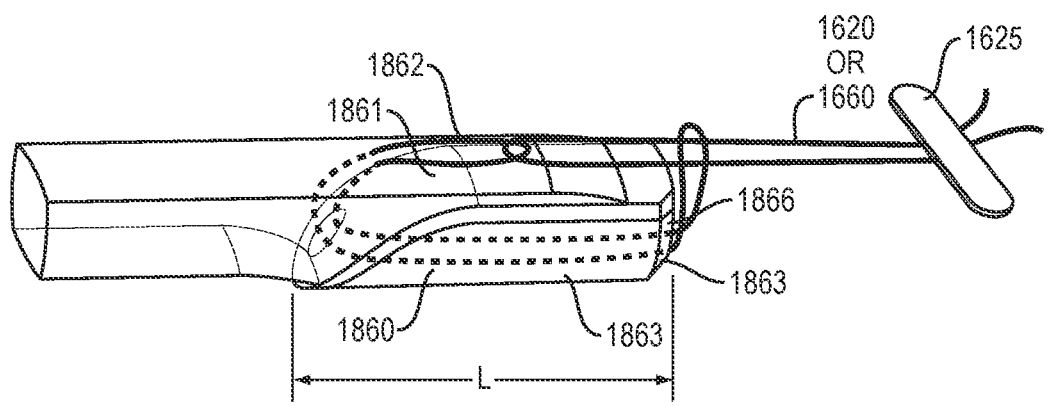
FIG. 19B illustrates the adjustable construct coupled to a bone block, in accordance with at least some embodiments.

FIG. 19A and 19B schematically show construct 1620 or 1660 before and after coupling to the bone block 1860 respectively. Best seen in FIG. 19B, bone block 1860 includes an outer cortical layer 1861 on the top side only, as this bone block is usually a top portion of a bone such as the patella. Top side/cortical layer may also be covered with a thin layer of soft tissue such as connective tissue and tendon 1862. The underside and other external sides of the bone block 1860 define exposed cancellous bone 1863. The method of coupling includes extending the suture along an external surface of bone block that preferably includes the top surface and thereby engages the cortical bone and tendon and avoids the cancellous bone surfaces. Avoiding coverage or blockage of the cancellous bone external surfaces is preferable. As explained earlier, this top surface is least expected to integrate with the femoral bone tunnel and therefore the suture loops (1620, 1660, 1640) are not anticipated to inhibit bone-to-bone ingrowth. The intersection or transition from the loop 1640 to the adjustable loop (1620, 1660 or 1670) is preferably disposed long the length (L) of the bone block 1860 and preferably closer to the tendon attachment end 1865 of the bone block 1860. Typical bone blocks are 2-3 cm long and about 6-11 mm thick. The continuous loop 1640 may therefore be approximately 3-5 cm long and preferably less than or equal to double the length L of the bone block 1860 so that the continuous loop 1640 can wrap around the bone block, form the luggage tag and position the intersection with the adjustable loop on a cortical outer surface along the bone block length L. This allows the adjustable loop to reduce in length, such that the fixation button 1625 may be less than a few millimeters from the bone block end 1866, while the intersection between the two loops is spaced further away from the fixation button 1625.

Figure 20A:
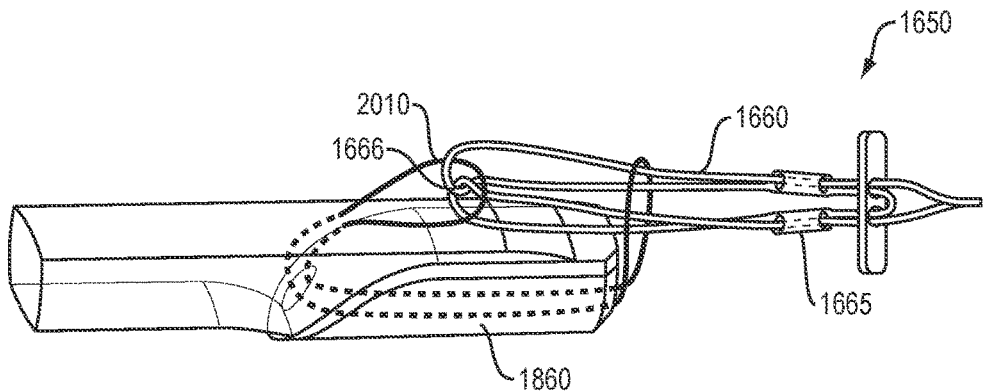
FIGS. 20A-20D schematically show alternative embodiment of adjustable construct coupled to a bone block, in accordance with at least some embodiments.
Figure 20B:
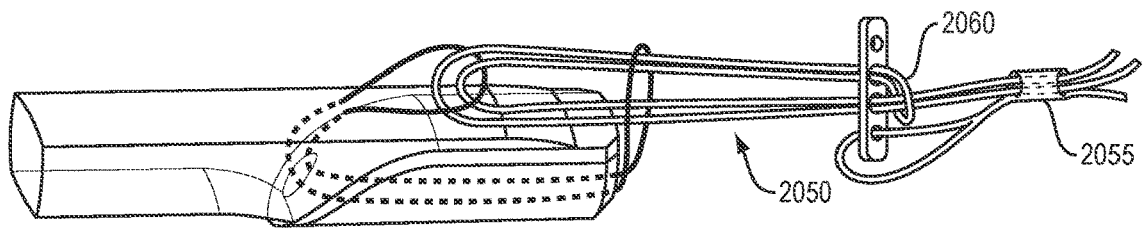
Figure 20C:
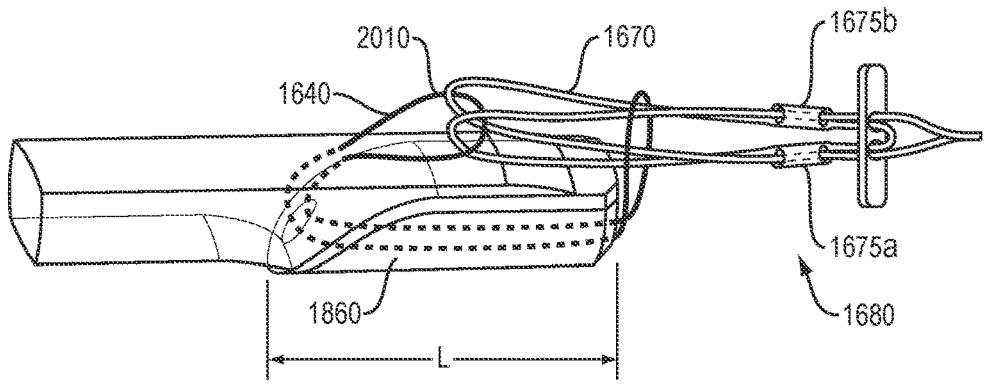
Figure 20D:
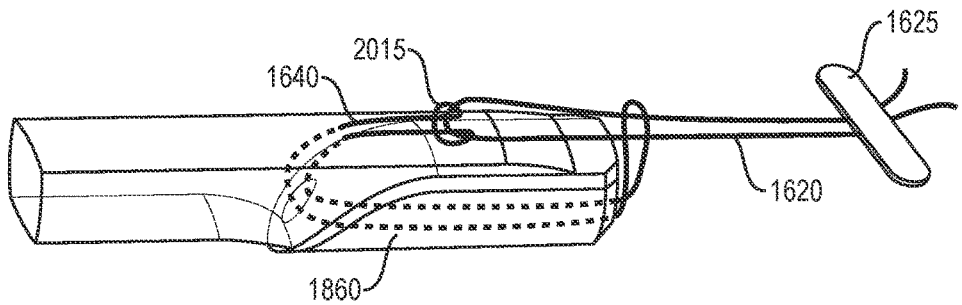
Figure 21:
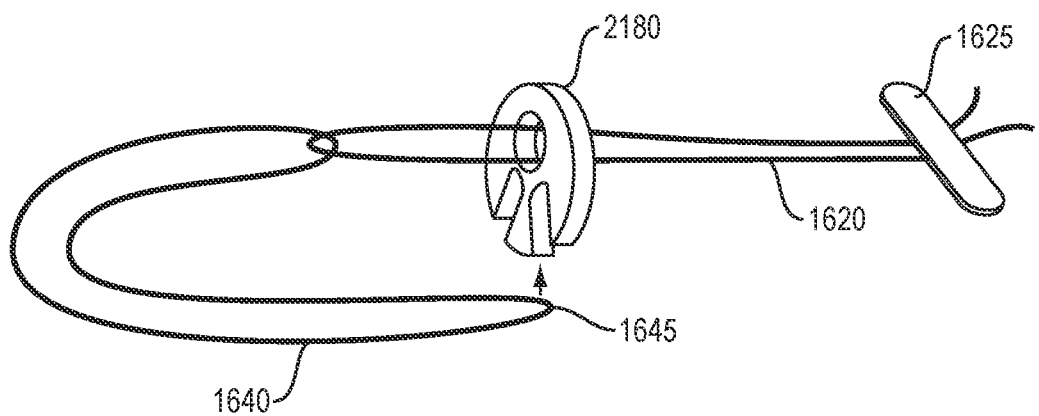
FIG. 21 schematically shows an alternative system and method of coupling an adjustable fixation construct to a bone block including a retaining button, in accordance with at least some embodiments.

FIG. 20A-20C represents a similar method of coupling an adjustable construct to a bone block, with alternate adjustable loop constructs. For example FIG. 20A shows construct 1650 coupled to bone block 1860, wherein sleeve portions 1665 limits the minimum loop length available during adjusting. The intersection 2010 remains along the length L of the bone block 1860 and includes both the link 1666 of the adjustable construct 1660 and continuous loop end. FIG. 20B shows an alternate adjustable loop construct 2050, including a luggage tag portion 2060 and a sleeve 2005 that may provide the adjustability. As a further example, FIG. 20C shows construct 1680 coupled to bone block 1860, wherein sleeve portions 1675a and 1675b limit the minimum loop length available during adjusting. The intersection 2010 included two loops of suture and remains along the length L of the bone block 1860. An alternate method of operatively coupling an adjustable loops construct to a second loop is shown in FIG. 20D. Example adjustable loop construct 1620 may be luggage tagged 2015 to continuous loop 1640 at intersection. Any of the herein disclosed adjustable loop constructs may be similar coupled.

In other embodiments, the method may not include forming a luggage tag over the adjustable loop as shown as FIGs.18A-18D, 19A, 19B and 20A-20C. In these alternative embodiments continuous loop end 1645 may include a stop element operatively coupled to the end 1645 to prevent the continuous loop 1645 from being pulled through the tunnel passage 1865. Optionally a stop element could be a knot (not shown) in the end 1645 that is larger in width or diameter than bone hole opening 1866. Knot (not shown) may be formed by the surgeon after threading the end 1645 through the bone passage. This option allows the intersection between the two loops to be more freely associated to the bone block, which may not be preferable as it may require additional suture management while inserting the construct 1600 into and along the tibial and femoral tunnel. Alternatively, a stop button 2180 may engage both the adjustable loop such as loop 1620 and selectively couple to end 1645 after the end 1645 has been threaded through the bone block passage. This stop button 2180 is configured to prevent the continuous loop end 1645 from migrating into the bone block passage when tension in applied to the construct and retain the adjustable loop closer to the bone block external surfaces. In this embodiment, continuous loop may be shorter than the continuous loop described in FIGs.18A-18D, 19A, 19B and 20A-20C, as the continuous loop does not loop over the adjustable loop. For example, typical bone blocks are 6-11 mm long. The continuous loop 1640 using a stop button may therefore be close to 2-4 cm long and preferably less than double the length of the bone block 1860 to place the intersection to the adjustable loop along the outer cortical surface of the bone block and along length L.

A further embodiment and coupling method to a bone block 1860 is shown in FIGS. 22A and 23A-23C. This embodiment may include adjustable fixation construct 1620, 1660 or 1670 for example. This embodiment, and may not utilize a second loop such as loop 1640. In this embodiment, cradle portion 1630 may be passed through an angled passage 2222 similar to that described in FIGS.15J or 15K. Cradle portion may initiate through the top side cortical surface 1861 to add structure to the entry point 2220 into the passage 2222. An entry through a cancellous bone surface may not provide sufficient structural rigidity and may allow the suture to comb out of the bone block 1860. A bilateral pair of circumferential grooves 2224 may extend at an angle from the first passage 2222 to receive a portion of the cradle 1630. Grooves 2224 allow the cradle 1630 or adjustable loop 1620 to sink below the block external surface thus allowing a closer apposition of the bone block 1860 to a bone tunnel through the tibia or femur. Grooves 2224 may be axially continuous and may intersect the passage opening on the lower surface 1863 and extend at an angle across the width of the bone block 1860. Grooves 2224 may pass through the bone block cortex on the tendon side of the bone block creating a construct more resistant to suture comb out.

Figure 22:
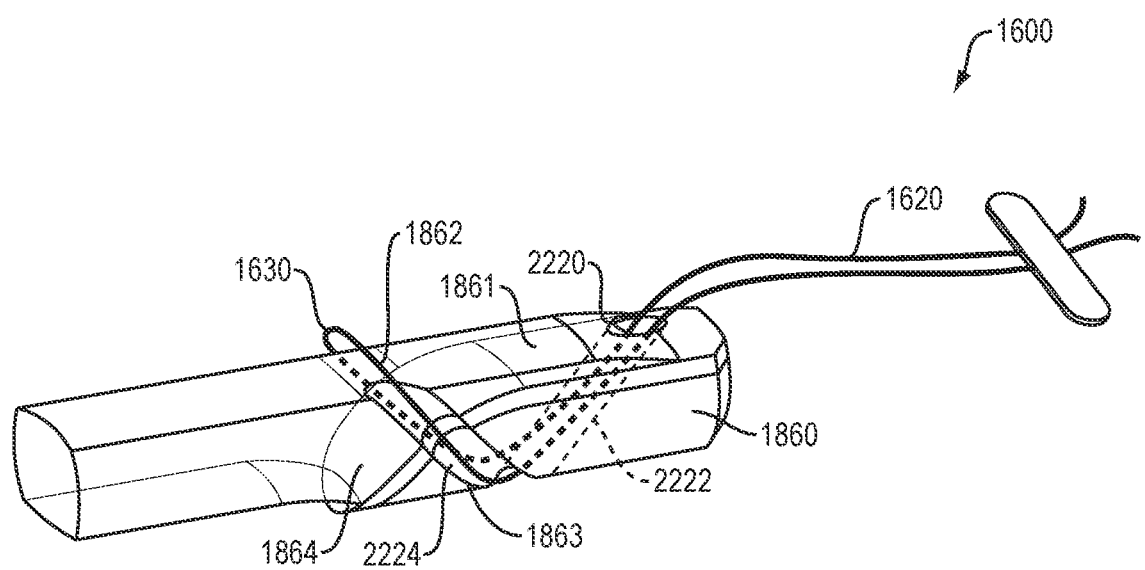
FIG. 22 schematically shows an alternative method of coupling an adjustable fixation construct to a bone block, in accordance with at least some embodiments.

A passing suture that may include a needle (shown in at least FIG. 15A) may be loosely attached to the cradle 1630 of a device/suture loop construct 1620. The passing suture may be inserted into a first end 2220 of bone block passage 2222 preformed within the bone block 1860, the passage extending at an angle relative to the longitudinal axis of the bone block 60, ranging from 20-60 degrees. Passage 2222 may extend from top cortical external surface and out through a lower cancellous bone surface 1863 of the bone block 1860. Cradle 1630 may be drawn or threaded through the passage 2222 of bone block 1860 such that the cradle 1630 exits the surface 1863 of the bone block 1860. As shown in FIG. 22, the cradle 1630 is then looped over the tendon/bone interface and placed within grooves 2224. Tension on the construct 1600 now puts compression on the tendon/bone interface 1862. This is preferable to a cradle for example wrapped around surface 1864 for example, which may act to shear off the tendon/bone interface 1862. Having a large radius of curvature around the bone blocks at the cradle 1630 minimizes kinking of the cradle and thereby internal suture friction within the system and allows for easier length reduction of the adjustable loop 1640. As explained earlier, this embodiment also places the adjustable loop along the bone block, with an end long the bone block thereby upon reducing the length of the adjustable loop, the fixation button 1625 may be directly adjacent the bone block.

Figure 23A:
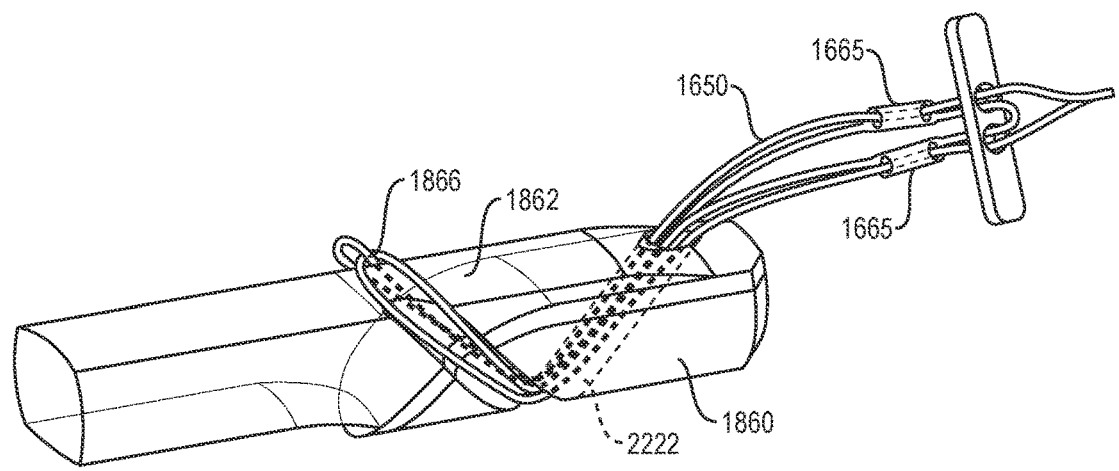
FIGS. 23A-23C schematically show alternative embodiment of adjustable constructs coupled to a bone block, in accordance with at least some embodiments.
Figure 23B:
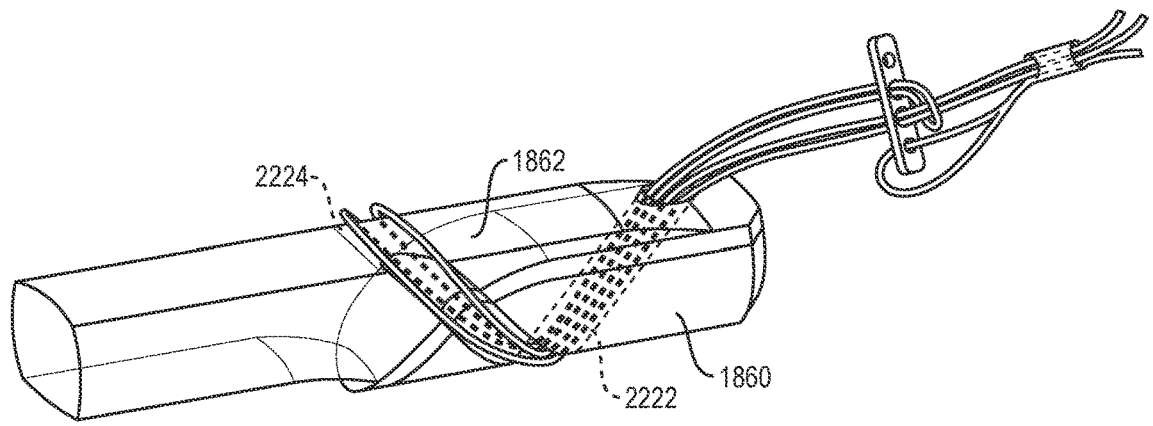
Figure 23C:
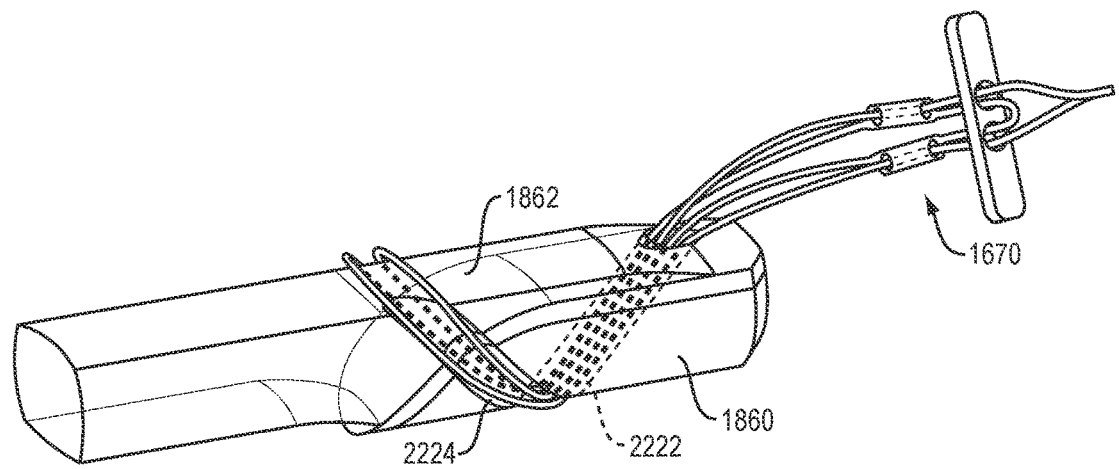

FIGS. 23A-23C show a variety of alternate embodiments of adjustable constructs directly attached to a bone block in a similar fashion to that described in FIG. 22. For example shown in FIG. 23A, an adjustable loop construct such as construct 1650 may extend through an angled passage 2222 and around to top surface of the bone/tendon interface 1862, the link 1666 may compress the tendon onto the bone. Alternatively, bilateral grooves (not shown) may be formed in the bone block 1860 and the link 1866 may sit within the grooves. As a further example shown in FIG. 23B, an adjustable loop construct such as construct 2050 may extend through an angled passage 2222 and around to top surface of the bone/tendon interface 1862 and into grooves 2224 be formed in the bone block 1860. As a further example shown in FIG. 23C, an adjustable loop construct such as construct 1670 may extend through an angled passage 2222 and around to top surface of the bone/tendon interface 1862 and may lie within performed grooves 2224.

Figure 24:
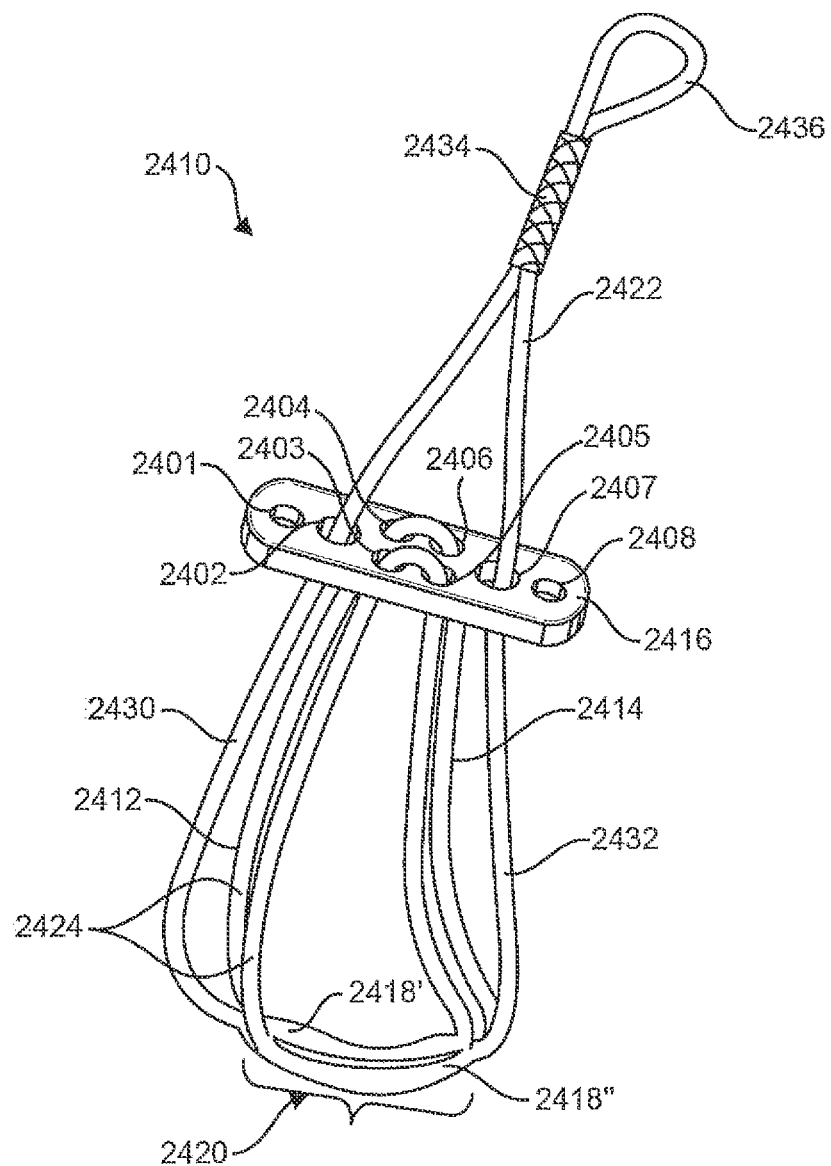
FIG. 24 schematically shows an adjustable fixation construct, in accordance with at least some embodiments.

FIGS. 24 shows an alternative embodiment of an adjustable fixation device including a bifurcated or split cradle 2420. Referring to FIGS. 24, an example of the graft suspension device 2410 of this disclosure is shown. The graft suspension device 2410 comprises a strand of suture 2422 having a first loop 2412 and a second loop 2414 (together, the suspension loop 2424) suspended from an anchor 2416. The suture 2422 is formed from a braided material having plaited threads, which together may form a non-hollow tubular material. In some embodiments, some of the suture 2422 may be hollow or coreless. The suture 2422 may be made from a suitable bio-compatible material which may be a bio-absorbable material or a non-absorbable permanent material. A length of the strand of suture 2422 may be about 46 inches. The anchor 2416 may be of conventional construction for securement to the outside of a bone, such as a cortical button. A length of the anchor (or cortical button) 2416 may be about 10 mm to about 15 mm and a width may be about 2 mm to about 5 mm. The graft suspension device 2410 may include a bifurcated cradle 2420 located substantially midway along the length of the suture 2422, as further described below. In other embodiments the graft suspension device 2410 may be configured to separate from a single suture into a plurality of longitudinal passages, including two, three, four or five longitudinal passages, located substantially midway along the length of the suture 2422. The bifurcated cradle 2420 defines two parallel braided coreless longitudinal passages 2418' and 2418" at the opposite end of the suspension loop 2424 to the anchor 2416, as further described below.

Also shown in FIG. 24, the anchor 2416 may include a plurality of apertures, which may be eight apertures, extending therethrough and configured for the passage of the suture 2422. Outer and intermediate apertures 2401, 2402, 2407 and 2408 are aligned with each other along the longitudinal axis of the anchor 2416. Central apertures 2403, 2404, 2405 and 2406 are formed in two pairs symmetrically offset from the longitudinal axis but aligned with each other transverse to the longitudinal axis. The two pairs of central apertures 2403, 2404, 2405 and 2406 are designed to accommodate the suture loops 2412, 2414 therethrough. The intermediate pair of apertures 2402, 2407 are designed to accommodate the two ends 2430, 2432 of the suture respectively. The outer pair of apertures 2401, 2408 are designed to assist in the placement of the anchor 2416 on the outside of a bone utilizing leading and trailing sutures passed through apertures 2401, 2408 (not shown). First and second loops 2412, 2414 are shown threaded through the central apertures 2403, 2404, 2405 and 2406 as further described below. The loose ends 2430, 2432 of the suture 2422 are shown threaded through the two separated longitudinal passages or bifurcated sleeve portions 2418' and 2418" to complete the suspension loop 2424. The threading of the loose ends 2430, 2432 in this manner, in addition to the bifurcation may have the effect of widening the bifurcating sleeve portion 2418' and 2418" with respect to the remainder of the suspension loop 2424. The loose ends 2430, 2432 are then shown as passing through the intermediate pair of apertures 2402, 2407. In some embodiments, loose ends 2430 and 2432 may then join together to form a single tail 2434. Advantageously, routing the suture 2422 through the plurality of apertures keeps the various strands of suture 2422 separated, making them less likely to bunch or tangle. The single tail 2434 may be further adapted to form a finger loop 2436 to provide a means whereby the surgeon can adjust the distance of the bifurcated cradle 2418' and 2418" from the anchor 2416, and/or shortening the length of the suspension loop 2424, either before or during the surgical operation. Advantageously, the finger loop 2436 may be used with just one hand.

The bifurcated portion 2418 forms an integral part of the first and second loop 2412, 2414. First and second eyes 2438, 2440 may be formed in a first longitudinal passage 2418' of the bifurcated portion 2418 at spaced intervals through which the loose ends 2430 may be threaded, as further described below. It is contemplated by this disclosure that first and second eyes 2438, 2440 need not be pre-formed in the bifurcated portion 2418 if the loose ends 2430, 2432 may be threaded therethrough by passing through gaps between adjacent threads of the braided suture 2422. In an alternative embodiment, first and second eyelets 2438 and 2440 may be pre-formed or disposed in first and/or second limb, adjacent to and not necessarily within the bifurcated portion itself. The example loose end may therefore extends into and along a limb portion that is at least partially continuous with the bifurcated portion 2418, such that the example loose end extends along both the limb portion and one of the bifurcated longitudinal passages 2418' or 2418". This example loose end may also remain within the suture and extend into the other limb portion adjacent the other side of the bifurcated portion 2418 before exiting between the braids or through a pre-formed eyelet.

A length of the bifurcated portion 2418 can vary, but may be sufficiently long enough to accommodate a ligament fixation graft suspended thereover, and short enough to facilitate efficient adjustment of the suspension loop 2424. A distance between preformed eyelets or exit and entrance positions of the loose ends between braids can vary, but is selected to be sufficiently long enough to accommodate a ligament fixation graft suspended thereover, but short enough to facilitate efficient adjustment of the suspension loop 2424.

Figure 25A:
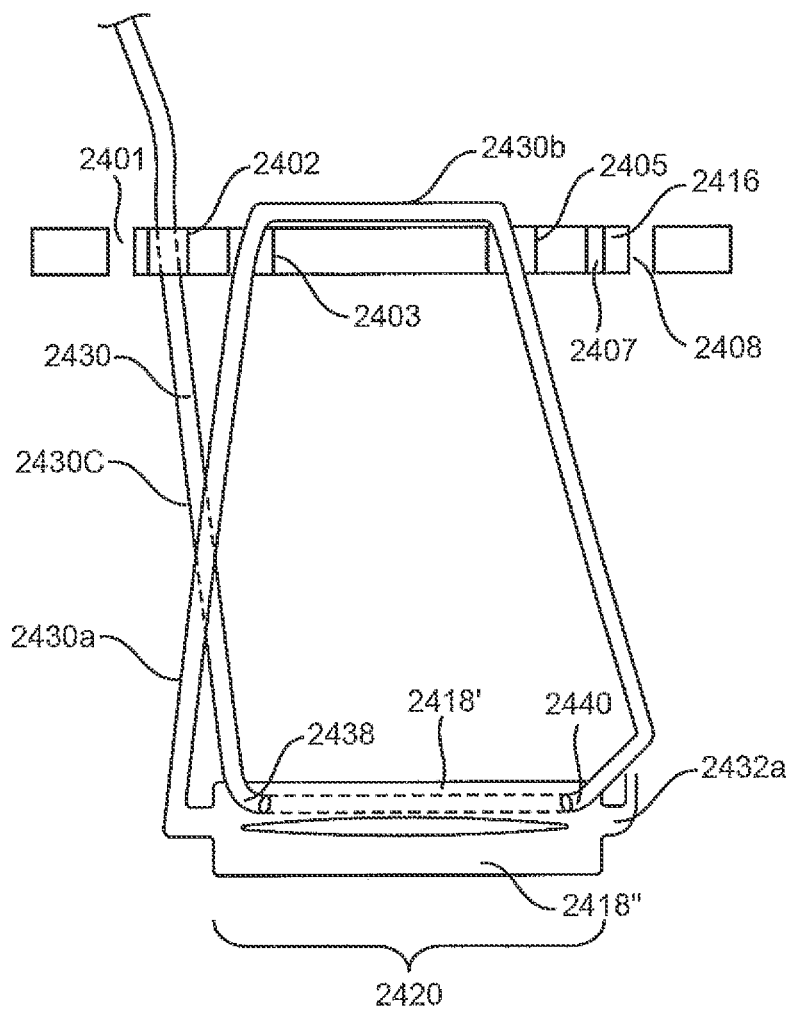
FIGS. 25A and 25B schematically show the routing of a first adjustable loop and both adjustable loops respectively.

FIG. 25A represents in schematic form the embodiment showing the routing of the first loop only, for clarity purposes. Second loop is omitted for clarity purposes and added in FIG. 25B to show the preferred embodiment. Referring now to FIG. 25A, forming the first loop 2412 involves threading the loose ends 2430 that extends from a first end of the bifurcated cradle portion 2420 through a pair of central apertures 2403 and 2405 of the anchor 2416 from the underside to the top side thereof. More particularly, loose end portion 2430a is threaded through central aperture 2403 and then looped back through the aperture 2405 adjacent to the aperture 2403 through which it has already been passed. Specifically, loose end portion 2430b passes through aperture 2405 from the top side to the underside of the anchor 2416. Thereafter, loose end portion 2430b is threaded between braids and through a first longitudinal passage 2418' of cradle portion 2420' entering aperture 2440 and exiting aperture 2438. At this stage, loose end portion 2430c is passed through the intermediate aperture 2402 from the underside of the anchor to the top side thereof, i.e., loose end portion 2430c is passed through aperture 2402. Bifurcated cradle portion 2420 defines two longitudinal passages or sleeves 2418' and 2418" that are parallel with each other and are braided to braid into a single suture at either end. In FIG. 25A suture end 2432a is shown extending from bifurcated portion 2420.

Figure 25B:
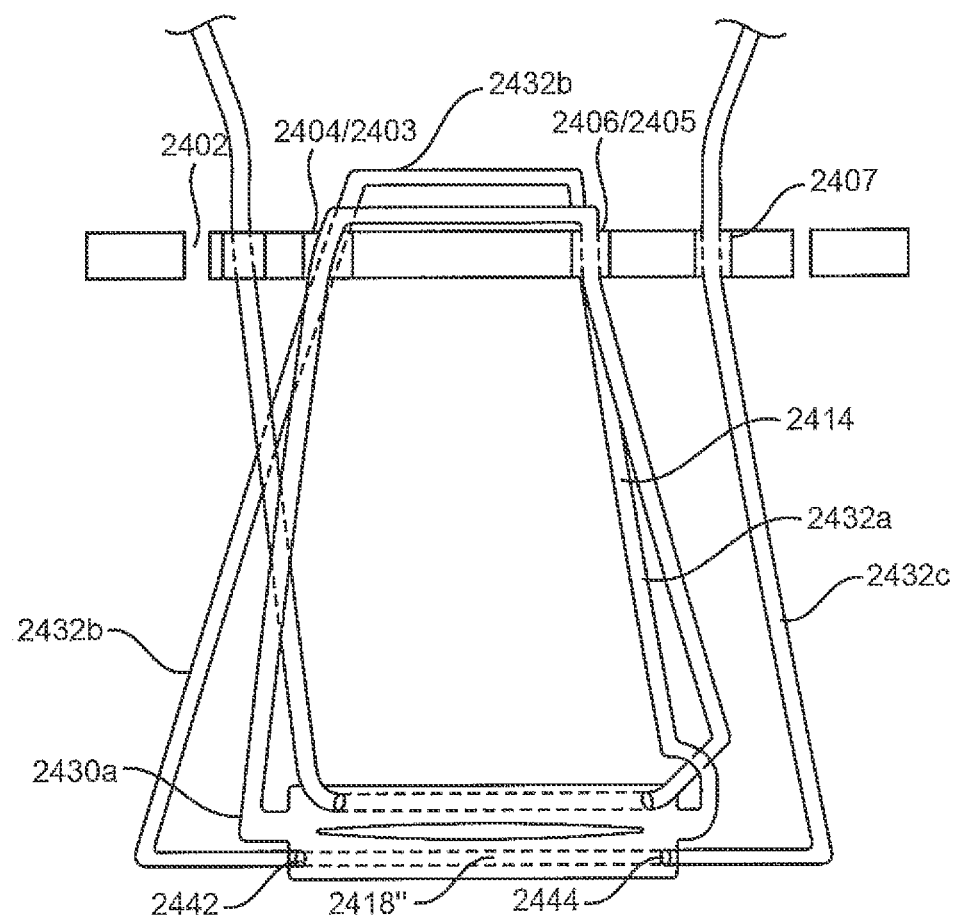

Referring now to FIG. 25B, forming the second loop 2414 (in addition to the first loop 2412) involves threading the loose ends 2432 that extends from a second end of the bifurcated cradle portion 2420 through a pair of central apertures 2404 and 2406 of the anchor 2416 from the underside to the top side thereof. More particularly, loose end portion 2432a is first threaded through central aperture 2406 and then looped back through the aperture 2404 adjacent to the aperture 2406 through which it has already been passed. Specifically, loose end portion 2432b passes through aperture 2404 from the top side to the underside of the anchor 2416. Thereafter, loose end portion 2432b is threaded through a second longitudinal passage 2418" of cradle portion 2420 entering aperture 2442 and exiting aperture 2444. At this stage, loose end portion 2432c is passed through the intermediate aperture 2407 from the underside of the anchor to the top side thereof, i.e., loose end portion 2432c is passed through aperture 2407. Loose ends 2430 and 2432 each extend through individual sleeves formed by the bifurcated portion 2420, in opposing directions to cross over each other.

Figure 26A:
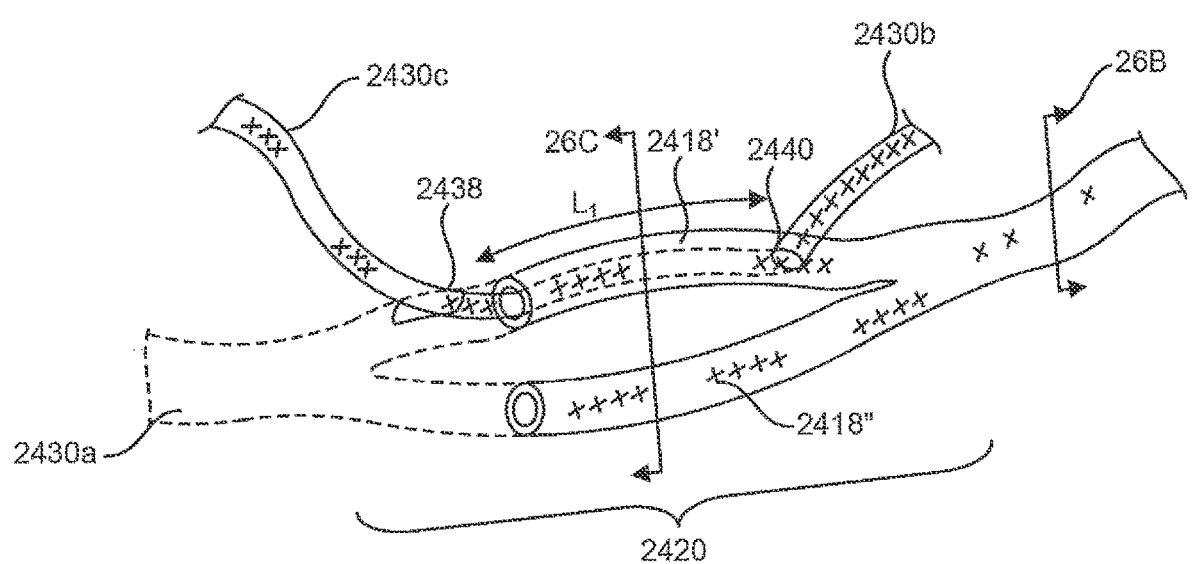
FIG. 26A schematically shows routing of a first adjustable loop by disposing a first loose end 2430 along longitudinal passage 2418' in accordance with at least some embodiments.

FIG. 26A is an alternative view representing the bifurcated portion 2420 and an example threading of free end 2430 into opening 2438 along the core or longitudinal passage of a first coreless longitudinal passage 2418' and then out of opening 2440. Free end 2432 threads through 2418" in a similar manner (not shown). In some embodiments, the two free ends are threaded through in opposing directions. In some embodiments, the two free ends are threaded along the respective core for differing lengths to each other. In some embodiments, the two free ends are threaded along their respective longitudinal passages at offset locations along the cradle portion 2420. In some embodiments, the two longitudinal passages 2418' and 2418" are equal in diameter to each other.

Using today's technology, suture can be continuously braided to bifurcate for a length and then join back to together. In addition, suture can be continuously braided to separate into a plurality of longitudinal passages, including more than two passages. In some embodiments, each longitudinal passage could have a different diameter. For example, a first longitudinal passage may have a larger diameter allowing for easier sliding of the loose end therethrough and therefore easier reduction of the suture loops. A second leg may have a smaller diameter that may more securely lock with a free end threaded therethrough and provide for a tighter lock of the suture construct.

In use, each of the longitudinal passages 2418'and 2418" may be configured so that tension may create a Chinese finger lock and selectively reduce the core inner diameter. This Chinese finger lock, once activated may prevent sliding of the free end threaded therethough once the soft tissue is in the targeted location. In some examples, the tissue being in the targeted location places a counter tension on the adjustable loop and therefore contributes towards this activation tension, creating an auto-lock. Stated otherwise once the soft tissue has reaches the targeted location, the soft tissue may automatically resist further relocation, providing a counter force that acts to reduce the longitudinal passage inner diameter, prevent further suture sliding through the bifurcated cradle and thereby loop reduction, and consequentially lock the soft tissue in the targeted location. Relative to a single suture that receives a plurality of free ends therethrough, as described in the US application 2017/0231752, herein incorporated by reference in its entirely, by having a plurality of free ends each having their own dedicated longitudinal passage, circumferentially enclosed, the friction on each free end may be higher. This increased friction may reduce the likelihood of the suture loop loosening and thereby mitigate tissue displacement. The friction is now circumferential on each free end.

Figure 26B:
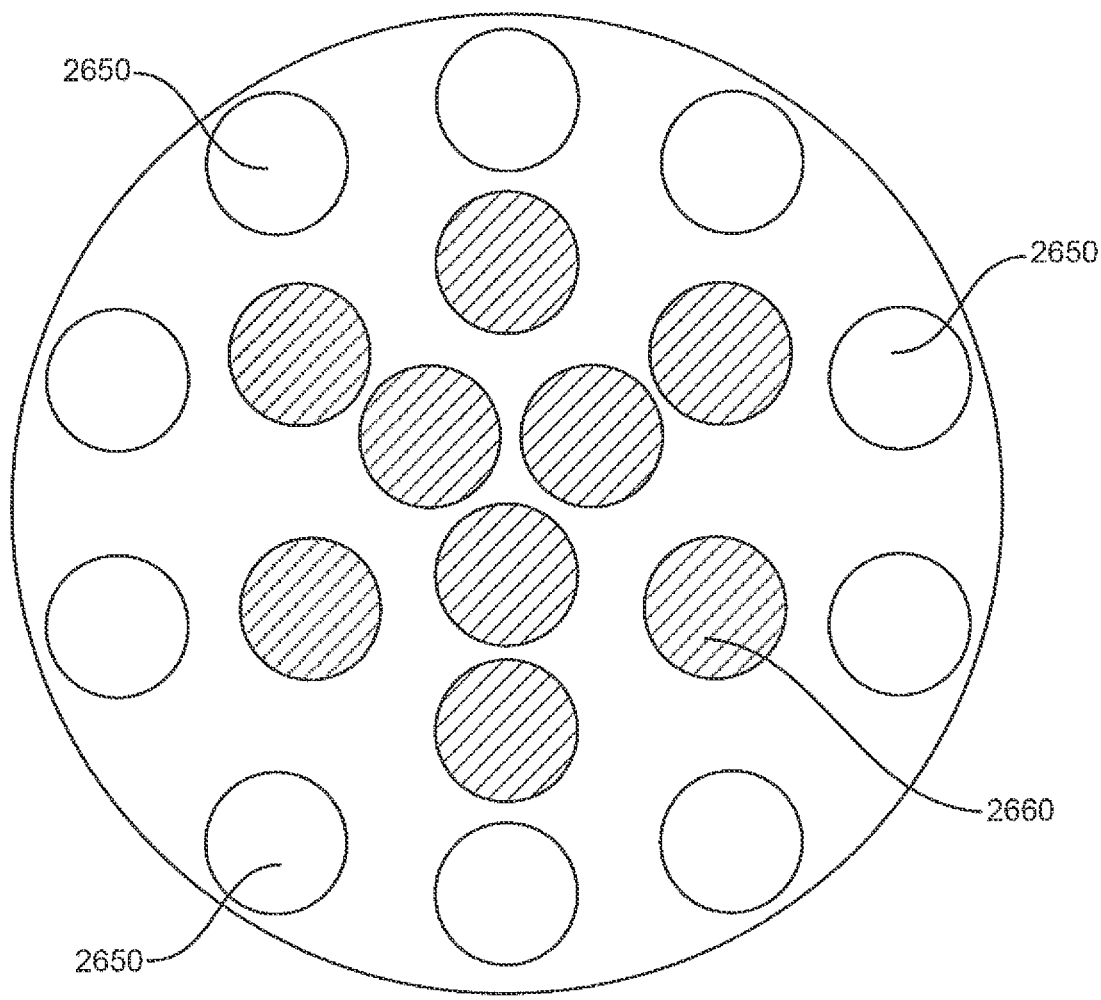
FIGS. 26B and 26C schematically show example cross sections of the suture along a non-bifurcated length and a bifurcated length respectively in accordance with at least some embodiments.
Figure 26C:
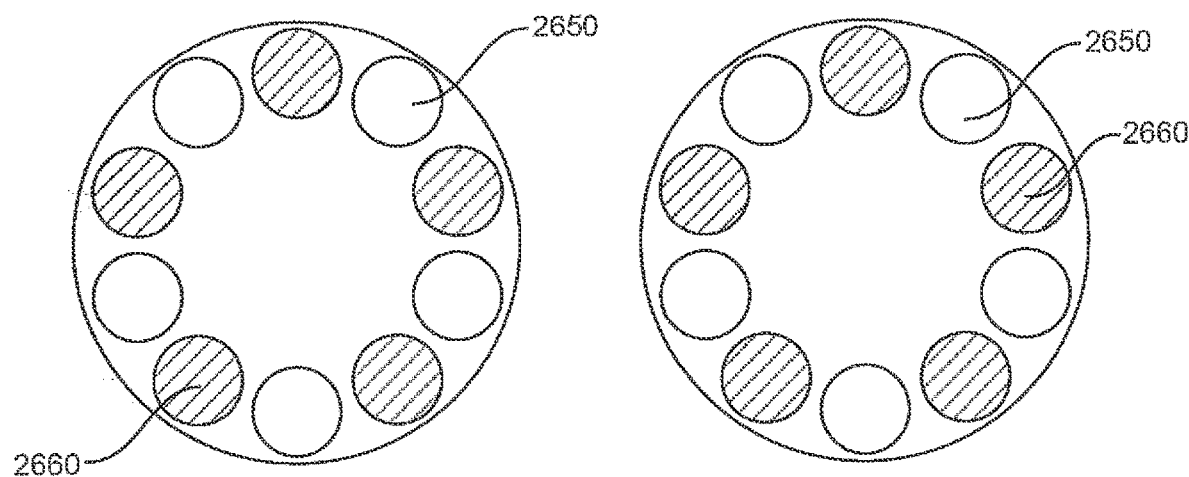

The cross section of each loose end or limb is schematically shown in FIG. 26B, showing a cross section of a first plurality and second plurality of braids (2650 and 2660 respectively). The first plurality of braids 2650 define an outer wall or sheath of braided suture. The second plurality 2660, shown shaded for clarity, may make up a core portion of braided suture. Tension on the suture 2422 as a whole tends to be unevenly distributed; much of it is taken up by the braids in the core section 2660. The inventors therefore envision that the suture may be preferably bifurcated by continuous braiding so as to separate the suture into at least two longitudinal passages that splits the braids from both the first and second plurality 2650 and 2660 approximately evenly between both passages, represented in FIG. 26C. This may more evenly distributes the tension along the suture as a whole and between the separated passages; leading to a more evenly distributed operation of the construct such that all of the longitudinal passages may evenly lock around a suture therethrough. FIG. 26C shows two longitudinal passages without a suture threaded therethrough. Stated alternatively both loops 2412 and 2414 may more evenly reduce in loop size and more equally tighten and lock around the suture therethrough when each passage of the bifurcated or separated portion includes an approximate evenly distributed mixture of braids between the first and second plurality of braids 2650 and 2660.

In alterative embodiments, each longitudinal passage 2418' and 2418" could include an uneven distribution of the first and second plurality of braids. For example should the inventors wish to provide two longitudinal passages with differing roles, the first longitudinal passage 2418' may be formed entirely or substantially with the braids from the first plurality, while the second longitudinal passage may be formed entirely or substantially with braids from the second plurality. Each longitudinal passage may be characterized therefore in that tension may be unevenly distributed. This may tend to cause one longitudinal passage to preferentially lock around a suture disposed there along than the other, while a second longitudinal passage may more preferable allow a suture to slide.

An example suture 2422 may include between 8-64 total braids that may be evenly split between each of the separated longitudinal passages, such as for example 32 braids separated into two passages with 16 braids each. In some alternative embodiments, each longitudinal passages 2418', 2418" may have a differing braid count, to offer alternative roles for each of the passages. One passage may have 22 braids, while the other has 10 for example. One passage may more tightly or preferably lock for example than the other while the other passage may preferably allow the suture to slide therethough.

Figure 27A:
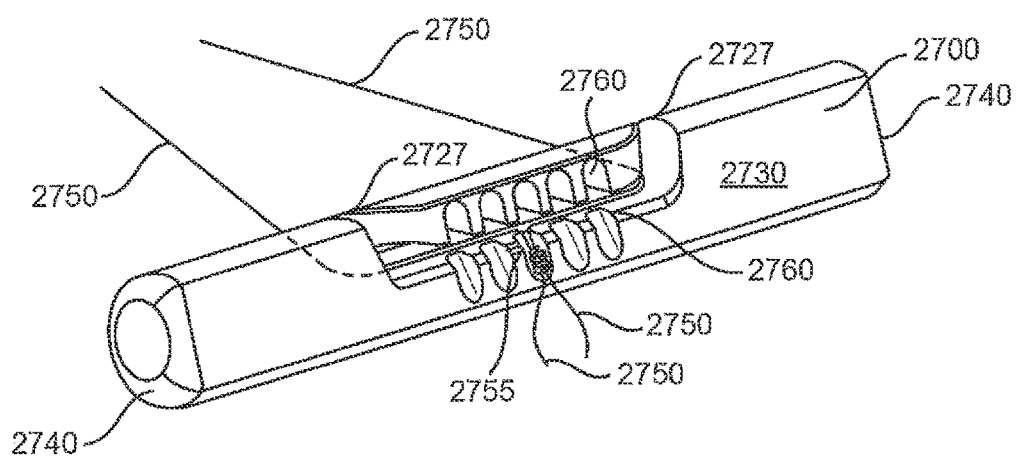
FIGS. 27A-27C schematically show a variety of views of an embodiment of a tension bar in accordance with at least some embodiments.
Figure 27B:
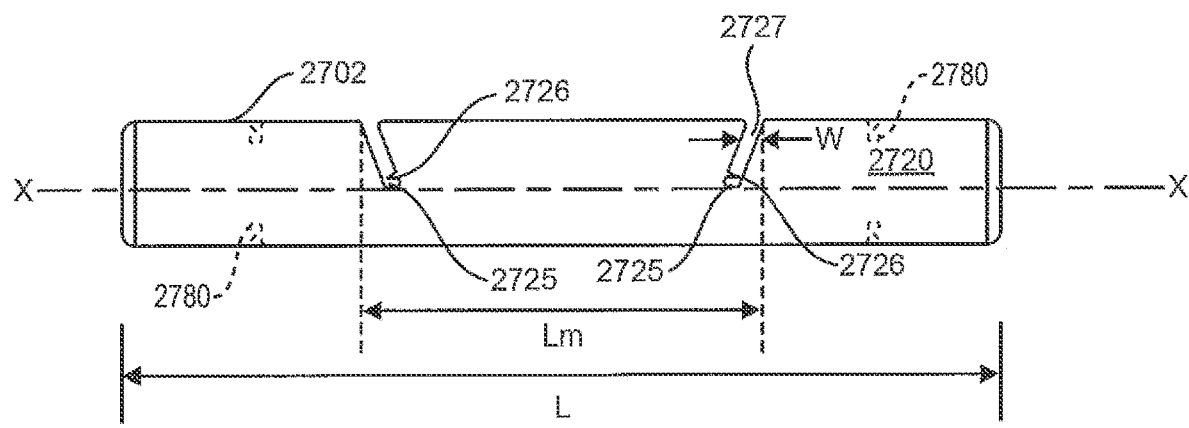
Figure 27C:
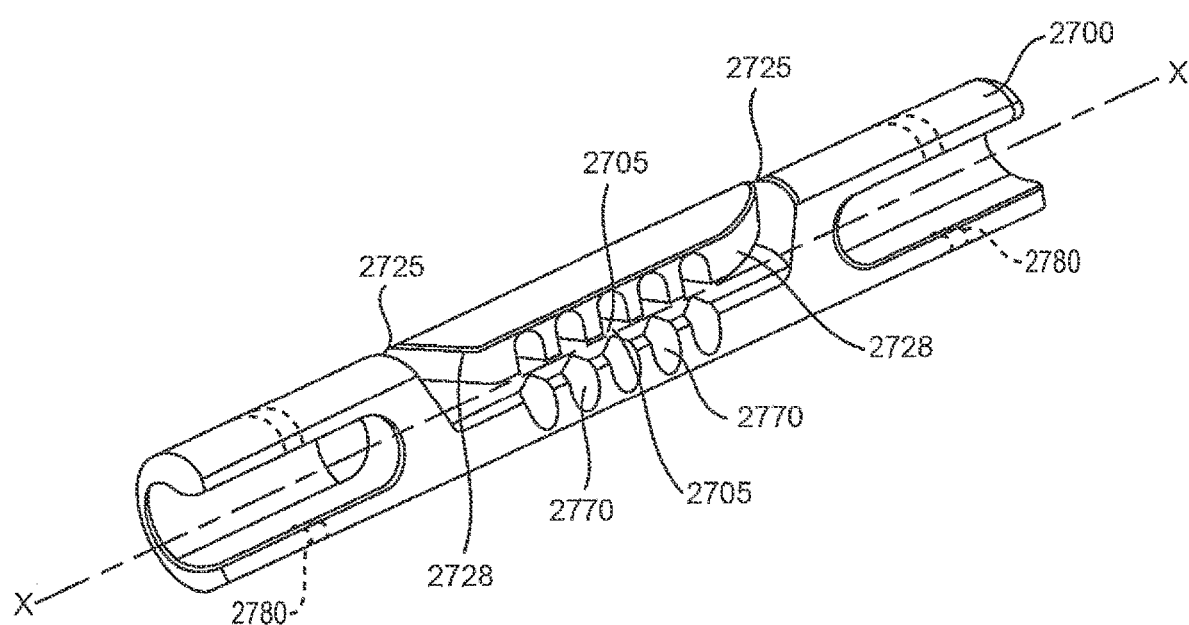

FIGS. 27A-27C illustrate an example of a tension bar 2700, for use in, for example, an anterior cruciate ligament (ACL) surgery. The tension bar 2700 may be employed to couples to at least two suture tails 2750 that may be coupled together to form a suture reduction loop by a linking means 2755. The tension bar 2700 may be employed to apply tension to at least one of the suture tails 2750. Linking means may include any means for coupling a plurality of suture tails together, and may include for example an eye splice, a collar, a button or a knot for example. Alternatively linking means may include linking means on each suture tail such that each suture tail terminates with it owns dedicated knot, loop, and collar or button for example. For example, each suture tail 2750 may terminate with a knot (not shown) that separately engages the suture bar 2700, and therefore each suture tail may not be coupled to form a reduction loop. For example in the suture construct shown in FIG. 8D or 32C, the tension bar may be configured to receive the suture looped ends through example cleats 2780 (shown in FIG. 27B and 27C). In one embodiment, the tension bar 2700 is configured to engage the suture tails 2750 and the linking means (2755), to limit sliding of the suture 2750 relative to the suture bar 2700 and aid in tensioning the adjustable suture construct associated with the suture tails 2750. Alternatively, lateral cleats 2780 may receive finger loops 830a, 830b therethough, to wrap loop 830a around a first cleat 2780 and loop 830b around the other cleat 2780. The suture construct and more specifically suture tails or loops may be operably coupled to an adjustable tissue fixation system such as those disclosed herein, wherein tensioning the suture tails or loops reduces an adjustable loop of the adjustable suture loop construct and thereby adjusts the tissue fixation construct.

The tension bar 2700 may define a generally tubular or bar shaped body member with a plurality of slots, grooves, cleats and notches arranged to selectively receive suture tails 2750 or loops 830 that may be operatively coupled to an adjustable suture fixation construct such as those described previously herein. The tension bar 2700 may define a unibody or one-piece single shot molded plastic component. The bar 2700 is configured to receive the suture tails 2750 or loops 830a, 830b, and distribute the load on the fingers of a surgeon when tightening/pulling on the suture(s). The bar 2700 may include at least one notch or means to receive and engage a linking means such as a button, collar, knot or eye splice. This notch may be centrally located along the bar 2700. The bar 2700 may include at least two notches to receive and engage a first and second linking means associated with two ends of a first and second suture tail respectively.

FIG. 27A shows a view of the bar 2700 with suture tails 2750 operatively coupled thereto, the suture tails 2750 formed into a loop using a linking means 2755 that is an eye splice. An example end to form a single tail may be similar to single tail 2434 shown in FIG. 24. Adjustable suture fixation systems may be any adjustable suture constructs described heretofore such as those disclosed in FIGS. 5H, 8D, 24 and 16A-16C.

Bar 2700 includes a lower side surface 2720, an upper side surface 2730 and two lateral end surfaces 2740. Lower side surface 2720 may define a curved surface for nesting within a user's hand and better distribute the load on the fingers of the user. Lower surface 2720 faces the adjustable suture construct. Lower side surface 2720 may include two slots 2725, each slot to receive a length suture tail 2750 therethrough to guide the suture tails into the groove. Tension bar 2700 may have an overall length L that approximates a surgeon's hand width. Tension bar 2700 may define a median working portion $L_m$ that is spaced away from both lateral ends 2740, which receives and engages the suture tails 2750. This may create a mechanical advantage where some of the surgeon's fingers are lateral to the suture slots 2727 which occurs when the bar 2700 is rocked as is described later. Slots 2725 may define the outer periphery of the median working portion $L_m$. Slots 2725 may extend from a top surface 2702 of bar 2700 towards a central axis X-X and may be continuous with groove 2760. Slots 2725 may have a constant width "W" on the lower side surface 2720 and may extend along an angle such that the closed end 2726 of each slot 2725 is further from the most-adjacent lateral end 2740 than the open end 2727. Part way along each slot 2725 may include a ramp 2726 that locally reduces the width "W" to better retain suture tail 2750 therein and mitigate the likelihood of the tension bar 2700 falling on the floor. Ramp 2726 may be closer to the closed end 2728 than open end 2727. Ramp 2826 may be approximately a suture tail diameter or width from the closed end 2728. Ramp 2826 may define a closed portion of slot 2725 that is continuous with groove 2760. Each slot 2725 may extend from the lower side surface 2720 to the upper side surface 2730 and may be continuous with groove 2760 along the upper side surface 2730. In alternative embodiments, the median working portion $L_m$ may approximate the same as the overall length L, of the bar 2700. In such a case, the slots 2725 would not exist and the sutures 2750 would exit the lateral ends 2740. In an alternative embodiment, bar 2700 may include additional cleats 2780 laterally disposed relative to median portion $L_m$ for optionally receiving loops 830a and 830b therethrough.

FIG. 27C illustrates a bar 2700 with modified lateral ends 2740 to allow for a single action mold manufacturing process, by exposing cavities 2701 at each end. This may make the device more cost effective, and require less material. This device may be single use, formed of a plastic and provided sterile. This device may alternatively be intended as a durable or reusable device and may be formed of a material that re-sterilizes well using existing sterilization methods. Reusable tension bars may be formed from stainless steel, for example.

Illustrated in FIGS. 27A and 27C, each slot 2725 extends up to and including the upper side surface 2730 and may include a curved surface 2728 that curves towards the middle 1705 of bar. The middle being approximately equidistant between the two lateral ends 2740. Each slot 2725 and curved surface 2728 is configured to lead a suture tail 2750 into groove 2760. Seen also in FIGS. 27A and 27C, is at least one notch 2770 radially extending from groove 2760 for receiving a linking means such as knot, button, collar or eye slice associated with the suture tail 2750. The at least one notch is larger is cross section to receive and engage the linking means 2755 which may generally have a larger cross section than the suture tail 2750.

Figure 27D:
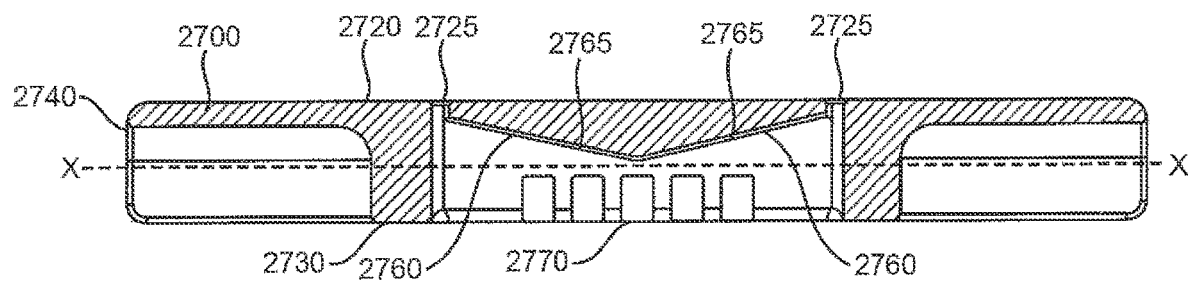
FIG. 27D schematically shows a cross section along the handle longitudinal axis.
Figure 27E:
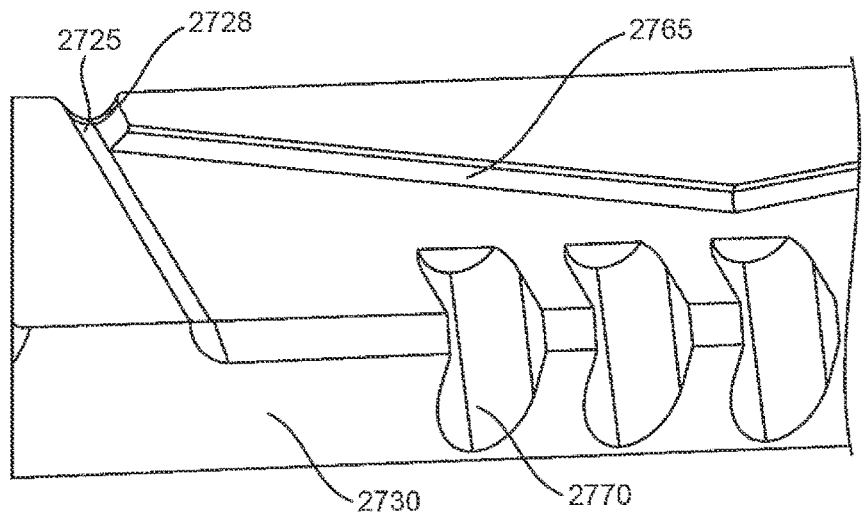
FIG. 27E schematically shows an isometric of the section shown in FIG. 27D.

FIG. 27D is a longitudinal cross section of bar 2700 showing the lower side surface 2720 with the slots 2725 therethrough. At least a portion of groove bottom surface 2765 is shown continuous with slots 2725 and spaced laterally or radially away from notches 2770. Groove bottom surface 2765 may extends at an angle (non-zero) relative to the longitudinal axis of the bar 2700, defining an apex at the middle of bar, approximately equidistant from both ends 2740. Cleats 2780 are omitted from FIG. 27D for simplification. FIG. 27E illustrates an isometric view of a slot 2725 and groove bottom surface 2765 continuous.

Figure 28A:
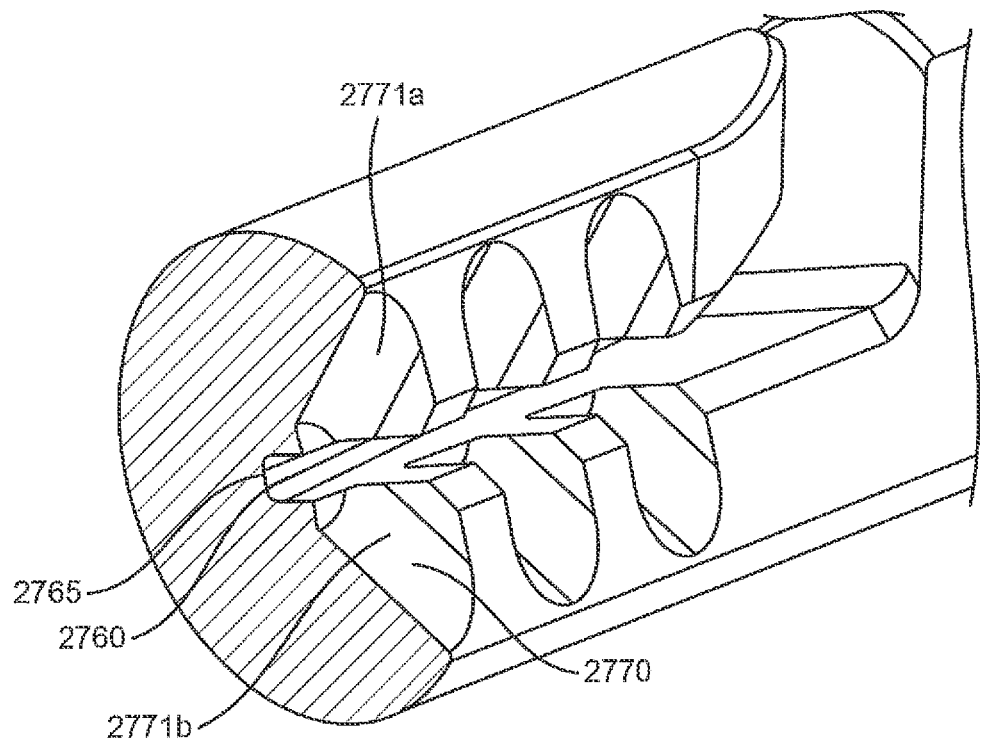
FIGS. 28A and 28B shown a section of a tension bar and a corresponding end view of the cross section respectively in accordance with at least some embodiments.
Figure 28B:
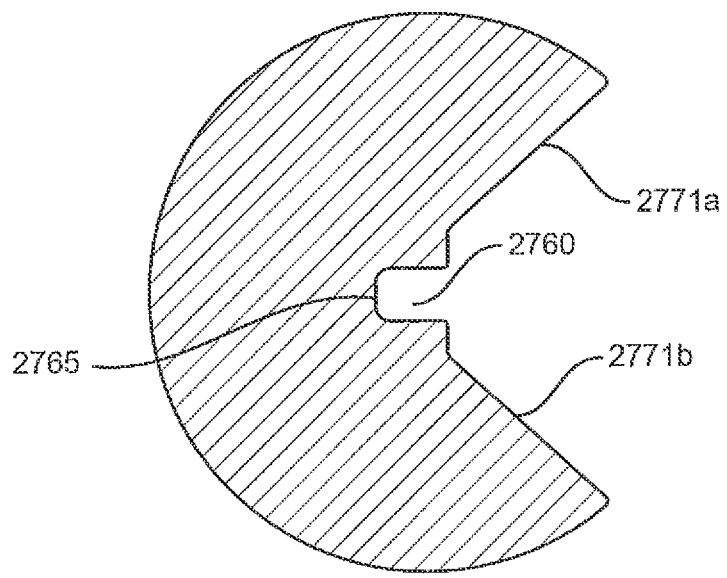

FIGS. 28A and 28B show a first cross section of bar 2700, the cross section extending through a center of a notch 2770. Groove 2760 extends parallel to longitudinal axis of bar and defines a bottom surface 2765 that is medially spaced relative to notch surfaces 2771. Groove 2760 is sized to receive a suture tail, but obstruct the linking means 2755 from entry. Groove 2760 is sized to block the linking means 2755 from entering the medial most portion of groove 2760 and place the linking means within one of the notches 2770. A plurality of axially spaced notches 2770 are shown in the medial portion $L_m$ between the two slots 2725. In some embodiments, there may be a single notch located at the middle 2705, equally spaced from both lateral ends 2740. Notch 2770 has a width configured to receive and engage the linking means to limit motion of the suture tails 2750 along the tensioning bar 2700. The at least one notch 2770 defines two angled channels 2771a and 2771b that extend bilaterally from the groove. Channels 2771a and 2771b may be mirror images of each other. In some embodiments a single channel only, such as channel 2771a may be sufficient.

Figure 29A:
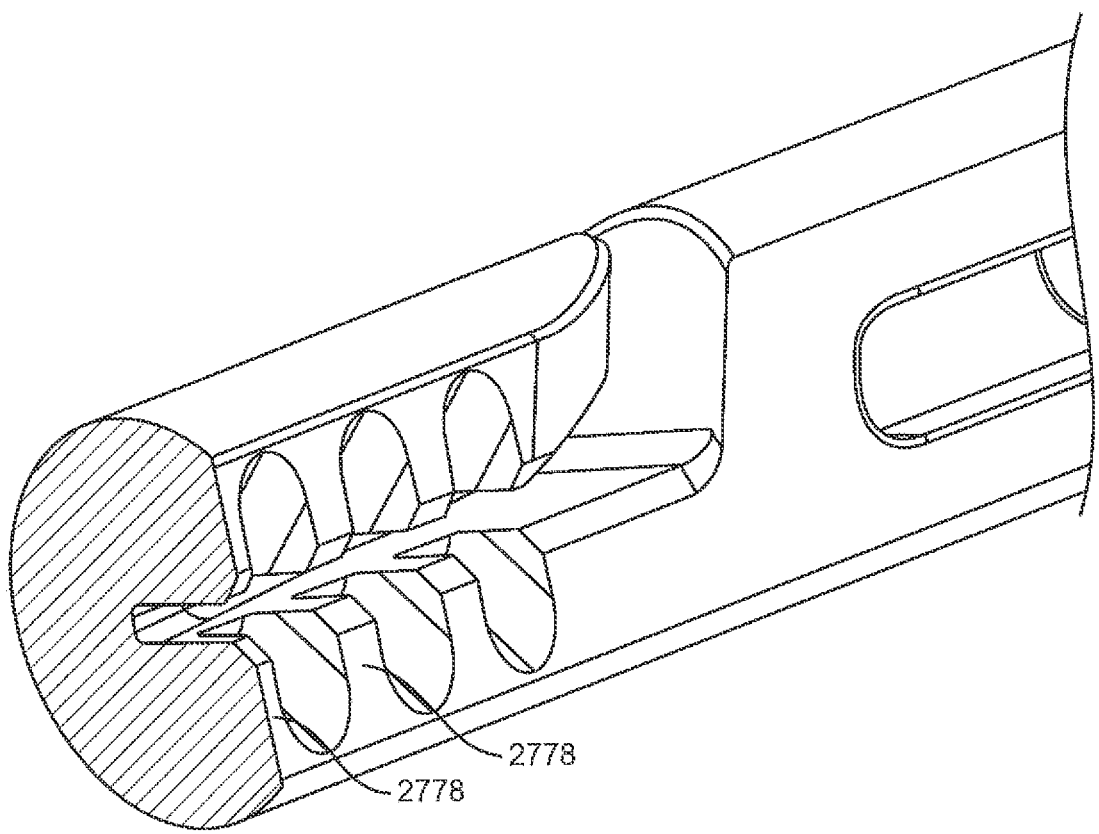
FIGS. 29A and 29B shown a section of a tension bar and a corresponding end view of the cross section respectively in accordance with at least some embodiments.
Figure 29B:
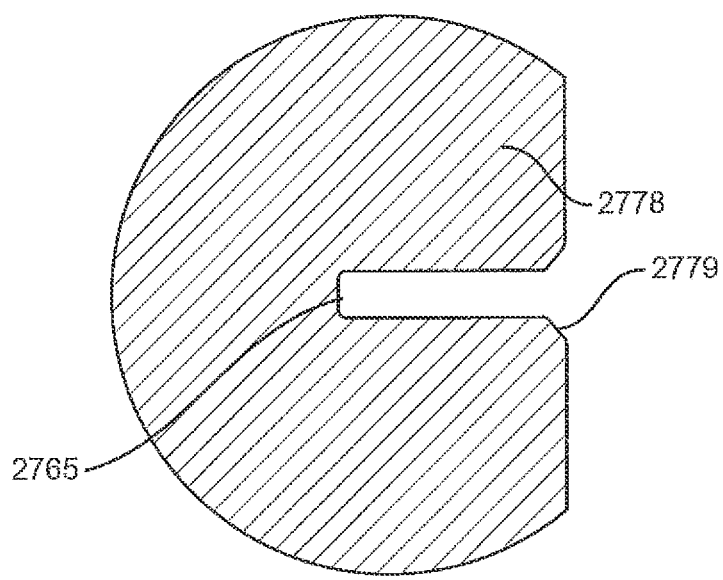

FIGS. 29A and 29B show a second cross section of bar 2700, the cross section offset from the first, and extending through a rib 2778 that may separate two serially disposed notches 2770. Rib 2778 may include a chamfer 2779. Ribs 2778 are axially spaced, defining notches 2770 to allow the linking means 2755 to lie within notch 2770, while the suture tail 2750 is disposed more medially along groove 2760. Since each suture tail may not be equal in length depending on the construction of the suture construct and location of the linking means 2755 a plurality of notches 2770 may be preferable to accommodate some asymmetry between the suture tails. In alternative embodiments where each suture tail terminates with its own linking means, a first linking means on a first suture tail may engage a first notch and a second linking means on a second suture tail may engage a second notch.

Figure 30:
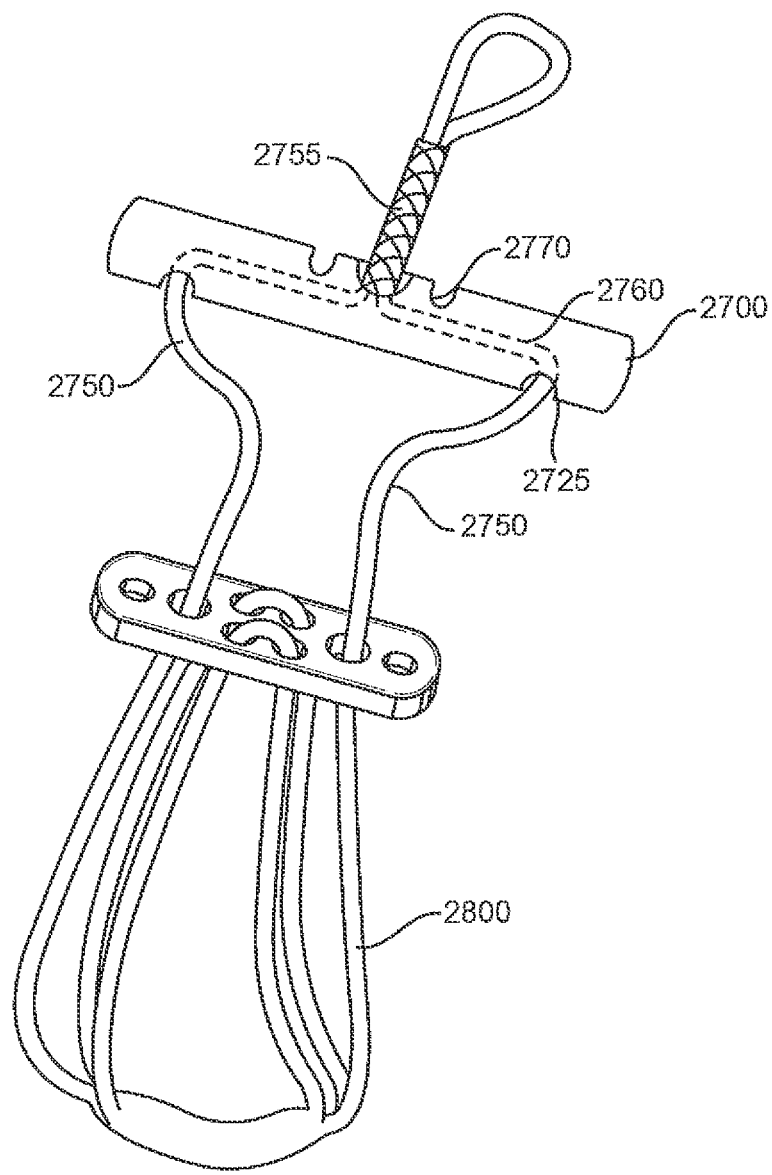
FIG. 30 schematically represents an example adjustable fixation construct with a tension bar operably coupled in accordance with at least some embodiments.

FIG. 30 illustrates an adjustable fixation construct 2800 operably coupled to a tension bar 2700. An eye splice is shown as a linking means 2755 to the two suture tails 2750 together, the eye splice seated within a notch 2770.

Figure 31A:
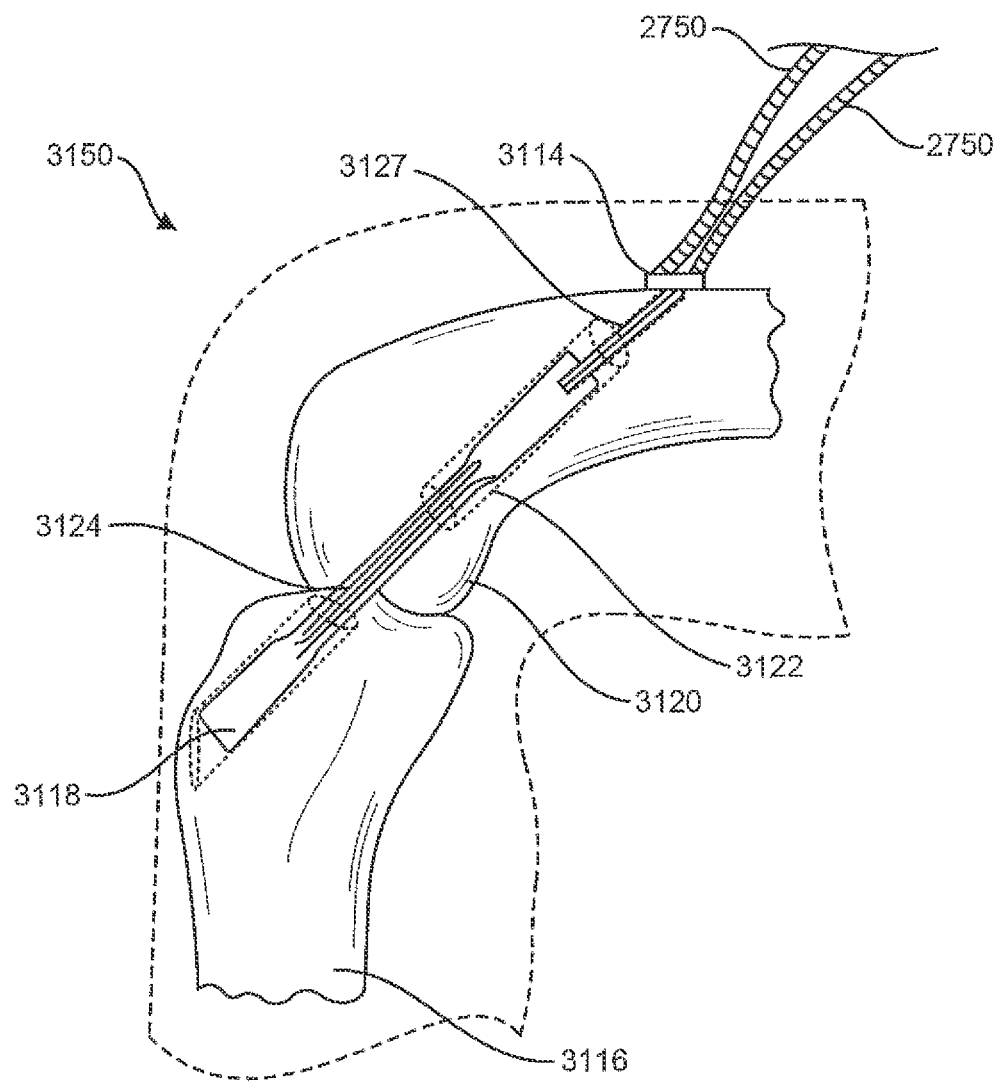
FIGS. 31A and 31B show a method of using the tension bar with an adjustable fixation construct in accordance with at least some embodiments.
Figure 31B:
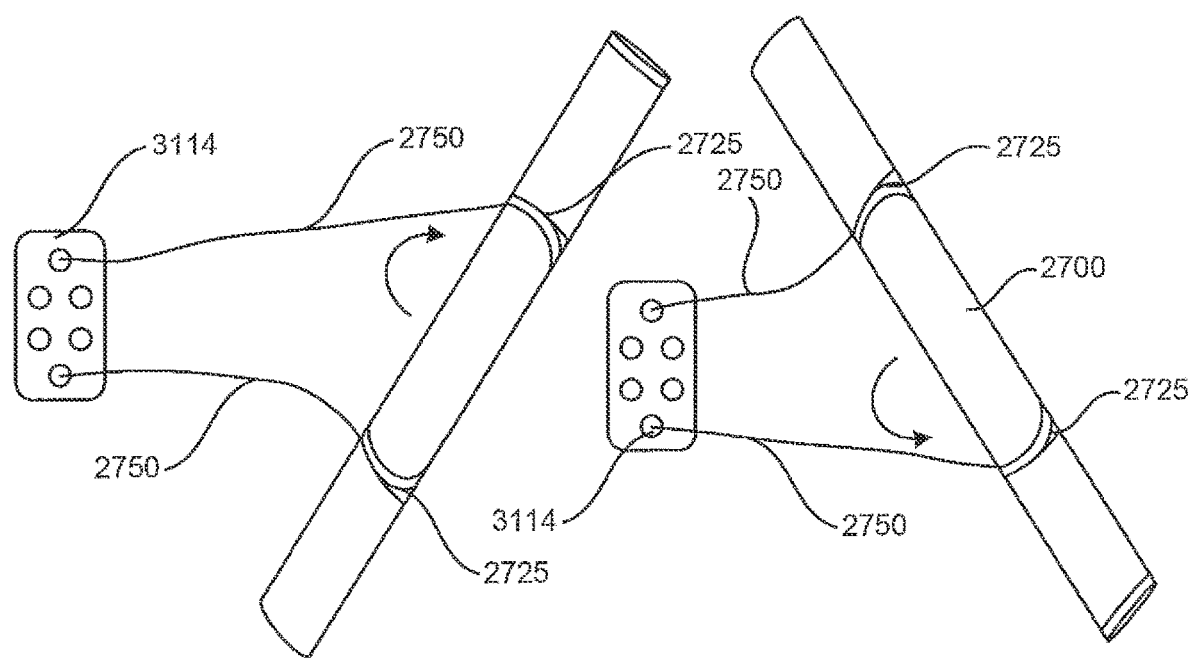

FIGS. 31A and 31B represents a portion of a method of implanting a tissue graft 3124 within a knee 3150 during an anterior cruciate ligament (ACL) repair and reconstruction procedure. Drilling procedures are performed to form one or more bone tunnels, such as the appropriately sized tibial tunnel 3118 extending through tibia 3116 and femoral tunnel 3122 through the femur 3120. Surgical construct includes a tissue graft 3124, a suture construct 3127 (such as loops 2412 and 2414 for example in FIG. 24, or loop construct shown in FIG. 8D) and a graft attachment device 3114.

In a first example using fixation device shown in FIG. 30, the suture tails 2750 may be coupled to a tensioning bar 2700 after the attachment device 3114 has been placed on the outer surface of femur, or before the attachment device 3114 has been threaded through the tunnels 3118, 3122. Each suture tail 2750 may be provided coupled to form a loop, the loop formed using a linking means 2755 means. Each suture tail 2750 may extend through an individual slot 2725 through the tensioning bar 2700, placing a length of each suture tail 2750 along a groove and the linking means within a notch 2770 along the groove 2760. The surgeon may then apply tension to the suture tails 2750 via pulling on the tensioning bar 2700 to draw the suture, graft attachment device, and tissue graft through the bone tunnel. For instance, the surgeon may pull on the tension bar 2700 to draw suture tails 2750 and loops 3127 through tibial tunnel 3118 and femoral tunnel 3122, so that the tissue graft 3124 is positioned within the femoral tunnel 3122 and tibial tunnel 3118. While pulling on the tension bar 2700 suture tails 2750 may by prevented from sliding along the tensioning bar 2700 as the linking means 2755 may be seated within notch 2770. The tension bar 2700 may be rocked, pulling on a first tail of the suture tails 2750 and then on the other, in an alternating rocking motion, as shown in FIG. 31B. This allows increased tension to be isolated and focused on the first tail followed by on the other. This places more tension on a single length of suture, more readily overcoming friction of the suture construct (cradle 2420 for example) and therefore providing a means of more easily reducing the suture loop.

In a second example using fixation device including a suture construct as shown in FIG. 8D, the suture loops 830a, 830b may be coupled to a tensioning bar 2700 after the attachment device 3114 has been placed on the outer surface of femur, or before the attachment device 3114 has been threaded through the tunnels 3118, 3122. In this example, at least one of the suture loops 830b for example may first have been passed through a graft tissue or bone block before being coupled to or passed through an aperture of a fixation device 3114, as disclosed herein. Each suture loop 830a, 830b may be looped around the bar 2700 and into its own cleat 2780. The tension bar 2700 may be rocked, pulling on a first loop 830a and then on the other, in an alternating rocking motion, in a similar manner as disclosed in FIG. 31B. This allows increased tension to be isolated and focused on the first tail followed by on the other. This places more tension on a single loop, more readily overcoming friction of the suture construct (cradle 820 for example) and therefore providing a means of more easily reducing the suture loop.

A number of implementations have been described. Nevertheless, it will be understood that various modifications may be made. For example, while the tensioning bar 2700 is shown in use with a knee joint, the tensioning bar can be used in other areas of the body, for example a hip or shoulder joint, and would be sized appropriately. The tensioning bar may be made out of many different materials such as stainless steel, aluminum, PEEK, a polycarbonate, acetal, etc, and may be intended for one time use or multiple uses. Although the tension bar 2700 has been described for use by hand, it is contemplated that the tension bar 2700 may be used with another instrument or may be connected to a pulling or winding device. Tension bar may be operatively coupled to a working head of a robot arm. Accordingly, other implementations are within the scope of the following claims.

Disclosed in FIGS. 32B-32F are a means of passing multiple sutures or suture loops through a target tissue with minimal friction/resistance and damage to this target tissue. For example, this may be required while coupling multiple suture loops and/or lengths of suture of an adjustable suture loop construct such as loops of construct 806 illustrated in at least FIG. 8D, through a graft. Grafts may include bone blocks or a Quadriceps Tendon (QT) for example. Disclosed in FIGS. 32B-32F is a means of passing multiple sutures with a single pass of a needle and thus reducing the number of suture passing actions, and consequently reducing the graft preparation time of a surgical procedure.

Figure 32A:
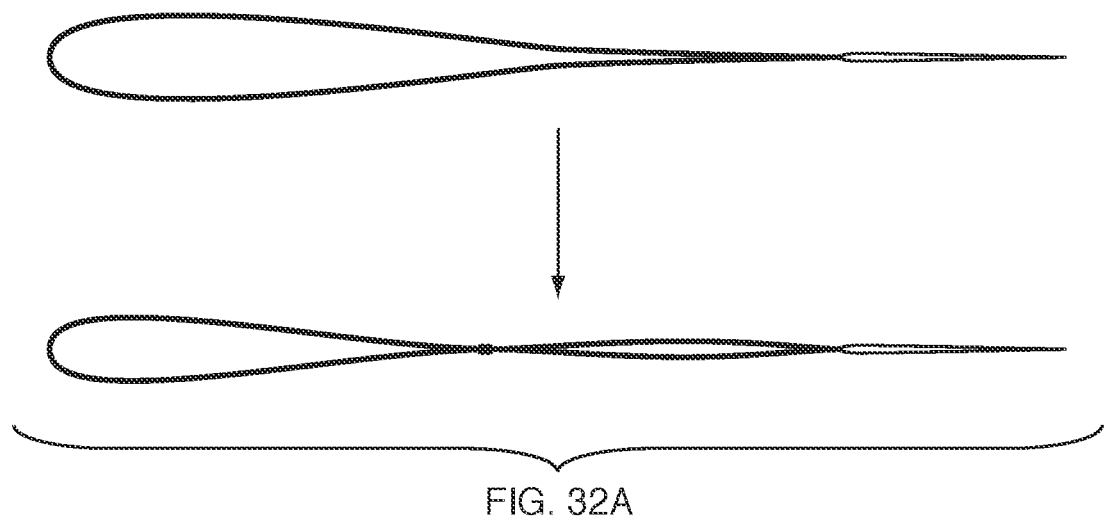
FIG. 32A shows a double loop needle system formed with a knot.

Passing multiple loops of suture around a suture passer such as a needle and threading each suture simultaneously causes extra friction/resistance while being passed through tissue. Passing multiple loops of suture through tissue one at a time multiplies the number of passing sutures. Another option is to knot a looped suture to form two serial loops (FIG. 32A). A first suture may be coupled to the first of the two serial loops, and a second suture may be passed through a second of the two serial loops. While passing the needle through tissue the two sutures may pull though the tissue in stages. Adding knots however causes extra resistance while passing through tissue and demands higher forces. Graft tissue is typically about 10 mm wide and 5 mm thick and may be quite slippery. Therefore handling this small and slippery tissue may be difficult, and passing multiple sutures that include changes is cross section, in the form of knots or large instantaneous changes in the number of suture lengths for example is awkward, time consuming and may damage the graft tissue. Therefore, there is a need to provide a means to pass multiple sutures through tissue with minimal friction/resistance and/or needless tissue damage.

Reference is now made to earlier figures disclosing an open loop suspensory fixation construct such as at least construct 106, 206 and 806. These constructs provide a free end that may be passed through graft tissue before assembling directly to a cortical button, such as button 1202 for example. FIG. 32C shows an open loop construct 3206 similar to at least construct 1205, the method of forming disclosed in at least FIG. 8D. Construct 3206 may include an anchor or cortical button 3220, a preassembled end 3230 and a free end 3240. Free end 3240 may be passed through and coupled to graft tissue as describe in at least 11B and 34A. Free end 3240 includes a loop end 3244 of an adjustable loop 3242 and a finger loop end 3246. Finger loop end 3246 and loop end 3244 may be offset from each other as loop end 3244 is configured to link around button 3220 while finger loop end 3246 is configured to pass through an aperture of button 3220 and extend away from button 3220 providing a means of adjusting the construct 3206. The proposed approach discloses a needle passing system with a means to stage passing these two loops (3244 and 3246) with a reduced force for a single pass of the needle through the graft tissue. This proposed approach includes a needle passing system avoiding a knot. A knot, as shown in FIG. 32A may increase passing force through the tissue. The disclosed needle passing system may include a double loop needle system.

Figure 32B:
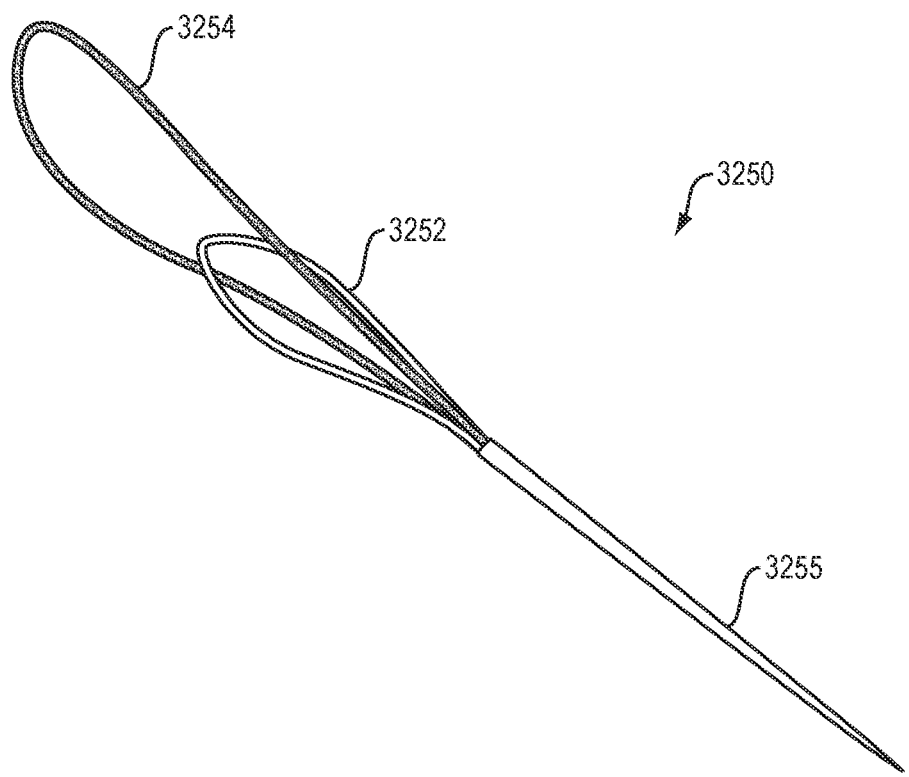
FIG. 32B illustrates a needle system including two loops in accordance with at least some embodiments.
Figure 32C:
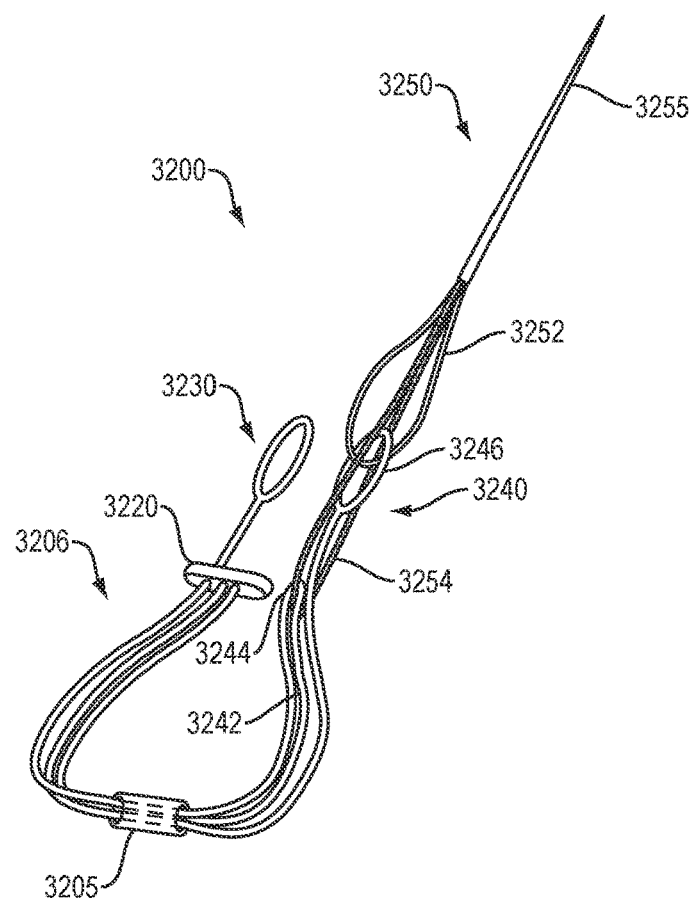
FIG. 32C illustrates an open looped fixation construct operatively coupled to a needle system in accordance with at least some embodiments.

FIG. 32B shows a first embodiment of a double loop needle system 3250 that allows multiple lengths of a flexible material to pass through a target tissue such as graft tissue while minimally adding to the volume of flexible material being passed each time. System 3250 includes two loops of flexible material with offset or different lengths, a first shorter loop 3252 and second longer loop 3254, both coupled directly to needle 3255. The loop material can be any flexible material suitable for coupling in a surgical procedure such as suture strands, monofilaments, or thin wires. Loops 3252 and 3254 may have different colors or marking for suture management. The loop length difference is determined based on the configuration of the loops 3252 and 3254.

An example method of use is represented in FIG. 32C, wherein first loop 3252 may be provided coupled to the finger loop end 3246 and the second loop 3254 may be provided linked to loop end 3244. The construct 3206 is initially, as shown, in an open loop configuration. Needle 3255 may be passed through graft tissue to draw both ends 3244 and 3246 through the graft tissue, the end 3246 being drawn first, end 3244 thereafter to stage the passing and reduce the passing resistance through tissue. Sleeve or cradle 3205 may now extend through graft tissue and loop end 3244 may be coupled to anchor 3220 to change construct 3206 to a closed configuration. Needle system 3250 may be disconnected from the loop end 3244 before coupling the loop end 3244 while the needle system 3250 remains coupled to end 3246. The needle 3255 may then extend through the cortical button 3220 to draw the finger loop end 3246 through an aperture of the cortical button 3220 before disconnecting the needle system 3250 from the finger loop end 3246. Tension on the finger loop end 3246 may reduce the adjustable suture construct 3206, in a manner similar to that described in at least U.S. Pat. No. 10,383,617 and disclosed herein in earlier figures. Needle system 3250 may be disconnected by cutting the loops 3254 and 3252. By offsetting the loops and not adding any knots, the passing force would be less (easier), saving OR time and potential graft damage.

Figure 32D:
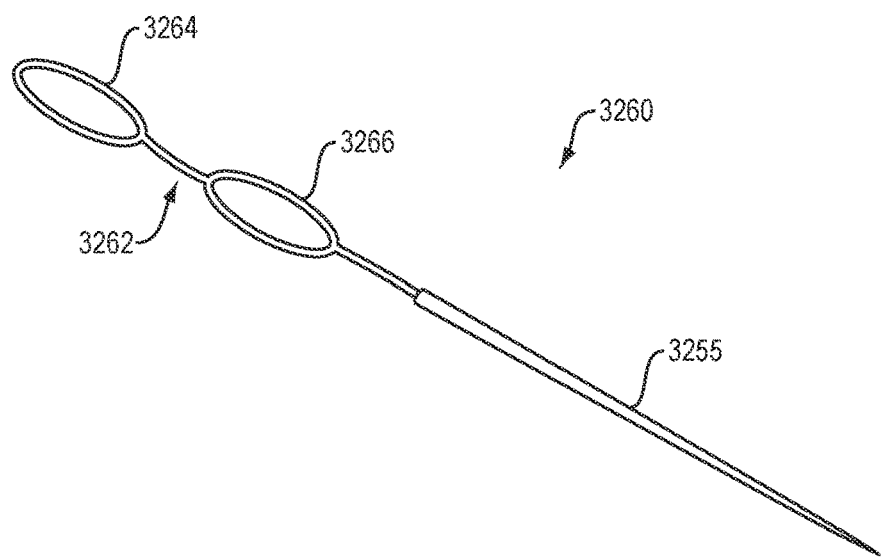
FIG. 32D illustrates an alternative needle system including two loops in accordance with at least some embodiments.

FIG. 32D presents a second embodiment of a double loop needle system 3260. This system 3260 may include a flexible member 3262 that is cinched to the needle 3255 and two axially spaced loops 3264 and 3266 extending therefrom along the single flexible member. Flexible member 3262 may be formed of a braided yarn and loops 3264 and 3266 may be formed by altering a weaving pattern during manufacture to form a bifurcation (i.e., the yarns of suture can be woven in different patterns to go from a single stand to bifurcated, then single then bifurcated.) First loop 3264 may therefore be operatively coupled to loop 3244 for example and second loop 3266 may be operatively coupled to the finger loop end 3246.

An example method of use may therefore include providing an adjustable loop fixation construct 3206 that has an opening loop configuration, and may be assembled with a double loop needle system 3260. The first loop 3264 may be provided coupled to the loop end 3244 and the second loop 3266 may be provided linked to loop 3246. Needle 3255 may be passed through graft tissue to draw both ends 3244 and 3246 through the graft tissue, one after the other. This may place sleeve or cradle 3205 through graft tissue before coupling the loop end 3244 to anchor 3220. Needle system 3260 may be disconnected from the two ends 3244 and 3246 by cutting the two loops 3264 and 3266. Needle system may first be disconnected from loop end 3244 and the loop end 3244 may be assembled to cortical button 3220, while the finger loop end 3246 remains coupled to the double loop needle system 3260. The needle 3255 may be used to extend the finger loop 3246 through an aperture of the cortical button 3220. Tension on the finger loop end 3246 may reduce the adjustable suture construct 3206, in a manner similar to that described in at least U.S. Pat. No. 10,383,617, as disclosed herein.

Figure 32E:
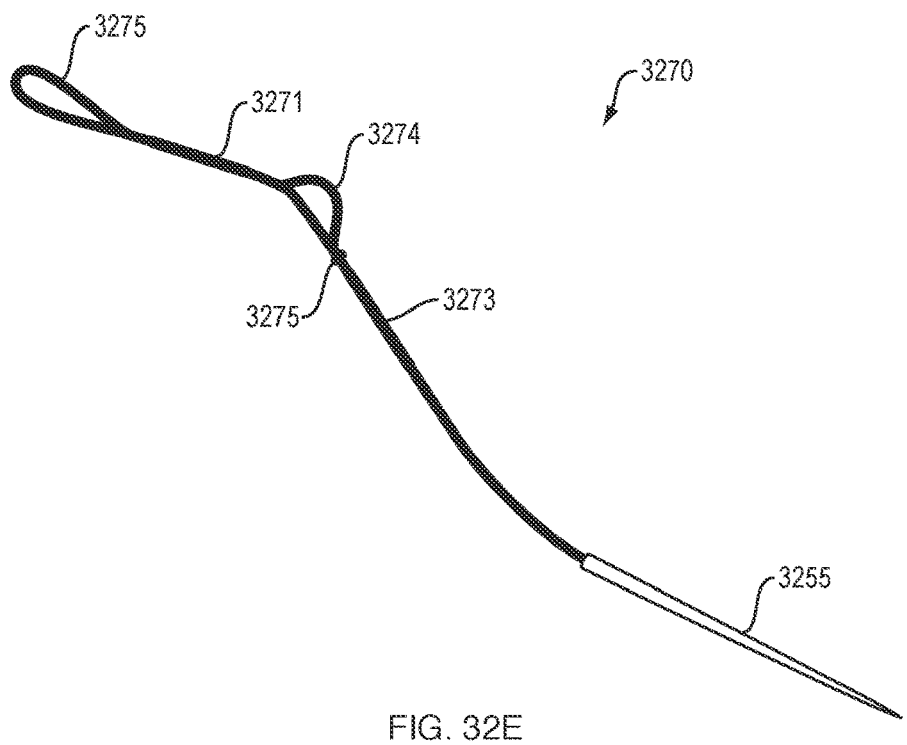
FIG. 32E illustrates an alternative needle system including two loops in accordance with at least some embodiments.

FIG. 32E presents another embodiment of a double loop needle system 3270. One end of a suture is cinched in a needle 3255, the other end may include two eye splices or finger-traps 3271 and 3273 with two loops 3272 and 3274 alternating between them.

This construct may be formed using a single flexible member that extends from the needle 3255, forms the first loop 3272 and then extends through itself for a length defining the first finger trap 3271. The suture then exits the finger trap 3271 for a short length before returning to extend along the core of the flexible member for a length, defining the second finger trap 3274. There may be a low profile knot 3275 formed using a reciprocity of splicing adjacent the second loop 3274 to stop the suture from sliding along itself. Reciprocity of slicing may be similar to that disclosed in at least U.S. Pat. No. 10,383,617, commonly owned and herein incorporated by reference.

An example method of use may therefore include providing an adjustable loop fixation construct, such as example construct 3206 that may be assembled with a double loop needle system 3270. The second loop 3274 may be provided coupled to the finger loop end 3246 and the first loop 3272 may be provided linked to loop end 3244. Needle 3255 may be passed through graft tissue to draw both ends 3244 and 3246 through the graft tissue. This may place sleeve 3205 through graft tissue before coupling the loop end 3244 directly to anchor 3220. Needle system 3270 may be disconnected from the two ends 3244 and 3246 by cutting the two loops 3272 and 3274. The first loop 3272 may be detached first with the second loop still attached until the end 3244 is coupled to the anchor 3220. Tension on the finger loop end 3246 may reduce the adjustable suture construct 3206 as disclosed herein. Needle system 3250 may have a straight needle 3255 or curved.

FIG. 33A-33C illustrate alternative embodiments of open loop adjustable suture constructs that allow a staging of passing flexible members through a graft tissue using a bypass loop 3310 Similar to the FIG. 32B-F, adjustable fixation construct 3300 may be an open loop adjustable construct with a free end 3340 including the finger loop end 3346 and loop end 3344. Free end also includes a bypass loop 3310. Bypass loop 3310 may be formed during weaving or manufacture of the flexible member 3305 and may be a bifurcated portion where some of the yarns are woven for a short distance to form two separate lengths of flexible material before weaving back together. Alternatively, bypass loop 3310 may be formed using eye-splices or finger cinches, or reciprocating splices as described herein. An example method of forming finger loop end 3346 and loop 3310 will now be described with reference to FIG. 33B. End of flexible member 3305 may form a loop to form finger loop end 3346 and then extend along a hollow core of flexible member 3305 to form eye splice 3311. End of flexible member may then exit the hollow core and thread through loop end 3344, and enter the hollow core again at point P forming bypass loop 3310. End of flexible member may then form a reciprocating splice adjacent point P to keep it in place, or be fixed in place using an adhesive for example. Bypass loop 3310 is preferable marked to be readily discovered by the surgeon, and may be a different color or shape for example than the rest of the flexible member 3305. System 3300 may be operatively coupled as provided to a needle system 3350 with a single loop 3252 of flexible material. The single loop 3252 may be formed as suture strands, monofilaments, or thin wires. Loop 3252 may have a different color to the flexible member 3305 and bypass loop 3310 for suture management.

An example method of use may include passing a free end 3340 of an open loop adjustable fixation construct 3300 through graft tissue, the free end including a finger loop end 3346 directly coupled to a needle system 3350. The free end 3340 also includes a loop end 3344 operatively coupled to a bypass loop 3310 of the construct. The construct 3300 may initially in an open loop configuration defining the finger loop end 3346 and loop end 3344 with a second end 3330 operatively coupled to a cortical button 3335. Needle 3255 may be passed through graft tissue to draw both ends 3344 and 3346 through the graft tissue, until the cradle 3355 extends through graft tissue. Bypass loop 3310 may then be cut to release loop end 3344. Bypass loop 3310 is easily discovered and distinguished from other portions of flexible material to cut only the bypass loop.

This may be achieved with markings, shape or colored dies for example. Loop end 3344 may then be coupled to anchor 3220 to change construct 3300 to a closed configuration. Needle system 3350 may remain coupled to the finger loop end 3346 while coupling the loop end 3344. The needle 3255 may then extend through an aperture in the cortical button 3220 to draw the finger loop end 3346 through the aperture before disconnecting the needle system 3350 from the finger loop end 3346. Tension on the finger loop end 3346 may reduce the adjustable suture construct 3300, in manner similar to that described in at least U.S. Pat. No. 10,383,617. Needle system 3350 may be disconnected by cutting the loop 3254.

Figure 32F:
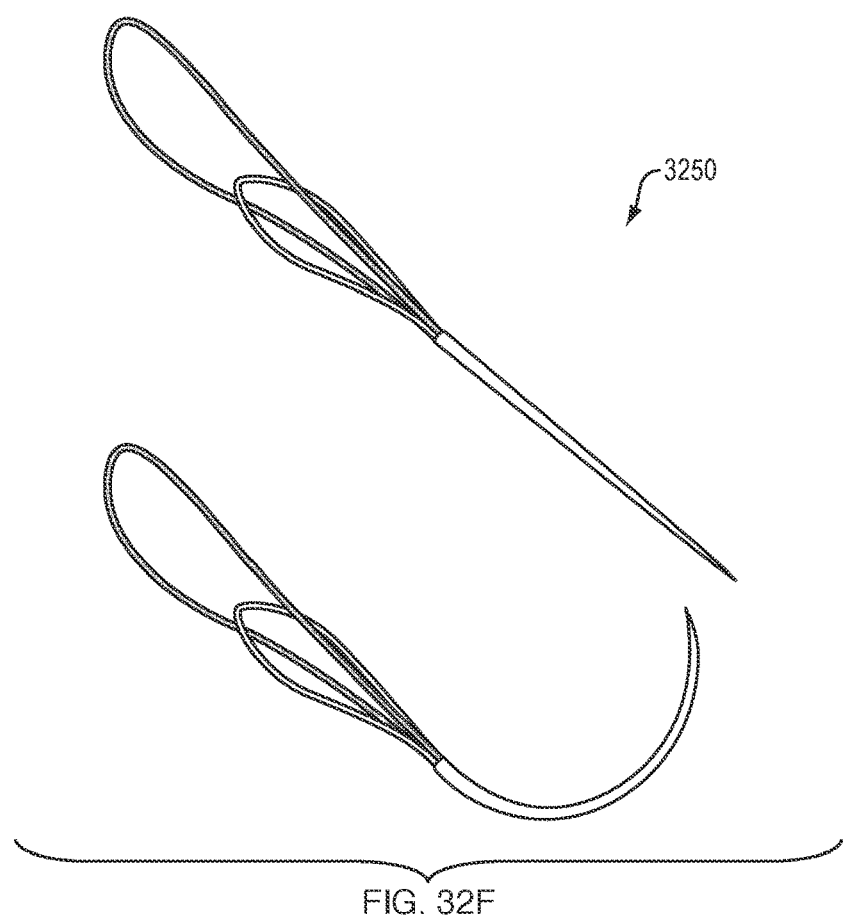
FIG. 32F illustrates an alternative needle system including two loops in accordance with at least some embodiments.

FIG. 33C shows a similar embodiment to that shown in FIG. 33A and 33B, with the exception that it discloses an adjustable fixation construct 3350 with two free ends 3360*a* and 3360*b*. This may be termed a symmetrical open loop configuration. At least one of the free ends (3360*b* shown) may be coupled to needle system 3350. Both free ends 3360*a* and 3350*b* may include a bypass loop 3310*a* and 3310*b*. This system allows for the cortical button such as button 800 to be coupled at the surgeon's choice and prevents the loop ends being inadvertently pulled out the cradle 3355, as this would destroy the construct The number of loops can be more than 2 loops, with different offset lengths per design requirements. The needle can be straight or curved (FIG. 32F). The material of the loop could be suture (size depends on design requirement, but generally the thinner the better, without compromising strength), monofilament or even a metal wires.

Connecting adjustable suture constructs to grafts is sometimes achieved by forming a herringbone stitch through the graft, as shown in FIG. 15C-15G. This may require the use of connecting tape or suture and may be difficult to pull multiple loops of suture through the graft. Alternatively, the graft may be split into two "legs" for about ⅔ along it longitudinal axis and passed through a closed adjustable loop construct such as that disclosed in at least U.S. Pat. No. 10,383,617. In this option, the legs are stitched back together to secure the loop within the graft. This approach is time consuming in operating room, and may compromises the integrity of the graft. In addition, sutures that stitch back the legs together, add to graft volume. Therefore, there is a need to couple an adjustable suture construct directly to graft tissue, without the need for tape or suture, pulling multiple suture loops simultaneously through the graft or splitting the graft.

Disclosed herein therefore is a method of forming a stitch through tissue with a single free end of an open loop adjustable fixation construct such as constructs disclosed herein in at least FIG. 1A-FIG. 8D and FIG. 32C. This may attach the loop of a fixation construct to graft tissue directly without the need for a connecting tape or suture; may improve the integrity of the graft; may decrease the graft preparation time in OR; and is very versatile, i.e., can be used for soft tissue and hard tissue (patellar graft, or QT with bone block) and different type of grafts, for ACL reconstruction or ACL repair or other ligament reconstruction procedures.

Figure 34A:
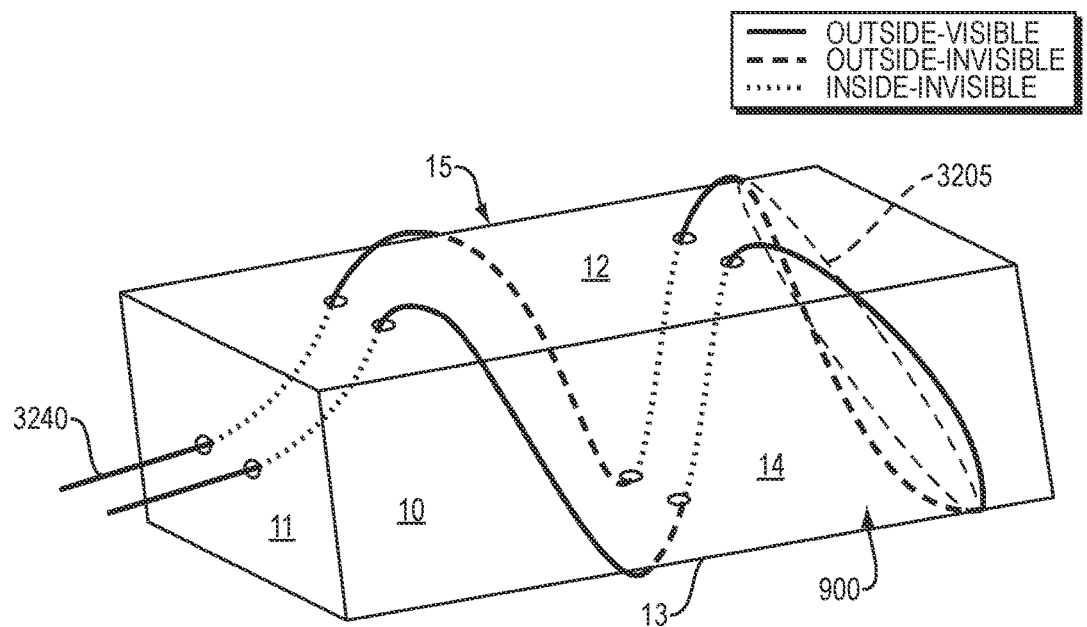
FIGS. 34A-34B illustrate a method of coupling an open looped fixation construct to tissue.
Figure 34B:
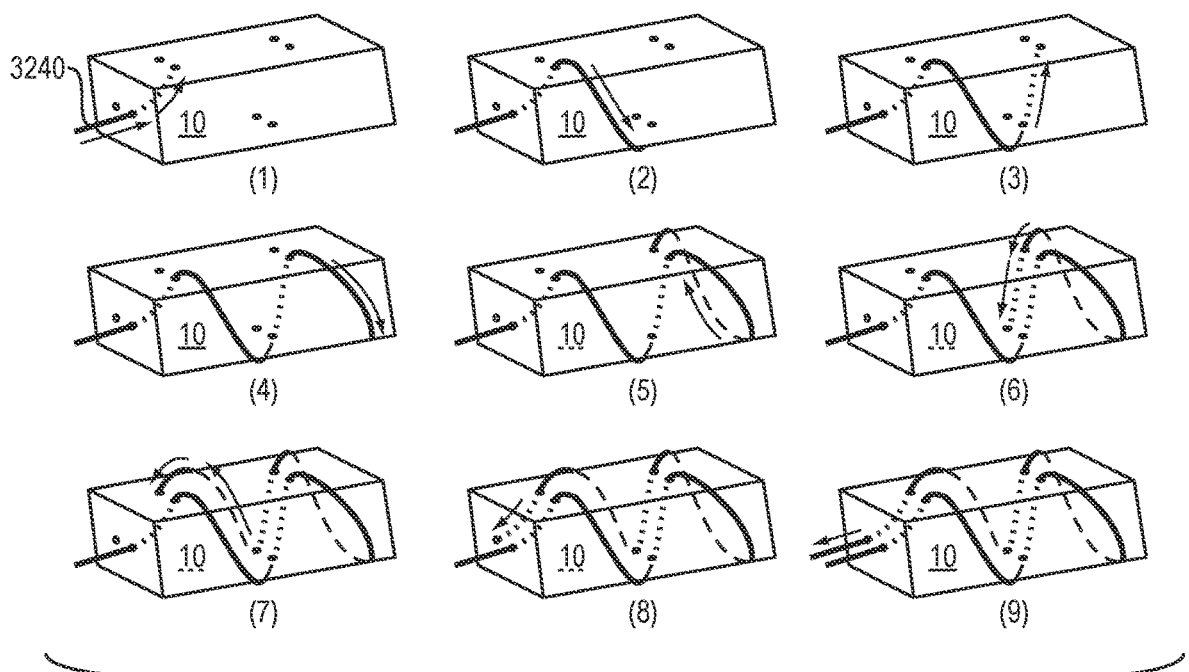

The open looped construct may be similar to constructs disclosed herein, including at least construct 3206 and includes a free end 3240 that may be drawn through the graft tissue using a double needle system as disclosed in FIG. 32B-32F for example. The free end (which may include finger loop end 3246 and loop end 3244) of the open loop construct can be passed through soft tissue graft along the path shown in FIGS. 34A and 34B using a suture passer such as passer 3250. The final cradle location 3205 is shown in FIG. 34A. FIG. 34B shows the steps method of passing of the free end 3240 through the graft tissue 10 to form a stitch through the graft 10. Graft defines a front face 11, a top surface 12, bottom surface 13, first side surface 14 and second side surface 15. In order to pass the free end of the loop through the soft tissue, either a looped needle or a suture passer can be used. Shown in Step 1 the free end 3240 may be passed from a front surface 11 to top surface 12, then wrapped around first side surface 14 (step 2) before passing from the lower surface 13 through to the top surface 12 (step 3). Step 2 and step 3 may be repeated. End 3240 may the wrap around the lower surface of graft to the second side surface 15 into the top surface 12 and out of the bottom surface 13 of the graft (step 6). From the bottom surface 13, end 3240 may wrap around the second side external surface then into the top surface 12 and out of front surface 11 (step 7 and 8). End 3240 is drawn through graft 10 and preferable places cradle 3205 around the two side surfaces 14 and 15 and lower surface 13, along the graft 10 and spaced away from front face 11.

The entry and exit point of suture is designed to be on front face 11 of the graft 10 to avoid bunching up during passing graft through tunnel. Since the entry and exit points are apart, a more even stress distribution through graft 10 would be provided (it could be ⅓, ⅓, ⅓ evenly, or any other way, for instance ¼, ½, ¼, etc.) While two passes are shown in FIG. 34A and 34B, the number of rows of stiches is flexible and can be selected by the surgeon. Passing a free end 3240 through the graft 10 may form any number of stitching patterns/techniques including but not limited to Krackow, whip stitches, baseball stitches, etc. Exit and entry points may be on different faces to form different stitches through the graft.

Figure 35A:
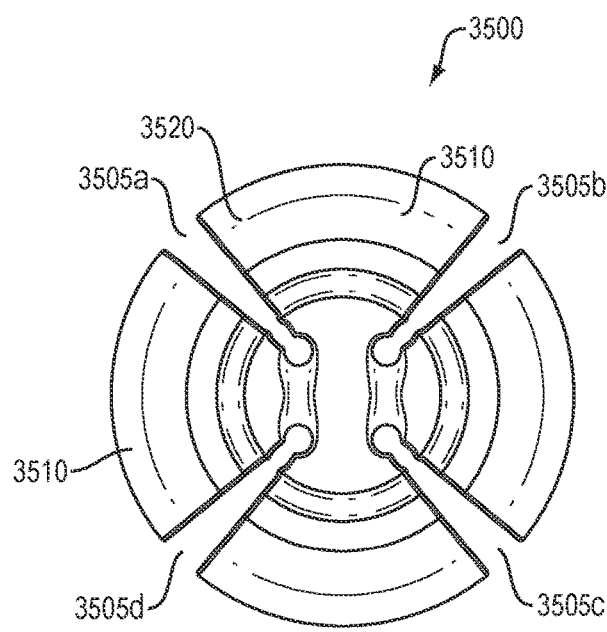
FIGS. 35A-35C illustrate a low profile tibial button in accordance with at least some embodiments.
Figure 35B:
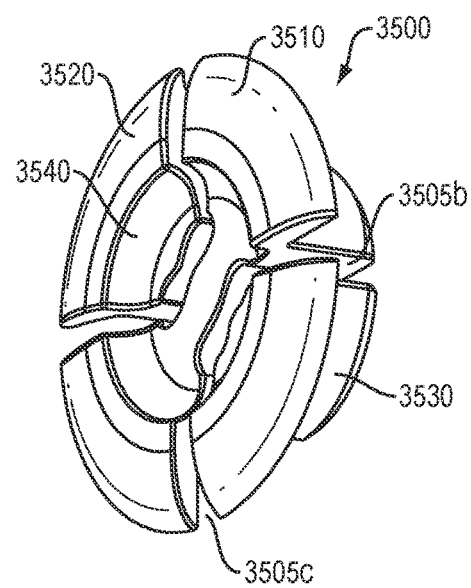
Figure 35C:
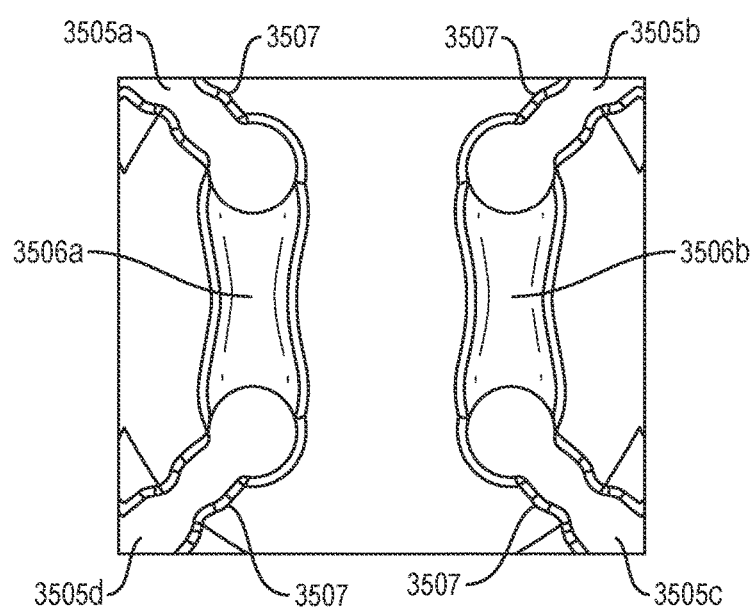

Turning now to FIGS. 35A-35C, a button style anchor is disclosed that may be operatively coupled to a suspensory fixation construct such as those disclosed herein to fix the tibial side of the reconstruction. This is closer to the patient's skin with less inherent muscle, fatty layers and connective tissue in the area and may be noticeable to the patient. Some attempted solutions have tried fixing the tibial side with a screw style anchor placed within the prepared tibia tunnel, but this has not sufficiently addressed the needs to adjust the tension on the graft tissue. Some attempted solutions have tried fixing the tibial side with a thin and squared or rectangular cross-section profile button-style anchor, but this has not sufficiently addressed the needs to provide a less palpable button. A minimal profile means of fixing the graft to the tibial cortex is therefore needed for improved tactile feel.

FIG. 35A and 35B illustrate a variety of views of a low profile button style anchor 3500 that may couple flexible members of a fixation construct to the tibial cortex. A head portion 3520 is configured to sit proud of the cortical surface while the body portion 3530 may extend into the tibial tunnel. Head portion is configured to be low profile, including a dome or rounded top surface 3510 to reduce palpation by the patient. Anchor 3500 may define a circular cross section for increased contact surface with cortical tibial bone and thereby improve stress distribution around the anchor. This allows for a reduced thickness (T) of the head 3520 (see FIG. 36c) and therefore lower profile head 3520 with reduced tactile feedback to the patient for the same mechanical strength. In addition, a dome-shape profile on the top (or any gradual change of profile) helps providing a smoother tactile feeling. Other shapes may include an oval or rounded rectangular shape.

A cavity 3540 in the center of the anchor 3500 button is configured to house any knots formed with flexible member constructs therein. This maintains the knots preferably below the top surface 3510 to reduce tactile feedback to patient. Body portion 3530 may be tapered such that the anchor 3500 may be press fit into the tibial tunnel and may improve fixation.

Anchor 3500 includes a plurality of radially oriented slots 3505a, 3505b, 3505c and 3505d that extend through both the head 3520 and body 3530. Slots 3505a, 3505b, 3505c and 3505d are configured to receive flexible members of a fixation construct therethough. Slots 3505a, 3505b, 3505c and 3505d are tapered having a maximum opening at the outermost peripheral edge of the head 3520 and narrows as each slot extends medially. A narrowing profile 3507 along each slot 3505 may also help retain flexible member within medial end of slots. Slots 3505a, 3505b, 3505c and 3505d are generally configured to direct flexible members into the slot medial end and helps maintain the flexible members therein. These flexible members may be used for suture loop reduction. Slots 3505a, 3505b, 3505c and 3505d all terminate and intersect a recess 3506a or 3506b best seen in FIG. 35C. Two slots 3505a and 3505d each terminate at ends of recess 3506a. Recess 3506a extends between ends of slots 3505a and 3505d. Recess 3506a is continuous with and lies below bottom of cavity 3540. Recess 3506a is configured to receive a flexible member therein. For example, a loop of a flexible member may extend through both slot 3505a and 3505d and nest within recess 3506d.

Figures 36A, 36B:
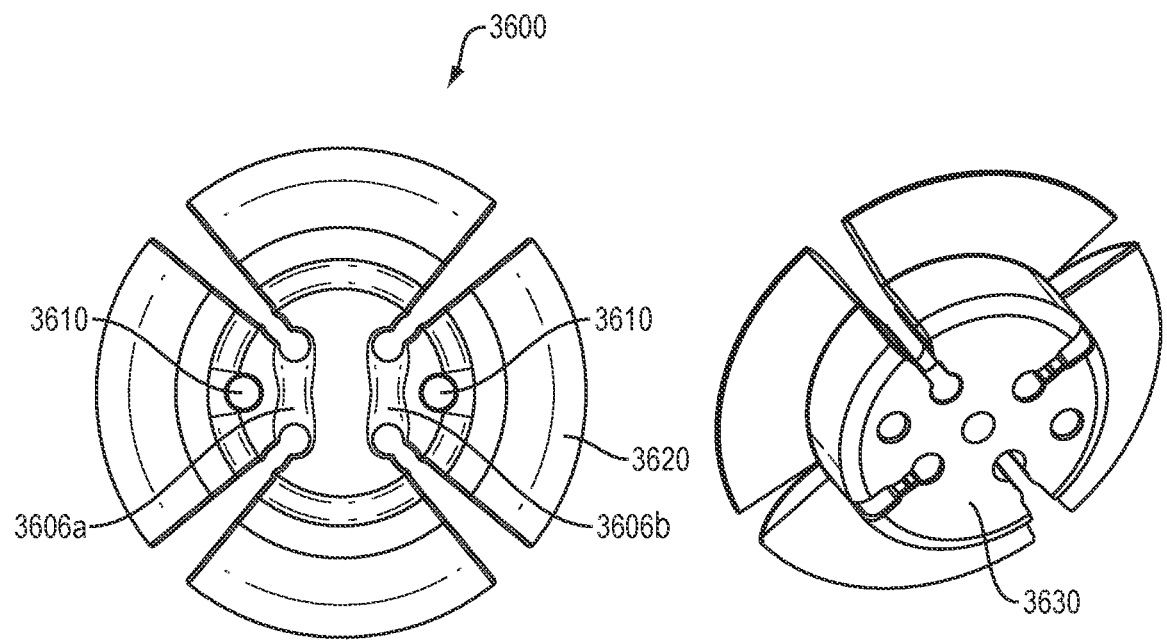
FIGS. 36A-36C illustrate an alternative low profile tibial button in accordance with at least some embodiments.
Figure 36C:
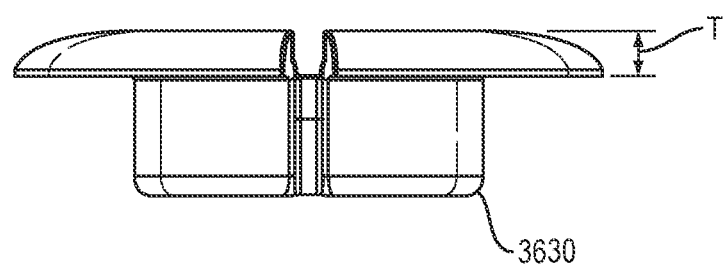
Figures 37A, 37B:
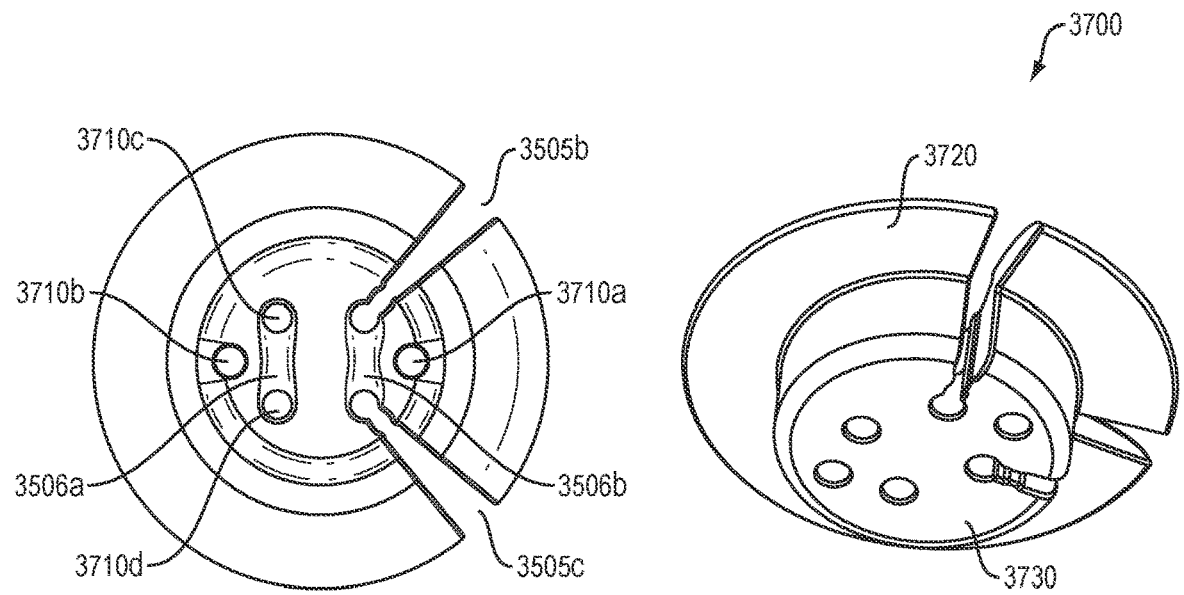
FIGS. 37A-37B illustrate an alternative low profile tibial button in accordance with at least some embodiments.
Figure 37C:
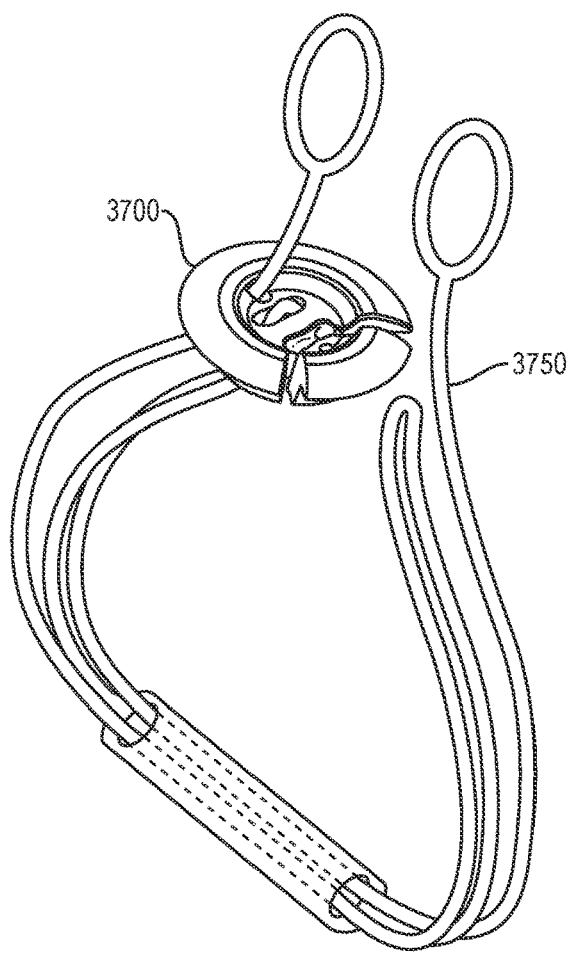
FIG. 37C illustrates an open loop fixation construct assembled to a low profile tibial button in accordance with at least some embodiments.

FIGS. 36A-36C illustrate an alternative embodiment 3600 with the addition of at least two holes 3610, extending through both the head 3620 and body 3630. Ends of a flexible member may extend along a tibial tunnel and then through these at least one of these two holes 3610. Tension applied to these flexible member ends may reduce an adjustable construct, or apply tension to a graft. The at least two holes 3610 are disposed either side of recesses 3606a and 3606b, and may lie on a line through the center of anchor 3600. FIGS. 37A-37C illustrate an alternative embodiment 3700 with asymmetric slots and holes. Button 1600 includes two slots 3505b and 3505c. Anchor 3700 includes at least four holes 3710a, 3710b, 3710c and 3710d.

All holes and slots extend through both the head 3720 and body 3730. Shown in FIG. 37C, ends and loops of a flexible member may be threaded through at some of these holes 3710a, 3710b, 3710c and 3710d. In this embodiment, flexible members of an adjustable fixation construct may be provided pre-assembled to button 3700 and may include a loop pre-assembled through holes 3710c and 3710d. Similar to open loop configuration adjustable constructs described herein a free end 3750 may be passed through graft tissue before extending along slots 3505b and 3505c. Loop end 3750 may lie within recess 3506b once assembled with button 3700. Button is configured to engage a tibial cortex end of prepared ACL tunnel.

When using an Open Loop Adjustable Fixation construct such as construct 106 or 3206 for example, suture and anchor management in a procedure requires a different and more complex operation that for a closed loop adjustable fixation construct. For example, the anchor is small, and may be difficult to see and even more difficult to work with, especially with wet/greasy gloved hands and a lack of dedicated supporting instrumentation. In addition, the multiple lengths and loops of suture may be difficult to keep track of and inadvertent cutting of the wrong suture may destroy the entire construct. A means of managing this construct is therefore disclosed herein to improve procedure efficiency and avoid costly errors. Additionally, the tool or jig is designed to provide tactile feedback when mating the suture loop and implant hole slots, reducing the need to visualize small mating features.

Figure 38:
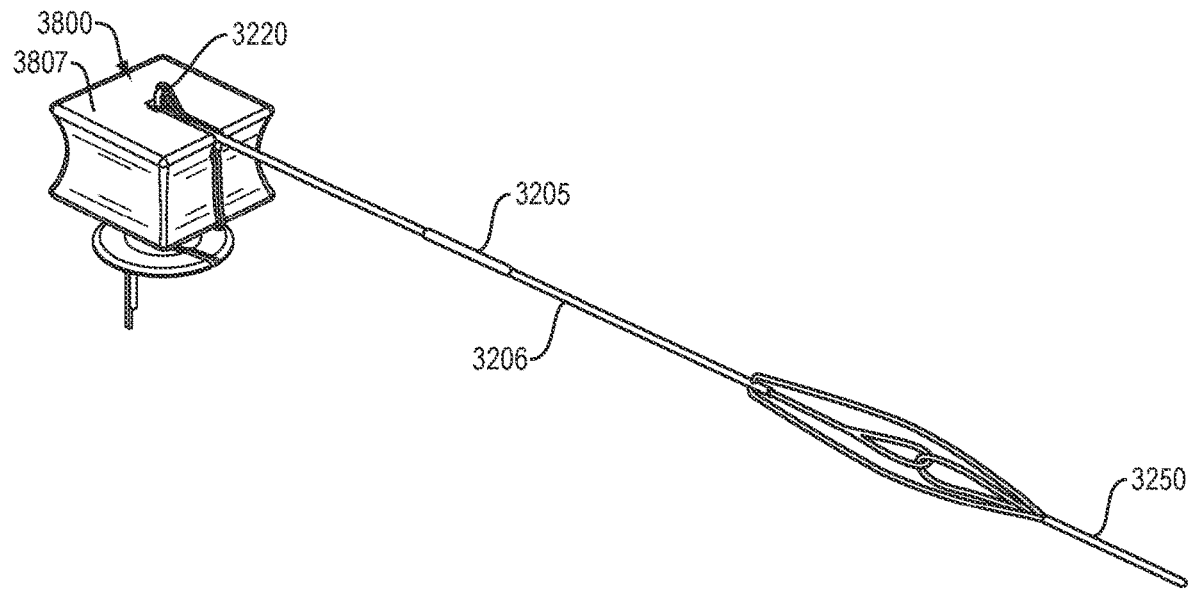
FIG. 38 illustrates an open loop construct assembly tool in accordance with at least some embodiments.

Disclosed is FIGS. 38 is a management and assembly tool for an open looped adjustable fixation construct with the button implant (anchor) and flexible member pre-loaded. The assembly tool provides a means of suture management and may facilitate simpler assembly of anchor and suture by allowing the user a means to securely handle the tiny implant while manipulating suture into the respective features on the implant. Disclosed herein is an adjustable suture construct management and assembly tool with means of securely holding the anchor to allow for rigorous manipulation of suture on the anchor without concern of dropping/dislodging the anchor. This tool may be provided packaged and preassembled with the button/suture on it and would allow for use out-of-the-box without the need to assemble the anchor into a fixture before subsequently assembling suture onto it.

Figure 39A:
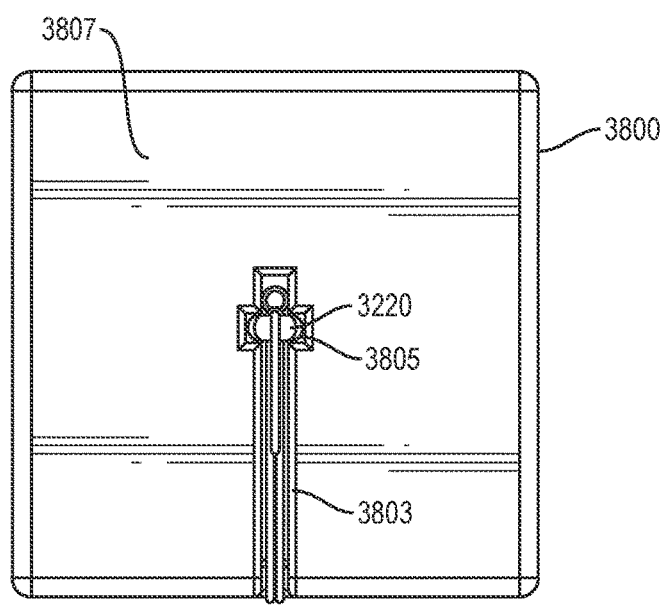
FIG. 39A-39D illustrate various views of the assembly tool in accordance with at least some embodiments.
Figure 39B:
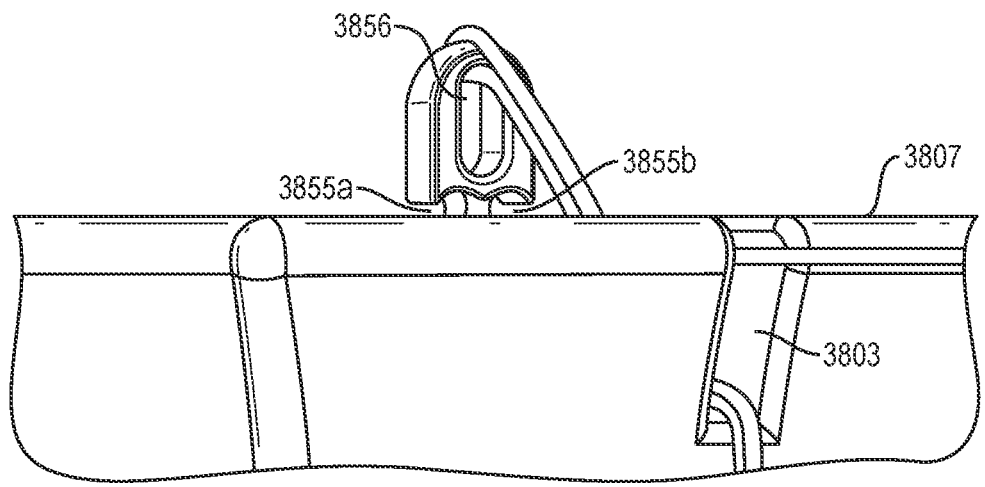

FIG. 38 illustrates an overall view of the assembly tool 3800. Assembled thereto is an example anchor (button implant) 3220 and adjustable loop construct that may include a cradle portion 3205, an example open loop adjustable suture construct 3206 and an example double needle system similar to system 3250. Assembly tool 3800 may be cube-shaped with contours for easy handling, although other shapes that nest easily within a surgeon's hand are contemplated. Assembly tool may include means to clip to or couple to a position arm or drape of a patient (now shown). Assembly tool 3800 may include channel 3803 for nesting a length of flexible member of example adjustable suture construct 3206. Best seen in at least FIG. 39A, channel 3803 extends medially where it transitions to a slot 3805 that conforms to a shape of the anchor 3220, to nest and hold cortical button or anchor 3220. Tension on the suture construct along the channel 3803 does not release the anchor 3220. Anchor 3220 may be nested and oriented orthogonally to slot longitudinal axis. Slot 3805 may be configured to nest anchor 3220 within the slot to sit upright within the slot 3805 and protrude a little beyond a top surface 3807. Shown in at least FIG. 39B, the depth of slot 3805 preferably places the anchor slots 3855a and 3855b above surface 3807. Slots 3855 are configured to receive the free end (such as free end 3240) of suture construct, as disclosed herein. Slots 3855a and 3855b may be similar to slots 1210 shown in at least FIG. 12B. A portion of slots 3855a and 3855b may be flush with surface 3807. In providing this feature, the user is able to align the loop, such as loop 3244 with the surface 3807 of the assembly tool 3800 and simply pull on the construct 3206 to engage the loop 3244 within the hold slots 3855a and 3855b, rather than having to visualize the slots 3855a and 3855b and attempting to align the suture loop while applying tension. FIG. 39B also shows an aperture 3856 for receiving a finger loop end therethrough.

Figure 39C:
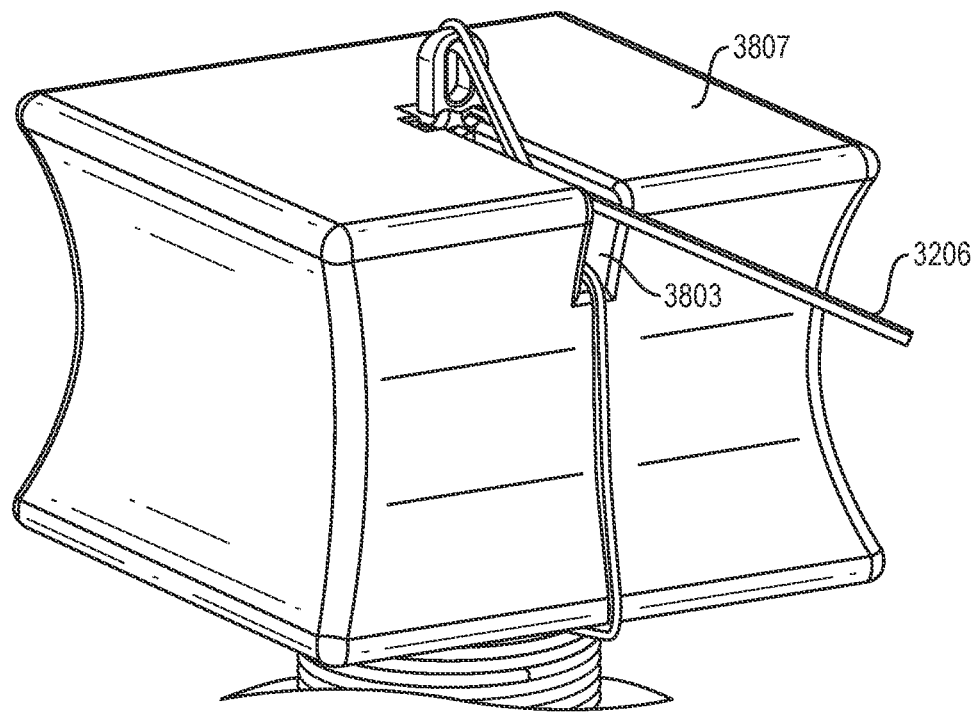
Figure 39D:
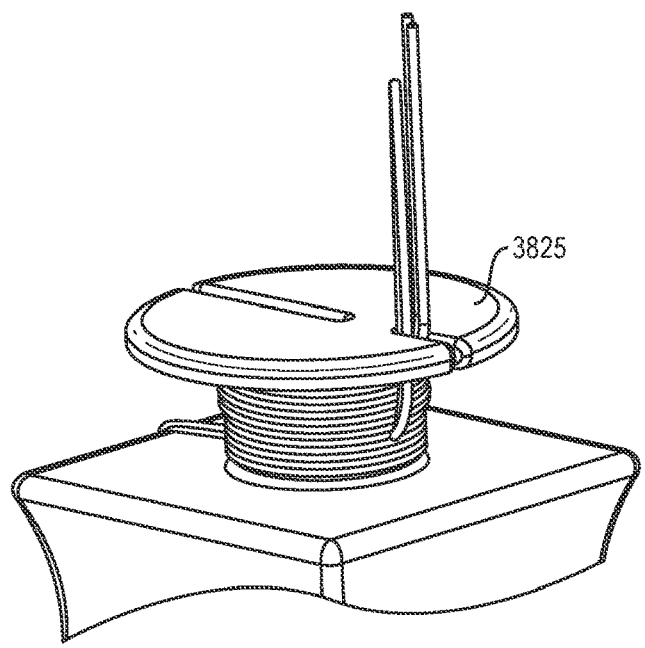

FIG. 39C illustrates channel 3803 and example adjustable suture construct 3206 extending therealong. For example construct 3206 may include a first pre-assembled side similar to side 1206a shown in FIG. 12B. The portion of the open loop adjustable suture construct 3206 that is not attached to the anchor 3220 is free to manipulate outside of the tool 3800 to allow assembly to BTB graft or QT tissue. FIG. 39D illustrates the underside of tool 3800, including a suture management bobbin 3825. From the bottom of the slot 3805 is a through-hole (not shown) which runs the depth of the assembly block 3800 (not shown). This through-hole allows a first suture, coupled to the anchor 3850 to be passed through the assembly jig 3800 and wound tightly around the bobbin feature 3825 on the bottom of the assembly tool 3800. By winding the suture and subsequently cleating it within the bobbin feature 3825, the button 3850 is secured into the slot 3805 to allow for manipulation of the construct 3806 around the button 3850 without fear of the button 3850 becoming dislodged from the tool 3800.

Figure 40A:
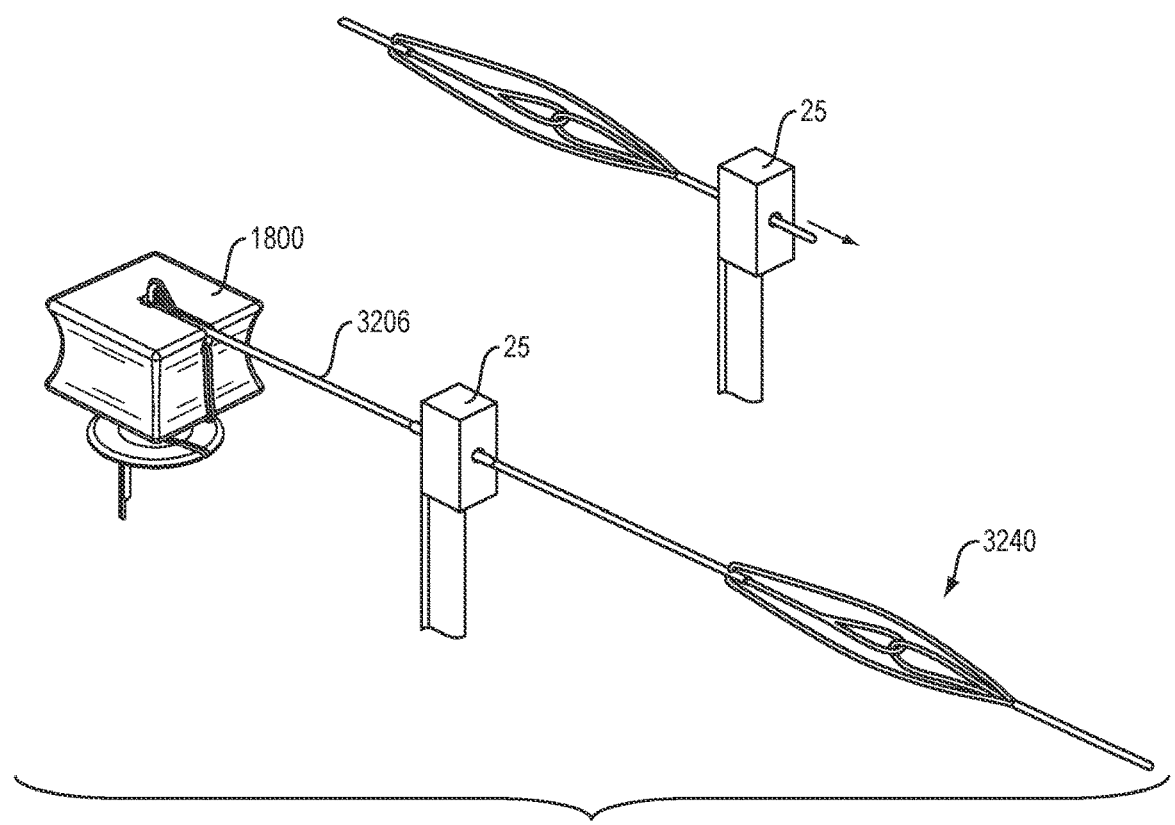
FIG. 40A-40F illustrate a method of repairing tissue using an open loop fixation construct and assembly tool of FIG. 38 and FIG. 39A-39D, in accordance with at least some embodiments.
Figure 40B:
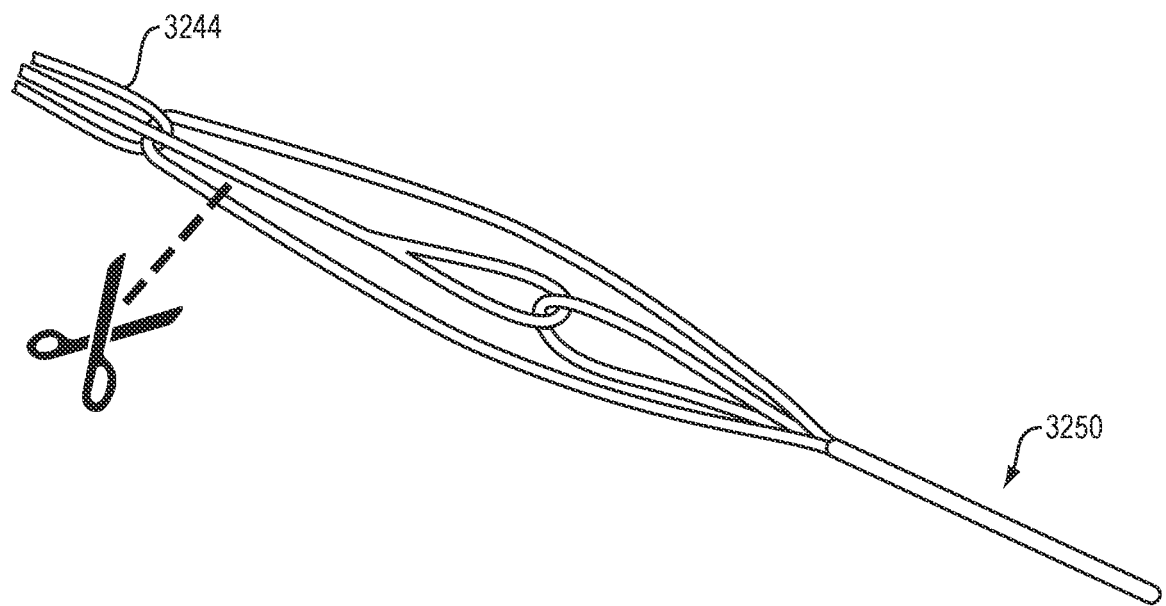
Figure 40C:
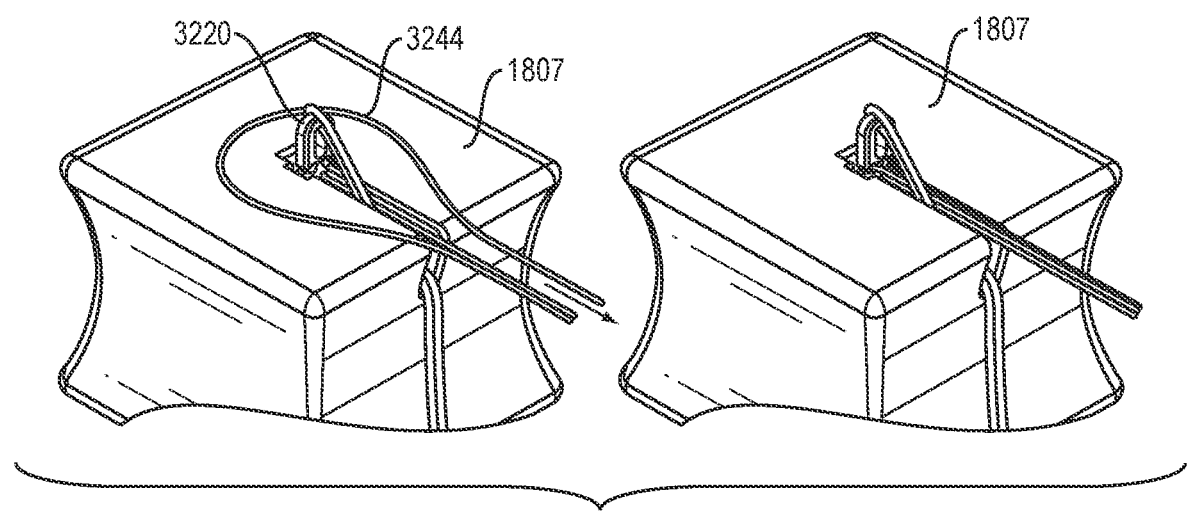
Figure 40D:
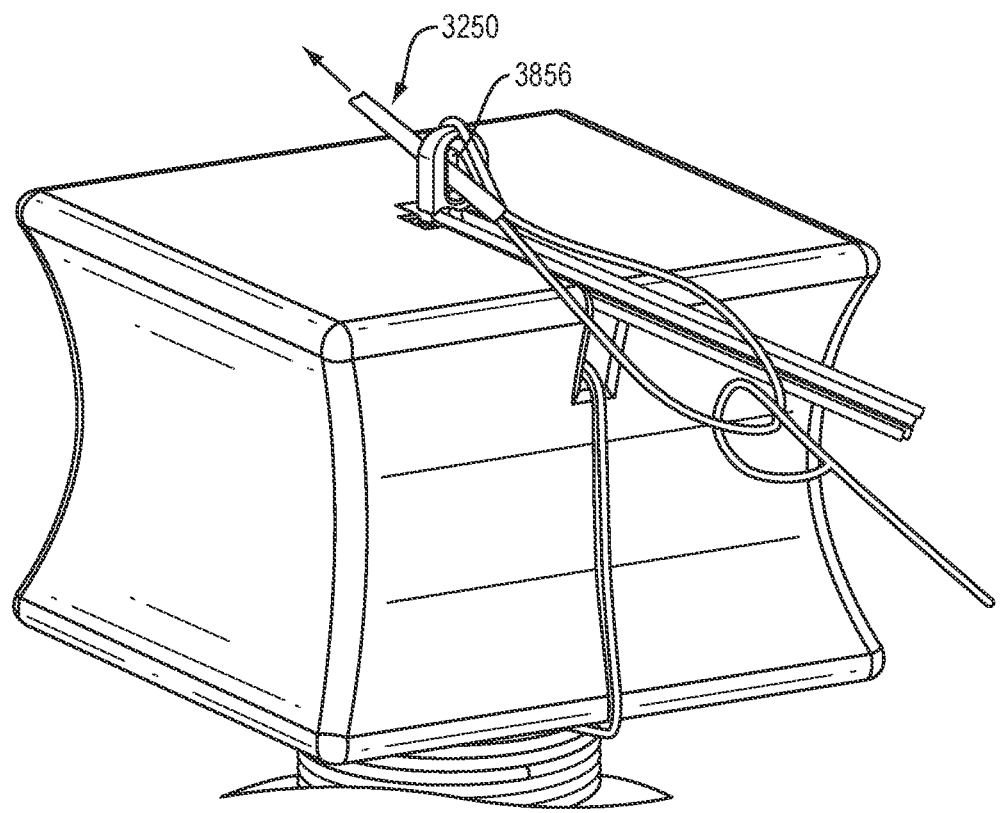
Figure 40E:
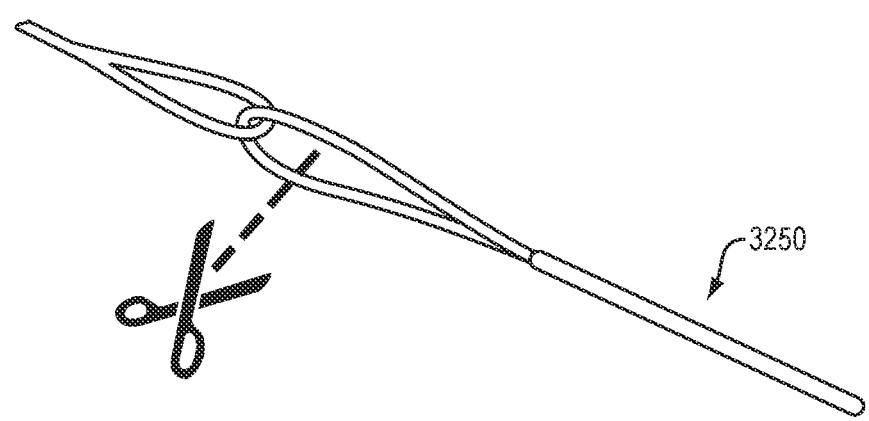
Figure 40F:
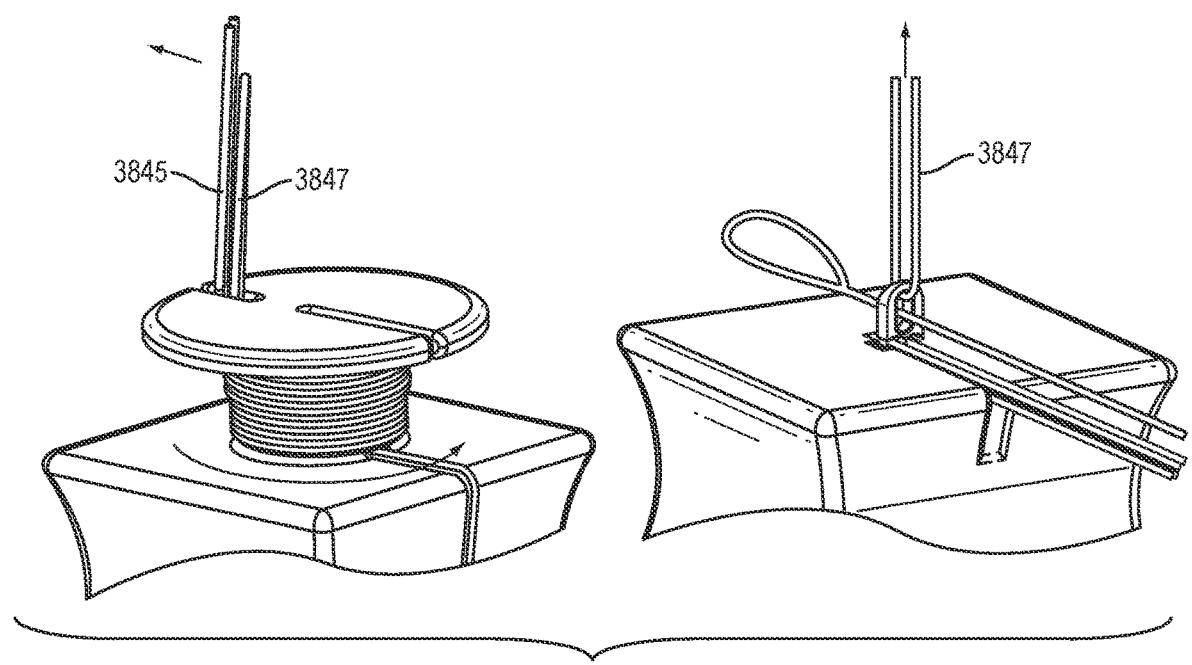

FIGS. 40A-40F show an example method of using the assembly tool 3800 to couple an open looped adjustable construct such as construct 3206 with graft tissue such as tissue 25. Other constructs described throughout this disclosure may assemble to tool 3800 in a similar manner. FIG. 40a shows Step 1, passing a free end 3240 of the open looped adjustable construct 3860 though graft tissue 25. This tissue may include a tunnel of a bone block. Passing may be achieved using a double loop suture system 3250 for example. Cradle 3205 may be place within tissue 25. FIG. 40B illustrates the next step including detaching the suture loop 3244 of the free end 3240 from passing system 3250. This may include cutting through the second suture segment of the system 3250. FIG. 40C illustrates placing the freed suture loop flush onto the face 3807 of the assembly tool and around the anchor 3850 and pulling forcefully in the direction of the suture channel 3803 engages with the button 3220. Suture loop 3244 may extend through and into slots 3855a and 3855b of anchor 3850. FIG. 40D illustrates the step of passing a needle of the needle system 3250 for example through the aperture 3856 of the anchor 3220 and pulling the finger loop through. FIG. 40E illustrates detaching the finger loop from system 3250 by cutting through the first suture segment of the system 3250. FIG. 40F illustrates uncleating the sutures and subsequently unwinding them one at a time, beginning with the first length of suture 3845 and then the second length of suture 3847. Once both sutures 3845 and 3847 have been unwound, the assembly tool may be flipped over and tension on the second suture 3847 may remove construct 3206 from tool with the free end 3240 now assembled with anchor 3220 and the cradle 3205 extending through the graft tissue 25.

Figure 41:
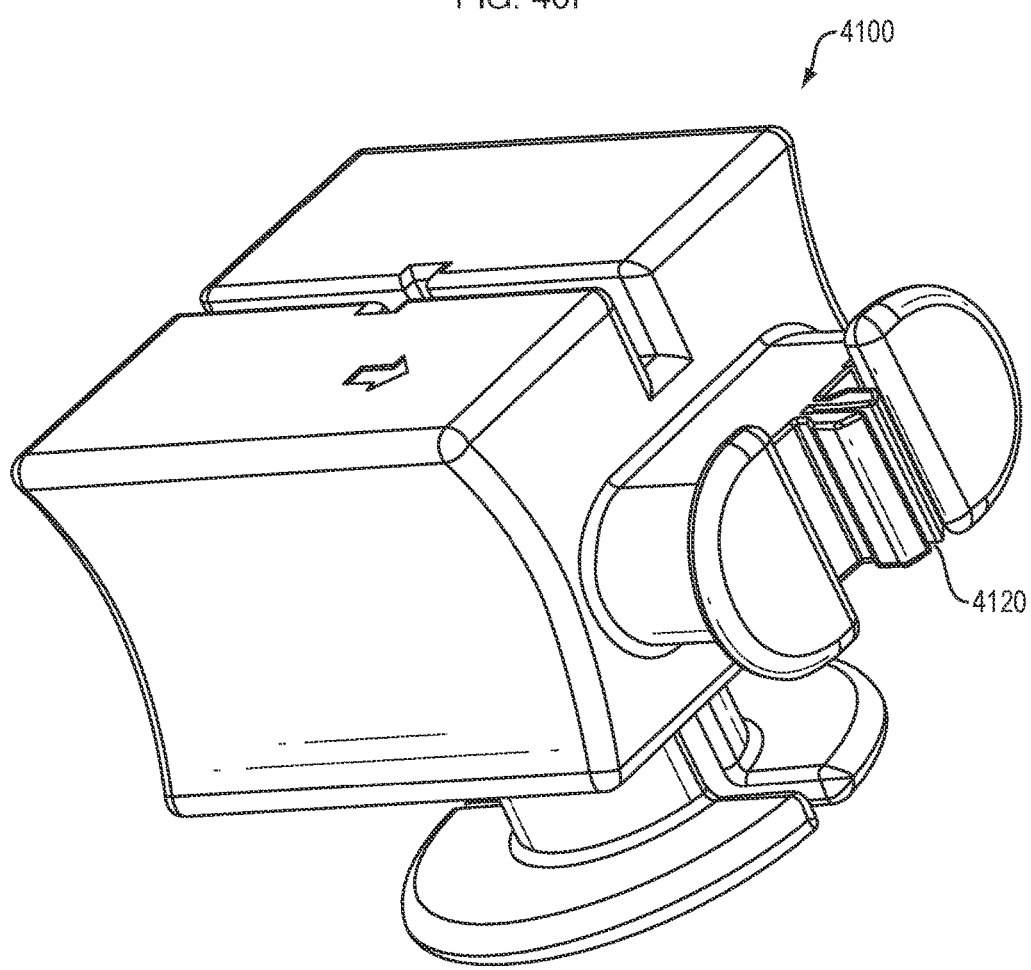
FIG. 41 illustrates an alternative assembly tool in accordance with at least some embodiments.

FIG. 41 illustrates an alternative embodiment of a tool assembly 4100 including an additional suture management channel 4110, poke-yoked to ensure proper order of operations. Once suture is wrapped around the ellipse-shaped base, the suture is brought up and secured within the cleat 4120. After securing the suture, a suture passing device is woven through an aperture of the button implant and snapped onto the rounded outer of the cleat feature, ensuring the finger loop is passed using the suture passer through the button implant prior to disengaging the additional suture from the cleat and unwinding from the base. Additionally, numbers are imprinted on this concept, which correspond to technique steps to aid in user assembly of suture to the button implant.

One skilled in the art will realize the disclosure may be embodied in other specific forms without departing from the spirit or essential characteristics thereof. The foregoing examples are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

What is claimed is:

1. A graft suspension device comprising:
   an adjustable suture loop construct having a first loop and a second loop; and
   an elongate body having a first end, a second end, and a longitudinal axis extending therebetween, a first sidewall extending between the first and second ends along the longitudinal axis, and a second sidewall opposite the first sidewall extending between the first and second ends along the longitudinal axis; wherein the elongate body further comprises:
   at least a first and a second aperture defined through the body adjacent a midpoint of the body defined by the first and second ends;
   a first slot extending though the body and also through one of the first or second sidewalls such that the first slot is adjacent the first aperture;
   a second slot formed through the body and also through one of the first side or second sidewalls such that the second slot is adjacent the second aperture;
   wherein the at least first and second apertures are configured to assemble to the first loop of the adjustable suture loop construct;
   wherein the first and second slots are configured to assemble with the second loop of the adjustable suture loop construct, independently from the first loop and after the second loop has been threaded through a graft, and wherein the adjustable suture loop construct includes a cradle comprising a longitudinal passage, through which a limb end of the adjustable suture loop construct extends, the cradle spacing first loop from the second loop.

2. The graft suspension device of claim 1 wherein the second loop is provided as a continuous loop, free from the elongate body, and wherein the second loop is configured to draw the cradle through graft tissue and then loop over the elongate body and into the first and second slots to assemble the second loop and thereby the graft tissue to the elongate body.

3. The graft suspension device of claim 1 wherein the elongate body further comprises a third and fourth hole, disposed adjacent the first and second end respectively, the third and fourth holes configured to receive the first and second limbs therethrough.

4. The graft suspension device of claim 1 wherein the first and second aperture and the first and second slots define four separate openings, each having an equivalent maximum opening width to each other.

5. The graft suspension device of claim 1 wherein the first and second apertures are closed apertures and disposed directly opposite each other, on either side of the longitudinal axis.

6. The graft suspension device of claim 1 wherein the first and second slots are disposed directly opposite each other, on either side of the longitudinal axis.

7. The graft suspension device of claim 1 wherein the second loop is pre-assembled to a double loop needle system, the double loop needle system formed of a suture separately formed from the adjustable loop construct and configured to stage threading of a free end of the adjustable suture loop construct and the second loop through the graft.

8. The graft suspension device of claim 7 wherein the double loop needle system includes a first continuous loop and a second continuous loop, the first continuous loop configured to couple directly to the second loop of the adjustable suture loop construct, and the second continuous loop is configured to couple directly to the second free end of the adjustable suture loop construct.

9. A graft suspension device comprising:
   an elongate body defining a length, a thickness and a transverse width shorter than the length and having a first end, a second end, and a longitudinal axis extending along the length from the first end to the second end, a first sidewall extending from the first to the second end along the longitudinal axis, and a second sidewall opposite the first sidewall extending from the first end to the second ends end along the longitudinal axis; wherein the elongate body further comprises:
   a pair of holes extending through the entire thickness of the elongate body and disposed adjacent the first end, on opposing sides of the longitudinal axis to each other;
   a pair of slotted holes disposed adjacent the second end, on opposing sides of the longitudinal axis to each other; and
   an adjustable fixation loop construct having a first side and a second side, separated by a cradle, the first side including a first adjustable suture loop and first free end and the second side including a second adjustable suture loop and second free end;
   wherein the first adjustable suture loop is pre-assembled to the pair of holes and wherein the second adjustable loop is pre-assembled to a needle loop, the needle loop including a suture and a needle, the suture formed separately from the adjustable fixation loop and wherein the needle loop is configured to couple the cradle to tissue while the first adjustable loop remains assembled to the pair of holes.

10. The graft suspension device of claim 9 wherein the pair of holes and pair of slotted holes, each define a maximum opening width that are equivalent to each other.

11. The graft suspension device of claim 9 wherein the cradle comprises a longitudinal passage portion through which the first free end and the second free end extend.

12. The graft suspension device of claim 9 wherein the elongate body further comprises a third and a fourth hole, disposed adjacent the first and second end respectively, the third and fourth holes configured to receive one each of the first and second free ends therethrough.

13. The graft suspension device of claim 9 wherein the pair of holes are disposed directly opposite each other.

14. The graft suspension device of claim 9 wherein the pair of slotted holes are disposed directly opposite each other.

15. The graft suspension device of claim 9 wherein the needle loop includes two continuous loops, configured to sequentially pass the second free end followed by the second adjustable suture loop through tissue.

16. The graft suspension device of claim 15 wherein the two continuous loops have different perimeter sizes to each other.

17. The graft suspension device of claim 15 wherein the two continuous loops define a first continuous loop configured to couple directly to the second adjustable loop and hold the second adjustable loop a first distance from the needle, and a second continuous loop, configured to couple directly to the second free end and hold to-the second free end a second, shorter distance from the needle.

18. A graft suspension device comprising:
- an adjustable suture loop construct including a first loop end, a second loop end, a first free limb and a second free limb and a cradle separating the first and second loop ends, the cradle formed of suture and including a longitudinal passage portion though which the first and second free limbs extend; and
- an elongate body having a first end, a second end, and a longitudinal axis extending therebetween, a first sidewall extending between the first and second ends along the longitudinal axis, and a second sidewall opposite the first sidewall extending between the first and second ends along the longitudinal axis; wherein the elongate body further comprises:
- at least a first and a second aperture defined through the body adjacent a midpoint of the body defined by the first and second ends;
- a first slot extending though the body and also through one of the first or second sidewalls such that the first slot is adjacent the first aperture;
- a second slot formed through the body and also through one of the first side or second sidewalls such that the second slot is adjacent the second aperture;
- wherein the at least first and second apertures are preassembled to the first loop of the adjustable suture loop construct; and
- wherein the first and second slots are configured to assemble with the second loop of the adjustable suture loop, after the second loop has been threaded through a graft.

19. The graft suspension device of claim 18 wherein the second loop end is pre-assembled to a separately formed suture loop, and wherein the separately formed suture loop is configured to pass only the second loop end and second free limb through the graft.

* * * * *